United States Patent
Seki et al.

(10) Patent No.: US 9,309,973 B2
(45) Date of Patent: *Apr. 12, 2016

(54) SEALING DEVICE AND SEALING STRUCTURE

(71) Applicant: NOK CORPORATION, Tokyo (JP)

(72) Inventors: Kazunari Seki, Kitaibaraki (JP); Koji Watanabe, Kitaibaraki (JP); Wataru Tokunaga, Kitaibaraki (JP); Yuki Takao, Fujisawa (JP); Fangman Xu, Fujisawa (JP); Hirotaka Mizuta, Fujisawa (JP); Keisuke Nakashima, Fujisawa (JP); Takuya Igawa, Fujisawa (JP); Yusuke Yoshida, Fujisawa (JP); Hideya Watanabe, Kitaibaraki (JP); Yosuke Kondo, Kitaibaraki (JP)

(73) Assignee: NOK CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/384,483

(22) PCT Filed: Mar. 11, 2013

(86) PCT No.: PCT/JP2013/056653
§ 371 (c)(1),
(2) Date: Sep. 11, 2014

(87) PCT Pub. No.: WO2013/137198
PCT Pub. Date: Sep. 19, 2013

(65) Prior Publication Data
US 2015/0108720 A1    Apr. 23, 2015

(30) Foreign Application Priority Data

| Mar. 12, 2012 | (JP) | 2012-054614 |
|---|---|---|
| Mar. 14, 2012 | (JP) | 2012-057617 |
| Apr. 3, 2012 | (JP) | 2012-084544 |
| May 31, 2012 | (JP) | 2012-125009 |
| Jun. 8, 2012 | (JP) | 2012-130693 |
| Jul. 3, 2012 | (JP) | 2012-149282 |
| Aug. 7, 2012 | (JP) | 2012-175150 |
| Aug. 7, 2012 | (JP) | 2012-175151 |
| Aug. 9, 2012 | (JP) | 2012-177232 |
| Sep. 13, 2012 | (JP) | 2012-201402 |
| Sep. 13, 2012 | (JP) | 2012-201403 |
| Sep. 14, 2012 | (JP) | 2012-202870 |
| Oct. 11, 2012 | (JP) | 2012-225731 |
| Nov. 22, 2012 | (JP) | 2012-256323 |
| Nov. 27, 2012 | (JP) | 2012-259065 |
| Nov. 27, 2012 | (JP) | 2012-259069 |
| Nov. 27, 2012 | (JP) | 2012-259078 |

(51) Int. Cl.
*F16J 15/00* (2006.01)
*F16J 15/16* (2006.01)
(Continued)

(52) U.S. Cl.
CPC ............. *F16J 15/164* (2013.01); *F01D 11/003* (2013.01); *F16J 9/20* (2013.01); *F16J 15/18* (2013.01);
(Continued)

(58) Field of Classification Search
CPC ......... F16J 15/32; F16J 15/441; F16J 15/442; F16J 15/26; F16J 15/3292; F16J 15/164; F16J 15/18; F16J 15/181; F16J 15/3208; F01D 11/003
USPC .......................................................... 277/543
See application file for complete search history.

(56) References Cited

U.S. PATENT DOCUMENTS 3,942,806 A * 3/1976 Edlund .......................... 277/589
4,449,718 A * 5/1984 Muller .......................... 277/589
(Continued)

FOREIGN PATENT DOCUMENTS

| CN | 102282397 A | 12/2011 |
|---|---|---|
| JP | 03-88062 | 9/1991 |

(Continued)

OTHER PUBLICATIONS

International Search Report and Written Opinion of the International Searching Authority for PCT/JP2013/056653 (in English and Japanese), mailed May 28, 2013; ISA/JP.
(Continued)

*Primary Examiner* — Kristina Fulton
*Assistant Examiner* — Nathan Cumar
(74) *Attorney, Agent, or Firm* — Harness, Dickey & Pierce, P.L.C.

(57) ABSTRACT

The sealing device includes: an outer peripheral ring 2000 that is in contact with a side wall surface of an annular groove 4100 at a low pressure side (L), and slides with respect to an inner peripheral surface of a shaft hole in a housing 5000 through which a shaft 4000 is inserted. An inner peripheral ring 3000 made of a rubber-like elastic body that is in contact with an inner peripheral surface of the outer peripheral ring 2000 and a groove bottom surface of the annular groove 4100, respectively. The outer peripheral ring 2000 is formed on its outer peripheral surface with a concave portion 2220 which extends from an end of a high pressure side (H) to a position which does not arrive at an end of a low pressure side, so as to introduce fluid thereinto from the high pressure side.

5 Claims, 65 Drawing Sheets

(51) Int. Cl.
*F16J 15/32* (2006.01)
*F16J 15/44* (2006.01)
*F16J 15/18* (2006.01)
*F01D 11/00* (2006.01)
*F16J 9/20* (2006.01)

(52) U.S. Cl.
CPC ............ *F16J 15/181* (2013.01); *F16J 15/3208* (2013.01); *F16J 15/3244* (2013.01); *F16J 15/442* (2013.01)

(56) References Cited

U.S. PATENT DOCUMENTS

| | | | |
|---|---|---|---|
| 4,712,801 A | * | 12/1987 | Kaller ............................ 277/553 |
| 4,995,485 A | * | 2/1991 | Nakamura et al. ....... 188/322.17 |
| 5,098,071 A | | 3/1992 | Umetsu |
| 7,461,708 B2 | | 12/2008 | Yong et al. |
| 2010/0133757 A1 | | 6/2010 | Maeda et al. |
| 2011/0278799 A1 | | 11/2011 | Seki et al. |
| 2012/0235361 A1 | | 9/2012 | Tadano et al. |

FOREIGN PATENT DOCUMENTS

| | | | |
|---|---|---|---|
| JP | 04-66459 | | 6/1992 |
| JP | 08-254272 | | 10/1996 |
| JP | 09133215 | A | 5/1997 |
| JP | 09-217836 | | 8/1997 |
| JP | 2000-081146 | A | 3/2000 |
| JP | 2006-329337 | A | 12/2006 |
| JP | 2007-198478 | A | 8/2007 |
| JP | 2007-247672 | A | 9/2007 |
| JP | 2010265937 | A | 11/2010 |
| JP | 4665046 | B1 | 4/2011 |
| JP | 2011144847 | A | 7/2011 |
| KR | 20080108981 | A | 12/2008 |
| WO | 2007105589 | A1 | 9/2007 |
| WO | WO 2010084853 | * | 7/2010 ............... F16J 15/16 |

OTHER PUBLICATIONS

Korean Office Action dated Jun. 9, 2015 with English translation.
Extended European search report dated Nov. 18, 2015.
Chinese Office Action dated Jun. 1, 2015 with English translation.
Chinese Office Action dated Jun. 24, 2015 with English translation.

* cited by examiner

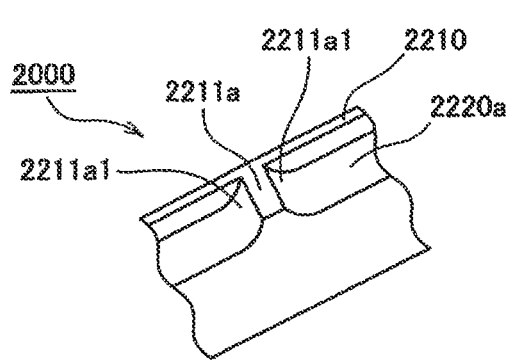
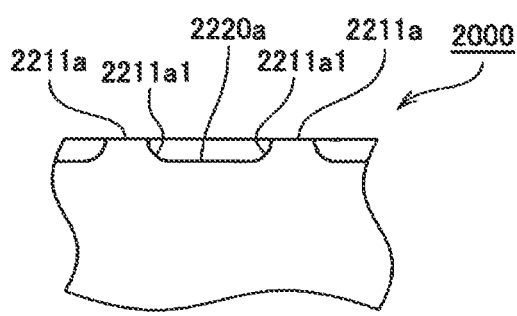
Fig. 26(a)   Fig. 26(b)
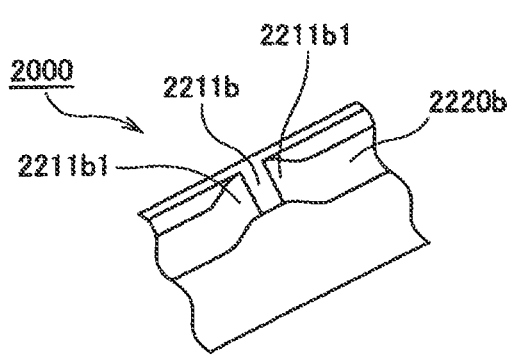
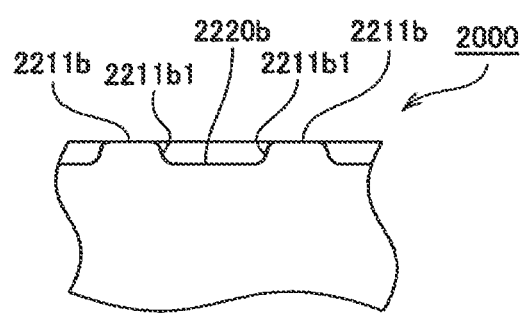
Fig. 27(a)   Fig. 27(b)
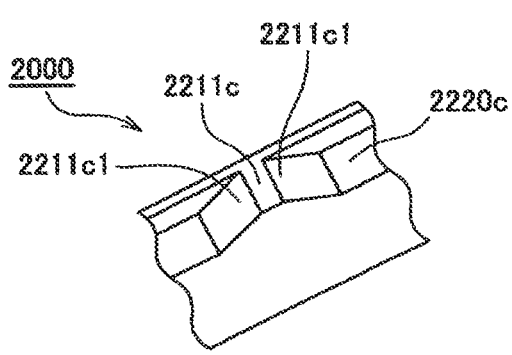
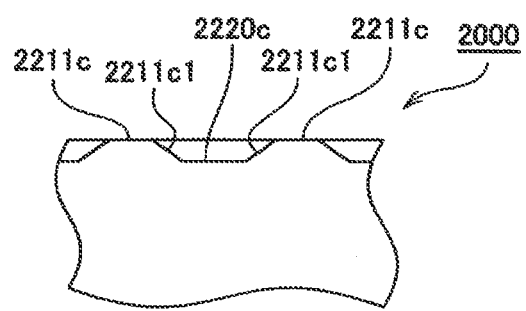
Fig. 28(a)   Fig. 28(b)

SEALING DEVICE AND SEALING STRUCTURE

CROSS-REFERENCE TO RELATED APPLICATIONS

This application is a National Stage of International Application No. PCT/JP2013/056653, filed Mar. 11, 2013, which claims priority to: Japanese Patent Application No. 2012-054614, filed Mar. 12, 2012; Japanese Patent Application No. 2012-057617, filed Mar. 14, 2012; Japanese Patent Application No. 2012-084544, filed Apr. 3, 2012; Japanese Patent Application No. 2012-125009, filed May 31, 2012; Japanese Patent Application No. 2012-130693, filed Jun. 8, 2012; Japanese Patent Application No. 2012-149282, filed Jul. 3, 2012; Japanese Patent Application No. 2012-175150, filed Aug. 7, 2012; Japanese Patent Application No. 2012-175151, filed Aug. 7, 2012; Japanese Patent Application No. 2012-177232, filed Aug. 9, 2012; Japanese Patent Application No. 2012-201402, filed Sep. 13, 2012; Japanese Patent Application No. 2012-201403, filed Sep. 13, 2012; Japanese Patent Application No. 2012-202870, filed Sep. 14, 2012; Japanese Patent Application No. 2012-225731, filed Oct. 11, 2012; Japanese Patent Application No. 2012-256323, filed Nov. 22, 2012; Japanese Patent Application No. 2012-259065, filed Nov. 27, 2012; Japanese Patent Application No. 2012-259069, filed Nov. 27, 2012; Japanese Patent Application No. 2012-259078, filed Nov. 27, 2012. The entire disclosures of each of the above applications are incorporated herein by reference.

FIELD

The present disclosure relates to a sealing device and a sealing structure which serve to seal an annular gap between a shaft and a shaft hole in a housing.

BACKGROUND

In an automatic transmission (AT) and a continuously variable transmission (CVT) for automotive vehicle, in order to hold oil pressure, there is arranged a seal ring which serves to seal an annular gap between a shaft and a housing which rotate relative to each other. A seal ring according to a conventional example will be explained while referring to FIG. 138 and FIG. 139. FIG. 138 is a schematic cross sectional view showing a state in which oil pressure is not held in the seal ring according to the conventional example. FIG. 139 is a schematic cross sectional view showing a state in which oil pressure is held in the seal ring according to the conventional example. A seal ring 6000 according to the conventional example is fitted in an annular groove 4100 formed in an outer periphery of a shaft 4000. And, the seal ring 6000 seals an annular gap between a shaft hole in a housing 5000 and the shaft 4000 by making sliding contact with an inner peripheral surface of the shaft hole in the housing 5000 through which the shaft 4000 is inserted, and with a side wall surface of the annular groove 4100, respectively.

The seal ring 6000 used for the above-mentioned usage is required to make sliding torque sufficiently low. For that reason, the peripheral length of an outer peripheral surface of the seal ring 6000 is made shorter than the peripheral length of the inner peripheral surface of the shaft hole in the housing 5000. In this manner, the seal ring 6000 is constructed such that it does not have a tightening margin with respect to the inner peripheral surface of the shaft hole. Then, in a state where an engine of an automotive vehicle is started to operate and the oil pressure is high, the seal ring 6000 is expanded in its diameter due to the oil pressure, so that it makes intimate contact with the inner peripheral surface of the shaft hole and the side wall surface of the annular groove 4100. As a result of this, a function to hold the oil pressure is exhibited to a sufficient extent (refer to FIG. 139).

In contrast to this, in a state where the oil pressure is not applied due to stoppage of the engine, the seal ring 6000 is in a state apart or separated from the inner peripheral surface of the shaft hole or side wall surfaces of the annular groove 4100 (refer to FIG. 138). For that reason, in the state where the oil pressure is not applied, the seal ring 6000 does not exhibit a sealing function. Accordingly, in a construction in which transmission control is carried out by means of oil pressure fed by a hydraulic pump, as in the case of an AT or a CVT, the oil having been sealed by the seal ring 6000 will return to an oil pan in an unloaded condition in which the hydraulic pump is stopped (for example, at the time of idling stop). As a result of this, the oil in the vicinity of the seal ring 6000 will be lost. Thus, when the engine is started (restarted) from this state, there will be no oil in the vicinity of the seal ring 6000, and engine operation will be started in a state where there is no lubrication. For that reason, there is a problem that responsiveness and operability are bad.

PRIOR ART REFERENCES

Patent Documents

[First Patent Document] Japanese patent No. 4665046
[Second Patent Document] Japanese patent application laid-open No. 2011-144847
[Third Patent Document] Japanese patent application laid-open No. 2010-265937

SUMMARY

Problem to be Solved by the Disclosure

An object of the present disclosure is to provide a sealing device and a sealing structure which are capable of exhibiting a sealing function even in a state where fluid pressure is low or in a state where there is no fluid pressure, while suppressing sliding torque to a low level.

Means for Solving the Problem

In order to solve the above-mentioned problem, the present disclosure adopts the following means.

That is, a sealing device of the present disclosure, which is fitted into an annular groove formed in an outer periphery of a shaft so as to seal an annular gap between said shaft and a housing which rotate relative to each other, thereby to hold a fluid pressure in a region to be sealed which is constructed such that the fluid pressure therein changes comprising: an outer peripheral ring made of resin that is in intimate contact with a side wall surface of said annular groove at a low pressure side thereof, and slides with respect to an inner peripheral surface of a shaft hole in said housing through which said shaft is inserted; and an inner peripheral ring made of a rubber-like elastic body that is in intimate contact with an inner peripheral surface of said outer peripheral ring and a groove bottom surface of said annular groove, respectively, thereby to push said outer peripheral ring toward an outer peripheral surface side thereof; wherein said outer peripheral ring has a concave portion formed on its outer peripheral surface to extend from an end of a high pressure side to a position which does not arrive at an end of a low pressure side, so as to introduce fluid thereinto from the high pressure side.

Here, note that in the present disclosure, the "high pressure side" means a side at which pressure is higher than at the other side at the time when a differential pressure has occurred on opposite sides of the sealing device, and the "low pressure side" means a side at which pressure is lower than at the other side at the time when a differential pressure has occurred on opposite sides of the sealing device.

According to the sealing device of the present disclosure, the outer peripheral ring is pushed toward the outer peripheral surface side thereof by means of the inner peripheral ring. For that reason, even in a state where the fluid pressure does not act (a differential pressure has not occurred), or in a state where the fluid pressure does not substantially act (a differential pressure has not substantially occurred), the outer peripheral ring will be in a state of being in contact with the inner peripheral surface of the shaft hole in the housing, so that a sealing function thereof can be exhibited. Accordingly, the fluid pressure can be made to be held from immediately after the fluid pressure in the region to be sealed begins to increase. In addition, the concave portion is formed on the outer peripheral surface of the outer peripheral ring, so that fluid can be introduced into this concave portion from the high pressure side. For that reason, even if the fluid pressure becomes higher, the fluid pressure acts toward the inner peripheral surface side of the outer peripheral ring in a region in which the concave portion is formed. Accordingly, an increase in pressure toward the outer peripheral surface by means of the outer peripheral ring accompanying the increase in the fluid pressure can be suppressed, thus making it possible to suppress sliding torque to a low level.

Effect of the Disclosure

As described above, according to the present disclosure, it is possible to exhibit a sealing function even in a state where fluid pressure is low or in a state where there is no fluid pressure, while suppressing sliding torque to a low level.

DRAWINGS

FIG. 26 is a part of an external view of an outer peripheral ring according to a first modification of the first practical example of the present disclosure.

FIG. 27 is a part of an external view of an outer peripheral ring according to a second modification of the first practical example of the present disclosure.

FIG. 28 is a part of an external view of an outer peripheral ring according to a third modification of the first practical example of the present disclosure.

DETAILED DESCRIPTION

Hereinafter, modes for carrying out the present disclosure will be described in detail by way of example based on a preferred embodiment and practical examples thereof with reference to the accompanying drawings. However, the dimensions, materials, shapes, relative arrangements and so on of component parts described in the embodiment and practical examples are not intended to limit the scope of the present disclosure to these alone in particular as long as there are no specific statements. Here, note that sealing devices according to the present embodiment and practical examples are used for the use or purpose of sealing an annular gap between a shaft and a housing which rotate relative to each other in order to hold oil pressure in speed-change gears or transmissions for automotive vehicles, such as AT, CVT, etc. In addition, in the following description, a "high pressure side" means a side at which pressure is higher than at the other side at the time when a differential pressure has occurred on opposite sides of a sealing device, and a "low pressure side" means a side at which pressure is lower than at the other side at the time when a differential pressure has occurred on the opposite sides of the sealing device.

Embodiment

Hereinafter, a sealing device and a sealing structure according to an embodiment of the present disclosure will be explained while referring to FIG. 1 through FIG. 6.

<Construction of the Sealing Device and the Sealing Structure>

Figure 1:
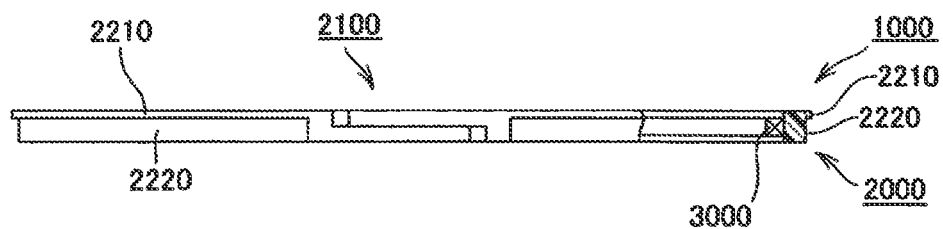
FIG. 1 is a partially broken cross sectional view of a sealing device according to an embodiment of the present disclosure.
Figure 2:
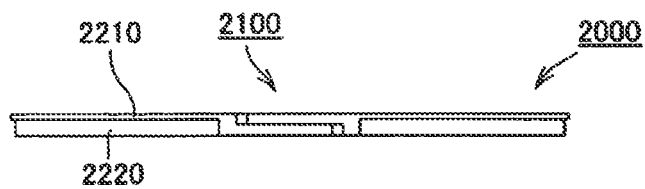
FIG. 2 is a view of an outer peripheral ring seen from an outer peripheral surface side thereof according to the embodiment of the present disclosure.
Figure 3:
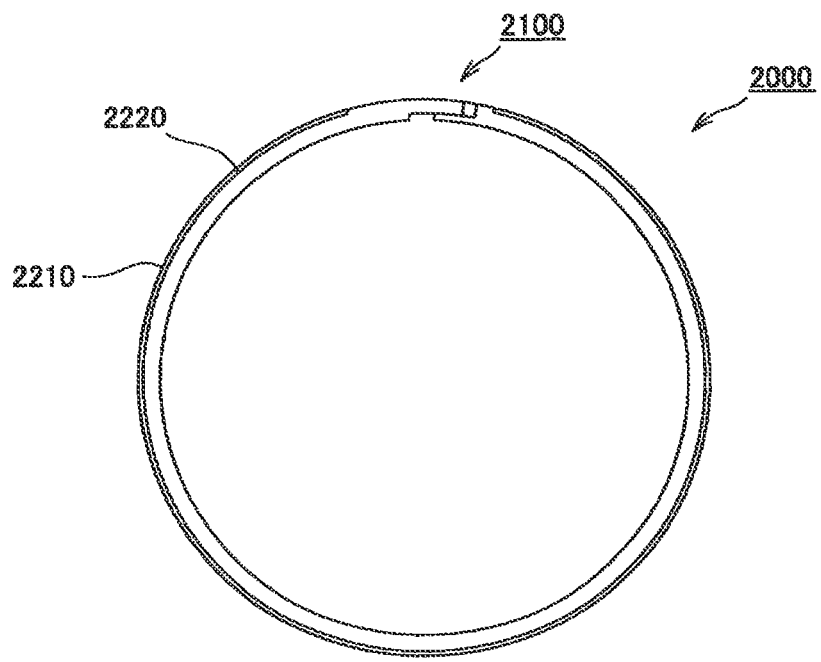
FIG. 3 is a side view of the outer peripheral ring according to the embodiment of the present disclosure.
Figure 4:
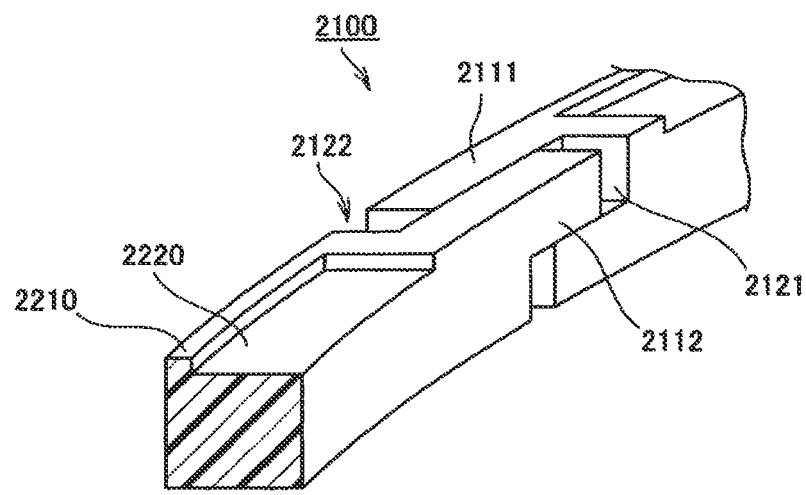
FIG. 4 is a partially broken perspective view of the outer peripheral ring according to the embodiment of the present disclosure.
Figure 5:
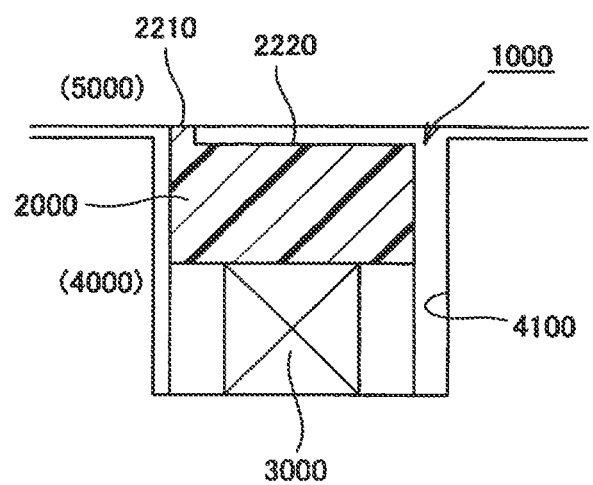
FIG. 5 is a schematic cross sectional view showing an unloaded state in the sealing device according to the embodiment of the present disclosure.

The construction of the sealing device and the sealing structure according to the embodiment of the present disclosure will be explained, while referring in particular to FIG. 1, FIG. 5 and FIG. 6. The sealing device 1000 according to the present embodiment is mounted or fitted in an annular groove 4100 formed in an outer periphery of a shaft 4000. Then, the sealing device 1000 serves to seal an annular gap between the shaft 4000 and a housing 5000 (an inner peripheral surface of a shaft hole in the housing 5000 through which the shaft 4000 is inserted) which rotate relative to each other. As a result of this, the sealing device 1000 holds fluid pressure in a region to be sealed which is constructed in such a manner that the fluid pressure (oil or hydraulic pressure in this embodiment) can change. Here, in this embodiment, it is constructed such that fluid pressure in a region at the right side in FIG. 5 and FIG. 6 can change, and the sealing device 1000 bears the role of holding the fluid pressure in the region to be sealed at the right side in these figures. Here, note that in a state where an engine of an automotive vehicle has been stopped, the fluid pressure in the region to be sealed is low and the engine is in an unloaded state, whereas when the engine is started, the fluid pressure in the region to be sealed will become high.

Then, the sealing device 1000 according to this embodiment is composed of an outer peripheral ring 2000 made of resin, and an inner peripheral ring 3000 made of a rubber-like elastic body. As preferable examples of a material for the outer peripheral ring 2000, there can be mentioned polyether ether ketone (PEEK), polyphenylene sulfide (PPS), and polytetrafluoroethylene (PTFE). In addition, as preferable examples of a material for the inner peripheral ring 3000, there can be mentioned acrylic rubber (ACM), fluororubber (FKM), and hydrogenated nitrile rubber (HNBR). In FIG. 1, FIG. 5 and FIG. 6, the inner peripheral ring 3000 is shown in a simplified manner.

In addition, it is constructed such that in a state where the outer peripheral ring 2000 and the inner peripheral ring 3000 are combined or assembled together, a peripheral length of an outer peripheral surface of the outer peripheral ring 2000 becomes longer than a peripheral length of an inner peripheral surface of the shaft hole in the housing 5000. Here, note that, for the outer peripheral ring 2000 as a single or separate member, the peripheral length of the outer peripheral surface thereof is made shorter than the peripheral length of the inner peripheral surface of the shaft hole in the housing 5000. In other words, the outer peripheral ring 2000 as a single member is constructed such that it does not have a tightening margin with respect to the inner peripheral surface of the shaft hole. Accordingly, if the outer peripheral ring 2000 is made in a state where the inner peripheral ring 3000 is not mounted or fitted therein and an external force does not act thereon, the outer peripheral surface of the outer peripheral ring 2000 will not be in contact with the inner peripheral surface of the shaft hole in the housing 5000.

<Outer Peripheral Ring>

In particular, the outer peripheral ring 2000 according to the embodiment of the present disclosure will be explained in further detail while referring to FIG. 1 through FIG. 4. An abutment joint portion 2100 is formed on the outer peripheral ring 2000 at one place in a circumferential direction thereof. In addition, the outer peripheral ring 2000 is formed on its outer peripheral surface with a concave portion 2220 for introducing fluid. Here, note that the outer peripheral ring 2000 according to this embodiment is constructed such that the abutment joint portion 2100 and the concave portion 2220 as mentioned above are formed on an annular member of which the cross section is rectangular. However, this is only an explanation of the shape thereof, but does not necessarily mean that an annular member of a rectangular cross section is used as a material, and processing to form the abutment joint portion 2100 and the concave portion 2220 is applied to this material. Of course, after an annular member of a rectangular cross section has been molded or formed, the abutment joint portion 2100 and the concave portion 2220 can also be obtained by means of cutting work. However, for example, after molding or forming a member which has the abutment joint portion 2100 in advance, the concave portion 2220 may be obtained by means of cutting work. In this manner, the method of production thereof is not limited in particular.

The abutment joint portion 2100 adopts a so-called special step cut which is formed by being cut in a stepwise shape even when seen from any of an outer peripheral surface side and opposite side wall surface sides thereof. As a result of this, in the outer peripheral ring 2000, a first fitting convex portion 2111 and a first fitting concave portion 2121 are formed at one outer peripheral side of a cut portion, and a second fitting concave portion 2122 into which the first fitting convex portion 2111 fits, and a second fitting convex portion 2112 which fits into the first fitting concave portion 2121, are formed at the other outer peripheral side. A special step cut has a characteristic of maintaining stable sealing performance even if the peripheral length of the outer peripheral ring 2000 is changed due to thermal expansion and contraction. Such a special step cut is a well-known technique, so a detailed explanation thereof is omitted.

Here, a case of the special step cut has been shown as an example of the abutment joint portion 2100. However, for the abutment joint portion 2100, there can be adopted a straight cut, a bias cut, another step cut, and so on, including but not limited to this. Here, note that the step cut is of a stepwise cut structure even if seen from any of an outer peripheral surface side and an inner peripheral surface side. In addition, in cases where a material (e.g., PTFE, etc.) of low elasticity is adopted as a material of the outer peripheral ring 2000, the outer peripheral ring 2000 may also be endless, without forming the abutment joint portion 2100.

The concave portion 2220 is formed substantially over the entire periphery except for the vicinity of the abutment joint portion 2100. In addition, this concave portion 2220 is formed in such a manner that it extends from one end (i.e., a high pressure side (H) as referred to later) of the outer peripheral ring 2000 to a location not reaching the other end thereof (i.e., a low pressure side (L) as referred to later). More specifically, this concave portion 2220 is formed so as to extend to the vicinity of the other end of the outer peripheral ring 2000. Here, note that a bottom surface of the concave portion 2220 is composed of a surface which is concentric with an inner peripheral surface of the outer peripheral ring 2000. Hereinafter, a portion of the outer peripheral surface side of the outer peripheral ring 2000 in which the concave portion 2220 is not formed at the other side (the low pressure side (L)) is referred to as a low pressure side convex portion 2210. Here, note that the shallower the depth of the concave portion 2220, the higher becomes the rigidity of the portion of the outer peripheral ring 2000 in which the low pressure side convex portion 2210 is formed. On the other hand, the low pressure side convex portion 2210 is worn out due to the relative sliding movement thereof, so the depth of the concave portion 2220 becomes shallower as the time elapses. For that reason, when the depth of the concave portion 2220 becomes too much shallow, it will become impossible to introduce fluid therein. Accordingly, it is desirable to set an initial depth of the concave portion 2220 by taking into consideration both the above-mentioned rigidity and the maintenance of introduction of fluid even if the wear progresses with the lapse of time. For example, in cases where the thickness of the outer peripheral ring 2000 is 1.7 mm, it is preferable to set the depth of the concave portion 2220 to be equal to or more than about 0.1 mm and equal to or less than about 0.3 mm.

In addition, with respect to the width (width in an axial direction) of the concave portion 2220, the wider the width of the concave portion 2220, the narrower becomes the width of the low pressure side convex portion 2210. The narrower becomes this width, the more the torque can be reduced, but if the width is made too much narrow, sealing efficiency and durability will become low. Accordingly, it is desirable to narrow the width concerned as much as possible according to service conditions, etc., to such an extent that sealing efficiency and durability can be maintained. Here, note that for example, in cases where the entire length of the width (width in the axial direction) of the outer peripheral ring 2000 is 1.9 mm, it is preferable to set the width of the low pressure side convex portion 2210 to be equal to or more than about 0.3 mm and equal to or less than about 0.7 mm.

<Mechanism at the Time of Using the Sealing Device>

A mechanism at the time of using the sealing device 1000 according to this embodiment of the present disclosure will be explained, while referring in particular to FIG. 5 and FIG. 6. FIG. 5 shows an unloaded (or low load) state in which the engine is stopped, and there does not exist a differential pressure (or there exists substantially no differential pressure) between right-hand side region of the sealing device 1000 and left-hand side region of the sealing device 1000. FIG. 6 shows a state in which the engine is operated, and the fluid pressure in the right-hand side region of the sealing device 1000 has become higher in comparison with that in the left-hand side region of the sealing device 1000.

In a state where the sealing device 1000 is fitted in the annular groove 4100, the inner peripheral ring 3000 made of a rubber-like elastic body is in intimate contact with the inner peripheral surface of the outer peripheral ring 2000 and a groove bottom surface of the annular groove 4100, respectively. Then, the inner peripheral ring 3000 exhibits a function of pushing the outer peripheral ring 2000 toward its outer peripheral surface side due to the elastic repulsion thereof.

Accordingly, even if the engine is in an unloaded state, those portions of the outer peripheral surface of the outer peripheral ring 2000 which exclude the concave portion 2220 (i.e., the low pressure side convex portion 2210 and a portion of the outer peripheral ring 2000 in the vicinity of the abutment joint portion 2100 in which the concave portion 2220 is not formed) maintain a state in which they are in contact with the inner peripheral surface of the shaft hole in the housing 5000.

Figure 6:
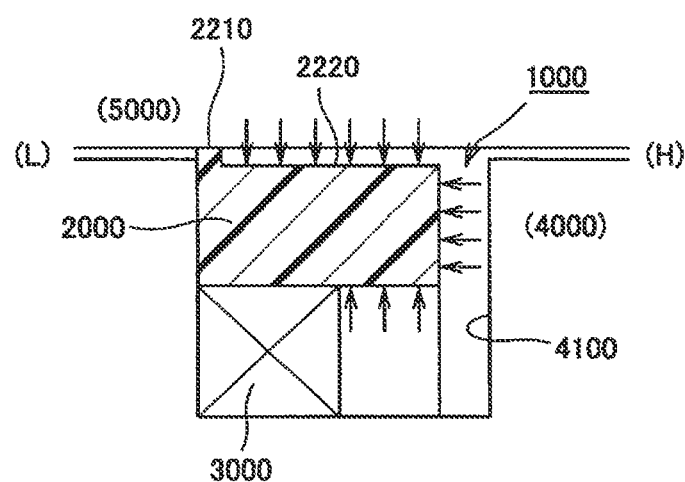
FIG. 6 is a schematic cross sectional view showing a high pressure state in the sealing device according to the embodiment of the present disclosure.

Then, in a state in which the engine is started to generate a differential pressure, the outer peripheral ring 2000 is pushed to the low pressure side (L) by means of the fluid pressure from the high pressure side (H), so that it becomes a state of being in intimate contact with the side wall surface of the annular groove 4100 at the low pressure side (L), as shown in FIG. 6. Here, note that it is needless to say that the outer peripheral ring 2000 maintains the state of being in contact (sliding) with the inner peripheral surface of the shaft hole in the housing 5000. In addition, with respect to the inner peripheral ring 3000, too, it also becomes a state where it is in intimate contact with the side wall surface of the annular groove 4100 at the low pressure side (L).

<Advantages of the Sealing Device and the Sealing Structure According to this Embodiment>

According to the sealing device 1000 and sealing structure provided therewith according to this embodiment of the present disclosure, the outer peripheral ring 2000 is pushed toward the outer peripheral surface side thereof by mean of the inner peripheral ring 3000. For that reason, even in a state where the fluid pressure does not act (a differential pressure has not occurred), or in a state where the fluid pressure does not substantially act (a differential pressure has not substantially occurred), the outer peripheral ring 2000 becomes the state of being in contact with the inner peripheral surface of the shaft hole in the housing 5000. Here, note that an annular continuous sealing surface is formed by the outer peripheral surface of the low pressure side convex portion 2210 and that portion of the outer peripheral surface of the outer peripheral ring 2000 in which the concave portion 2220 is not formed in the vicinity of the abutment joint portion 2100.

Accordingly, the fluid pressure can be made to be held from immediately after the fluid pressure in the region to be sealed begins to increase. In other words, in an engine having an idling stop function, oil pressure can be made to be held immediately after oil pressure at the side of the region to be sealed begins to increase due to starting of the engine by an accelerator being depressed from an engine stopped state.

Here, in general, in the case of a seal ring made of resin, the function of suppressing the leakage of fluid is not exhibited so much. However, in this embodiment, the outer peripheral ring 2000 is pushed toward the outer peripheral surface side thereof by mean of the inner peripheral ring. For that reason, the function of suppressing the leakage of fluid is exhibited to some extent. As a result of this, even after the action of a pump, etc., is stopped due to stoppage of the engine, it becomes possible to maintain the state where a differential pressure has occurred for a while. For that reason, in the engine having an idling stop function, in cases where the stopped state of the engine is not so long, it is possible to maintain the state where a differential pressure has occurred. Accordingly, at the time of carrying out the restarting of the engine, it is possible to hold the fluid pressure in a suitable manner from immediately after that.

In addition, the concave portion 2220 is formed on the outer peripheral surface of the outer peripheral ring 2000, so that fluid can be introduced into this concave portion 2220 from the high pressure side (H). For that reason, even if the fluid pressure becomes higher, the fluid pressure acts toward the inner peripheral surface side of the outer peripheral ring 2000 in a region in which the concave portion 2220 is formed. Here, in this embodiment, the bottom surface of the concave portion 2220 is composed of a surface which is concentric with the inner peripheral surface of the outer peripheral ring 2000. For that reason, in the region in which the concave portion 2220 is formed, a direction in which the fluid pressure acts from the inner peripheral surface side and a direction in which the fluid pressure acts from the outer peripheral surface side become opposite to each other. Furthermore, it is needless to say that in a region in which the outer peripheral ring 2000 receives pressure from both of the inner peripheral surface side and the outer peripheral surface side, an outside diameter of the outer peripheral ring 2000 is larger than an inside diameter thereof, and hence, an area in which the fluid pressure acts becomes wider in the outer peripheral surface side than in the inner peripheral side. Here, note that an arrow in FIG. 6 shows how the fluid pressure acts with respect to the outer peripheral ring 2000. In this manner, in the sealing device 1000 according to this embodiment, it is possible to suppress an increase in pressure toward the outer peripheral surface by means of the outer peripheral ring 2000 accompanying an increase in the fluid pressure, thus making it possible to suppress sliding torque to a low level.

Moreover, in this embodiment, the inner peripheral ring 3000 is in intimate contact with the inner peripheral surface of the outer peripheral ring 2000 and the groove bottom surface of the annular groove 4100, respectively, so that it exhibits a sealing function in these intimate contact portions thereof. For that reason, by the sealing function of the inner peripheral ring 3000, it is possible to suppress the action of the fluid pressure with respect to that portion of the inner peripheral surface of the outer peripheral ring 2000 which corresponds to a sliding portion between the low pressure side convex portion 2210 in the outer peripheral ring 2000 and the shaft hole inner peripheral surface. In other words, as shown in FIG. 6, in the region of the low pressure side (L) from the intimate contact portion of the inner peripheral ring 3000, it is possible to suppress the action of the fluid pressure with respect to the inner peripheral surface of the outer peripheral ring 2000. Accordingly, even if the fluid pressure at the high pressure side (H) increases, it is possible to suppress an increase in the pressure to the outer peripheral surface side by the outer peripheral ring 2000 in an effective manner.

Further, in this embodiment, the concave portion 2220 is formed so as to extend from an end of the high pressure side (H) to the vicinity of an end of the low pressure side (L) and over the entire periphery of the outer peripheral ring 2000 except for the vicinity of the abutment joint portion 2100. Thus, in this embodiment, due to the fact that the concave portion 2220 is formed over a wide range of the outer peripheral surface of the outer peripheral ring 2000, it is possible to make the sliding area between the outer peripheral ring 2000 and the inner peripheral surface of the shaft hole in the housing 5000 as narrow as possible. As a result, the sliding torque can be reduced very much. Here, note that the sliding area between the outer peripheral ring 2000 and the inner peripheral surface of the shaft hole in the housing 5000 is sufficiently narrower than the area of intimate contact between the outer peripheral ring 2000 and the side wall surface of the annular groove 4100 at the low pressure side (L). With this, it is possible to suppress the outer peripheral ring 2000 from sliding with respect to the side wall surface of the annular groove 4100 at the low pressure side (L). Accordingly, the outer peripheral ring 2000 according to this embodiment slides at the outer peripheral surface side. For that reason, in comparison with the case of a seal ring which slides with respect to the side wall surface of the annular groove, it becomes easy for a lubricating film (here an oil film) of the fluid being sealed to be formed, so that the sliding torque can be reduced to a further extent.

In this manner, the generation of heat due to sliding can be suppressed by being able to achieve the reduction of the sliding torque. Accordingly, it becomes possible to use the sealing device 1000 according to this embodiment in a suitable manner even under a high-speed high-pressure environmental condition.

Hereinafter, some more specific examples will be described. Here, note that in the following individual reference examples and individual practical examples, the use of sealing devices, and materials for their outer peripheral rings and inner peripheral rings are as described in the above-mentioned embodiment. Accordingly, in the following individual reference examples and individual practical examples, the explanation of these will be omitted as the case may be.

First Reference Example

Figure 7:
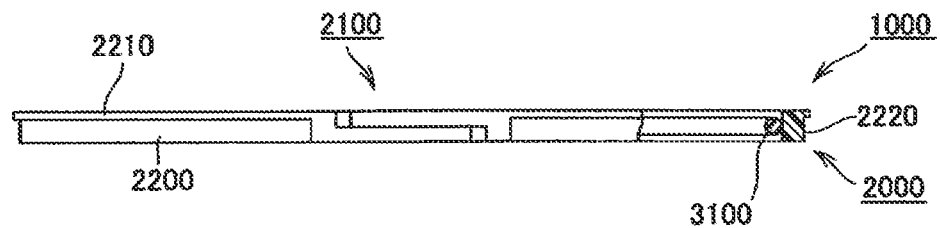
FIG. 7 is a partially broken cross sectional view of a sealing device according to a first reference example of the present disclosure.
Figure 8:
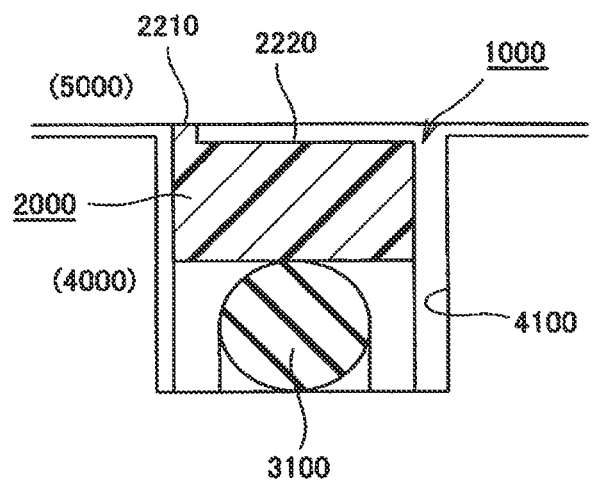
FIG. 8 is a schematic cross sectional view showing an unloaded state in the sealing device according to the first reference example of the present disclosure.
Figure 9:
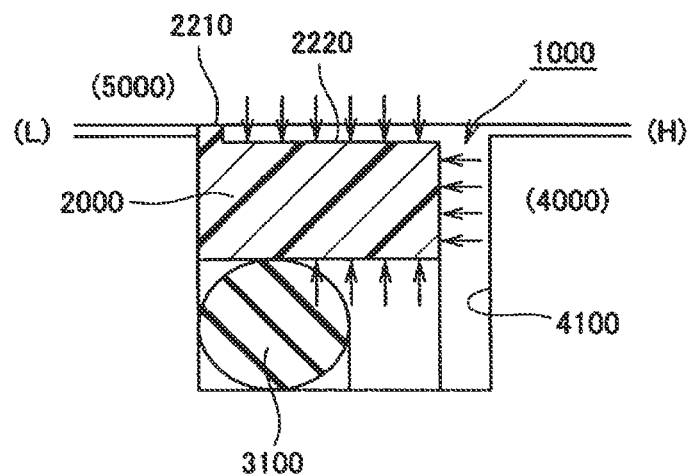
FIG. 9 is a schematic cross sectional view showing a high pressure state in the sealing device according to the first reference example of the present disclosure.

Hereinafter, a sealing device and a sealing structure according to a first reference example of the present disclosure will be explained while referring to FIG. 7 through FIG. 9. In this reference example, a construction is shown in which an O ring is adopted as the inner peripheral ring in the above-mentioned embodiment. The other construction and operation of this example are the same as those in the above-mentioned embodiment, and hence, the same parts as those of the above-mentioned embodiment are denoted by the same reference numerals and characters, and the explanation thereof is omitted as the case may be.

A sealing device 1000 according to this reference example is composed of an outer peripheral ring 2000 made of resin, and an inner peripheral ring 3100 made of a rubber-like elastic body. The inner peripheral ring 3100 according to this reference example is a so-called O ring having a circular cross sectional shape.

It is constructed such that in a state where the outer peripheral ring 2000 and the inner peripheral ring 3100 are combined or assembled together, a peripheral length of an outer peripheral surface of the outer peripheral ring 2000 becomes longer than a peripheral length of an inner peripheral surface of a shaft hole in a housing 5000, as explained in the above-mentioned embodiment. Here, note that for the outer peripheral ring 2000 as a single or separate member, the peripheral length of the outer peripheral surface thereof is made shorter than the peripheral length of the inner peripheral surface of the shaft hole in the housing 5000, as explained in the above-mentioned embodiment.

The outer peripheral ring 2000 is the same as explained in the above-mentioned embodiment, and so, the detailed explanation thereof is omitted. In addition, a mechanism at the time of use of the sealing device 1000, too, is the same as explained in the above-mentioned embodiment. Here, note that FIG. 8 shows an unloaded state in which an engine is stopped, and there does not exist a differential pressure (or there exists substantially no differential pressure) between right-hand side region of the sealing device 1000 and left-hand side region of the sealing device 1000. FIG. 9 shows a state in which the engine is operated, and fluid pressure in the right-hand side region of the sealing device 1000 has become higher in comparison with that in the left-hand side region of the sealing device 1000. The advantage of the sealing device 1000 and the sealing structure provided with this sealing device according to this reference example are the same as explained in the above-mentioned embodiment.

Second Reference Example

Summary

A sealing device according to a second reference example of the present disclosure, which is fitted into an annular groove formed in an outer periphery of a shaft so as to seal an annular gap between said shaft and a housing which rotate relative to each other, thereby to hold a fluid pressure in a region to be sealed which is constructed such that the fluid pressure therein changes, comprising: an outer peripheral ring made of resin that is in intimate contact with a side wall surface of said annular groove at a low pressure side thereof, and slides with respect to an inner peripheral surface of a shaft hole in said housing through which said shaft is inserted; and an inner peripheral ring made of a rubber-like elastic body that is fitted in a mounting groove formed in an inner peripheral surface of said outer peripheral ring, and is in intimate contact with a groove bottom surface of said mounting groove and a groove bottom surface of said annular groove, respectively, thereby to push said outer peripheral ring toward an outer peripheral surface side thereof; wherein said outer peripheral ring is formed on its outer peripheral surface with a concave portion which extends from an end of a high pressure side to a position which does not arrive at an end of a low pressure side, so as to introduce fluid thereinto from the high pressure side.

According to the sealing device according to this second reference example, the following advantages are achieved in comparison with the sealing device explained in the above-mentioned embodiment. That is, in this reference example, the inner peripheral ring is fitted into the mounting groove formed in the inner peripheral surface of the outer peripheral ring, so that the position and posture of the inner peripheral ring with respect to the outer peripheral ring are stabilized. Accordingly, the outer peripheral ring can be pushed toward the outer peripheral surface side in a stable manner. In addition, even if fluid pressure acts on the inner and outer peripheral rings, it is possible to suppress the inner peripheral ring from being twisted.

Specific Example

Hereinafter, a sealing device and a sealing structure according to the second reference example of the present disclosure will be explained more specifically, while referring to FIG. 10 through FIG. 13. Here, note that the basic construction of this example is the same as that of the above-mentioned embodiment and the above-mentioned first reference example, so the same parts are denoted by the same reference numerals and characters, and the explanation thereof is omitted.

A sealing device 1000 according to this second reference example is composed of an outer peripheral ring 2000 made of resin, and an inner peripheral ring 3100 made of a rubber-like elastic body. The inner peripheral ring 3100 according to this second reference example is a so-called O ring having a circular cross sectional shape. However, the inner peripheral ring 3100 is not limited to the O ring, but as such there can be adopted other seal ring such as a rectangular or polygonal ring, etc.

It is constructed such that in a state where the outer peripheral ring 2000 and the inner peripheral ring 3100 are combined or assembled together, a peripheral length of an outer peripheral surface of the outer peripheral ring 2000 becomes longer than a peripheral length of an inner peripheral surface of a shaft hole in a housing 5000, as explained in the above-mentioned embodiment. Here, note that for the outer peripheral ring 2000 as a single or separate member, the peripheral length of the outer peripheral surface thereof is made shorter than the peripheral length of the inner peripheral surface of the shaft hole in the housing 5000, as explained in the above-mentioned embodiment.

<Outer Peripheral Ring>

Figure 10:
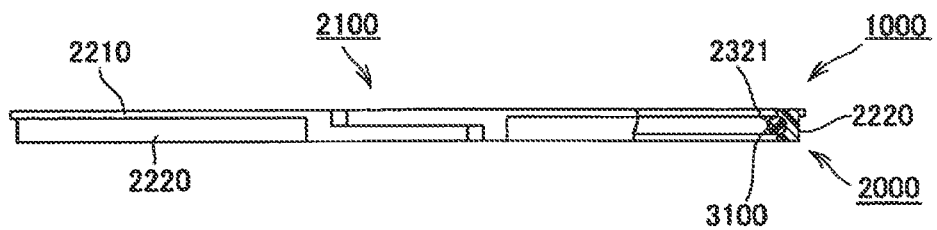
FIG. 10 is a partially broken cross sectional view of a sealing device according to a second reference example of the present disclosure.
Figure 11:
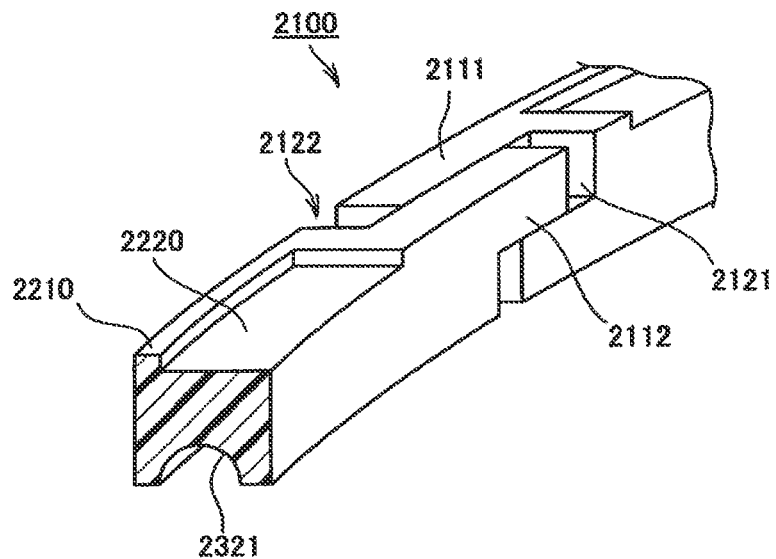
FIG. 11 is a partially broken perspective view of an outer peripheral ring according to the second reference example of the present disclosure.

The outer peripheral ring 2000 according to this second reference example of the present disclosure will be explained in further detail while referring in particular to FIG. 10 and FIG. 11. An abutment joint portion 2100 is formed on the outer peripheral ring 2000 at one place in a circumferential direction thereof. In addition, the outer peripheral ring 2000 is formed on its outer peripheral surface with a concave portion 2220 for introducing fluid. Further, the outer peripheral ring 2000 is also formed on its inner peripheral surface with a mounting groove 2321 for mounting the inner peripheral ring 3100 thereon.

Here, note that the outer peripheral ring 2000 according to this second reference example is constructed such that the abutment joint portion 2100, the concave portion 2220 and the mounting groove 2321 as mentioned above are formed on an annular member of which the cross section is rectangular. However, this is only an explanation of the shape thereof, but does not necessarily mean that an annular member of a rectangular cross section is used as a material, and processing to form the abutment joint portion 2100, the concave portion 2220 and the mounting groove 2321 is applied to this material. Of course, after an annular member of a rectangular cross section has been molded or formed, the abutment joint portion 2100, the concave portion 2220 and the mounting groove 2321 can also be obtained by means of cutting work. However, for example, after molding or forming a member which has the abutment joint portion 2100 in advance, the concave portion 2220 and the mounting groove 2321 may be obtained by means of cutting work. In this manner, the method of production thereof is not limited in particular.

A special step cut is used for the abutment joint portion 2100, similar to the above-mentioned embodiment. However, for the abutment joint portion 2100, there can be adopted a straight cut, a bias cut, another step cut, and so on, including but not limited to this. In addition, in cases where a material (e.g., PTFE, etc.) of low elasticity is adopted as a material of the outer peripheral ring 2000, the outer peripheral ring 2000 may also be endless, without forming the abutment joint portion 2100.

In this second reference example, too, the concave portion 2220 is formed over the entire periphery of the outer peripheral ring 2000 except for the vicinity of the abutment joint portion 2100. Because the concave portion 2220 is formed as explained in the above-mentioned embodiment, the detailed explanation thereof is omitted.

The mounting groove 2321 is formed over the entire periphery of the outer peripheral ring 2000 except for the abutment joint portion 2100. Here, note that in a state where a gap of a cut portion in the abutment joint portion 2100 is lost, the mounting groove 2321 becomes an annular groove. In addition, with respect to the mounting groove 2321, a cross sectional shape thereof cut by a plane including an axis (a central axis of a shaft 4000) is a substantially arc shape so as to conform to the shape of the inner peripheral ring 3100. Here, note that in cases where the inner peripheral ring 3100 is not an O ring, that is the inner peripheral ring 3100 does not have a circular cross sectional shape, it is also necessary to conform the cross sectional shape of the mounting groove 2321 to the cross sectional shape of the inner peripheral ring.

<Mechanism at the Time of Using the Sealing Device>

Figure 12:
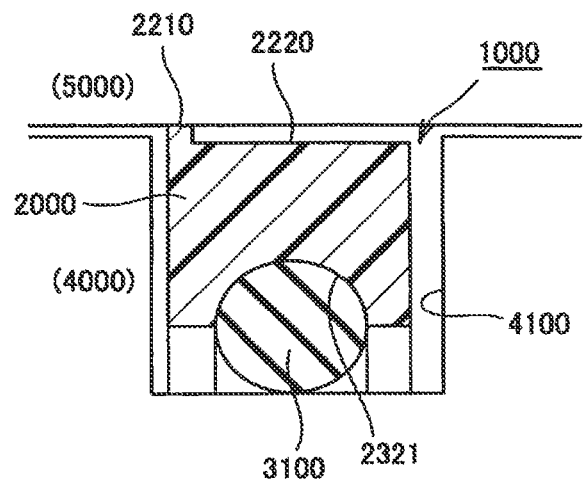
FIG. 12 is a schematic cross sectional view showing an unloaded state in the sealing device according to the second reference example of the present disclosure.
Figure 13:
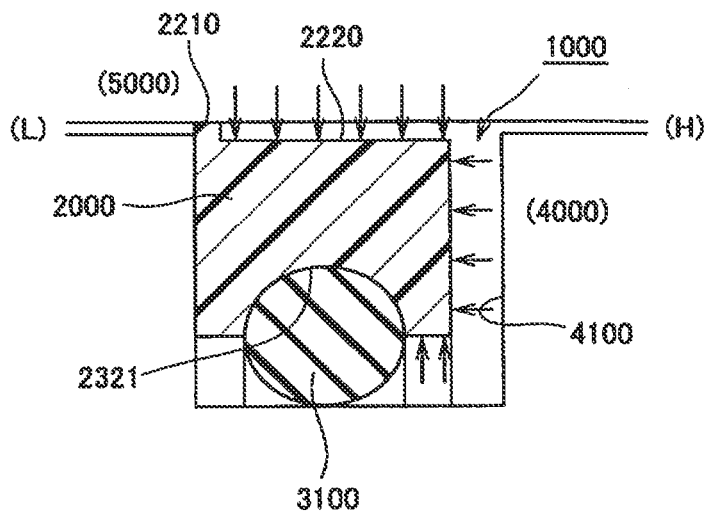
FIG. 13 is a schematic cross sectional view showing a high pressure state in the sealing device according to the second reference example of the present disclosure.

A mechanism at the time of using the sealing device 1000 according to this second reference example will be explained, while referring in particular to FIG. 12 and FIG. 13. FIG. 12 shows an unloaded state in which an engine is stopped, and there does not exist a differential pressure (or there exists substantially no differential pressure) between right-hand side region of the sealing device 1000 and left-hand side region of the sealing device 1000. FIG. 13 shows a state in which the engine is operated, and fluid pressure in the right-hand side region of the sealing device 1000 has become higher in comparison with that in the left-hand side region of the sealing device 1000.

In a state where the sealing device 1000 is fitted in the annular groove 4100, the inner peripheral ring 3100 made of a rubber-like elastic body is mounted or fitted in the mounting groove 2321 formed on the inner peripheral surface of the outer peripheral ring 2000. According to this, the inner peripheral ring 3100 is in intimate contact with the groove bottom surface of the mounting groove 2321 in the outer peripheral ring 2000 and the groove bottom surface of the annular groove 4100, respectively. Then, the inner peripheral ring 3100 exhibits a function of pushing the outer peripheral ring 2000 toward its outer peripheral surface side due to the elastic repulsion thereof.

Accordingly, even if the engine is in an unloaded state, those portions of the outer peripheral surface of the outer peripheral ring 2000 which exclude the concave portion 2220 (i.e., the low pressure side convex portion 2210 and a portion of the outer peripheral ring 2000 in the vicinity of the abutment joint portion 2100 in which the concave portion 2220 is not formed) maintain a state in which they are in contact with the inner peripheral surface of the shaft hole in the housing 5000.

Then, in a state in which the engine is started to generate a differential pressure, the outer peripheral ring 2000 is pushed to the low pressure side (L) by means of the fluid pressure from the high pressure side (H), so that it becomes a state of being in intimate contact with the side wall surface of the annular groove 4100 at the low pressure side (L), as shown in FIG. 13. Here, note that it is needless to say that the outer peripheral ring 2000 maintains the state of being in contact (sliding) with the inner peripheral surface of the shaft hole in the housing 5000. And, with respect to the inner peripheral ring 3100, it is fitted in the mounting groove 2321 in the outer peripheral ring 2000, so the position and posture of the inner peripheral ring 3100 with respect to the outer peripheral ring 2000 are maintained in a stable state.

<Advantages of the Sealing Device and the Sealing Structure According to this Reference Example>

According to the sealing device 1000 and the sealing structure provided with this sealing device according to this second reference example, the following advantages are achieved in comparison with the sealing device explained in the above-mentioned embodiment. That is, the inner peripheral ring 3100 is mounted or fitted in the mounting groove 2321 formed in the inner peripheral surface of the outer peripheral ring 2000, so that the position and posture of the inner peripheral ring 3100 with respect to the outer peripheral ring 2000 are stabilized. Accordingly, the outer peripheral ring 2000 can be pushed toward the outer peripheral surface side thereof in a stable manner. In addition, even if fluid pressure acts on the outer peripheral ring 2000 (i.e., fluid pressure varies), it is possible to suppress the inner peripheral ring 3100 from being twisted.

Third Reference Example

Summary

A sealing device according to a third reference example of the present disclosure, which is fitted into an annular groove formed in an outer periphery of a shaft so as to seal an annular gap between said shaft and a housing which rotate relative to each other, thereby to hold a fluid pressure in a region to be sealed which is constructed such that the fluid pressure therein changes, comprising: an outer peripheral ring made of resin that makes intimate contact with a side wall surface at a low pressure side in said in an annular groove and carries out sliding movement with respect to an inner peripheral surface of a shaft hole in said housing through which said shaft is inserted; and an inner peripheral ring made of a rubber-like elastic body that makes intimate contact with the inner peripheral surface of said of the outer peripheral ring and a groove bottom surface of said annular groove, respectively, thereby to push said outer peripheral ring toward an outer peripheral surface side; wherein said outer peripheral ring is formed on its outer peripheral surface with a first concave portion which extends from an end of a high pressure side to a position which does not arrive at an end of a low pressure side, so as to introduce fluid thereinto from the high pressure side; and wherein said outer peripheral ring is formed on its inner peripheral surface with a second concave portion in which said inner peripheral ring is fitted and which extends from an end of a low pressure side to a position which does not arrive at an end of a high pressure side, so as to limit a range of movement in an axial direction of said inner peripheral ring.

According to the sealing device according to this third reference example, the following advantages are achieved in comparison with the sealing device explained in the above-mentioned embodiment. That is, in this reference example, the inner peripheral ring is mounted or fitted in the second concave portion formed on the inner peripheral surface of the outer peripheral ring, so that the range of movement thereof in the axial direction is limited. For that reason, the position and posture of the inner peripheral ring with respect to the outer peripheral ring are stabilized. Accordingly, the outer peripheral ring can be pushed toward the outer peripheral surface side thereof in a stable manner. In addition, even if fluid pressure acts on the outer peripheral ring, it is possible to suppress the inner peripheral ring from being twisted.

Specific Example

Hereinafter, a sealing device and a sealing structure according to the third reference example of the present disclosure will be explained more specifically while referring to FIG. 14 through FIG. 18. Here, note that the basic construction of this example is the same as that of the above-mentioned embodiment and individual reference examples, and hence, the same component parts are denoted by the same reference numerals and characters, and the explanation thereof is omitted as the case may be.

A sealing device 1000 according to this third reference example is composed of an outer peripheral ring 2000 made of resin, and an inner peripheral ring 3100 made of a rubber-like elastic body. The inner peripheral ring 3100 according to this third reference example is a so-called O ring having a circular cross sectional shape. However, the inner peripheral ring 3100 is not limited to the O ring, but as such there can be adopted other seal ring such as a rectangular or polygonal ring, etc.

It is constructed such that in a state where the outer peripheral ring 2000 and the inner peripheral ring 3100 are combined or assembled together, a peripheral length of an outer peripheral surface of the outer peripheral ring 2000 becomes longer than a peripheral length of an inner peripheral surface of a shaft hole in a housing 5000, as explained in the above-mentioned embodiment. Here, note that for the outer peripheral ring 2000 as a single or separate member, the peripheral length of the outer peripheral surface thereof is made shorter than the peripheral length of the inner peripheral surface of the shaft hole in the housing 5000, as explained in the above-mentioned embodiment.

<Outer Peripheral Ring>

Figure 14:
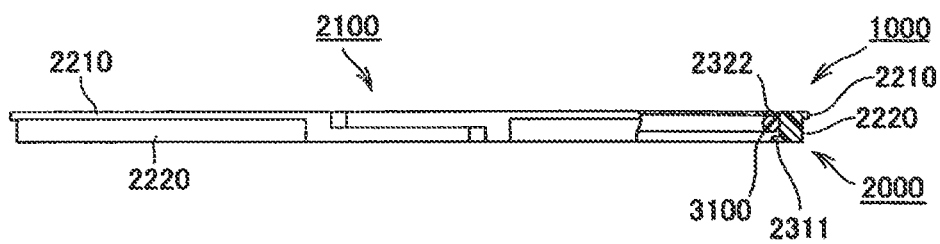
FIG. 14 is a partially broken cross sectional view of a sealing device according to a third reference example of the present disclosure.
Figure 15:
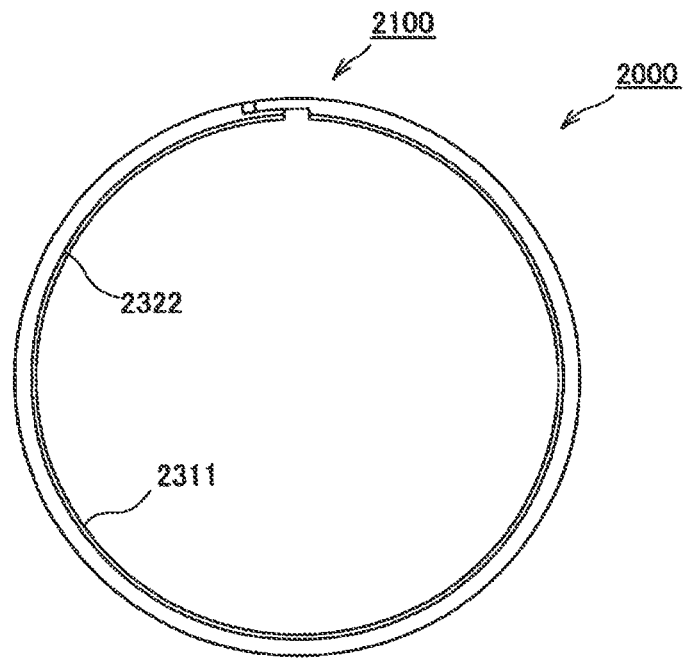
FIG. 15 is a side view of an outer peripheral ring (a side view seen from a low pressure side) according to the third reference example of the present disclosure.
Figure 16:
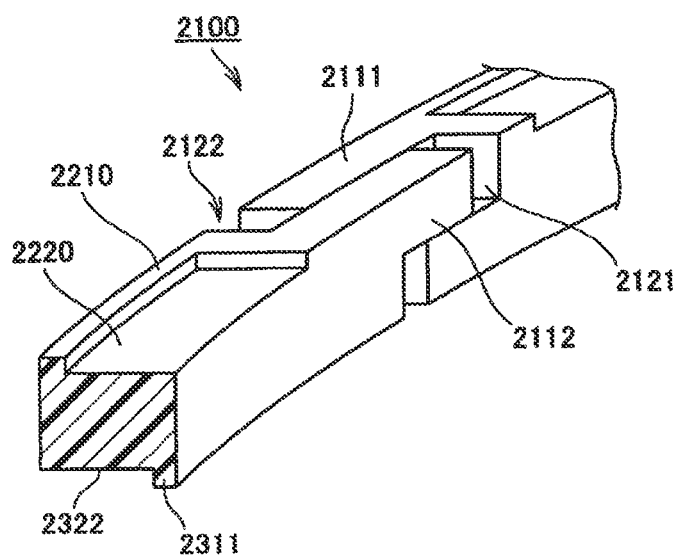
FIG. 16 is a partially broken perspective view of an outer peripheral ring according to the third reference example of the present disclosure.

The outer peripheral ring 2000 according to this third reference example of the present disclosure will be explained in further detail while referring in particular to FIG. 14 through FIG. 16. An abutment joint portion 2100 is formed on the outer peripheral ring 2000 at one place in a circumferential direction thereof. In addition, the outer peripheral ring 2000 is formed on its outer peripheral surface with a first concave portion 2220 for introducing fluid. Further, the outer peripheral ring 2000 is formed on its inner peripheral surface with a second concave portion 2322 in which the inner peripheral ring 3100 is fitted.

Here, note that the outer peripheral ring 2000 according to this third reference example is constructed such that the abutment joint portion 2100, the first concave portion 2220 and the second concave portion 2322 as mentioned above are formed on an annular member of which the cross section is rectangular. However, this is only an explanation of the shape thereof, but does not necessarily mean that an annular member of a rectangular cross section is used as a material, and processing to form the abutment joint portion 2100, the first concave portion 2220 and the second concave portion 2322 is applied to this material. Of course, after an annular member of a rectangular cross section has been molded or formed, the abutment joint portion 2100, the first concave portion 2220 and the second concave portion 2322 can also be obtained by means of cutting work. However, for example, after molding or forming a member which has the abutment joint portion 2100 in advance, the first concave portion 2220 and the second concave portion 2322 may be obtained by means of cutting work. In this manner, the method of production thereof is not limited in particular.

A special step cut is employed for the abutment joint portion 2100, similar to the above-mentioned embodiment. However, for the abutment joint portion 2100, there can be adopted a straight cut, a bias cut, another step cut, and so on, including but not limited to this. In addition, in cases where a material (e.g., PTFE, etc.) of low elasticity is adopted as a material of the outer peripheral ring 2000, the outer peripheral ring 2000 may also be endless, without forming the abutment joint portion 2100.

In this third reference example, too, the first concave portion 2220 is formed over the entire periphery of the outer peripheral ring 2000 except for the vicinity of the abutment joint portion 2100. With respect to the first concave portion 2220, it is the same as explained in the above-mentioned embodiment (i.e., the same construction as the concave portion 2220 in the above-mentioned embodiment), so the detailed explanation thereof is omitted.

Also, the second concave portion 2322 is formed over the entire periphery of the outer peripheral ring 2000 except for the abutment joint portion 2100. Here, note that in a state where a gap of a cut portion in the abutment joint portion 2100 is lost, the second concave portion 2322 becomes an annular concave portion. However, in cases where to form a concave portion in the vicinity of the abutment joint portion 2100 is difficult, it is not necessary to form the concave portion in the vicinity of the abutment joint portion 2100. This second concave portion 2322 is formed in such a manner that it extends from one end (i.e., a low pressure side (L)) of the outer peripheral ring 2000 to a location not reaching the other end thereof (i.e., a high pressure side (H)). Here, in the inner peripheral surface side of the outer peripheral ring 2000, an annular convex portion (substantially annular convex portion) 2311, which remains in the vicinity of the other end thereof without the second concave portion 2322 being formed, functions as a stopper which serves to restrict the axial movement of the inner peripheral ring 3100.

<Mechanism at the Time of Using the Sealing Device>

Figure 17:
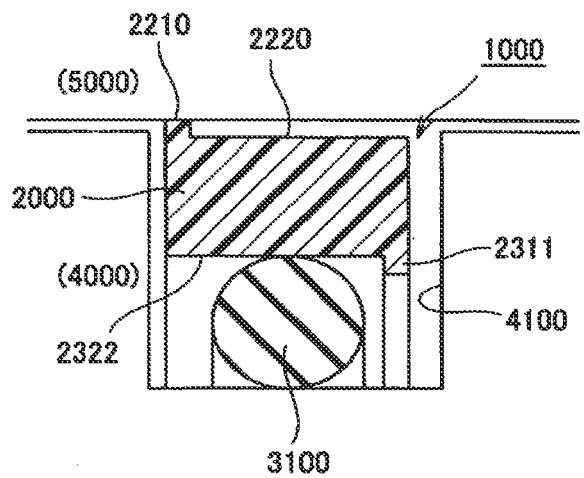
FIG. 17 is a schematic cross sectional view showing an unloaded state in the sealing device according to the third reference example of the present disclosure.
Figure 18:
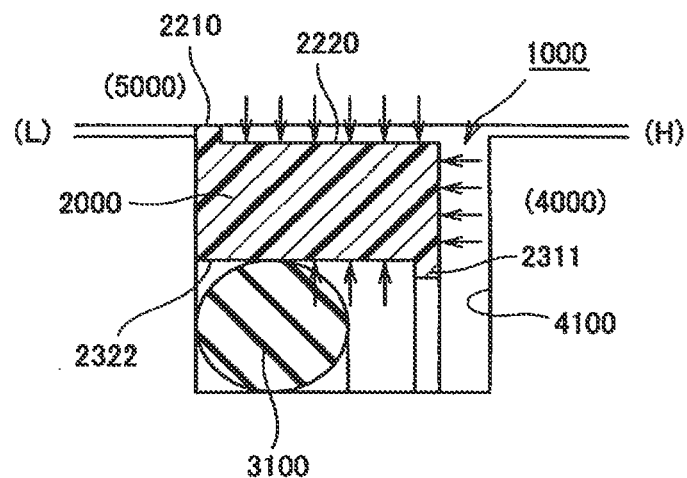
FIG. 18 is a schematic cross sectional view showing a high pressure state in the sealing device according to the third reference example of the present disclosure.
Figure 19:
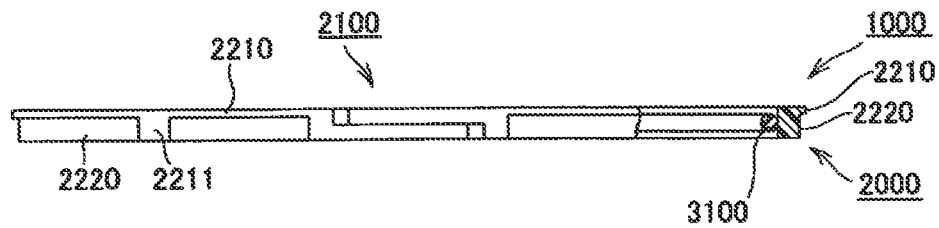
FIG. 19 is a partially broken cross sectional view of a sealing device according to a first practical example of the present disclosure.
Figure 20:
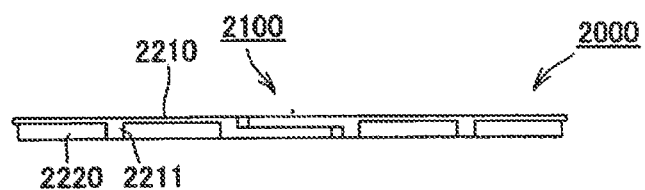
FIG. 20 is a view of an outer peripheral ring seen from an outer peripheral surface side thereof according to the first practical example of the present disclosure.
Figure 21:
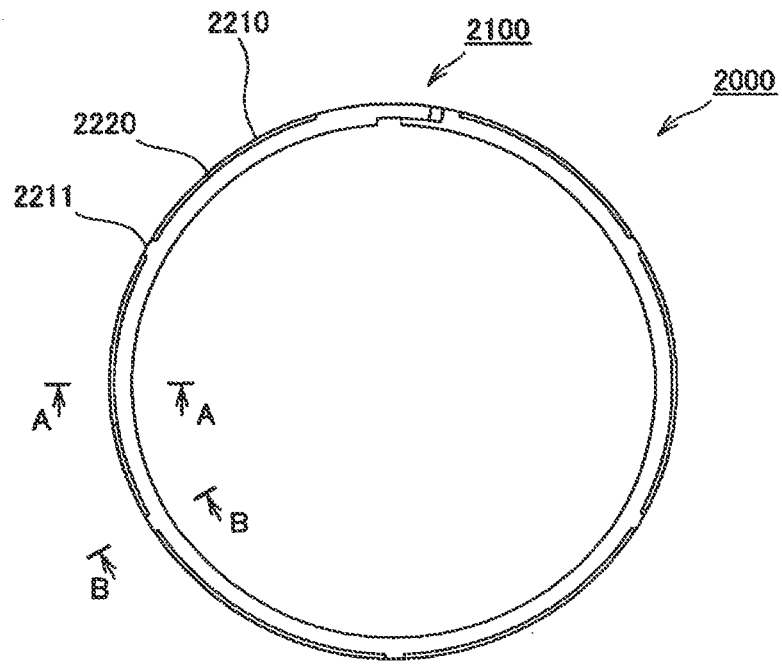
FIG. 21 is a side view of the outer peripheral ring according to the first practical example of the present disclosure.
Figure 22:
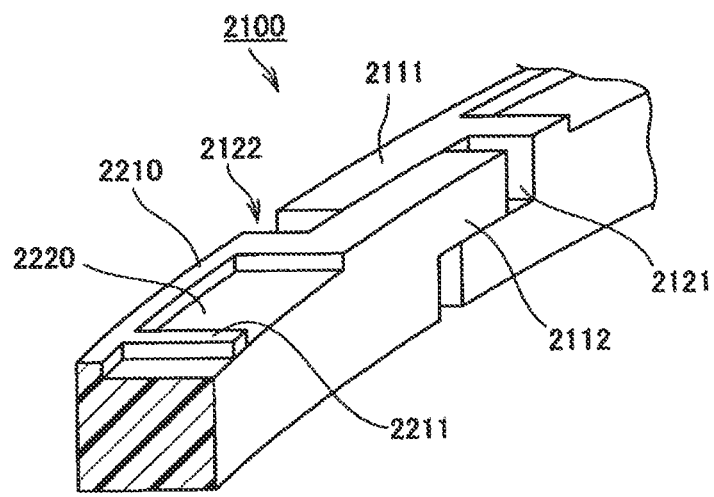
FIG. 22 is a partially broken perspective view of the outer peripheral ring according to the first practical example of the present disclosure.

A mechanism at the time of using the sealing device 1000 according to this third reference example will be explained, while referring in particular to FIG. 17 and FIG. 18. FIG. 17 shows an unloaded state in which an engine is stopped, and there does not exist a differential pressure (or there exists substantially no differential pressure) between right-hand side region of the sealing device 1000 and left-hand side region of the sealing device 1000. FIG. 18 shows a state in which the engine is operated, and fluid pressure in the right-hand side region of the sealing device 1000 has become higher in comparison with that in the left-hand side region of the sealing device 1000.

In a state where the sealing device 1000 is fitted in the annular groove 4100, the inner peripheral ring 3100 made of a rubber-like elastic body is mounted or fitted in the second concave portion 2322 formed on the inner peripheral surface of the outer peripheral ring 2000. According to this, the inner peripheral ring 3100 is in intimate contact with the inner peripheral surface of the outer peripheral ring 2000 (i.e., the inner peripheral surface of that portion in which the second concave portion 2322 is formed) and the groove bottom surface of the annular groove 4100, respectively. Then, the inner peripheral ring 3100 exhibits a function of pushing the outer peripheral ring 2000 toward its outer peripheral surface side due to the elastic repulsion thereof.

Accordingly, even if the engine is in an unloaded state, those portions of the outer peripheral surface of the outer peripheral ring 2000 which exclude the first concave portion 2220 (i.e., the low pressure side convex portion 2210 and a portion of the outer peripheral ring 2000 in the vicinity of the abutment joint portion 2100 in which the first concave portion 2220 is not formed) maintain a state in which they are in contact with the inner peripheral surface of the shaft hole in the housing 5000.

Then, in a state in which the engine is started to generate a differential pressure, the outer peripheral ring 2000 is pushed by means of the fluid pressure from the high pressure side (H), so that it becomes a state of being in intimate contact with the side wall surface of the annular groove 4100 at the low pressure side (L), as shown in FIG. 18. Here, note that it is needless to say that the outer peripheral ring 2000 maintains the state of being in contact (sliding) with the inner peripheral surface of the shaft hole in the housing 5000.

In addition, with respect to the inner peripheral ring 3100, it is fitted in the second concave portion 2322 in the outer peripheral ring 2000, so that a movement thereof in the axial direction is limited. In other words, the movement of the inner peripheral ring 3100 toward the high pressure side (H) is limited by the convex portion 2311 formed at the inner peripheral surface side of the outer peripheral ring 2000. As a result, the position and posture of the inner peripheral ring 3100 with respect to the outer peripheral ring 2000 are kept in a stable state.

<Advantages of the Sealing Device and the Sealing Structure According to this Reference Example>

According to the sealing device 1000 and the sealing structure provided with this sealing device according to this third reference example, the following advantages are achieved in comparison with the sealing device explained in the above-mentioned embodiment. That is, the inner peripheral ring 3100 is mounted or fitted in the second concave portion 2322 formed on the inner peripheral surface of the outer peripheral ring 2000, so that the range of movement thereof in the axial direction is limited. As a result, the position and posture of the inner peripheral ring 3100 with respect to the outer peripheral ring 2000 are stabilized. Accordingly, the outer peripheral ring 2000 can be pushed toward the outer peripheral surface side thereof in a stable manner. In addition, even if fluid pressure acts on the outer peripheral ring 2000 (i.e., fluid pressure varies), it is possible to suppress the inner peripheral ring 3100 from being twisted.

First Practical Example

Summary

A sealing device according to a first practical example of the present disclosure, which is fitted into an annular groove formed in an outer periphery of a shaft so as to seal an annular gap between said shaft and a housing which rotate relative to each other, thereby to hold a fluid pressure in a region to be sealed which is constructed such that the fluid pressure therein changes, comprising: an outer peripheral ring made of resin that makes intimate contact with a side wall surface at a low pressure side in said in an annular groove and carries out sliding movement with respect to an inner peripheral surface of a shaft hole in said housing through which said shaft is inserted; and an inner peripheral ring made of a rubber-like elastic body that makes intimate contact with the inner peripheral surface of said of the outer peripheral ring and a groove bottom surface of said annular groove, respectively, thereby to push said outer peripheral ring toward an outer peripheral surface side; wherein said outer peripheral ring is formed on its outer peripheral surface with a plurality of concave portions which are spaced with respect to one another in a circumferential direction and which each extend from an end of a high pressure side to a position which does not arrive at an end of a low pressure side, so as to introduce fluid thereinto from the high pressure side.

According to the sealing device according to this practical example, the following advantages are achieved in comparison with the sealing device explained in the above-mentioned embodiment. That is, in this practical example, the concave portions are formed in plurality in a spaced-apart relation with respect to one another in a circumferential direction. For that reason, the portions between adjacent concave portions will be in a state of contact with the inner peripheral surface of the shaft hole in the housing, and can suppress the reduction in rigidity of the outer peripheral ring. Accordingly, it is possible to suppress the outer peripheral ring from being inclined in the annular groove, thereby making it possible to stabilize the mounting state of the outer peripheral ring.

Specific Example

Hereinafter, a sealing device and a sealing structure according to the first practical example of the present disclosure will be explained more specifically while referring to FIG. 19 through FIG. 28. Here, note that the basic construction of this example is the same as that of the above-mentioned embodiment and individual reference examples, and hence, the same component parts are denoted by the same reference numerals and characters, and the explanation thereof is omitted as the case may be.

A sealing device 1000 according to this practical example is composed of an outer peripheral ring 2000 made of resin, and an inner peripheral ring 3100 made of a rubber-like elastic body. The inner peripheral ring 3100 according to this practical example is a so-called O ring having a circular cross sectional shape. However, the inner peripheral ring 3100 is not limited to the O ring, but as such there can be adopted other seal ring such as a rectangular or polygonal ring, etc.

It is constructed such that in a state where the outer peripheral ring 2000 and the inner peripheral ring 3100 are combined or assembled together, a peripheral length of an outer peripheral surface of the outer peripheral ring 2000 becomes longer than a peripheral length of an inner peripheral surface of a shaft hole in a housing 5000, as explained in the above-mentioned embodiment. Here, note that for the outer peripheral ring 2000 as a single or separate member, the peripheral length of the outer peripheral surface thereof is made shorter than the peripheral length of the inner peripheral surface of the shaft hole in the housing 5000, as explained in the above-mentioned embodiment.

<Outer Peripheral Ring>

The outer peripheral ring 2000 according to this practical example of the present disclosure will be explained in further detail while referring in particular to FIG. 19 through FIG. 22. An abutment joint portion 2100 is formed on the outer peripheral ring 2000 at one place in a circumferential direction thereof. In addition, the outer peripheral ring 2000 is formed on its outer peripheral surface with a plurality of concave portions 2220 which are respectively spaced from one another in a circumferential direction.

Here, note that the outer peripheral ring 2000 according to this practical example is constructed such that the abutment joint portion 2100 and the plurality of concave portions 2220 as mentioned above are formed on an annular member of which the cross section is rectangular. However, this is only an explanation of the shape thereof, but does not necessarily mean that an annular member of a rectangular cross section is used as a material, and processing to form the abutment joint portion 2100 and the plurality of concave portions 2220 is applied to this material. Of course, after an annular member of a rectangular cross section has been molded or formed, the abutment joint portion 2100 and the plurality of concave portions 2220 can also be obtained by means of cutting work. However, for example, after molding or forming a member which has the abutment joint portion 2100 in advance, the plurality of concave portions 2220 may be obtained by means of cutting work. In this manner, the method of production thereof is not limited in particular.

A special step cut is employed for the abutment joint portion 2100, similar to the above-mentioned embodiment. However, for the abutment joint portion 2100, there can be adopted a straight cut, a bias cut, another step cut, and so on, including but not limited to this. In addition, in cases where a material (e.g., PTFE, etc.) of low elasticity is adopted as a material of the outer peripheral ring 2000, the outer peripheral ring 2000 may also be endless, without forming the abutment joint portion 2100.

That is, in this practical example, the concave portions 2220 are formed in plurality in a spaced-apart relation with respect to one another in a circumferential direction. Here, note that in this practical example, the plurality of concave portions 2220 are arranged so as to be at equal intervals, except for the vicinity of the abutment joint portion 2100. In addition, the concave portions 2220 are constructed in such a manner that they each have a relatively long length in the circumferential direction, and the length in the circumferential direction of each portion between the adjacent concave portions 2220 except for the vicinity of the abutment joint portion 2100 becomes shorter in comparison with the length in the circumferential direction of each of the adjacent concave portions 2220. Hereinafter, the portions between the adjacent concave portions 2220 are each called a rib 2211. With such a construction, the concave portions 2220 are formed over substantially the entire region in the circumferential direction. In other words, except for those portions in which the abutment joint portion 2100 and the plurality of ribs 2211 each having a short length in the circumferential direction are formed, the concave portions 2220 are formed over the entire region of the outer peripheral ring 2000 in the circumferential direction. In addition, it is constructed such that the opposite side surfaces of each rib 2211 in this practical example are vertical from the bottom surfaces of the adjacent concave portions 2220.

In addition, the concave portions 2220 are formed in such a manner that they each extend from one end of the outer peripheral ring 2000 to a location not reaching the other end thereof, similar to the case of the above-mentioned embodiment. More specifically, the concave portions 2220 are formed so as to extend to the vicinity of the other end of the outer peripheral ring 2000. Here, note that in this practical example, too, the bottom surfaces of the concave portions 2220 are composed of surfaces which are concentric with the inner peripheral surface of the outer peripheral ring 2000. The shallower the depth of the concave portions 2220, the higher becomes the rigidity of those portions of the outer peripheral ring 2000 in which the ribs 2211 and low pressure side convex portions 2210 are formed. On the other hand, these ribs 2211 and low pressure side convex portions 2210 are worn out due to the relative sliding movement thereof, so the depth of the concave portions 2220 becomes shallower as the time elapses. For that reason, when the depth of the concave portions 2220 becomes too much shallow, it will become impossible to introduce fluid therein. Accordingly, it is desirable to set an initial depth of the concave portions 2220 by taking into consideration both the above-mentioned rigidity and the maintenance of introduction of fluid even if the wear progresses with the lapse of time. For example, in cases where the thickness of the outer peripheral ring 2000 is 1.7 mm, it is preferable to set the depth of the concave portions 2220 to be equal to or more than about 0.1 mm and equal to or less than about 0.3 mm.

Moreover, with respect to the width (width in the axial direction) of the concave portions 2220, the wider the width of the concave portions 2220, the narrower becomes the width of the low pressure side convex portions 2210. The narrower this width becomes, the more the torque can be reduced, but if the width is made too much narrow, sealing efficiency and durability will become low. Accordingly, it is desirable to narrow the width concerned as much as possible according to service conditions, etc., to such an extent that sealing efficiency and durability can be maintained. Here, note that for example, in cases where the entire length of the width (width in the axial direction) of the outer peripheral ring 2000 is 1.9 mm, it is preferable to set the width of the low pressure side convex portions 2210 to be equal to or more than about 0.3 mm and equal to or less than about 0.7 mm. Also, it is preferable to set the width in the circumferential direction of the ribs 2211 to be equal to or more than 0.3 mm and equal to or less than 0.7 mm.

<Mechanism at the Time of Using the Sealing Device>

Figure 23:
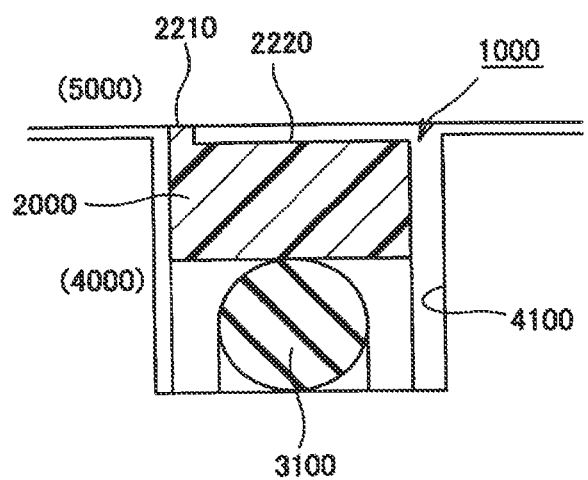
FIG. 23 is a schematic cross sectional view showing an unloaded state in the sealing device according to the first practical example of the present disclosure.
Figure 24:
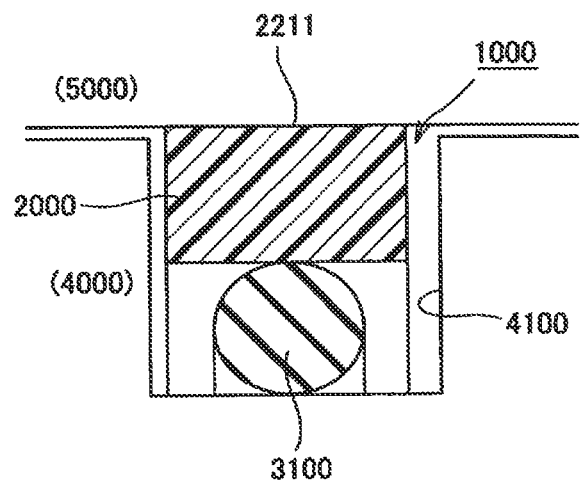
FIG. 24 is a schematic cross sectional view showing an unloaded state in the sealing device according to the first practical example of the present disclosure.
Figure 25:
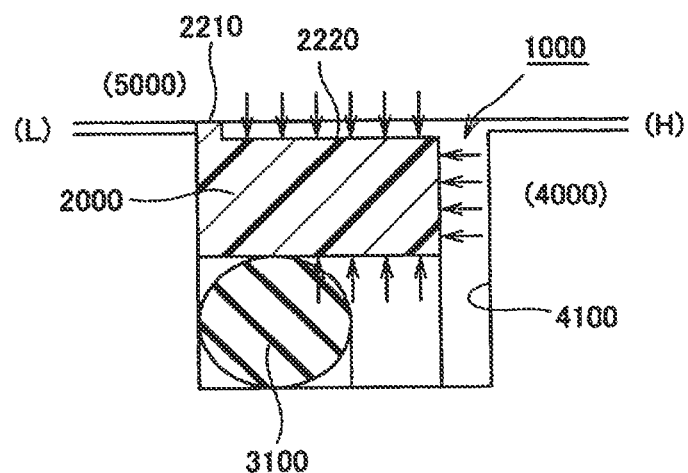
FIG. 25 is a schematic cross sectional view showing a high pressure state in the sealing device according to the first practical example of the present disclosure.

A mechanism at the time of using the sealing device 1000 according to this practical example will be explained, while referring in particular to FIG. 23 through FIG. 25. FIG. 23 and FIG. 24 each show an unloaded state in which an engine is stopped, and there does not exist a differential pressure (or there exists substantially no differential pressure) between right-hand side region of the sealing device 1000 and left-hand side region of the sealing device 1000. Here, note that FIG. 23 is a schematic cross sectional view (i.e., a cross sectional view including an axis of a shaft 4000) of a portion in which a concave portion 2220 is formed in the outer peripheral ring 2000, and FIG. 24 is a schematic cross sectional view (i.e., a cross sectional view including the axis of the shaft 4000) of a portion in which a rib 2211 is formed in the outer peripheral ring 2000. The outer peripheral ring 2000 in FIG. 23 corresponds to an AA cross section in FIG. 21, and the outer peripheral ring 2000 in FIG. 24 corresponds to a BB cross section in FIG. 21. FIG. 25 shows a state in which the engine is operated, and fluid pressure in the right-hand side region of the sealing device 1000 has become higher in comparison with that in the left-hand side region of the sealing device 1000. Here, note that FIG. 25 is a schematic cross sectional view (i.e., a cross sectional view including the axis of the shaft 4000) of a portion in which a concave portion 2220 is formed in the outer peripheral ring 2000. The outer peripheral ring 2000 in FIG. 25 corresponds to the AA cross section in FIG. 21.

In a state where the sealing device 1000 is fitted in an annular groove 4100, the inner peripheral ring 3100 made of a rubber-like elastic body is in intimate contact with the inner peripheral surface of the outer peripheral ring 2000 and a groove bottom surface of the annular groove 4100, respectively. Then, the inner peripheral ring 3100 exhibits a function of pushing the outer peripheral ring 2000 toward its outer peripheral surface side due to the elastic repulsion thereof.

Accordingly, even if the engine is in an unloaded state, those portions of the outer peripheral surface of the outer peripheral ring 2000 which exclude the concave portions 2220 (i.e., the low pressure side convex portions 2210, the ribs 2211 and a portion of the outer peripheral ring 2000 in the vicinity of the abutment joint portion 2100 in which a concave portion 2220 is not formed) maintain a state in which they are in contact with the inner peripheral surface of the shaft hole in the housing 5000.

Then, in a state in which the engine is started to generate a differential pressure, the outer peripheral ring 2000 is pushed by means of the fluid pressure from the high pressure side (H), so that it becomes a state of being in intimate contact with the side wall surface of the annular groove 4100 at the low pressure side (L), as shown in FIG. 25. Here, note that it is needless to say that the outer peripheral ring 2000 maintains the state of being in contact (sliding) with the inner peripheral surface of the shaft hole in the housing 5000. In addition, with respect to the inner peripheral ring 3100, too, it also becomes a state of being in intimate contact with the side wall surface of the annular groove 4100 at the low pressure side (L).

<Advantages of the Sealing Device and the Sealing Structure According to this Practical Example>

According to the sealing device 1000 and the sealing structure provided with this sealing device according to this practical example, the following advantages are achieved in comparison with the sealing device and the sealing structure explained in the above-mentioned embodiment. That is, the concave portions 2220 are formed in plurality in a spaced-apart relation in a circumferential direction with respect to one another, and hence, the portions (ribs 2211) between adjacent concave portions 2220 will be in a state of contact with the inner peripheral surface of the shaft hole in the housing 5000. In addition, because of the provision of the plurality of ribs 2211, the reduction in rigidity of the outer peripheral ring 2000 can be suppressed in comparison with the case where the ribs 2211 are not formed. Accordingly, it is possible to suppress the outer peripheral ring 2000 from being inclined in the annular groove 4100, thereby making it possible to stabilize the mounting state of the outer peripheral ring 2000. Here, note that in cases where a construction is adopted in which the plurality of ribs 2211 are not formed, there will be a fear that in FIG. 23 and FIG. 25, the outer peripheral ring 2000 may incline in a counter clockwise direction in these figures.

In addition, in the outer peripheral ring 2000 according to this practical example, the plurality of ribs 2211 are formed, but these ribs 2211 are constructed in such a manner that the length thereof in the circumferential direction becomes short. For that reason, in this practical example, too, the concave portions 2220 are formed over a large area of the outer peripheral surface of the outer peripheral ring 2000. Accordingly, in this practical example, too, it is possible to reduce sliding torque to a sufficient extent, similar to the case of the above-mentioned embodiment.

<Modifications of the First Practical Example>

Sealing devices according to modifications of the first practical example of the present disclosure will be explained while referring to FIG. 26 through FIG. 28. In the first practical example, there has been shown the case where the opposite side surfaces of each rib are constructed to be vertical from the bottom surfaces of adjacent concave portions. In contrast to this, in each of the following modifications, there is shown a construction in which a bottom surface of each concave portion and an outer peripheral surface of each rib in an outer peripheral ring are connected with each other through an inclined surface. The other construction in these modifications is the same as that in the above-mentioned first practical example, so the explanation thereof is omitted.

In these modifications, only the shapes of the concave portions and the ribs of the outer peripheral ring are different from those in the first practical example. That is, in these modifications, a bottom surface of each concave portion and an outer peripheral surface of each rib are connected with each other through an inclined surface. Hereinafter, this will be described in more detail with reference to FIG. 26 through FIG. 28. Here, note that FIG. 26 through FIG. 28 show examples in which the shapes of inclined surfaces are respectively different from one another. In addition, in these individual figures, (a) is a part of a perspective view of the outer peripheral ring, and (b) is a part of a side elevational view of the outer peripheral ring. Moreover, in the individual figures, for the sake of convenience, although an outer peripheral portion, an inner peripheral portion, and a bottom surface of a concave portion are drawn linearly, they are circular arc in practice.

In a first modification shown in FIG. 26, a bottom surface of a concave portion 2220a and an outer peripheral surface of each rib 2211a in an outer peripheral ring 2000 are connected with each other through an inwardly concaved curved surface (a curved inclined surface) 2211a1.

In a second modification shown in FIG. 27, a bottom surface of a concave portion 2220b and an outer peripheral surface of each rib 2211b in an outer peripheral ring 2000 are connected with each other through a curved surface (a curved inclined surface) 2211b1 which is bulged outwardly at an outer peripheral surface side thereof, and is concaved inwardly at an inner peripheral surface side thereof.

In a third modification shown in FIG. 28, a bottom surface of a concave portion 2220c and an outer peripheral surface of each rib 2211c in an outer peripheral ring 2000 are connected with each other through a planar inclined surface 2211c1.

In the sealing devices (the outer peripheral rings 2000) according to the various kinds of modifications constructed as described above, too, the same effects as in the above-mentioned first practical example can be obtained. In addition, in the case of each of the outer peripheral rings 2000 according to the various kinds of modifications, it is constructed such that a bottom surface of each concave portion and an outer peripheral surface of each rib are connected with each other through an inclined surface. Accordingly, the strength of each rib can be enhanced as compared with the case of the first practical example, keeping the sliding area thereof with respect to an inner peripheral surface of a shaft hole in a housing to the same extent as in the above-mentioned first practical example. As a result, the reduction in rigidity of each of the outer peripheral rings can be suppressed to a further extent.

Here, note that in the first practical example and the various kinds of modifications of the first practical example, in cases where a sealing function does not need to be exhibited in a state where fluid pressure is low or in a state where there is no fluid pressure, the outer peripheral rings 2000 can be independently used without the inner peripheral rings 3100, respectively. In this case, a low torque effect can be enhanced.

Second Practical Example

Summary

A sealing device according to a second practical example of the present disclosure, which is fitted into an annular groove formed in an outer periphery of a shaft so as to seal an annular gap between said shaft and a housing which rotate relative to each other, thereby to hold a fluid pressure in a region to be sealed which is constructed such that the fluid pressure therein changes, comprising: an outer peripheral ring made of resin that is in intimate contact with a side wall surface of said annular groove at a low pressure side thereof, and slides with respect to an inner peripheral surface of a shaft hole in said housing through which said shaft is inserted; and an inner peripheral ring made of a rubber-like elastic body that is in intimate contact with an inner peripheral surface of said outer peripheral ring and a groove bottom surface of said annular groove, respectively, thereby to push said outer peripheral ring toward an outer peripheral surface side thereof; wherein a portion in said outer peripheral ring which slides with respect to the inner peripheral surface of said shaft hole is constructed by a convex portion which is formed so as to extend toward a circumferential direction while changing its position to a high pressure side and a low pressure side in an alternate manner.

According to the sealing device according to this practical example, the following advantages are achieved in comparison with the sealing device explained in the above-mentioned embodiment. That is, in this practical example, the convex portion formed on an outer peripheral surface of the outer peripheral ring is formed so as to extend toward a circumferential direction while changing its position to a high pressure side and a low pressure side in an alternate manner. Accordingly, it is possible to suppress the outer peripheral ring from being inclined in the annular groove, thereby making it possible to stabilize the mounting state of the outer peripheral ring. Here, note that in this practical example, the convex portion formed so as to extend toward a circumferential direction while changing its position to a high pressure side and a low pressure side in an alternate manner is formed on the outer peripheral surface of the outer peripheral ring. For that reason, in a state where the sealing device is fitted, the concave portion opened to the high pressure side exists in plurality on the outer peripheral surface side of the outer peripheral ring. Then, fluid is introduced into these plurality of concave portions from the high pressure side. Accordingly, these plurality of concave portions exhibit the same function as the concave portion 2220 in the above-mentioned embodiment.

Specific Example

Hereinafter, a sealing device and a sealing structure according to the second practical example of the present disclosure will be explained more specifically while referring to FIG. 29 through FIG. 37. Here, note that the basic construction of this example is the same as that of the above-mentioned embodiment, individual reference examples and first practical example, and hence, the same parts are denoted by the same reference numerals and characters, and the explanation thereof is omitted as the case may be.

A sealing device 1000 according to this practical example is composed of an outer peripheral ring 2000 made of resin, and an inner peripheral ring 3100 made of a rubber-like elastic body. The inner peripheral ring 3100 according to this practical example is a so-called O ring having a circular cross sectional shape. However, the inner peripheral ring 3100 is not limited to the O ring, but as such there can be adopted other seal ring such as a rectangular or polygonal ring, etc.

It is constructed such that in a state where the outer peripheral ring 2000 and the inner peripheral ring 3100 are combined or assembled together, a peripheral length of an outer peripheral surface of the outer peripheral ring 2000 becomes longer than a peripheral length of an inner peripheral surface of a shaft hole in a housing 5000, as explained in the above-mentioned embodiment. Here, note that for the outer peripheral ring 2000 as a single or separate member, the peripheral length of the outer peripheral surface thereof is made shorter than the peripheral length of the inner peripheral surface of the shaft hole in the housing 5000, as explained in the above-mentioned embodiment.

<Outer Peripheral Ring>

Figure 29:
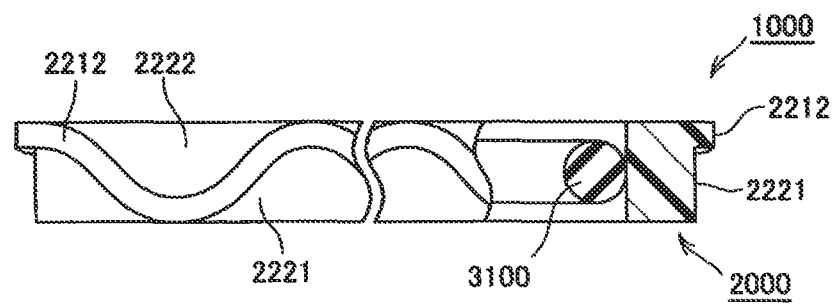
FIG. 29 is a partially broken cross sectional view of a sealing device according to a second practical example of the present disclosure.
Figure 30:
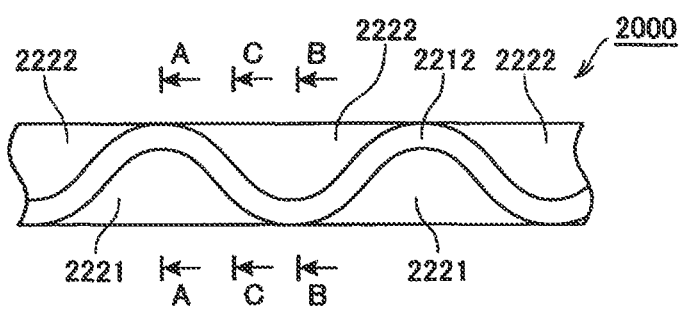
FIG. 30 is a part of a view of an outer peripheral ring seen from an outer peripheral surface side thereof according to the second practical example of the present disclosure.
Figure 31:
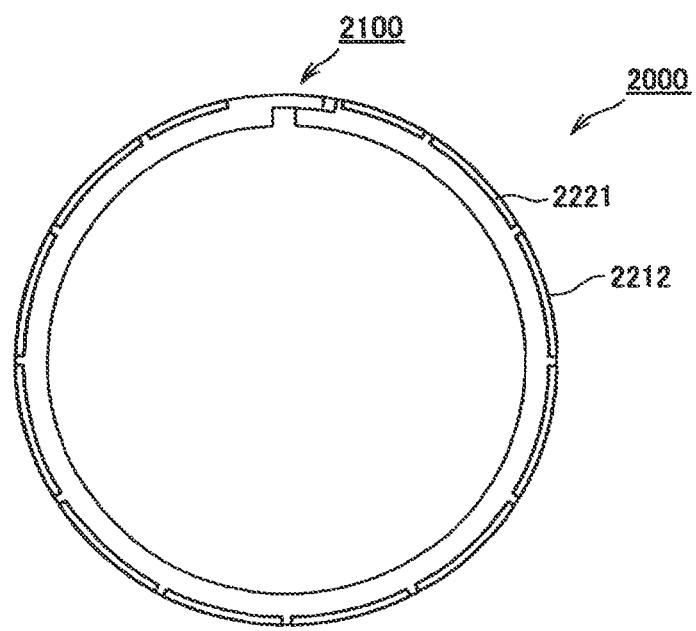
FIG. 31 is a side view of the outer peripheral ring according to the second practical example of the present disclosure.

The outer peripheral ring 2000 according to this second practical example of the present disclosure will be explained in further detail while referring in particular to FIG. 29 through FIG. 31. An abutment joint portion 2100 is formed on the outer peripheral ring 2000 at one place in a circumferential direction thereof. In addition, the outer peripheral ring 2000 is formed on its outer peripheral surface with a convex portion 2212 which protrudes to an outer peripheral surface side, with its surface being in sliding contact with the inner peripheral surface of the shaft hole in the housing 5000. This convex portion 2212 is formed in such a manner that it extends toward a circumferential direction while changing its position to a high pressure side (H) and a low pressure side (L) in an alternate manner so as to reach positions on opposite side surfaces in a width direction. More specifically, the convex portion 2220 is constructed so as to take a wave shape meandering toward the circumferential direction. Moreover, this convex portion 2212 is formed over the entire periphery of the outer peripheral ring 2000 except for the vicinity of the abutment joint portion 2100. Here, note that in cases where a construction unprovided with the abutment joint portion 2100 is adopted, as will be described later, this convex portion 2212 is formed over the entire periphery of the outer peripheral ring 2000.

Then, due to the formation of such a convex portion 2212, the outer peripheral ring 2000 is formed at the high pressure side (H) in its outer peripheral surface with a plurality of third concave portions 2221 which are respectively spaced from one another in the circumferential direction. Also, the outer peripheral ring 2000 is formed at the low pressure side (L) in its outer peripheral surface with a plurality of fourth concave portions 2222 which are respectively spaced from one another in the circumferential direction. The third concave portions 2221 are each constructed to extend from an end of the high pressure side (H) to a position which does not reach an end of the low pressure side (L), so that they exhibit a function of introducing fluid thereinto from the high pressure side (H). Also, the fourth concave portions 2222 are each constructed so as to extend from the end of the low pressure side (L) to a position which does not reach the end of the high pressure side (H). Here, the bottom surfaces of the third concave portions 2221 and the bottom surfaces of the fourth concave portions 2222 are each composed of a surface which is concentric with the inner peripheral surface of the outer peripheral ring 2000.

Here, note that the outer peripheral ring 2000 according to this practical example is constructed such that the abutment joint portion 2100, the convex portion 2212, the plurality of third concave portions 2221 and the plurality of fourth concave portions 2222 as mentioned above are formed on an annular member of which the cross section is rectangular. However, this is only an explanation of the shape thereof, but does not necessarily mean that an annular member of a rectangular cross section is used as a material, and processing to form the abutment joint portion 2100, the convex portion 2212, the plurality of third concave portions 2221 and the plurality of fourth concave portions 2222 is applied to this material. Of course, after an annular member of a rectangular cross section has been molded or formed, the abutment joint portion 2100, the convex portion 2212, the plurality of third concave portions 2221 and the plurality of fourth concave portions 2222 can also be obtained by means of cutting work. However, for example, after molding or forming a member which has the abutment joint portion 2100 in advance, the convex portion 2212, the plurality of third concave portions 2221 and the plurality of fourth concave portions 2222 may be obtained by means of cutting work. In this manner, the method of production thereof is not limited in particular.

A special step cut is employed for the abutment joint portion 2100, similar to the above-mentioned embodiment. However, for the abutment joint portion 2100, there can be adopted a straight cut, a bias cut, another step cut, and so on, including but not limited to this. In addition, in cases where a material (e.g., PTFE, etc.) of low elasticity is adopted as a material of the outer peripheral ring 2000, the outer peripheral ring 2000 may also be endless, without forming the abutment joint portion 2100. Here, note that in cases where the construction provided with the abutment joint portion 2100 is adopted, it is desirable not to form the third concave portions 2221 and the fourth concave portions 2222 in the vicinity of the abutment joint portion 2100 (refer to FIG. 31). In this case, the outer peripheral surface of the outer peripheral ring 2000 in the vicinity of the abutment joint portion 2100 becomes the same surface as an outer peripheral surface of the convex portion 2212. Accordingly, in this case, those portions of the outer peripheral ring 2000 which slides with respect to the inner peripheral surface of the shaft hole become the outer peripheral surface of the convex portion 2212 and an outer peripheral surface of a portion of the outer peripheral ring 2000 in which the third concave portions 2221 and the fourth concave portions 2222 are not formed in the vicinity of the abutment joint portion 2100.

The convex portion 2212 according to this the practical example is of an elongated construction, and is constructed such that in the outer peripheral surface of the outer peripheral ring 2000, an area occupied by the convex portion 2212 is sufficiently narrower as compared with an area occupied by the plurality of third concave portions 2221 and the plurality of fourth concave portions 2222. In addition, the plurality of third concave portions 2221 and the plurality of fourth concave portions 2222 are formed over substantially the entire region in the circumferential direction of the outer peripheral ring 2000. In other words, except for the vicinity in which the abutment joint portion 2100 is formed and for that portion in which the elongated convex portion 2212 is formed, the third concave portions 2221 and the fourth concave portions 2222 are formed over the entire region of the outer peripheral ring 2000 in the circumferential direction. Moreover, it is also constructed such that the opposite side surfaces of the convex portion 2212 in this practical example are vertical with respect to the bottom surfaces of the third concave portions 2221 and the bottom surfaces of the fourth concave portions 2222.

In addition, the lower the height of the convex portion 2212 (i.e., equal to the depth of the third concave portions 2221 and the fourth concave portions 2222), the higher becomes the rigidity of the portion of the outer peripheral ring 2000 in which the convex portion 2212 is formed. On the other hand, the convex portion 2212 is worn out due to the relative sliding movement thereof, so the depth of the third concave portions 2221 and the fourth concave portions 2222 becomes shallower as the time elapses. For that reason, when the depth of the third concave portions 2221 becomes too much shallow, it will become impossible to introduce fluid therein. Accordingly, it is desirable to set an initial height of the convex portion 2212 by taking into consideration both the above-mentioned rigidity and the maintenance of introduction of fluid even if the wear progresses with the lapse of time. For example, in cases where the thickness of the outer peripheral ring 2000 is 1.7 mm, it is preferable to set the height of the convex portion 2212 to be equal to or more than about 0.1 mm and equal to or less than about 0.3 mm.

Moreover, the narrower the width of the convex portion 2212, the more the torque can be reduced, but if the width is made too much narrow, sealing efficiency and durability will become low. Accordingly, it is desirable to narrow the width of the convex portion 2212 as much as possible according to service conditions, etc., to such an extent that sealing efficiency and durability can be maintained. Here, note that for example, in cases where the entire length of the width (width in the axial direction) of the outer peripheral ring 2000 is 1.9 mm, it is preferable to set the width of the convex portion 2212 to be equal to or more than about 0.3 mm and equal to or less than about 0.7 mm.

<Mechanism at the Time of Using the Sealing Device>

Figure 32:
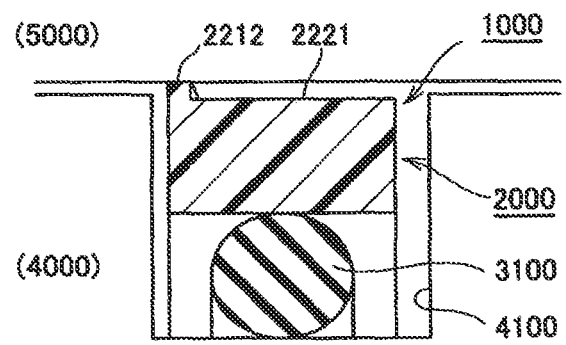
FIG. 32 is a schematic cross sectional view showing an unloaded state in the sealing device according to the second practical example of the present disclosure.
Figure 33:
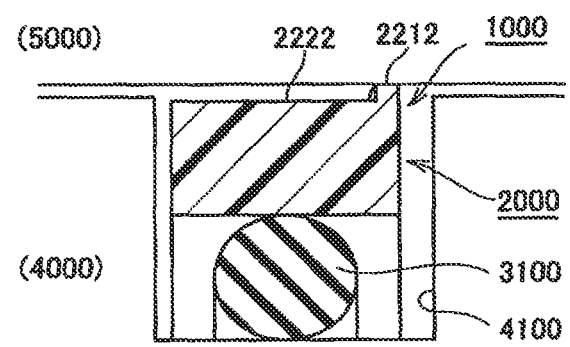
FIG. 33 is a schematic cross sectional view showing an unloaded state in the sealing device according to the second practical example of the present disclosure.
Figure 34:
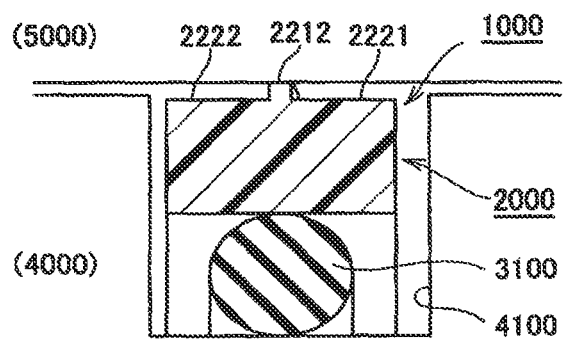
FIG. 34 is a schematic cross sectional view showing an unloaded state in the sealing device according to the second practical example of the present disclosure.
Figure 35:
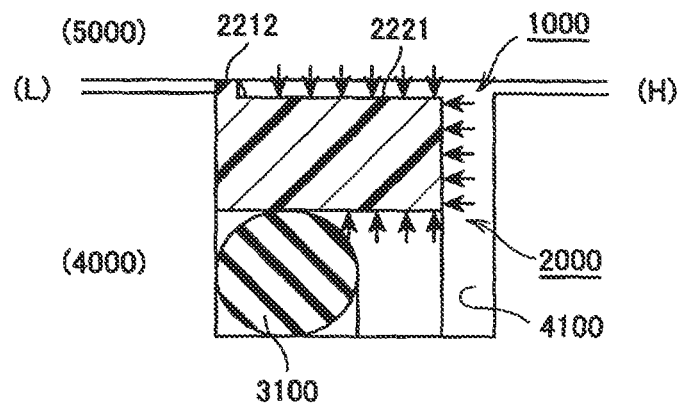
FIG. 35 is a schematic cross sectional view showing a high pressure state in the sealing device according to the second practical example of the present disclosure.

A mechanism at the time of using the sealing device 1000 according to this practical example will be explained, while referring in particular to FIG. 32 through FIG. 35. FIG. 32 through FIG. 34 each show an unloaded state in which an engine is stopped, and there does not exist a differential pressure (or there exists substantially no differential pressure) between right-hand side region of the sealing device 1000 and left-hand side region of the sealing device 1000. Here, note that the outer peripheral ring 2000 in FIG. 32 corresponds to an AA cross section in FIG. 30, and the outer peripheral ring 2000 in FIG. 33 corresponds to a BB cross section in FIG. 30, and the outer peripheral ring 2000 in FIG. 34 corresponds to a CC cross section in FIG. 30. FIG. 35 shows a state in which the engine is operated, and fluid pressure in the right-hand side region of the sealing device 1000 has become higher in comparison with that in the left-hand side region of the sealing device 1000. Here, note that the outer peripheral ring 2000 in FIG. 35 corresponds to the AA cross section in FIG. 30.

In a state where the sealing device 1000 is fitted in an annular groove 4100, the inner peripheral ring 3100 made of a rubber-like elastic body is in intimate contact with the inner peripheral surface of the outer peripheral ring 2000 and a groove bottom surface of the annular groove 4100, respectively. Then, the inner peripheral ring 3100 exhibits a function of pushing the outer peripheral ring 2000 toward its outer peripheral surface side due to the elastic repulsion thereof.

Accordingly, even if the engine is in an unloaded state, those portions of the outer peripheral surface of the outer peripheral ring 2000 which exclude the third concave portions 2221 and the fourth concave portions 2222 (i.e., the convex portion 2212 and a portion of the outer peripheral ring 2000 in the vicinity of the abutment joint portion 2100 in which the third concave portions 2221 and the fourth concave portions 2222 are not formed) maintain a state in which they are in contact with the inner peripheral surface of the shaft hole in the housing 5000.

Then, in a state in which the engine is started to generate a differential pressure, the outer peripheral ring 2000 is pushed by means of the fluid pressure from the high pressure side (H), so that it becomes a state of being in intimate contact with the side wall surface of the annular groove 4100 at the low pressure side (L), as shown in FIG. 35. Here, note that it is needless to say that the outer peripheral ring 2000 maintains the state of being in contact (sliding) with the inner peripheral surface of the shaft hole in the housing 5000. In addition, with respect to the inner peripheral ring 3100, too, it also becomes a state of being in intimate contact with the side wall surface of the annular groove 4100 at the low pressure side (L).

<Advantages of the Sealing Device and the Sealing Structure According to this Practical Example>

According to the sealing device 1000 and the sealing structure provided with this sealing device according to this practical example, the following advantages are achieved in comparison with the sealing device explained in the abovementioned embodiment. That is, the convex portion 2212 formed on the outer peripheral surface of the outer peripheral ring 2000 is formed so as to extend toward the circumferential direction while changing its position to the high pressure side (H) and the low pressure side (L) in an alternate manner. For that reason, the position in which the outer peripheral surface of the outer peripheral ring 2000 slides with respect to the shaft hole in the housing 5000 is not biased toward the high pressure side (H) or the low pressure side (L). Accordingly, it is possible to suppress the outer peripheral ring 2000 from being inclined in the annular groove 4100, thereby making it possible to stabilize the mounting state of the outer peripheral ring 2000. Here, note that in this practical example, the convex portion 2212 is formed in such a manner that it extends toward a circumferential direction while changing its position to a high pressure side (H) and a low pressure side (L) in an alternate manner so as to reach positions on opposite side surfaces in the width direction. Accordingly, the position in which the outer peripheral surface of the outer peripheral ring 2000 slides with respect to the shaft hole in the housing 5000 can be suppressed from being biased toward the high pressure side (H) or the low pressure side (L) in an effective manner.

In addition, the plurality of third concave portions 2221 are formed on the outer peripheral surface of the outer peripheral ring 2000, so that fluid can be introduced into these plurality of third concave portions 2221 from the high pressure side (H). For that reason, even if the fluid pressure becomes higher, the fluid pressure acts toward the inner peripheral surface side of the outer peripheral ring 2000 in a region in which the third concave portions 2221 are formed. Here, in this practical example, the bottom surfaces of the third concave portions 2221 are each composed of a surface which is concentric with the inner peripheral surface of the outer peripheral ring 2000, as a consequence of which in the region in which the third concave portions 2221 are formed, a direction in which the fluid pressure acts from the inner peripheral surface side and a direction in which the fluid pressure acts from the outer peripheral surface side become opposite to each other. Here, note that an arrow in FIG. 35 shows how the fluid pressure acts with respect to the outer peripheral ring 2000. According to this, in the sealing device 1000 according to this practical example, it is possible to suppress an increase in pressure toward the outer peripheral surface side by means of the outer peripheral ring 2000 accompanying an increase in the fluid pressure, thus making it possible to suppress sliding torque to a low level.

Moreover, as shown in FIG. 35, in the region of the low pressure side (L) from the intimate contact portion of the inner peripheral ring 3100 with respect to the outer peripheral ring 2000, it is possible to suppress the action of the fluid pressure with respect to the inner peripheral surface of the outer peripheral ring 2000. Accordingly, even if the fluid pressure at the high pressure side (H) increases, it is possible to suppress an increase in the pressure to the outer peripheral surface side by the outer peripheral ring 2000.

Further, in this practical example, due to the fact that the third concave portions 2221 and the fourth concave portions 2222 are formed over a wide range of the outer peripheral surface of the outer peripheral ring 2000, it is possible to make the sliding area between the outer peripheral ring 2000 and the inner peripheral surface of the shaft hole in the housing 5000 as narrow as possible. Accordingly, the sliding torque can be reduced very much. Here, note that the sliding area between the outer peripheral ring 2000 and the inner peripheral surface of the shaft hole in the housing 5000 is sufficiently narrower than the area of intimate contact between the outer peripheral ring 2000 and the side wall surface of the annular groove 4100 at the low pressure side (L). With this, it is possible to suppress the outer peripheral ring 2000 from sliding with respect to the side wall surface of the annular groove 4100 at the low pressure side (L). Accordingly, the outer peripheral ring 2000 according to this practical example slides at the outer peripheral surface side. For that reason, in comparison with the case of a seal ring which slides with respect to the side wall surface of the annular groove, it becomes easy for a lubricating film (here an oil film) of the fluid being sealed to be formed, so that the sliding torque can be reduced to a further extent.

In this manner, the generation of heat due to sliding can be suppressed by being able to achieve the reduction of the sliding torque. Accordingly, it becomes possible to use the sealing device 1000 according to this practical example in a suitable manner even under a high-speed high-pressure environmental condition.

Further, the outer peripheral ring 2000 according to this practical example has a symmetrical structure with respect to a central plane in the width direction (axial direction). Accordingly, it is not necessary to care about the direction of mounting of the outer peripheral ring 2000 at the time when it is mounted or fitted, so this outer peripheral ring 2000 is excellent in mountability. In addition, the outer peripheral ring 2000 can be applied under an environment where the high pressure side (H) and the low pressure side (L) are interchanged with each other. In other words, in FIG. 32 through FIG. 34, the sealing device 1000 according to this practical example can also be used in a suitable manner under an environment where fluid pressure at the right-hand side becomes higher in comparison with that at the left-hand side, or fluid pressure at the left-hand side becomes higher in comparison with that at the right-hand side.

<Modifications of the Second Practical Example>

Sealing devices according to modifications of the second practical example of the present disclosure will be explained while referring to FIG. 36 and FIG. 37. In the modifications explained below, there are shown cases where the shapes of the convex portion, the third concave portions, and the fourth concave portions formed on the outer peripheral surface of the outer peripheral ring are different from those of the second practical example. The other construction in these modifications is the same as that in the above-mentioned second practical example, so the explanation thereof is omitted.

Figure 36:
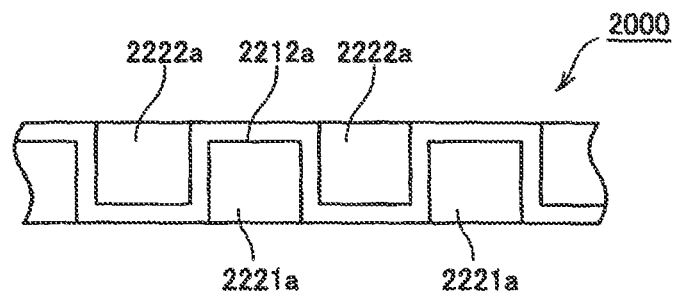
FIG. 36 is a part of a view of an outer peripheral ring seen from an outer peripheral surface side thereof according to a first modification of the second practical example of the present disclosure.

A convex portion 2212a formed on an outer peripheral surface of an outer peripheral ring 2000 according to a first modification shown in FIG. 36 is formed in such a manner that it extends toward a circumferential direction while changing its position to a high pressure side (H) and a low pressure side (L) in an alternate manner so as to reach positions on opposite side surfaces in a width direction, as in the case of the above-mentioned second practical example. However, in the case of the first modification, the convex portion 2212a is constructed so as to take a rectangular wave shape extending toward a circumferential direction.

The following feature is the same as that in the case of the above-mentioned second practical example; that is, due to the formation of such a convex portion 2212a, there are formed on the outer peripheral surface of the outer peripheral ring 2000 a plurality of third concave portions 2221a which are respectively spaced from one another in the circumferential direction, and a plurality of fourth concave portions 2222a which are respectively spaced from one another in the circumferential direction. In addition, a feature that the third concave portions 2221a are each constructed to extend from an end of the high pressure side (H) to a position which does not reach an end of the low pressure side (L) so as to exhibit a function of introducing fluid thereinto from the high pressure side (H) is also the same as in the case of the above-mentioned second practical example. Moreover, a feature that the fourth concave portions 2222a are each constructed so as to extend from the end of the low pressure side (L) to a position which does not reach the end of the high pressure side (H) is also the same as in the case of the above-mentioned second practical example. Further, a feature that the bottom surfaces of the third concave portions 2221a and the bottom surfaces of the fourth concave portions 2222a are each composed of a surface which is concentric with the inner peripheral surface of the outer peripheral ring 2000 is also the same as in the case of the above-mentioned second practical example.

It goes without saying that even in this first modification, too, the same operational effects as in the case of the above-mentioned second practical example are obtained.

Figure 37:
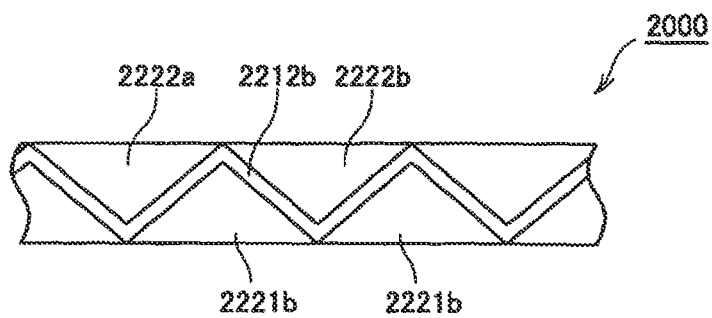
FIG. 37 is a part of a view of an outer peripheral ring seen from an outer peripheral surface side thereof according to a second modification of the second practical example of the present disclosure.
Figure 38:
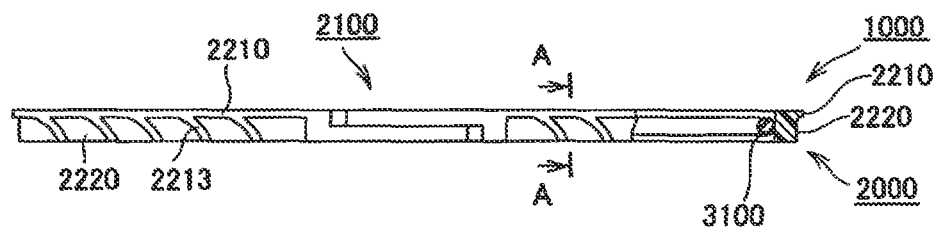
FIG. 38 is a partially broken cross sectional view of a sealing device according to a third practical example of the present disclosure.
Figure 39:
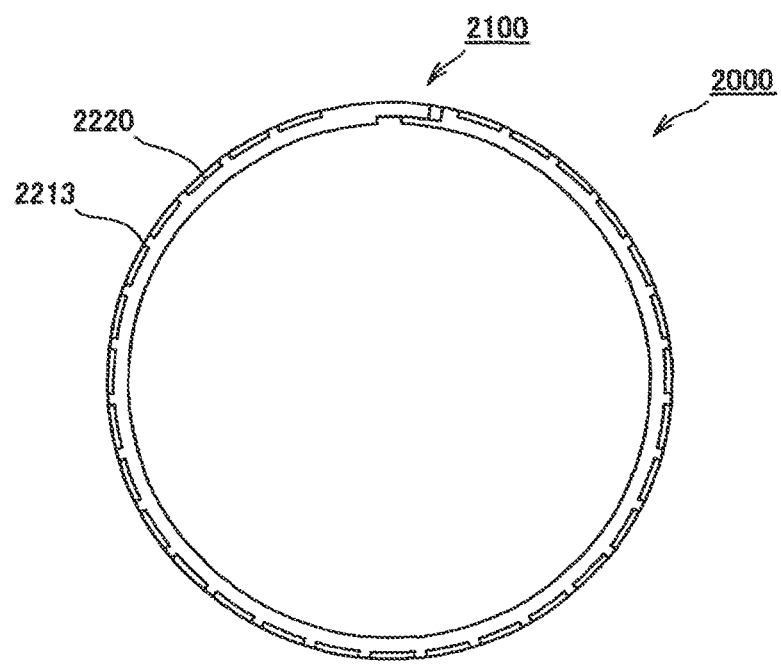
FIG. 39 is a side view of an outer peripheral ring according to the third practical example of the present disclosure.
Figure 40:
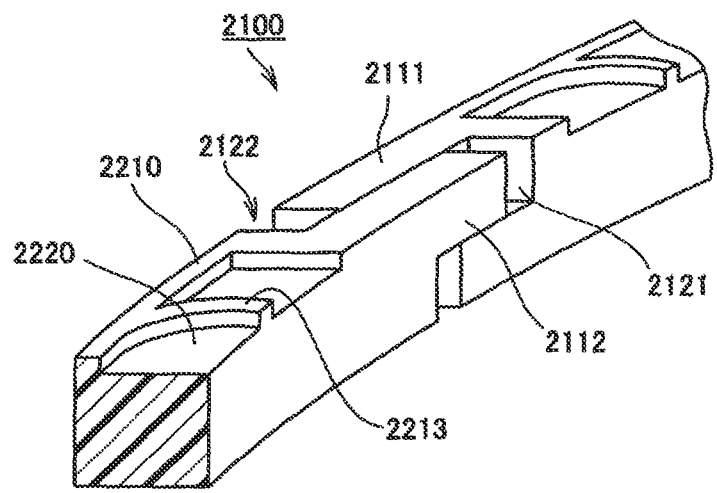
FIG. 40 is a partially broken perspective view of the outer peripheral ring according to the third practical example of the present disclosure.

In addition, a convex portion 2212b formed on an outer peripheral surface of an outer peripheral ring 2000 according to a second modification shown in FIG. 37 is formed in such a manner that it extends toward a circumferential direction while changing its position to a high pressure side (H) and a low pressure side (L) in an alternate manner so as to reach positions on opposite side surfaces in a width direction, as in the case of the above-mentioned second practical example. However, in the case of the second modification, the convex portion 2212b is constructed so as to take a triangular wave shape extending toward a circumferential direction.

The following feature is the same as that in the case of the above-mentioned second practical example; that is, due to the formation of such a convex portion 2212b, there are formed on the outer peripheral surface of the outer peripheral ring 2000 a plurality of third concave portions 2221b which are respectively spaced from one another in the circumferential direction, and a plurality of fourth concave portions 2222b which are respectively spaced from one another in the circumferential direction. In addition, a feature that the third concave portions 2221b are each constructed to extend from an end of the high pressure side (H) to a position which does not reach an end of the low pressure side (L) so as to exhibit a function of introducing fluid thereinto from the high pressure side (H) is also the same as in the case of the above-mentioned second practical example. Moreover, a feature that the fourth concave portions 2222b are constructed so as to extend from the end of the low pressure side (L) to a position which does not reach the end of the high pressure side (H) is also the same as in the case of the above-mentioned second practical example. Further, a feature that the bottom surfaces of the third concave portions 2221b and the bottom surfaces of the fourth concave portions 2222b are each composed of a surface which is concentric with the inner peripheral surface of the outer peripheral ring 2000 is also the same as in the case of the above-mentioned second practical example.

It goes without saying that even in this second modification, too, the same operational effects as in the case of the above-mentioned second practical example are obtained.

Here, note that in the second practical example and the various kinds of modifications of the second practical example, in cases where a sealing function does not need to be exhibited in a state where fluid pressure is low or in a state where there is no fluid pressure, the outer peripheral rings 2000 can be independently used without the inner peripheral rings 3100, respectively. In this case, a low torque effect can be enhanced.

Third Practical Example

Summary

A sealing device according to a third practical example of the present disclosure, which is fitted into an annular groove formed in an outer periphery of a shaft so as to seal an annular gap between said shaft and a housing which rotate relative to each other, thereby to hold a fluid pressure in a region to be sealed which is constructed such that the fluid pressure therein changes, comprising: an outer peripheral ring made of resin that is in intimate contact with a side wall surface of said annular groove at a low pressure side thereof, and slides with respect to an inner peripheral surface of a shaft hole in said housing through which said shaft is inserted; and an inner peripheral ring made of a rubber-like elastic body that is in intimate contact with an inner peripheral surface of said outer peripheral ring and a groove bottom surface of said annular groove, respectively, thereby to push said outer peripheral ring toward an outer peripheral surface side thereof; wherein said outer peripheral ring is formed on its outer peripheral surface with a plurality of concave portions which are spaced with respect to one another in a circumferential direction and which each extend from an end of a high pressure side to a position which does not arrive at an end of a low pressure side, so as to introduce fluid thereinto from the high pressure side; and wherein convex portions each formed between adjacent concave portions are formed so as to extend from the low pressure side toward the high pressure side as they go in the sliding direction of said outer peripheral ring with respect to said housing.

In addition, a sealing structure according to the third practical example of the present disclosure, which is provided with: a shaft and a housing that rotate relative to each other; and a sealing device that is fitted into an annular groove formed in an outer periphery of said shaft so as to seal an annular gap between said shaft and said housing, thereby to hold a fluid pressure in a region to be sealed which is constructed such that the fluid pressure therein changes; the sealing device comprises: an outer peripheral ring made of resin that is in intimate contact with a side wall surface of said annular groove at a low pressure side thereof, and slides with respect to an inner peripheral surface of a shaft hole in said housing through which said shaft is inserted; and an inner peripheral ring made of a rubber-like elastic body that is in intimate contact with an inner peripheral surface of said outer peripheral ring and a groove bottom surface of said annular groove, respectively, thereby to push said outer peripheral ring toward an outer peripheral surface side thereof; wherein said outer peripheral ring is formed on its outer peripheral surface with a plurality of concave portions which are spaced with respect to one another in a circumferential direction and which each extend from an end of a high pressure side to a position which does not arrive at an end of a low pressure side, so as to introduce fluid thereinto from the high pressure side; and wherein convex portions each formed between adjacent concave portions are formed so as to extend from the low pressure side toward the high pressure side as they go in the sliding direction of said outer peripheral ring with respect to said housing.

According to the sealing device according to this practical example, the following advantages are achieved in comparison with the sealing device explained in the above-mentioned embodiment. That is, in this practical example, the convex portions each formed between adjacent concave portions are formed so as to extend from the low pressure side toward the high pressure side as they go in the sliding direction of the outer peripheral ring with respect to the housing. For that reason, the fluid introduced into the concave portions in accordance with the relative rotation between the housing and the outer peripheral ring actively flows from the high pressure side to the low pressure side as well as toward the sliding direction of the housing with respect to the outer peripheral ring. As a result of this, the flow of fluid concentrates on the vicinity of wedge-shaped tip ends formed by low pressure side portions on the outer peripheral surface of the outer peripheral ring in which the concave portions are not formed and the convex portions. Then, dynamic pressure is generated due to this concentration of the flow of fluid, so the outer peripheral ring is pushed toward the inner peripheral surface side. Accordingly, due to this dynamic pressure, too, an increase in pressure toward the outer peripheral surface by means of the outer peripheral ring can be suppressed, thus making it possible to suppress sliding torque to a low level.

Further, because of the provision of the plurality of convex portions, the reduction in rigidity of the outer peripheral ring can be suppressed. In addition, these plurality of convex portions are in a state of contact with the inner peripheral surface of the shaft hole in the housing, so that the outer peripheral ring can be suppressed from being inclined in the annular groove, thereby making it possible to stabilize the mounting state of the outer peripheral ring.

Specific Example

Hereinafter, a sealing device and a sealing structure according to the third practical example of the present disclosure will be explained more specifically while referring to FIG. 38 through FIG. 43. Here, note that the basic construction of this example is the same as that of the above-mentioned embodiment, individual reference examples and individual practical examples, and hence, the same component parts are denoted by the same reference numerals and characters, and the explanation thereof is omitted as the case may be.

A sealing device 1000 according to this practical example is composed of an outer peripheral ring 2000 made of resin, and an inner peripheral ring 3100 made of a rubber-like elastic body. The inner peripheral ring 3100 according to this practical example is a so-called O ring having a circular cross sectional shape. However, the inner peripheral ring 3100 is not limited to the O ring, but as such there can be adopted other seal ring such as a rectangular or polygonal ring, etc.

It is constructed such that in a state where the outer peripheral ring 2000 and the inner peripheral ring 3100 are combined or assembled together, a peripheral length of an outer peripheral surface of the outer peripheral ring 2000 becomes longer than a peripheral length of an inner peripheral surface of a shaft hole in a housing 5000, as explained in the above-mentioned embodiment. Here, note that for the outer peripheral ring 2000 as a single or separate member, the peripheral length of the outer peripheral surface thereof is made shorter than the peripheral length of the inner peripheral surface of the shaft hole in the housing 5000, as explained in the above-mentioned embodiment.

<Outer Peripheral Ring>

The outer peripheral ring 2000 according to this third practical example of the present disclosure will be explained in further detail while referring in particular to FIG. 38 through FIG. 40 and FIG. 42. An abutment joint portion 2100 is formed on the outer peripheral ring 2000 at one place in a circumferential direction thereof. In addition, the outer peripheral ring 2000 is formed on its outer peripheral surface with a plurality of concave portions 2220 which are respectively spaced from one another in the circumferential direction.

Here, note that the outer peripheral ring 2000 according to this practical example is constructed such that the abutment joint portion 2100 and the plurality of concave portions 2220 as mentioned above are formed on an annular member of which the cross section is rectangular. However, this is only an explanation of the shape thereof, but does not necessarily mean that an annular member of a rectangular cross section is used as a material, and processing to form the abutment joint portion 2100 and the plurality of concave portions 2220 is applied to this material. Of course, after an annular member of a rectangular cross section has been molded or formed, the abutment joint portion 2100 and the plurality of concave portions 2220 can also be obtained by means of cutting work. However, for example, after molding or forming a member which has the abutment joint portion 2100 in advance, the plurality of concave portions 2220 may be obtained by means of cutting work. In this manner, the method of production thereof is not limited in particular.

A special step cut is employed for the abutment joint portion 2100, similar to the above-mentioned embodiment. However, for the abutment joint portion 2100, there can be adopted a straight cut, a bias cut, another step cut, and so on, including but not limited to this. In addition, in cases where a material (e.g., PTFE, etc.) of low elasticity is adopted as a material of the outer peripheral ring 2000, the outer peripheral ring 2000 may also be endless, without forming the abutment joint portion 2100.

In this practical example, the concave portions 2220 are formed in plurality in a spaced-apart relation with respect to one another in the circumferential direction. Here, note that in this practical example, the plurality of concave portions 2220 are arranged so as to be at equal intervals, except for the vicinity of the abutment joint portion 2100.

In addition, convex portions 2213 are each formed between adjacent concave portions 2220, respectively, by the formation of the plurality of concave portions 2220. The convex portions 2213 are formed so as to extend from a low pressure side (L) toward a high pressure side (H) as they go in the sliding direction of the outer peripheral ring 2000 with respect to the housing 5000.

Moreover, the concave portions 2220 are each constructed to extend from an end of the high pressure side (H) to a position which does not reach an end of the low pressure side (L). More specifically, the concave portions 2220 are formed so as to extend to the vicinity of the other end of the outer peripheral ring 2000 at the low pressure side (L). Here, note that in this practical example, too, the bottom surfaces of the concave portions 2220 are composed of surfaces which are concentric with the inner peripheral surface of the outer peripheral ring 2000.

Here, note that in the outer peripheral surface side of the outer peripheral ring 2000, an outer peripheral surface of a portion in which the concave portions 2220 are not formed in the vicinity of the abutment joint portion 2100, and outer peripheral surfaces of the convex portions 2213 and low pressure side convex portions 2210 are composed of the same surface. That is, these peripheral surfaces are concentric with the inner peripheral surface of the outer peripheral ring 2000. Then, a continuous annular surface is formed by the outer peripheral surface of that portion in which the concave portions 2220 are not formed in the vicinity of the abutment joint portion 2100 and the outer peripheral surfaces of the low pressure side convex portions 2210. This continuous annular surface functions as a sealing surface at the outer peripheral surface side in the outer peripheral ring 2000.

The shallower the depth of the concave portions 2220, the higher becomes the rigidity of those portions of the outer peripheral ring 2000 in which the convex portions 2213 and the low pressure side convex portions 2210 are formed. On the other hand, these convex portions 2213 and the low pressure side convex portions 2210 are worn out due to the relative sliding movement thereof, so the depth of the concave portions 2220 becomes shallower as the time elapses. For that reason, when the depth of the concave portions 2220 becomes too much shallow, it will become impossible to introduce fluid therein. Accordingly, it is desirable to set an initial depth of the concave portions 2220 by taking into consideration both the above-mentioned rigidity and the maintenance of introduction of fluid even if the wear progresses with the lapse of time. For example, in cases where the thickness of the outer peripheral ring 2000 is 1.7 mm, it is preferable to set the depth of the concave portions 2220 to be equal to or more than about 0.1 mm and equal to or less than about 0.3 mm.

In addition, with respect to the width (width in the axial direction) of the concave portions 2220, the wider the width of the concave portions 2220, the narrower becomes the width of the low pressure side convex portions 2210. The narrower this width becomes, the more the torque can be reduced, but if the width is made too much narrow, sealing efficiency and durability will become low. Accordingly, it is desirable to narrow the width concerned as much as possible according to service conditions, etc., to such an extent that sealing efficiency and durability can be maintained. Here, note that for example, in cases where the entire length of the width (width in the axial direction) of the outer peripheral ring 2000 is 1.9 mm, it is preferable to set the width of each of the low pressure side convex portions 2210 to be equal to or more than about 0.3 mm and equal to or less than about 0.7 mm. Also, it is preferable to set the width in the circumferential direction of the convex portions 2213 to be equal to or more than 0.3 mm and equal to or less than 0.7 mm.

<Mechanism at the Time of Using the Sealing Device>

Figure 41:
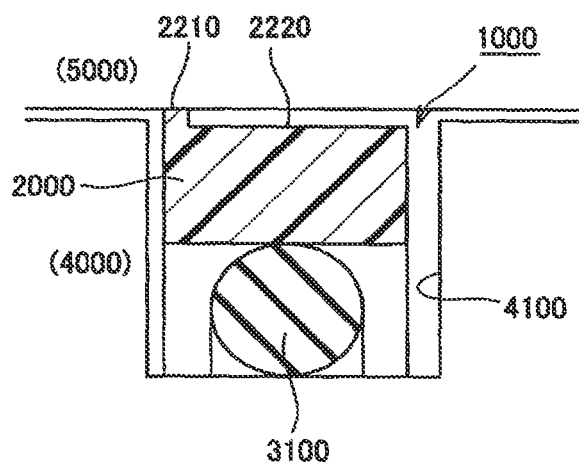
FIG. 41 is a schematic cross sectional view showing an unloaded state in the sealing device according to the third practical example of the present disclosure.
Figure 42:
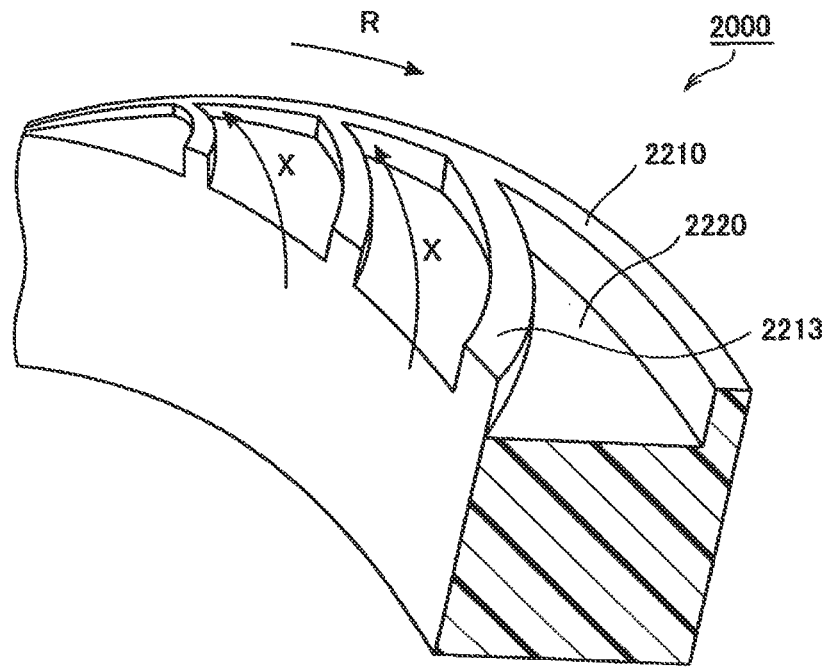
FIG. 42 is a partially broken perspective view of the outer peripheral ring according to the third practical example of the present disclosure.
Figure 43:
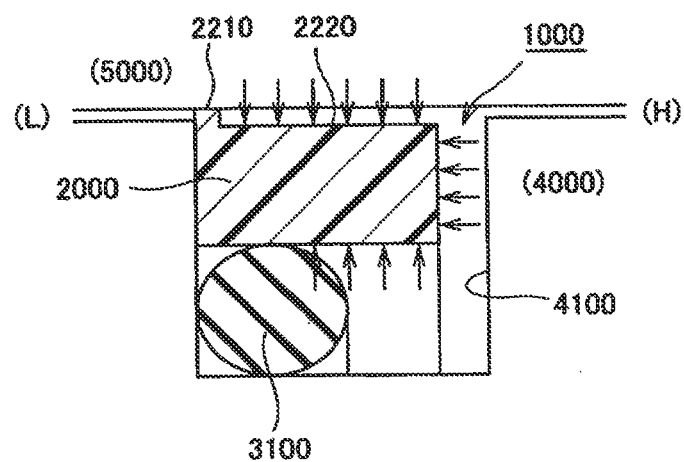
FIG. 43 is a schematic cross sectional view showing a high pressure state in the sealing device according to the third practical example of the present disclosure.
Figure 44:
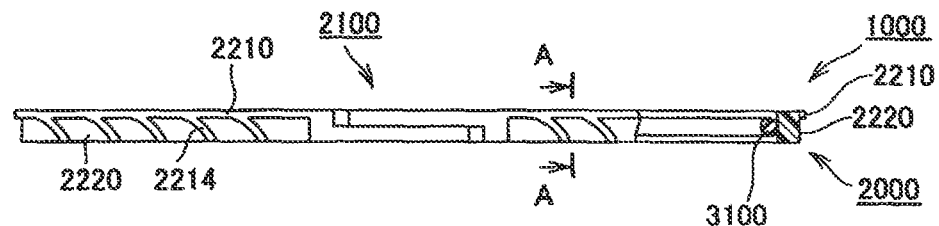
FIG. 44 is a partially broken cross sectional view of a sealing device according to a fourth practical example of the present disclosure.
Figure 45:
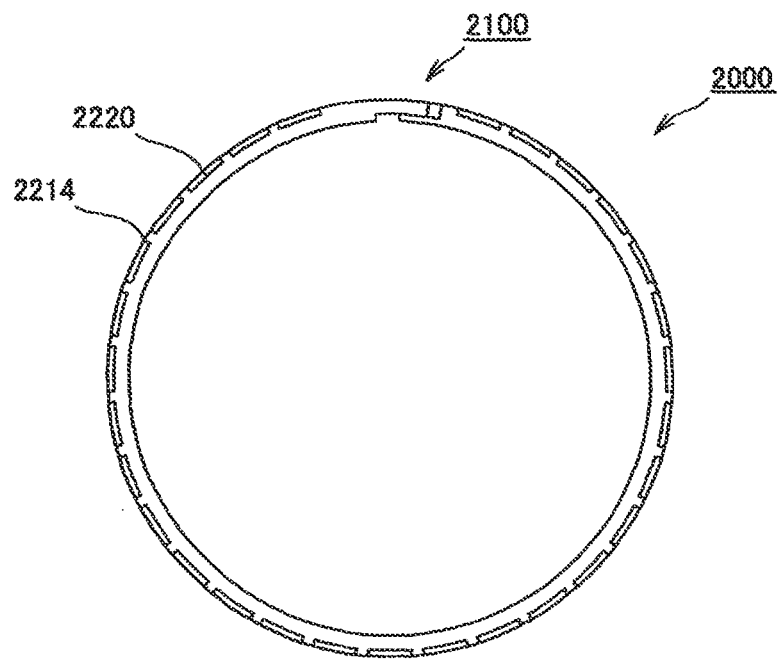
FIG. 45 is a side view of an outer peripheral ring according to the fourth practical example of the present disclosure.
Figure 46:
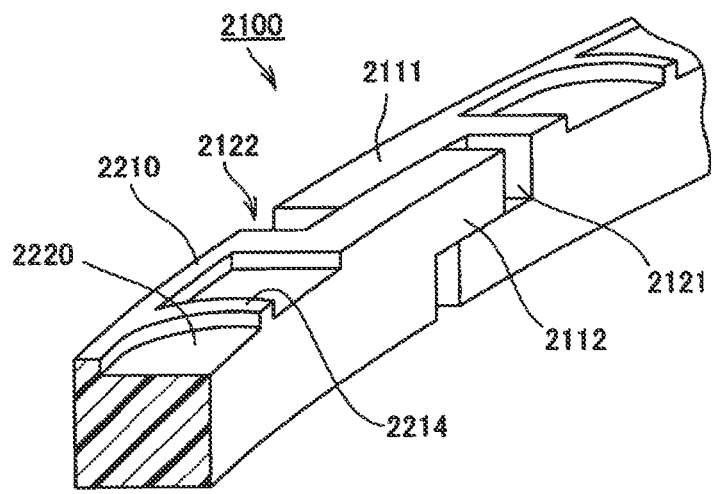
FIG. 46 is a partially broken perspective view of the outer peripheral ring according to the fourth practical example of the present disclosure.

A mechanism at the time of using the sealing device 1000 according to this practical example will be explained, while referring in particular to FIG. 41 through FIG. 43. FIG. 41 shows an unloaded state in which an engine is stopped, and there does not exist a differential pressure (or there exists substantially no differential pressure) between right-hand side region of the sealing device 1000 and left-hand side region of the sealing device 1000. Here, note that FIG. 41 is a schematic cross sectional view (i.e., a cross sectional view including an axis of a shaft 4000) of a portion in which a concave portion 2220 is formed in the outer peripheral ring 2000, wherein the sealing device 1000 in FIG. 41 corresponds to one in an AA cross section in FIG. 38. FIG. 42 is a partially broken perspective view in the outer peripheral ring 2000, showing the relation between the sliding direction of the outer peripheral ring 2000 with respect to the housing 5000 and the flow of fluid. FIG. 43 shows a state in which the engine is operated, and fluid pressure in the right-hand side region of the sealing device 1000 has become higher in comparison with that in the left-hand side region of the sealing device 1000. Here, note that FIG. 43 is a schematic cross sectional view (i.e., a cross sectional view including an axis of a shaft 4000) of a portion in which a concave portion 2220 is formed in the outer peripheral ring 2000, wherein the sealing device 1000 in FIG. 43 corresponds to one in an AA cross section in FIG. 38.

In a state where the sealing device 1000 is fitted in an annular groove 4100, the inner peripheral ring 3100 made of a rubber-like elastic body is in intimate contact with the inner peripheral surface of the outer peripheral ring 2000 and a groove bottom surface of the annular groove 4100, respectively. Then, the inner peripheral ring 3100 exhibits a function of pushing the outer peripheral ring 2000 toward its outer peripheral surface side due to the elastic repulsion thereof.

Accordingly, even if the engine is in an unloaded state, those portions of the outer peripheral surface of the outer peripheral ring 2000 which exclude the concave portions 2220 (i.e., the low pressure side convex portions 2210, the convex portions 2213 and that portion of the outer peripheral ring 2000 in the vicinity of the abutment joint portion 2100 in which a concave portion 2220 is not formed) maintain a state in which they are in contact with the inner peripheral surface of the shaft hole in the housing 5000.

Then, in a state in which the engine is started to generate a differential pressure, the outer peripheral ring 2000 is pushed by means of the fluid pressure from the high pressure side (H), so that it becomes a state of being in intimate contact with the side wall surface of the annular groove 4100 at the low pressure side (L), as shown in FIG. 43. Here, note that it is needless to say that the outer peripheral ring 2000 maintains the state of being in contact (sliding) with the inner peripheral surface of the shaft hole in the housing 5000. In addition, with respect to the inner peripheral ring 3100, too, it also becomes a state of being in intimate contact with the side wall surface of the annular groove 4100 at the low pressure side (L).

Moreover, the plurality of convex portions 2213 formed on the outer peripheral surface of the outer peripheral ring 2000 according to this practical example are formed so as to extend from the low pressure side (L) toward the high pressure side (H) as they go in the sliding direction (in the direction of an arrow R in FIG. 42) of the outer peripheral ring 2000 with respect to the housing 5000. For that reason, in accordance with relative rotation between the housing 5000 and the outer peripheral ring 2000, the fluid introduced in the concave portions 2220 actively flows from the high pressure side (H) to the low pressure side (L) as well as toward the sliding direction of the housing 5000 with respect to the outer peripheral ring 2000 (i.e., flows in the direction of an arrow X in FIG. 42).

<Advantages of the Sealing Device and the Sealing Structure According to this Practical Example>

According to the sealing device 1000 and the sealing structure provided with this sealing device according to this practical example, the following advantages are achieved in comparison with the sealing device explained in the above-mentioned embodiment. That is, by means of the convex portions 2213 formed on the outer peripheral ring 2000, the fluid introduced in the concave portions 2220 actively flows toward the direction of the arrow X in FIG. 42 in accordance with relative rotation between the housing 5000 and the outer peripheral ring 2000. As a result of this, the flow of fluid concentrates on the vicinity of wedge-shaped tip ends formed by the low pressure side convex portions 2210 and the convex portions 2213, among the concave portions 2220. Then, dynamic pressure is generated due to this concentration of the flow of fluid, so the outer peripheral ring 2000 is pushed toward the inner peripheral surface side. Accordingly, due to this dynamic pressure, too, an increase in pressure toward the outer peripheral surface by means of the outer peripheral ring 2000 can be suppressed, thus making it possible to suppress sliding torque to a low level.

Further, in this practical example, because of the provision of the plurality of convex portions 2213, the reduction in rigidity of the outer peripheral ring 2000 can be suppressed in comparison with the case where the convex portions 2213 are not formed. In addition, these plurality of convex portions 2213 are in a state of contact with the inner peripheral surface of the shaft hole in the housing 5000, so that the outer peripheral ring 2000 can be suppressed from being inclined in the annular groove 4100, thereby making it possible to stabilize the mounting state of the outer peripheral ring 2000. Here, because the convex portions 2213 are formed in such a manner that they each extend from the end of the high pressure side (H) to the end of the low pressure side (L) in the outer peripheral ring 2000, it is possible to suppress the tilt or inclination of the outer peripheral ring 2000 in an effective manner. Here, note that in cases where a construction is adopted in which the plurality of convex portions 2213 are not formed, there will be a fear that in FIG. 41 and FIG. 43, the outer peripheral ring 2000 may incline in a counter clockwise direction in these figures.

In addition, in this practical example, too, the concave portions 2220 are formed over a large area of the outer peripheral surface of the outer peripheral ring 2000. Accordingly, in this practical example, too, it is possible to reduce sliding torque to a sufficient extent, similar to the case of the above-mentioned embodiment.

Here, note that in the third practical example, in cases where a sealing function does not need to be exhibited in a state where fluid pressure is low or in a state where there is no fluid pressure, the outer peripheral ring 2000 can be independently used without the inner peripheral ring 3100. In this case, a low torque effect can be enhanced.

Fourth Practical Example

Summary

A sealing device according to a fourth practical example of the present disclosure, which is fitted into an annular groove formed in an outer periphery of a shaft so as to seal an annular gap between said shaft and a housing which rotate relative to each other, thereby to hold a fluid pressure in a region to be sealed which is constructed such that the fluid pressure therein changes, comprising: an outer peripheral ring made of resin that is in intimate contact with a side wall surface of said annular groove at a low pressure side thereof, and slides with respect to an inner peripheral surface of a shaft hole in said housing through which said shaft is inserted; and an inner peripheral ring made of a rubber-like elastic body that is in intimate contact with an inner peripheral surface of said outer peripheral ring and a groove bottom surface of said annular groove, respectively, thereby to push said outer peripheral ring toward an outer peripheral surface side thereof; wherein said outer peripheral ring is formed on its outer peripheral surface with a plurality of concave portions which are spaced with respect to one another in a circumferential direction and which each extend from an end of a high pressure side to a position which does not arrive at an end of a low pressure side, so as to introduce fluid thereinto from the high pressure side; and wherein convex portions each formed between adjacent concave portions are formed so as to extend from the high pressure side toward the low pressure side as they go in the sliding direction of said outer peripheral ring with respect to said housing.

In addition, a sealing structure according to the fourth practical example of the present disclosure, which is provided with: a shaft and a housing that rotate relative to each other; and a sealing device that is fitted into an annular groove formed in an outer periphery of said shaft so as to seal an annular gap between said shaft and said housing, thereby to hold a fluid pressure in a region to be sealed which is constructed such that the fluid pressure therein changes; the sealing device comprises: an outer peripheral ring made of resin that is in intimate contact with a side wall surface of said annular groove at a low pressure side thereof, and slides with respect to an inner peripheral surface of a shaft hole in said housing through which said shaft is inserted; and an inner peripheral ring made of a rubber-like elastic body that is in intimate contact with an inner peripheral surface of said outer peripheral ring and a groove bottom surface of said annular groove, respectively, thereby to push said outer peripheral ring toward an outer peripheral surface side thereof; wherein said outer peripheral ring is formed on its outer peripheral surface with a plurality of concave portions which are spaced with respect to one another in a circumferential direction and which each extend from an end of a high pressure side to a position which does not arrive at an end of a low pressure side, so as to introduce fluid thereinto from the high pressure side; and wherein convex portions each formed between adjacent concave portions are formed so as to extend from the high pressure side toward the low pressure side as they go in the sliding direction of said outer peripheral ring with respect to said housing.

According to the sealing device according to this practical example, the following advantages are achieved in comparison with the sealing device explained in the above-mentioned embodiment. That is, in this practical example, the convex portions each formed between adjacent concave portions are formed so as to extend from the high pressure side toward the low pressure side as they go in the sliding direction of the outer peripheral ring with respect to the housing. For that reason, the fluid introduced into the concave portions in accordance with the relative rotation between the housing and the outer peripheral ring actively flows from the low pressure side to the high pressure side as well as toward the sliding direction of the housing with respect to the outer peripheral ring. Thus, the fluid introduced in the concave portions acts in such a manner as to be caused to return to the high pressure side in accordance with relative rotation between the housing and the outer peripheral ring, so it is possible to suppress the leakage of fluid.

Further, because of the provision of the plurality of convex portions, the reduction in rigidity of the outer peripheral ring can be suppressed. In addition, these plurality of convex portions are in a state of contact with the inner peripheral surface of the shaft hole in the housing, so that the outer peripheral ring can be suppressed from being inclined in the annular groove, thereby making it possible to stabilize the mounting state of the outer peripheral ring.

Specific Example

Hereinafter, a sealing device and a sealing structure according to the fourth practical example of the present disclosure will be explained more specifically while referring to FIG. 44 through FIG. 49. Here, note that the basic construction of this example is the same as that of the above-mentioned embodiment, individual reference examples and individual practical examples, and hence, the same component parts are denoted by the same reference numerals and characters, and the explanation thereof is omitted as the case may be.

A sealing device 1000 according to this practical example is composed of an outer peripheral ring 2000 made of resin, and an inner peripheral ring 3100 made of a rubber-like elastic body. The inner peripheral ring 3100 according to this practical example is a so-called O ring having a circular cross sectional shape. However, the inner peripheral ring 3100 is not limited to the O ring, but as such there can be adopted other seal ring such as a rectangular or polygonal ring, etc.

It is constructed such that in a state where the outer peripheral ring 2000 and the inner peripheral ring 3100 are combined or assembled together, a peripheral length of an outer peripheral surface of the outer peripheral ring 2000 becomes longer than a peripheral length of an inner peripheral surface of a shaft hole in a housing 5000, as explained in the above-mentioned embodiment. Here, note that for the outer peripheral ring 2000 as a single or separate member, the peripheral length of the outer peripheral surface thereof is made shorter than the peripheral length of the inner peripheral surface of the shaft hole in the housing 5000, as explained in the above-mentioned embodiment.

<Outer Peripheral Ring>

The outer peripheral ring 2000 according to this fourth practical example of the present disclosure will be explained in further detail while referring in particular to FIG. 44 through FIG. 46 and FIG. 48. An abutment joint portion 2100 is formed on the outer peripheral ring 2000 at one place in a circumferential direction thereof. In addition, the outer peripheral ring 2000 is formed on its outer peripheral surface with a plurality of concave portions 2220 which are respectively spaced from one another in a circumferential direction.

Here, note that the outer peripheral ring 2000 according to this practical example is constructed such that the abutment joint portion 2100 and the plurality of concave portions 2220 as mentioned above are formed on an annular member of which the cross section is rectangular. However, this is only an explanation of the shape thereof, but does not necessarily mean that an annular member of a rectangular cross section is used as a material, and processing to form the abutment joint portion 2100 and the plurality of concave portions 2220 is applied to this material. Of course, after an annular member of a rectangular cross section has been molded or formed, the abutment joint portion 2100 and the plurality of concave portions 2220 can also be obtained by means of cutting work. However, for example, after molding or forming a member which has the abutment joint portion 2100 in advance, the plurality of concave portions 2220 may be obtained by means of cutting work. In this manner, the method of production thereof is not limited in particular.

A special step cut is employed for the abutment joint portion 2100, similar to the above-mentioned embodiment. However, for the abutment joint portion 2100, there can be adopted a straight cut, a bias cut, another step cut, and so on, including but not limited to this. In addition, in cases where a material (e.g., PTFE, etc.) of low elasticity is adopted as a material of the outer peripheral ring 2000, the outer peripheral ring 2000 may also be endless, without forming the abutment joint portion 2100.

In this practical example, the concave portions 2220 are formed in plurality in a spaced-apart relation with respect to one another in the circumferential direction. Here, note that in this practical example, the plurality of concave portions 2220 are arranged so as to be at equal intervals, except for the vicinity of the abutment joint portion 2100.

In addition, convex portions 2214 are each formed between adjacent concave portions 2220, respectively, by the formation of the plurality of concave portions 2220. The convex portions 2214 are formed so as to extend from a high pressure side (H) toward a low pressure side (L) as they go in the sliding direction of the outer peripheral ring 2000 with respect to the housing 5000.

Moreover, the concave portions 2220 are each constructed to extend from an end of the high pressure side (H) to a position which does not reach an end of the low pressure side (L). More specifically, the concave portions 2220 are each formed so as to extend to the vicinity of the other end of the outer peripheral ring 2000 at the low pressure side (L). Here, note that in this practical example, too, the bottom surfaces of the concave portions 2220 are composed of surfaces which are concentric with the inner peripheral surface of the outer peripheral ring 2000.

Here, note that in the outer peripheral surface side of the outer peripheral ring 2000, an outer peripheral surface of a portion in which the concave portions 2220 are not formed in the vicinity of the abutment joint portion 2100, and outer peripheral surfaces of the convex portions 2214 and low pressure side convex portions 2210 are composed of the same surface. That is, these peripheral surfaces are concentric with the inner peripheral surface of the outer peripheral ring 2000. Then, a continuous annular surface is formed by the outer peripheral surface of that portion in which the concave portions 2220 are not formed in the vicinity of the abutment joint portion 2100 and the outer peripheral surfaces of the low pressure side convex portions 2210. This continuous annular surface functions as a sealing surface at the outer peripheral surface side in the outer peripheral ring 2000.

The shallower the depth of the concave portions 2220, the higher becomes the rigidity of those portions of the outer peripheral ring 2000 in which the convex portions 2214 and the low pressure side convex portions 2210 are formed. On the other hand, these convex portions 2214 and the low pressure side convex portions 2210 are worn out due to the relative sliding movement thereof, so the depth of the concave portions 2220 becomes shallower as the time elapses. For that reason, when the depth of the concave portions 2220 becomes too much shallow, it will become impossible to introduce fluid therein. Accordingly, it is desirable to set an initial depth of the concave portions 2220 by taking into consideration both the above-mentioned rigidity and the maintenance of introduction of fluid even if the wear progresses with the lapse of time. For example, in cases where the thickness of the outer peripheral ring 2000 is 1.7 mm, it is preferable to set the depth of the concave portions 2220 to be equal to or more than about 0.1 mm and equal to or less than about 0.3 mm.

In addition, with respect to the width (width in the axial direction) of the concave portions 2220, the wider the width of the concave portions 2220, the narrower becomes the width of the low pressure side convex portions 2210. The narrower this width becomes, the more the torque can be reduced, but if the width is made too much narrow, sealing efficiency and durability will become low. Accordingly, it is desirable to narrow the width concerned as much as possible according to service conditions, etc., to such an extent that sealing efficiency and durability can be maintained. Here, note that for example, in cases where the entire length of the width (width in the axial direction) of the outer peripheral ring 2000 is 1.9 mm, it is preferable to set the width of each of the convex portions 2210 to be equal to or more than about 0.3 mm and equal to or less than about 0.7 mm. Also, it is preferable to set the width in the circumferential direction of the convex portions 2214 to be equal to or more than 0.3 mm and equal to or less than 0.7 mm.

<Mechanism at the Time of Using the Sealing Device>

Figure 47:
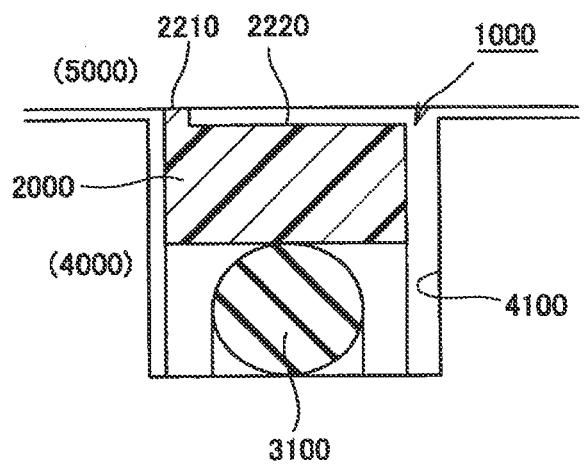
FIG. 47 is a schematic cross sectional view showing an unloaded state in the sealing device according to the fourth practical example of the present disclosure.
Figure 48:
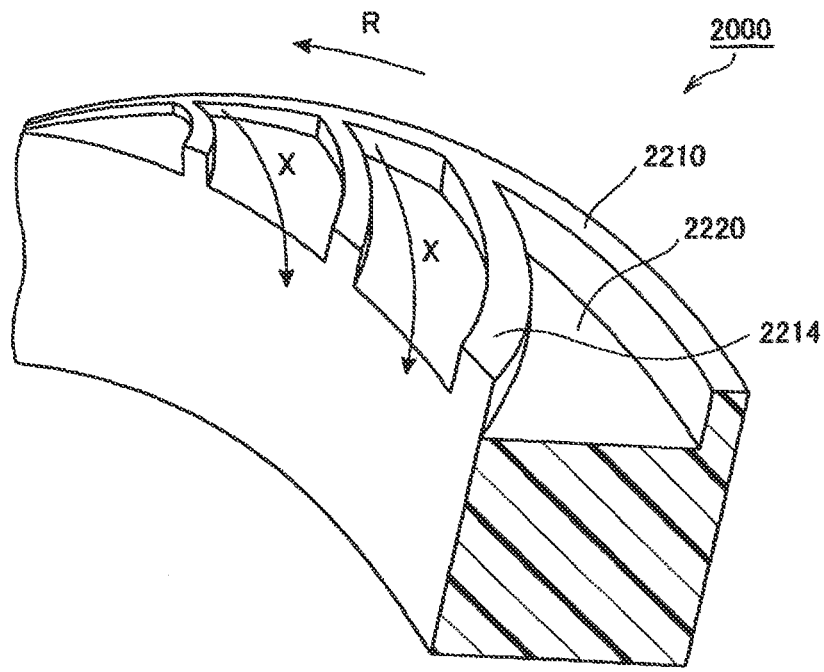
FIG. 48 is a partially broken perspective view of the outer peripheral ring according to the fourth practical example of the present disclosure.
Figure 49:
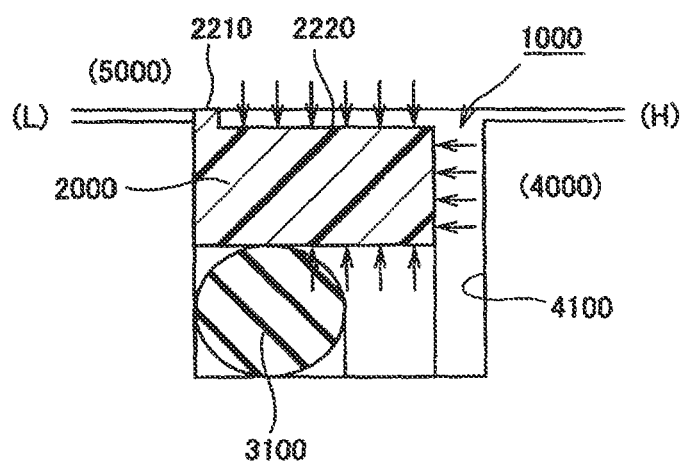
FIG. 49 is a schematic cross sectional view showing a high pressure state in the sealing device according to the fourth practical example of the present disclosure.

A mechanism at the time of using the sealing device 1000 according to this practical example will be explained, while referring in particular to FIG. 47 through FIG. 49. FIG. 47 shows an unloaded state in which an engine is stopped, and there does not exist a differential pressure (or there exists substantially no differential pressure) between right-hand side region of the sealing device 1000 and left-hand side region of the sealing device 1000. Here, note that FIG. 47 is a schematic cross sectional view (i.e., a cross sectional view including an axis of a shaft 4000) of a portion in which a concave portion 2220 is formed in the outer peripheral ring 2000, wherein the sealing device 1000 in FIG. 47 corresponds to one in an AA cross section in FIG. 44. FIG. 48 is a partially broken perspective view in the outer peripheral ring 2000, showing the relation between the sliding direction of the outer peripheral ring 2000 with respect to the housing 5000 and the flow of fluid. FIG. 49 shows a state in which the engine is operated, and fluid pressure in the right-hand side region of the sealing device 1000 has become higher in comparison with that in the left-hand side region of the sealing device 1000. Here, note that FIG. 49 is a schematic cross sectional view (i.e., a cross sectional view including an axis of a shaft 4000) of a portion in which a concave portion 2220 is formed in the outer peripheral ring 2000, wherein the sealing device 1000 in FIG. 49 corresponds to one in an AA cross section in FIG. 44.

In a state where the sealing device 1000 is fitted in an annular groove 4100, the inner peripheral ring 3100 made of a rubber-like elastic body is in intimate contact with the inner peripheral surface of the outer peripheral ring 2000 and a groove bottom surface of the annular groove 4100, respectively. Then, the inner peripheral ring 3100 exhibits a function of pushing the outer peripheral ring 2000 toward its outer peripheral surface side due to the elastic repulsion thereof.

Accordingly, even if the engine is in an unloaded state, those portions of the outer peripheral surface of the outer peripheral ring 2000 which exclude the concave portions 2220 (i.e., the low pressure side convex portions 2210, the convex portions 2214 and that portion of the outer peripheral ring 2000 in the vicinity of the abutment joint portion 2100 in which a concave portion 2220 is not formed) maintain a state in which they are in contact with the inner peripheral surface of the shaft hole in the housing 5000.

Then, in a state in which the engine is started to generate a differential pressure, the outer peripheral ring 2000 is pushed by means of the fluid pressure from the high pressure side (H), so that it becomes a state of being in intimate contact with the side wall surface of the annular groove 4100 at the low pressure side (L), as shown in FIG. 49. Here, note that it is needless to say that the outer peripheral ring 2000 maintains the state of being in contact (sliding) with the inner peripheral surface of the shaft hole in the housing 5000. In addition, with respect to the inner peripheral ring 3100, too, it also becomes a state of being in intimate contact with the side wall surface of the annular groove 4100 at the low pressure side (L).

Moreover, the plurality of convex portions 2214 formed on the outer peripheral surface of the outer peripheral ring 2000 according to this practical example are formed so as to extend from the high pressure side (H) toward the low pressure side (L) as they go in the sliding direction (in the direction of an arrow R in FIG. 48) of the outer peripheral ring 2000 with respect to the housing 5000. For that reason, in accordance with relative rotation between the housing 5000 and the outer peripheral ring 2000, the fluid introduced in the concave portions 2220 actively flows from the low pressure side (L) to the high pressure side (H) as well as toward the sliding direction of the housing 5000 with respect to the outer peripheral ring 2000 (i.e., flows in the direction of an arrow X in FIG. 48).

<Advantages of the Sealing Device and the Sealing Structure According to this Practical Example>

According to the sealing device 1000 and the sealing structure provided with this sealing device according to this practical example, the following advantages are achieved in comparison with the sealing device explained in the above-mentioned embodiment. That is, by means of the convex portions 2214 formed on the outer peripheral ring 2000, the fluid introduced in the concave portions 2220 actively flows toward the direction of the arrow X in FIG. 48 in accordance with relative rotation between the housing 5000 and the outer peripheral ring 2000. Thus, the fluid introduced in the concave portions 2220 acts in such a manner as to be caused to return to the high pressure side (H) in accordance with relative rotation between the housing 5000 and the outer peripheral ring 2000. Accordingly, the leakage of the fluid can be suppressed.

Further, in this practical example, because of the provision of the plurality of convex portions 2214, the reduction in rigidity of the outer peripheral ring 2000 can be suppressed in comparison with the case where the convex portions 2214 are not formed. In addition, these plurality of convex portions 2214 are in a state of contact with the inner peripheral surface of the shaft hole in the housing 5000, so that the outer peripheral ring 2000 can be suppressed from being inclined in the annular groove 4100, thereby making it possible to stabilize the mounting state of the outer peripheral ring 2000. Here, because the convex portions 2214 are formed in such a manner that they each extend from the end of the high pressure side (H) to the end of the low pressure side (L) in the outer peripheral ring 2000, it is possible to suppress the tilt or inclination of the outer peripheral ring 2000 in an effective manner. Here, note that in cases where a construction is adopted in which the plurality of convex portions 2214 are not formed, there will be a fear that in FIG. 47 and FIG. 49, the outer peripheral ring 2000 may incline in a counter clockwise direction in these figures.

In addition, in this practical example, too, the concave portions 2220 are formed over a large area of the outer peripheral surface of the outer peripheral ring 2000. Accordingly, in this practical example, too, it is possible to reduce sliding torque to a sufficient extent, similar to the case of the above-mentioned embodiment.

Here, note that in the practical example, in cases where a sealing function does not need to be exhibited in a state where fluid pressure is low or in a state where there is no fluid pressure, the outer peripheral ring 2000 can be independently used without the inner peripheral ring 3100. In this case, a low torque effect can be enhanced.

Fourth Reference Example

Summary

A sealing device according to a fourth reference example of the present disclosure, which is fitted into an annular groove formed in an outer periphery of a shaft so as to seal an annular gap between said shaft and a housing which rotate relative to each other, thereby to hold a fluid pressure in a region to be sealed which is constructed such that the fluid pressure therein changes, comprising: an outer peripheral ring made of resin that is in intimate contact with a side wall surface of said annular groove at a low pressure side thereof, and slides with respect to an inner peripheral surface of a shaft hole in said housing through which said shaft is inserted; and an inner peripheral ring made of a rubber-like elastic body that is in intimate contact with an inner peripheral surface of said outer peripheral ring and a groove bottom surface of said annular groove, respectively, thereby to push said outer peripheral ring toward an outer peripheral surface side thereof; wherein said outer peripheral ring is formed on its outer peripheral surface with a concave portion which extends from an end of a high pressure side to a position which does not arrive at an end of a low pressure side, so as to introduce fluid thereinto from the high pressure side; and wherein said outer peripheral ring is formed on its inner peripheral surface side and at the low pressure side with an inner peripheral convex portion which is constructed so as to extend toward the inner peripheral surface side, and which, at the time of holding the fluid pressure, is pushed by said inner peripheral ring into intimate contact with the side wall surface at the low pressure side in said annular groove.

According to the sealing device according to this reference example, the following advantages are achieved in comparison with the sealing device explained in the above-mentioned embodiment. That is, in this reference example, the inner peripheral convex portion formed on the outer peripheral ring is pushed by the inner peripheral ring into intimate contact with the side wall surface at the low pressure side in the annular groove. Accordingly, the outer peripheral ring is held in a state of intimate contact with the side wall surface at the low pressure side in the annular groove in a stable manner, so that the posture of the outer peripheral ring can be stabilized.

Specific Example

Hereinafter, a sealing device and a sealing structure according to the fourth reference example of the present disclosure will be explained more specifically while referring to FIG. 50 through FIG. 54. Here, note that the basic construction of this example is the same as that of the above-mentioned embodiment, individual reference examples and individual practical examples, and hence, the same component parts are denoted by the same reference numerals and characters, and the explanation thereof is omitted as the case may be.

A sealing device 1000 according to this reference example is composed of an outer peripheral ring 2000 made of resin, and an inner peripheral ring 3100 made of a rubber-like elastic body. The inner peripheral ring 3100 according to this reference example is a so-called O ring having a circular cross sectional shape. However, the inner peripheral ring 3100 is not limited to the O ring, but as such there can be adopted other seal ring such as a rectangular or polygonal ring, etc.

It is constructed such that in a state where the outer peripheral ring 2000 and the inner peripheral ring 3100 are combined or assembled together, a peripheral length of an outer peripheral surface of the outer peripheral ring 2000 becomes longer than a peripheral length of an inner peripheral surface of a shaft hole in a housing 5000, as explained in the above-mentioned embodiment. Here, note that for the outer peripheral ring 2000 as a single or separate member, the peripheral length of the outer peripheral surface thereof is made shorter than the peripheral length of the inner peripheral surface of the shaft hole in the housing 5000, as explained in the above-mentioned embodiment.

<Outer Peripheral Ring>

Figure 50:
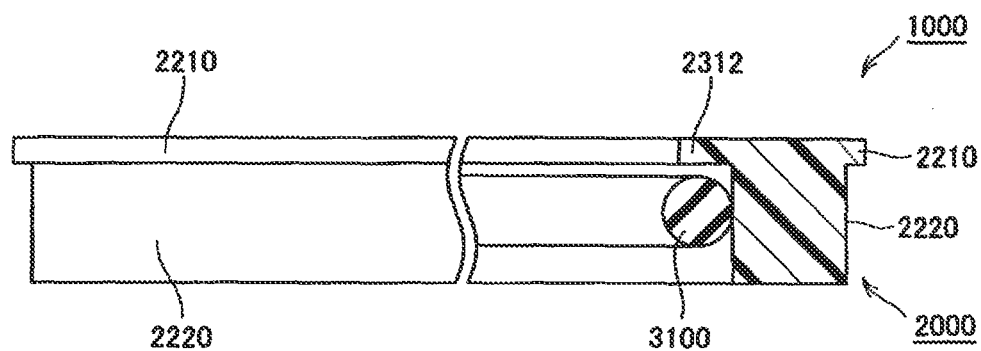
FIG. 50 is a partially broken cross sectional view of a sealing device according to a fourth reference example of the present disclosure.
Figure 51:
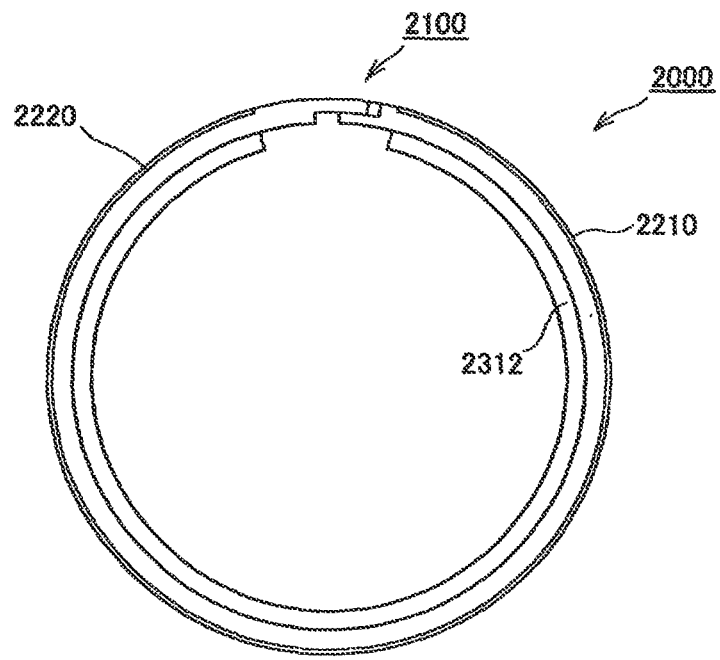
FIG. 51 is a side view of an outer peripheral ring according to the fourth reference example of the present disclosure.
Figure 52:
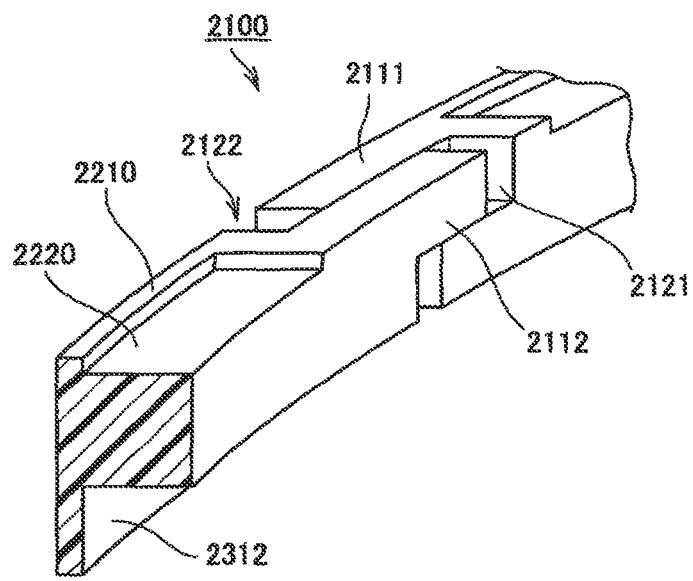
FIG. 52 is a partially broken perspective view of the outer peripheral ring according to the fourth reference example of the present disclosure.

The outer peripheral ring 2000 according to this fourth reference example of the present disclosure will be explained in further detail while referring in particular to FIG. 50 through FIG. 52. An abutment joint portion 2100 is formed on the outer peripheral ring 2000 at one place in a circumferential direction thereof. In addition, the outer peripheral ring 2000 is formed on its outer peripheral surface with a concave portion 2220 for introducing fluid. Further, the outer peripheral ring 2000 is formed on its inner peripheral surface and at the low pressure side with the inner peripheral convex portion 2312 which is constructed so as to extend toward the inner peripheral surface side.

Here, note that the outer peripheral ring 2000 according to this reference example is constructed such that the abutment joint portion 2100, the concave portion 2220 and the inner peripheral convex portion 2312 as mentioned above are formed on an annular member of which the cross section is rectangular. However, this is only an explanation of the shape thereof, but does not necessarily mean that an annular member of a rectangular cross section is used as a material, and processing to form the abutment joint portion 2100, the concave portion 2220 and the inner peripheral convex portion 2312 is applied to this material. Of course, after an annular member of a rectangular cross section has been molded or formed, the abutment joint portion 2100, the concave portion 2220 and the inner peripheral convex portion 2312 can also be obtained by means of cutting work. However, for example, after molding or forming a member which has the abutment joint portion 2100 in advance, the concave portion 2220 and the inner peripheral convex portion 2312 may be obtained by means of cutting work. In this manner, the method of production thereof is not limited in particular.

A special step cut is employed for the abutment joint portion 2100, similar to the above-mentioned embodiment. However, for the abutment joint portion 2100, there can be adopted a straight cut, a bias cut, another step cut, and so on, including but not limited to this. In addition, in cases where a material (e.g., PTFE, etc.) of low elasticity is adopted as a material of the outer peripheral ring 2000, the outer peripheral ring 2000 may also be endless, without forming the abutment joint portion 2100.

In this reference example, too, the concave portion 2220 is formed over the entire periphery of the outer peripheral ring 2000 except for the vicinity of the abutment joint portion 2100. The concave portion 2220 is the same as explained in the above-mentioned embodiment, and so, the detailed explanation thereof is omitted.

In addition, in this reference example, the inner peripheral convex portion 2312 is formed over the entire periphery of the outer peripheral ring 2000 except for the vicinity of the abutment joint portion 2100.

<Mechanism at the Time of Using the Sealing Device>

Figure 53:
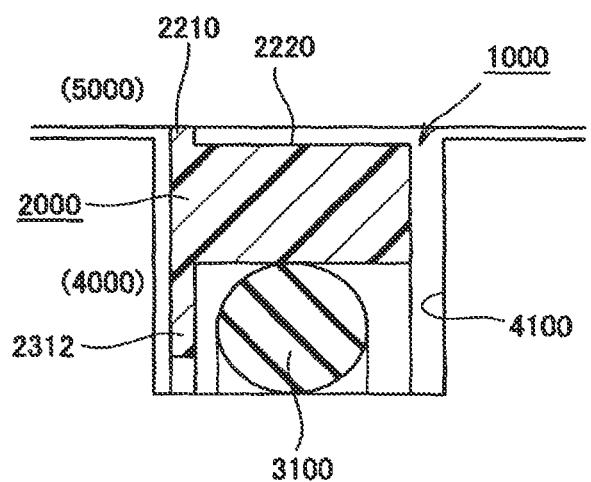
FIG. 53 is a schematic cross sectional view showing an unloaded state in the sealing device according to the fourth reference example of the present disclosure.
Figure 54:
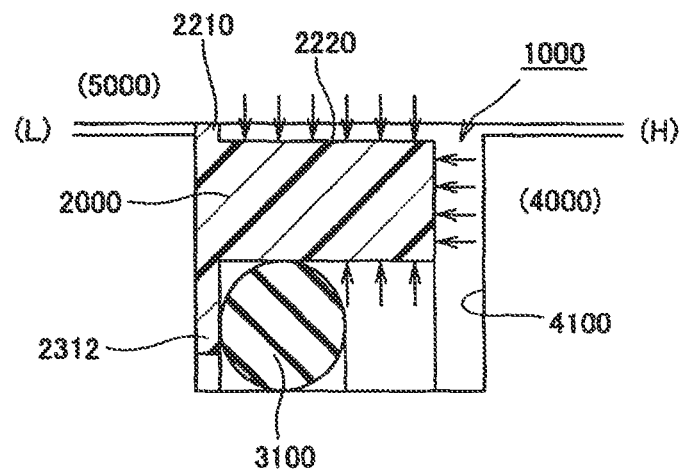
FIG. 54 is a schematic cross sectional view showing a high pressure state in the sealing device according to the fourth reference example of the present disclosure.

A mechanism at the time of using the sealing device 1000 according to this reference example will be explained, while referring in particular to FIG. 53 and FIG. 54. FIG. 53 shows an unloaded state in which an engine is stopped, and there does not exist a differential pressure (or there exists substantially no differential pressure) between right-hand side region of the sealing device 1000 and left-hand side region of the sealing device 1000. FIG. 54 shows a state in which the engine is operated, and fluid pressure in the right-hand side of the sealing device 1000 region has become higher in comparison with that in the left-hand side region of the sealing device 1000.

In a state where the sealing device 1000 is fitted in an annular groove 4100, the inner peripheral ring 3100 made of a rubber-like elastic body is in intimate contact with the inner peripheral surface of the outer peripheral ring 2000 and a groove bottom surface of the annular groove 4100, respectively. Then, the inner peripheral ring 3100 exhibits a function of pushing the outer peripheral ring 2000 toward its outer peripheral surface side due to the elastic repulsion thereof.

Accordingly, even if the engine is in an unloaded state, those portions of the outer peripheral surface of the outer peripheral ring 2000 which exclude the concave portion 2220 (i.e., the low pressure side convex portion 2210 and a portion of the outer peripheral ring 2000 in the vicinity of the abutment joint portion 2100 in which the concave portion 2220 is not formed) maintain a state in which they are in contact with the inner peripheral surface of the shaft hole in the housing 5000.

Then, in a state in which the engine is started to generate a differential pressure, the outer peripheral ring 2000 is pushed to the low pressure side (L) by means of the fluid pressure from the high pressure side (H), so that it becomes a state of being in intimate contact with the side wall surface of the annular groove 4100 at the low pressure side (L), as shown in FIG. 54. Here, note that it is needless to say that the outer peripheral ring 2000 maintains the state of being in contact (sliding) with the inner peripheral surface of the shaft hole in the housing 5000.

In addition, the inner peripheral convex portion 2312 in the outer peripheral ring 2000 is pushed by the inner peripheral ring 3100, so that it is maintained in a state of being in intimate contact with the side wall surface of the annular groove 4100 at the low pressure side (L).

<Advantages of the Sealing Device and the Sealing Structure According to this Reference Example>

According to the sealing device 1000 and the sealing structure provided with this sealing device according to this reference example, the following advantages are achieved in comparison with the sealing device explained in the above-mentioned embodiment. That is, the inner peripheral convex portion 2312 in the outer peripheral ring 2000 is pushed by the inner peripheral ring 3100, so that it is maintained in the state of intimate contact with the side wall surface of the annular groove 4100 at the low pressure side (L). Accordingly, it is possible to suppress the outer peripheral ring 2000 from being inclined in the annular groove 4100, thereby making it possible to stabilize the posture of the outer peripheral ring 2000.

Fifth Reference Example

Summary

A sealing device according to a fifth reference example of the present disclosure, which is fitted into an annular groove formed in an outer periphery of a shaft so as to seal an annular gap between said shaft and a housing which rotate relative to each other, thereby to hold a fluid pressure in a region to be sealed which is constructed such that the fluid pressure therein changes, comprising: an outer peripheral ring made of resin that is in intimate contact with a side wall surface of said annular groove at a low pressure side thereof, and slides with respect to an inner peripheral surface of a shaft hole in said housing through which said shaft is inserted; an inner peripheral ring made of a rubber-like elastic body that is in intimate contact with an inner peripheral surface of said outer peripheral ring and a groove bottom surface of said annular groove, respectively, thereby to push said outer peripheral ring toward an outer peripheral surface side thereof; and a position limiting ring that is fitted in said annular groove at a high pressure side and at an inner peripheral surface side inner than said outer peripheral ring, and limits movement of said inner peripheral ring toward the high pressure side; wherein said outer peripheral ring is formed on its outer peripheral surface with a concave portion which extends from an end of a high pressure side to a position which does not arrive at an end of a low pressure side, so as to introduce fluid thereinto from the high pressure side.

According to the sealing device according to this reference example, the following advantages are achieved in comparison with the sealing device explained in the above-mentioned embodiment. That is, in this reference example, the movement of the inner peripheral ring toward the high pressure side is limited by means of the position limiting ring. As a result of this, it is possible to suppress the pushing position of the inner peripheral ring with respect to the outer peripheral ring from being biased toward the high pressure side, i.e., toward a side in the outer peripheral surface at which the concave portion is formed. Accordingly, it is possible to stabilize the posture of the outer peripheral ring.

Specific Example

Hereinafter, a sealing device and a sealing structure according to the fifth reference example of the present disclosure will be explained more specifically while referring to FIG. 55 through FIG. 59. Here, note that the basic construction of this example is the same as that of the above-mentioned embodiment, individual reference examples and individual practical examples, and hence, the same component parts are denoted by the same reference numerals and characters, and the explanation thereof is omitted as the case may be.

A sealing device 1000 according to this reference example is composed of an outer peripheral ring 2000 made of resin, an inner peripheral ring 3100 made of a rubber-like elastic body, and a position limiting ring 3500. The inner peripheral ring 3100 according to this reference example is a so-called O ring having a circular cross sectional shape. However, the inner peripheral ring 3100 is not limited to the O ring, but as such there can be adopted other seal ring such as a rectangular or polygonal ring, etc.

It is constructed such that in a state where the outer peripheral ring 2000 and the inner peripheral ring 3100 are combined or assembled together, a peripheral length of an outer peripheral surface of the outer peripheral ring 2000 becomes longer than a peripheral length of an inner peripheral surface of a shaft hole in a housing 5000, as explained in the above-mentioned embodiment. Here, note that for the outer peripheral ring 2000 as a single or separate member, the peripheral length of the outer peripheral surface thereof is made shorter than the peripheral length of the inner peripheral surface of the shaft hole in the housing 5000, as explained in the above-mentioned embodiment.

The construction of the outer peripheral ring 2000 is the same as explained in the above-mentioned embodiment, and so, the detailed explanation thereof is omitted.

Then, in the sealing device 1000 according to this reference example, provision is made for the position limiting ring 3500 which is fitted in an annular groove 4100 at a high pressure side (H) and at an inner peripheral surface side inner than the outer peripheral ring 2000, and limits movement of the inner peripheral ring 3100 toward the high pressure side (H). For the material of this position limiting ring 3500, it is not limited in particular, but a rubber material, a resin material, etc., can be adopted as the case may be. In addition, in order to improve the mountability (easiness in fitting) of the position limiting ring 3500 with respect to the annular groove 4100, the position limiting ring 3500 may also be formed with an abutment joint portion, as in the case of the outer peripheral ring 2000. Here, note that to this abutment joint portion, there can be applied a variety of kinds of well-known techniques such as a straight cut, a bias cut, a special step cut, and so on.

<Mechanism at the Time of Using the Sealing Device>

Figure 55:
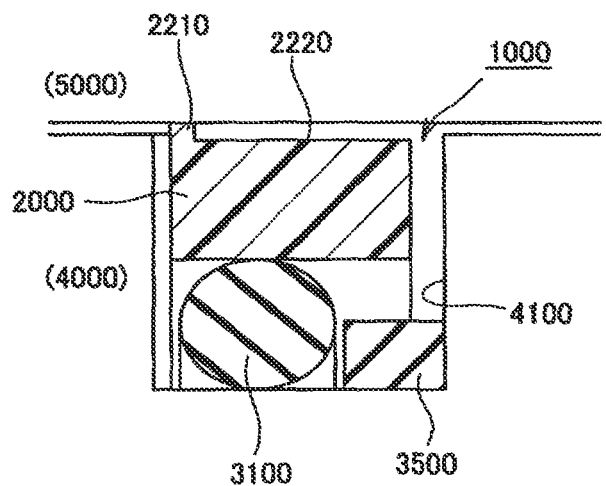
FIG. 55 is a schematic cross sectional view showing an unloaded state in a sealing device according to a fifth reference example of the present disclosure.
Figure 56:
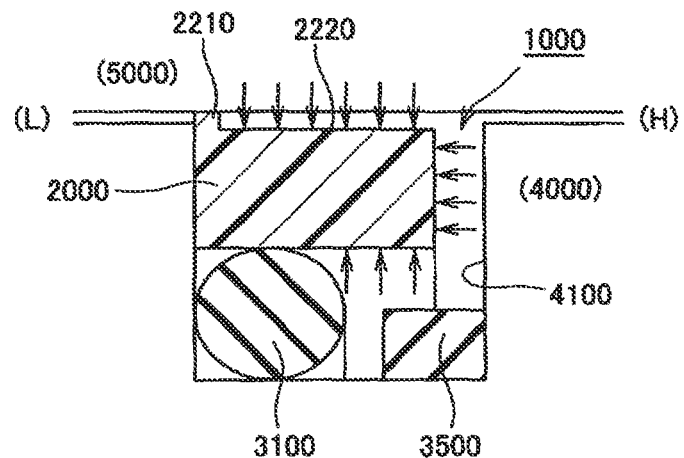
FIG. 56 is a schematic cross sectional view showing a high pressure state in the sealing device according to the fifth reference example of the present disclosure.

A mechanism at the time of using the sealing device 1000 according to this reference example will be explained, while referring in particular to FIG. 55 and FIG. 56. FIG. 55 shows an unloaded state in which an engine is stopped, and there does not exist a differential pressure (or there exists substantially no differential pressure) between right-hand side region of the sealing device 1000 and left-hand side region of the sealing device 1000. FIG. 56 shows a state in which the engine is operated, and fluid pressure in the right-hand side region of the sealing device 1000 has become higher in comparison with that in the left-hand side region of the sealing device 1000.

In a state where the sealing device 1000 is fitted in the annular groove 4100, the inner peripheral ring 3100 made of a rubber-like elastic body is in intimate contact with the inner peripheral surface of the outer peripheral ring 2000 and a groove bottom surface of the annular groove 4100, respectively. Then, the inner peripheral ring 3100 exhibits a function of pushing the outer peripheral ring 2000 toward its outer peripheral surface side due to the elastic repulsion thereof.

Accordingly, even if the engine is in an unloaded state, those portions of the outer peripheral surface of the outer peripheral ring 2000 which exclude the concave portion 2220 (i.e., the low pressure side convex portion 2210 and a portion of the outer peripheral ring 2000 in the vicinity of the abutment joint portion 2100 in which the concave portion 2220 is not formed) maintain a state in which they are in contact with the inner peripheral surface of the shaft hole in the housing 5000.

In addition, in this reference example, the position limiting ring 3500 is fitted in the annular groove 4100, so the range of movement of the inner peripheral ring 3100 is limited. In other words, the movement of the inner peripheral ring 3100 to the right side in FIG. 55 (the high pressure side (H) at the time of occurrence of differential pressure) is limited or restricted.

Then, in a state in which the engine is started to generate a differential pressure, the outer peripheral ring 2000 is pushed to the low pressure side (L) by means of the fluid pressure from the high pressure side (H), so that it becomes a state of being in intimate contact with the side wall surface of the annular groove 4100 at the low pressure side (L), as shown in FIG. 56. Here, note that it is needless to say that the outer peripheral ring 2000 maintains the state of being in contact (sliding) with the inner peripheral surface of the shaft hole in the housing 5000. In addition, with respect to the inner peripheral ring 3000, too, it also becomes a state of being in intimate contact with the side wall surface of the annular groove 4100 at the low pressure side (L).

<Advantages of the Sealing Device and the Sealing Structure According to this Reference Example>

According to the sealing device 1000 and the sealing structure provided with this sealing device according to this reference example, the following advantages are achieved in comparison with the sealing device explained in the above-mentioned embodiment. That is, the movement of the inner peripheral ring 3100 toward the high pressure side (H) is limited by means of the position limiting ring 3500. As a result of this, it is possible to suppress the pushing position of the inner peripheral ring 3100 with respect to the outer peripheral ring 2000 from being biased toward the high pressure side (H), i.e., toward a side in the outer peripheral surface at which the concave portion 2220 is formed. Accordingly, it is possible to stabilize the posture of the outer peripheral ring 2000. Here, note that in the case of this reference example, as shown in FIG. 55, even in a state where differential pressure is not generated, it is possible to suppress the pushing position of the inner peripheral ring 3100 with respect to the outer peripheral ring 2000 from being biased toward the right side in this figure. Accordingly, in the state where differential pressure is not generated, too, it is possible to stabilize the posture of the outer peripheral ring 2000.

Here, at the time when differential pressure has been generated, in order to make the inner peripheral ring 3100 into intimate contact with the side wall surface at the low pressure side (L) in the annular groove 4100 in a more reliable manner, it is desirable to cause the fluid pressure to act on the high pressure side (H) of the inner peripheral ring 3100 to a sufficient extent.

In order to achieve this, it is only necessary to make the range of movement in the axial direction of the inner peripheral ring 3100 wider than the axial width of the inner peripheral ring 3100 in its mounted or fitted state, as shown in FIG. 55 and FIG. 56. As a result of this, there will be a gap between the inner peripheral ring 3100 and the position limiting ring 3500, so it will become possible to cause the fluid pressure to act on the high pressure side (H) of the inner peripheral ring 3100 to a sufficient extent.

However, from the point of view of stabilizing the pushing position of the inner peripheral ring 3100 with respect to the outer peripheral ring 2000, it is preferable to make the range of movement in the axial direction of the inner peripheral ring 3100 narrow. If possible, it is preferable for the inner peripheral ring 3100 not to move in the axial direction.

Figure 57:
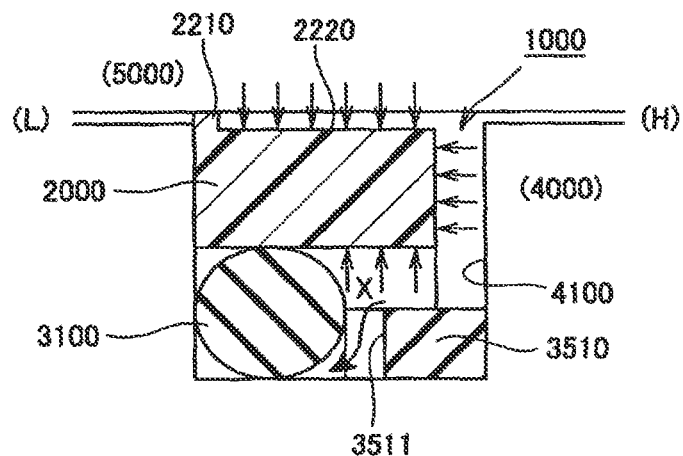
FIG. 57 is a schematic cross sectional view showing a high pressure state in the sealing device according to the fifth reference example of the present disclosure.

Accordingly, it can also be constructed such that the width (the distance or length in the axial direction) of the position limiting ring 3510 is made wide, as shown in FIG. 57, so that the position limiting ring 3510 is always in abutment with a surface of the inner peripheral ring 3100 at the high pressure side (H), thereby making it impossible or difficult for the inner peripheral ring 3100 to move in the axial direction.

Figure 58:
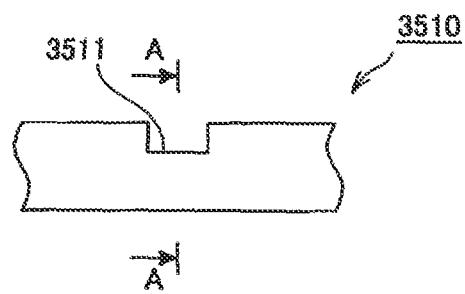
FIG. 58 is a part of a view of a position limiting ring seen from an outer peripheral surface side thereof according to the fifth reference example of the present disclosure.
Figure 59:
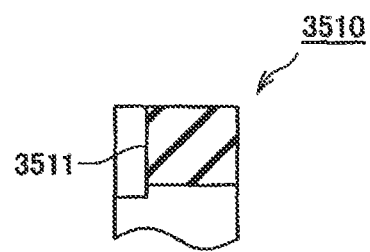
FIG. 59 is a cross sectional view of the position limiting ring according to the fifth reference example of the present disclosure.

In cases where such a construction is adopted, it is preferable to form a plurality of notches 3511 in the circumferential direction on a side surface of the position limiting ring 3510 at the low pressure side (L). According to this, a flow passage is ensured, as shown by an arrow X in FIG. 57, so it becomes possible to cause the fluid pressure to act on the high pressure side (H) of the inner peripheral ring 3100 to a sufficient extent. Here, note that FIG. 57 shows a state in which the engine is operated, and the fluid pressure in the right-hand side region of the sealing device 1000 has become higher in comparison with that in the left-hand side region of the sealing device 1000. In addition, FIG. 58 is a part of a view when looking at the position limiting ring 3510 from an outer peripheral surface side thereof, and FIG. 59 is a cross sectional view along a line A-A in FIG. 58.

Sixth Reference Example

Summary

A sealing device according to a sixth reference example of the present disclosure, which is fitted into an annular groove formed in an outer periphery of a shaft so as to seal an annular gap between said shaft and a housing which rotate relative to each other, thereby to hold a fluid pressure in a region to be sealed which is constructed such that the fluid pressure therein changes, comprising: an outer peripheral ring made of resin that is in intimate contact with a side wall surface of said annular groove at a low pressure side thereof, and slides with respect to an inner peripheral surface of a shaft hole in said housing through which said shaft is inserted; and an inner peripheral ring made of a rubber-like elastic body that is in intimate contact with an inner peripheral surface of said outer peripheral ring and a groove bottom surface of said annular groove, respectively, thereby to push said outer peripheral ring toward an outer peripheral surface side thereof; wherein said outer peripheral ring is formed on its outer peripheral surface with a concave portion which extends from an end of a high pressure side to a position which does not arrive at an end of a low pressure side, so as to introduce fluid thereinto from the high pressure side; and wherein said outer peripheral ring is formed on its inner peripheral surface side and at the low pressure side with an inner peripheral convex portion which is constructed so as to extend toward the inner peripheral surface side, and which, at the time of holding the fluid pressure, is pushed by said inner peripheral ring into intimate contact with the side wall surface at the low pressure side in said annular groove.

According to the sealing device according to this reference example, the following advantages are achieved in comparison with the sealing device explained in the above-mentioned embodiment. That is, in this reference example, the inner peripheral convex portion formed on the outer peripheral ring is pushed by the inner peripheral ring into intimate contact with the side wall surface at the low pressure side in the annular groove. Accordingly, the outer peripheral ring is held in a state of intimate contact with the side wall surface at the low pressure side in the annular groove in a stable manner, so that the posture of the outer peripheral ring can be stabilized.

In addition, it is preferable that a position limiting ring to limit movement of said inner peripheral ring toward the high pressure side be fitted in said annular groove at the high pressure side and at an inner peripheral surface side inner than said outer peripheral ring.

According to this, the position of the inner peripheral ring is limited or restricted, thereby making it possible to stabilize the posture of the outer peripheral ring to a further extent.

In addition, a sealing device according to the sixth reference example of the present disclosure, which is fitted into an annular groove formed in an outer periphery of a shaft so as to seal an annular gap between said shaft and a housing which rotate relative to each other, thereby to hold a fluid pressure in a region to be sealed which is constructed such that the fluid pressure therein changes, comprising: an outer peripheral ring made of resin that is in intimate contact with a side wall surface of said annular groove at a low pressure side thereof, and slides with respect to an inner peripheral surface of a shaft hole in said housing through which said shaft is inserted; an inner peripheral ring made of a rubber-like elastic body that is in intimate contact with an inner peripheral surface of said outer peripheral ring and a groove bottom surface of said annular groove, respectively, thereby to push said outer peripheral ring toward an outer peripheral surface side thereof; and a position limiting ring that is fitted in said annular groove at the high pressure side and at an the inner peripheral surface side inner than said outer peripheral ring, and limits movement of said inner peripheral ring toward the high pressure side; wherein said outer peripheral ring is formed on its outer peripheral surface with a concave portion which extends from an end of a high pressure side to a position which does not arrive at an end of a low pressure side, so as to introduce fluid thereinto from the high pressure side.

According to the sealing device according to this reference example, the following advantages are achieved in comparison with the sealing device explained in the above-mentioned embodiment. That is, in this reference example, the movement of the inner peripheral ring toward the high pressure side is limited by means of the position limiting ring. As a result of this, it is possible to suppress the pushing position of the inner peripheral ring with respect to the outer peripheral ring from being biased toward the high pressure side, i.e., toward a side in the outer peripheral surface at which the concave portion is formed. Accordingly, it is possible to stabilize the posture of the outer peripheral ring.

Specific Example

Hereinafter, a sealing device and a sealing structure according to the sixth reference example of the present disclosure will be explained while referring to FIG. 60 and FIG. 61. In this reference example, there is shown a construction in which the position limiting ring shown in the above-mentioned fifth reference example is provided with respect to the sealing device and the sealing structure which are shown in the above-mentioned fourth reference example. Here, note that the same component parts as those of the fourth reference example and the fifth reference example are denoted by the same reference numerals and characters, and the explanation thereof is omitted.

Figure 60:
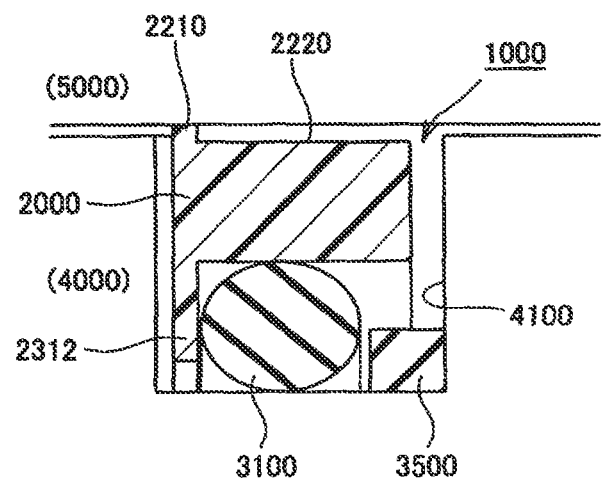
FIG. 60 is a schematic cross sectional view showing an unloaded state in a sealing device according to a sixth reference example of the present disclosure.
Figure 61:
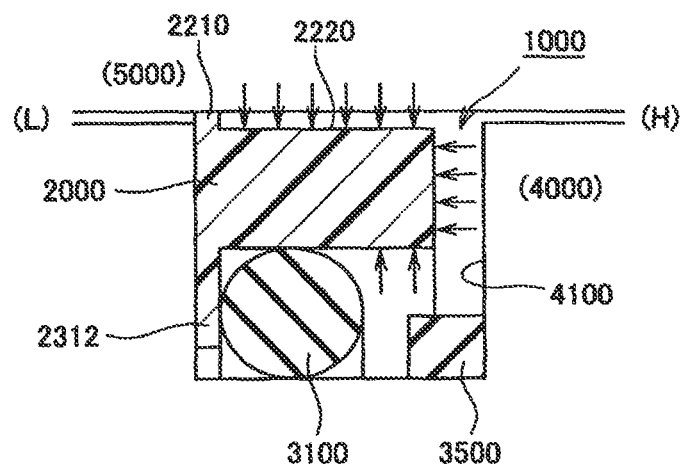
FIG. 61 is a schematic cross sectional view showing a high pressure state in the sealing device according to the sixth reference example of the present disclosure.

FIG. 60 is a schematic cross sectional view showing an unloaded state in the sealing device according to the sixth reference example of the present disclosure, and FIG. 61 is a schematic cross sectional view showing a high pressure state in the sealing device according to the sixth reference example of the present disclosure.

A sealing device 1000 according to this reference example is provided with an outer peripheral ring 2000 made of resin, an inner peripheral ring 3100 made of a rubber-like elastic body, and a position limiting ring 3500. With respect to the outer peripheral ring 2000 and the inner peripheral ring 3100, their construction is the same as that explained in the above-mentioned fourth reference example, and so, the detailed explanation thereof is omitted. In addition, with respect to the position limiting ring 3500, its construction is the same as that explained in the above-mentioned fifth reference example, so the explanation thereof is omitted.

Thus, the sealing device 1000 according to this reference example has a construction in which the position limiting ring 3500 explained in the above-mentioned fifth reference example is added to the sealing device and the sealing structure shown in the above-mentioned fourth reference example.

With the construction as mentioned above, in this reference example, the same operational effects as in the case of the above-mentioned fourth reference example can be obtained, and in addition to this, the same operational effects as in the case of the above-mentioned fifth reference example can also be obtained.

Here, note that in this reference example, too, the position limiting ring 3510 shown in the above-mentioned fifth reference example can be adopted. In this case, the inner peripheral ring 3100 is in a state of being sandwiched between the position limiting ring 3510 and the inner peripheral convex portion 2312, so that it is not moved in the axial direction.

Seventh Reference Example

Summary

A sealing device according to a seventh reference example of the present disclosure, which is fitted into an annular groove formed in an outer periphery of a shaft so as to seal an annular gap between said shaft and a housing which rotate relative to each other, thereby to hold a fluid pressure in a region to be sealed which is constructed such that the fluid pressure therein changes, comprising: an outer peripheral ring made of resin that is in intimate contact with a side wall surface of said annular groove at a low pressure side thereof, and slides with respect to an inner peripheral surface of a shaft hole in said housing through which said shaft is inserted; and an inner peripheral ring made of a rubber-like elastic body that is in intimate contact with an inner peripheral surface of said outer peripheral ring and a groove bottom surface of said annular groove, respectively, thereby to push said outer peripheral ring toward an outer peripheral surface side thereof; wherein said outer peripheral ring is formed on its outer peripheral surface with a concave portion which extends from an end of a high pressure side to a position which does not arrive at an end of a low pressure side, so as to introduce fluid thereinto from the high pressure side; and wherein said outer peripheral ring is formed on its inner peripheral surface side and at the low pressure side with an inner peripheral convex portion which is constructed so as to extend toward the inner peripheral surface side, and which, at the time of holding the fluid pressure, is pushed by said inner peripheral ring into intimate contact with the side wall surface at the low pressure side in said annular groove.

According to the sealing device according to this reference example, the following advantages are achieved in comparison with the sealing device explained in the above-mentioned embodiment. That is, in this reference example, the inner peripheral convex portion formed on the outer peripheral ring is pushed by the inner peripheral ring into intimate contact with the side wall surface at the low pressure side in the annular groove. Accordingly, the outer peripheral ring is held in a state of intimate contact with the side wall surface at the low pressure side in the annular groove in a stable manner, so that the posture of the outer peripheral ring can be stabilized.

In addition, it is preferable that a position limiting ring to limit movement of said inner peripheral ring toward the high pressure side be fitted in said annular groove at the high pressure side and at an inner peripheral surface side inner than said outer peripheral ring.

According to this, the position of the inner peripheral ring is limited or restricted, thereby making it possible to stabilize the posture of the outer peripheral ring to a further extent.

In addition, a sealing device according to the seventh reference example of the present disclosure, which is fitted into an annular groove formed in an outer periphery of a shaft so as to seal an annular gap between said shaft and a housing which rotate relative to each other, thereby to hold a fluid pressure in a region to be sealed which is constructed such that the fluid pressure therein changes, comprising: an outer peripheral ring made of resin that is in intimate contact with a side wall surface of said annular groove at a low pressure side thereof, and slides with respect to an inner peripheral surface of a shaft hole in said housing through which said shaft is inserted; an inner peripheral ring made of a rubber-like elastic body that is in intimate contact with an inner peripheral surface of said outer peripheral ring and a groove bottom surface of said annular groove, respectively, thereby to push said outer peripheral ring toward an outer peripheral surface side thereof; and a position limiting ring that is fitted in said annular groove at the high pressure side and at an the inner peripheral surface side inner than said outer peripheral ring, and limits movement of said inner peripheral ring toward the high pressure side; wherein said outer peripheral ring is formed on its outer peripheral surface with a concave portion which extends from an end of a high pressure side to a position which does not arrive at an end of a low pressure side, so as to introduce fluid thereinto from the high pressure side.

According to the sealing device according to this reference example, the following advantages are achieved in comparison with the sealing device explained in the above-mentioned embodiment. That is, in this reference example, the movement of the inner peripheral ring toward the high pressure side is limited by means of the position limiting ring. As a result of this, it is possible to suppress the pushing position of the inner peripheral ring with respect to the outer peripheral ring from being biased toward the high pressure side, i.e., toward a side in the outer peripheral surface at which the concave portion is formed. Accordingly, it is possible to stabilize the posture of the outer peripheral ring.

Specific Example

Hereinafter, a sealing device and a sealing structure according to the seventh reference example of the present disclosure will be explained while referring to FIG. 62 and FIG. 63. In this reference example, there is shown a construction in which in the sealing device and the sealing structure shown in the above-mentioned sixth reference example, a surface of the inner peripheral convex portion at the high pressure side is formed into or replaced by an inclined surface. Here, note that the same component parts as those in the above-mentioned fourth reference example, the above-mentioned fifth reference example and the above-mentioned sixth reference example are denoted by the same reference numerals and characters, and the explanation thereof is omitted.

Figure 62:
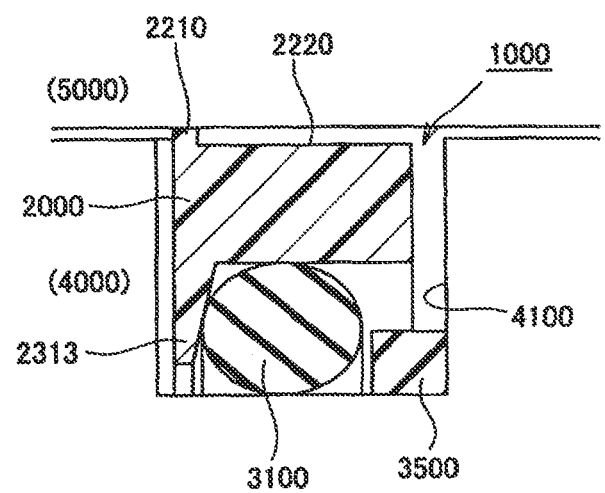
FIG. 62 is a schematic cross sectional view showing an unloaded state in a sealing device according to a seventh reference example of the present disclosure.
Figure 63:
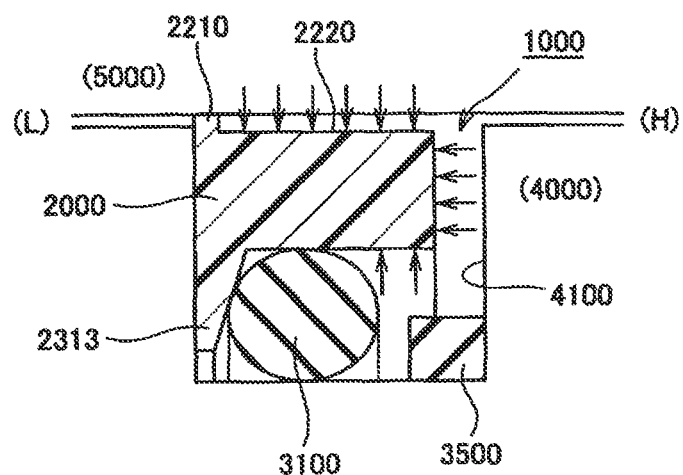
FIG. 63 is a schematic cross sectional view showing a high pressure state in the sealing device according to the seventh reference example of the present disclosure.

FIG. 62 is a schematic cross sectional view showing an unloaded state in the sealing device according to the seventh reference example of the present disclosure, and FIG. 63 is a schematic cross sectional view showing a high pressure state in the sealing device according to the seventh reference example of the present disclosure.

A sealing device 1000 according to this reference example is provided with an outer peripheral ring 2000 made of resin, an inner peripheral ring 3100 made of a rubber-like elastic body, and a position limiting ring 3500. With respect to the inner peripheral ring 3100, its construction is the same as that explained in the above-mentioned fourth reference example, and so, the detailed explanation thereof is omitted. In addition, with respect to the position limiting ring 3500, its construction is the same as that explained in the above-mentioned fifth reference example, so the explanation thereof is omitted.

Then, the outer peripheral ring 2000 according to this reference example is different from the outer peripheral ring shown in the above-mentioned fourth reference example in that a surface in the inner peripheral convex portion 2313 at a high pressure side (H) is composed of an inclined surface which approaches to a low pressure side (L) as it goes to a groove bottom of an annular groove 4100. The other construction is the same as the construction of the outer peripheral ring shown in the above-mentioned fourth reference example, so the explanation thereof is omitted.

Thus, the sealing device 1000 according to this reference example has a construction in which the position limiting ring 3500 explained in the above-mentioned fifth reference example is added to the sealing device and the sealing structure shown in the above-mentioned fourth reference example, after changing the construction of the inner peripheral convex portion in the outer peripheral ring. In other words, the sealing device 1000 according to this reference example has a construction in which in the sealing device and the sealing structure shown in the above-mentioned sixth reference example, the surface of the inner peripheral convex portion at the high pressure side is formed into or replaced by an inclined surface.

With the construction as mentioned above, in this reference example, too, similar to the case of the above-mentioned sixth reference example, the same operational effects as in the case of the above-mentioned fourth reference example can be obtained, and in addition to this, the same operational effects as in the case of the above-mentioned fifth reference example can also be obtained. In addition, in this reference example, the surface in the inner peripheral convex portion 2313 at the high pressure side (H) is composed of the inclined surface which approaches to the low pressure side (L) as it goes to the groove bottom of the annular groove 4100. Accordingly, when the outer peripheral ring 2000 is fitted into the annular groove 4100 after the inner peripheral ring 3100 and the position limiting ring 3500 are mounted thereon, the inner peripheral convex portion 2313 easily enters between the inner peripheral ring 3100 and the side wall surface of the annular groove 4100 at the low pressure side (L), so mountability (easiness of fitting) can be improved.

Here, note that in this reference example, too, the position limiting ring 3510 shown in the above-mentioned fifth reference example can be adopted. In this case, the inner peripheral ring 3100 is in a state of being sandwiched between the position limiting ring 3510 and the inner peripheral convex portion 2313, so that it is not moved in the axial direction.

Eighth Reference Example

Summary

In addition, a sealing structure according to an eighth reference example of the present disclosure, which is provided with: a shaft and a housing that rotate relative to each other; and a sealing device that is fitted into an annular groove formed in an outer periphery of said shaft so as to seal an annular gap between said shaft and said housing, thereby to hold a fluid pressure in a region to be sealed which is constructed such that the fluid pressure therein changes; said annular groove being composed of a stepped groove of which an outside diameter is smaller at a low pressure side in comparison with at a high pressure side; said sealing device comprises: an outer peripheral ring made of resin that is in intimate contact with a side wall surface of said annular groove at a low pressure side thereof, and slides with respect to an inner peripheral surface of a shaft hole in said housing through which said shaft is inserted; and an inner peripheral ring made of a rubber-like elastic body that is in intimate contact with an inner peripheral surface of said outer peripheral ring and a low pressure side portion of a groove bottom surface of said annular groove of which the outside diameter is small, respectively, thereby to push said outer peripheral ring toward an outer peripheral surface side thereof; and said outer peripheral ring is formed on its outer peripheral surface with a concave portion which extends from an end of a high pressure side to a position which does not arrive at an end of a low pressure side, so as to introduce fluid thereinto from the high pressure side.

According to the sealing structure according to this reference example, the following advantages are achieved in comparison with the sealing structure explained in the above-mentioned embodiment. That is, in this reference example, the inner peripheral ring is constructed such that it is in intimate contact with a low pressure side portion of the groove bottom surface of the annular groove composed of the stepped groove in which the outside diameter is small. With this construction, the movement of the inner peripheral ring toward the high pressure side is restricted or limited by the stepped portion in the annular groove. For that reason, it is possible to suppress the pushing position of the inner peripheral ring with respect to the outer peripheral ring from being biased toward the high pressure side, i.e., toward a side in the outer peripheral surface at which the concave portion is formed. Accordingly, it is possible to stabilize the posture of the outer peripheral ring.

It is preferable that said outer peripheral ring be formed on its inner peripheral surface side and at the low pressure side with an inner peripheral convex portion which is constructed so as to extend toward the inner peripheral surface side, and which, at the time of holding the fluid pressure, is pushed by said inner peripheral ring into intimate contact with the side wall surface at the low pressure side in said annular groove.

According to this, the outer peripheral ring is held in a state of intimate contact with the side wall surface at the low pressure side in the annular groove in a stable manner, so that the posture of the outer peripheral ring can be stabilized.

Specific Example

Hereinafter, a sealing device and a sealing structure according to the eighth reference example of the present disclosure will be explained while referring to FIG. 64 and FIG. 65. In this reference example, there is shown a case in which with respect to the sealing device and the sealing structure shown in the above-mentioned fifth reference example, the annular groove is composed of a stepped groove, instead of the provision of the position limiting ring. The other construction and operation of this example are the same as those in the above-mentioned fifth reference example, and hence, the same component parts as those of the above-mentioned fifth reference example are denoted by the same reference numerals and characters, and the explanation thereof is omitted.

Figure 64:
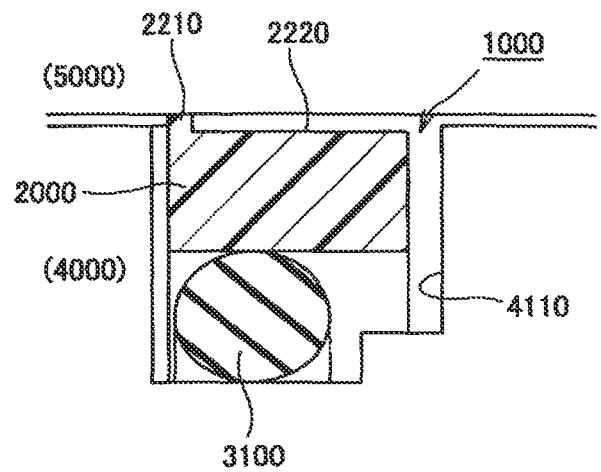
FIG. 64 is a schematic cross sectional view showing an unloaded state in a sealing device according to an eighth reference example of the present disclosure.
Figure 65:
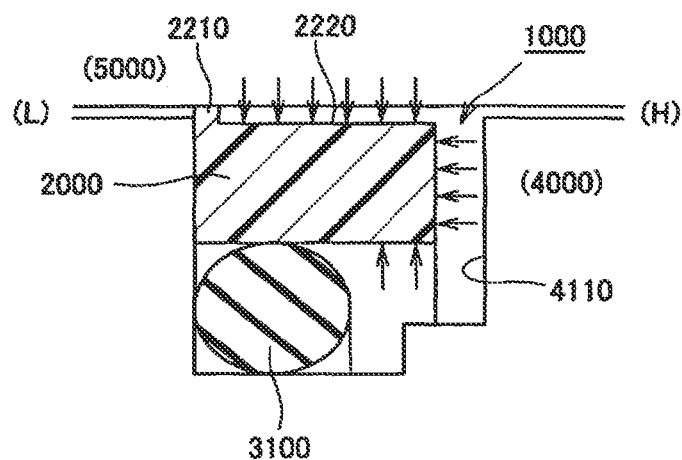
FIG. 65 is a schematic cross sectional view showing a high pressure state in the sealing device according to the eighth reference example of the present disclosure.

FIG. 64 is a schematic cross sectional view showing an unloaded state in the sealing device according to the eighth reference example of the present disclosure, and FIG. 65 is a schematic cross sectional view showing a high pressure state in the sealing device according to the eighth reference example of the present disclosure.

A sealing device 1000 according to this reference example is composed of an outer peripheral ring 2000 and an inner peripheral ring 3100. The construction of these component parts are the same as the outer peripheral ring and the inner peripheral ring in the above-mentioned fifth reference example.

Then, in this reference example, an annular groove 4110 formed in a shaft 4000 is composed of a stepped groove of which the outside diameter is smaller at a low pressure side (L) in comparison with a high pressure side (H). In addition, the inner peripheral ring 3100 is arranged such that it is in intimate contact with an inner peripheral surface in the outer peripheral ring 2000 and that portion of a groove bottom surface of the annular groove 4110 which is at the low pressure side (L) and of which the outside diameter is small, respectively.

With the construction as mentioned above, a large diameter portion at the high pressure side (H) in the annular groove 4110 composed of the stepped groove exhibits the same function as that of the position limiting ring 3500 in the above-mentioned fifth reference example. That is, the movement of the inner peripheral ring 3100, which is arranged in the small diameter portion at the low pressure side (L), toward the high pressure side (H) is restricted or limited by the stepped portion in the annular groove 4110. From the above, in this reference example, too, the same effects as in the case of the above-mentioned fifth reference example can be obtained.

Here, note that in this reference example, too, the width (i.e., the distance or length in the axial direction) of the large diameter portion in the annular groove 4110 may be made wide, as in the case of the position limiting ring 3510 shown in the above-mentioned fifth reference example. According to this, by making the stepped portion in the annular groove 4110 always in abutment with a surface of the inner peripheral ring 3100 at the high pressure side (H), it becomes possible to make it impossible or difficult for the inner peripheral ring 3100 to move in the axial direction. In cases where such a construction is adopted, it is preferable to form a plurality of notches in the circumferential direction on a side surface in the stepped portion at the low pressure side (L) as in the case of the position limiting ring 3510. According to this, a flow passage is ensured, as in case of the position limiting ring 3510, so it becomes possible to cause the fluid pressure to act on the high pressure side (H) of the inner peripheral ring 3100 to a sufficient extent.

Here, note that in this reference example, as an example of the outer peripheral ring 2000, there has been shown a construction in the case of an inner peripheral convex portion being not formed, as shown in the fifth reference example, but there may instead be used the outer peripheral ring 2000 which is provided with the inner peripheral convex portion 2312 or 2313, as shown in the fourth, the sixth and the seventh reference example.

Ninth Reference Example

Summary

A sealing structure according to a ninth reference example of the present disclosure, which is provided with: a shaft and a housing that rotate relative to each other; and a sealing device that is fitted into an annular groove formed in an outer periphery of said shaft so as to seal an annular gap between said shaft and said housing, thereby to hold a fluid pressure in a region to be sealed which is constructed such that the fluid pressure therein changes; wherein an annular concave portion concaved to a low pressure side is formed in a side wall surface of said annular groove at the low pressure side at a location nearer to a groove bottom side than to an outer peripheral surface of said shaft; said sealing device comprises: an outer peripheral ring made of resin that is in intimate contact with that portion of the side wall surface of said annular groove at the low pressure side in which said annular concave portion is not formed, and slides with respect to an inner peripheral surface of a shaft hole in said housing through which said shaft is inserted; and an inner peripheral ring made of a rubber-like elastic body that is in intimate contact with an inner peripheral surface of said outer peripheral ring and a groove bottom surface of said annular groove, respectively, thereby to push said outer peripheral ring toward an outer peripheral surface side thereof; said outer peripheral ring is formed on its outer peripheral surface with a concave portion which extends from an end of a high pressure side to a position which does not arrive at an end of a low pressure side, so as to introduce fluid thereinto from the high pressure side, and said outer peripheral ring is also formed on an inner peripheral surface side of its side surface at the low pressure side with a protrusion portion which comes into said annular concave portion; and said inner peripheral ring is arranged so as to be able to be in intimate contact with a side wall surface of said annular concave portion at the low pressure side.

In addition, a sealing device according to the ninth reference example of the present disclosure, which is fitted into an annular groove formed in an outer periphery of a shaft so as to seal an annular gap between said shaft and a housing which rotate relative to each other, thereby to hold a fluid pressure in a region to be sealed which is constructed such that the fluid pressure therein changes, said annular groove having an annular concave portion formed so as to be concave to a low pressure side in a position nearer to a groove bottom side than to an outer peripheral surface of said shaft, comprising: an outer peripheral ring made of resin that is in intimate contact with that portion of the side wall surface of said annular groove at the low pressure side in which said annular concave portion is not formed, and slides with respect to an inner peripheral surface of a shaft hole in said housing through which said shaft is inserted; and an inner peripheral ring made of a rubber-like elastic body that is in intimate contact with an inner peripheral surface of said outer peripheral ring and a groove bottom surface of said annular groove, respectively, thereby to push said outer peripheral ring toward an outer peripheral surface side thereof; wherein said outer peripheral ring is formed on its outer peripheral surface with a concave portion which extends from an end of a high pressure side to a position which does not arrive at an end of a low pressure side, so as to introduce fluid thereinto from the high pressure side, and said outer peripheral ring is also formed on an inner peripheral surface side of its side surface at the low pressure side with a protrusion portion which comes into said annular concave portion; and wherein said inner peripheral ring is arranged so as to be able to be in intimate contact with a side wall surface of said annular concave portion at the low pressure side.

According to the sealing structure and the sealing device according to this reference example, the following advantages are achieved in comparison with the sealing structure and the sealing device explained in the above-mentioned embodiment. That is, in this reference example, the annular concave portion is formed on the side wall surface of the annular groove at the low pressure side, and the protrusion portion, which comes into this annular concave portion, is formed on the side surface of the outer peripheral ring at the low pressure side. In addition, the inner peripheral ring is arranged so as to be able to be in intimate contact with the side wall surface of the annular concave portion at the low pressure side. For that reason, it becomes possible to cause the position of intimate contact of the inner peripheral ring with respect to the outer peripheral ring to be biased to the low pressure side. As a result of this, it becomes possible to make the position in which the outer peripheral ring slides with respect to the inner peripheral surface of the shaft hole, and the positions in which the inner peripheral ring is in intimate contact with respect to the inner peripheral surface of the outer peripheral ring and the groove bottom surface of the annular groove, respectively, close to (desirably coincident with) each other in the axial direction. Accordingly, it is possible to suppress the outer peripheral ring from being inclined in the annular groove, thereby making it possible to stabilize the mounting state of the outer peripheral ring.

Specific Example

Hereinafter, a sealing device and a sealing structure according to the ninth reference example of the present disclosure will be explained more specifically while referring to FIG. 66 through FIG. 70. Here, note that the basic construction of this example is the same as that of the above-mentioned embodiment, individual reference examples and individual practical examples, and hence, the same component parts are denoted by the same reference numerals and characters, and the explanation thereof is omitted as the case may be.

A sealing device 1000 according to this reference example is composed of an outer peripheral ring 2000 made of resin, and an inner peripheral ring 3100 made of a rubber-like elastic body. The inner peripheral ring 3100 according to this reference example is a so-called O ring having a circular cross sectional shape. However, the inner peripheral ring 3100 is not limited to the O ring, but as such there can be adopted other seal ring such as a rectangular or polygonal ring, etc.

It is constructed such that in a state where the outer peripheral ring 2000 and the inner peripheral ring 3100 are combined or assembled together, a peripheral length of an outer peripheral surface of the outer peripheral ring 2000 becomes longer than a peripheral length of an inner peripheral surface of a shaft hole in a housing 5000, as explained in the above-mentioned embodiment. Here, note that for the outer peripheral ring 2000 as a single or separate member, the peripheral length of the outer peripheral surface thereof is made shorter than the peripheral length of the inner peripheral surface of the shaft hole in the housing 5000, as explained in the above-mentioned embodiment.

<Annular Groove>

Figure 69:
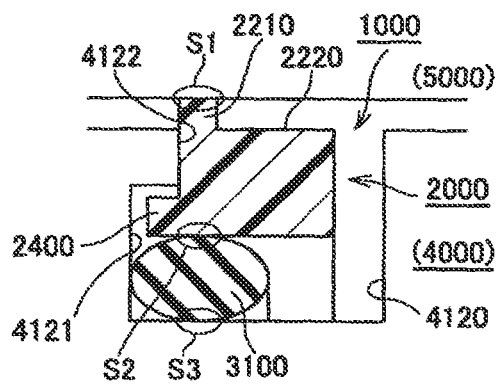
FIG. 69 is a schematic cross sectional view showing an unloaded state in a sealing structure according to the ninth reference example of the present disclosure.

The construction of an annular groove 4120 formed on an outer periphery of a shaft 4000 will be explained in further detail while referring in particular to FIG. 69 and FIG. 70. On a side wall surface of the annular groove 4120 at a low pressure side (L) according to this reference example, there is formed an annular concave portion 4121 which is concaved to the low pressure side (L) at a location nearer to a groove bottom side than to an outer peripheral surface of the shaft 4000. In addition, by the formation of the annular concave portion 4121, an annular convex portion 4122 projected to a high pressure side (H) is formed on the side wall surface of the annular groove 4120 at the low pressure side (L) in the vicinity of the outer peripheral surface of the shaft 4000.

<Outer Peripheral Ring>

Figure 66:
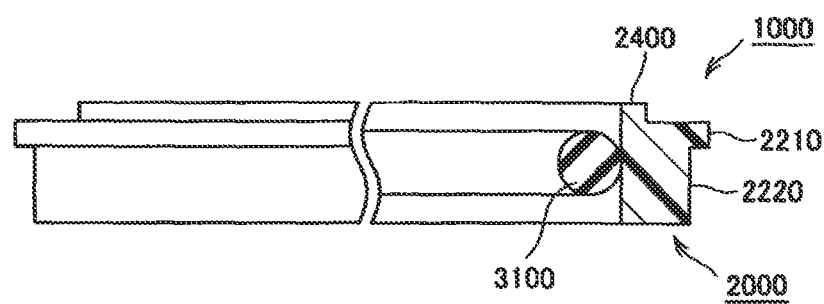
FIG. 66 is a partially broken cross sectional view of a sealing device according to a ninth reference example of the present disclosure.
Figure 67:
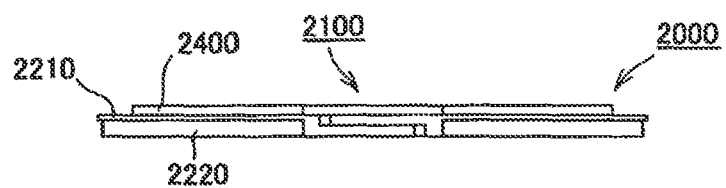
FIG. 67 is a view of an outer peripheral ring seen from an outer peripheral surface side thereof according to the ninth reference example of the present disclosure.
Figure 68:
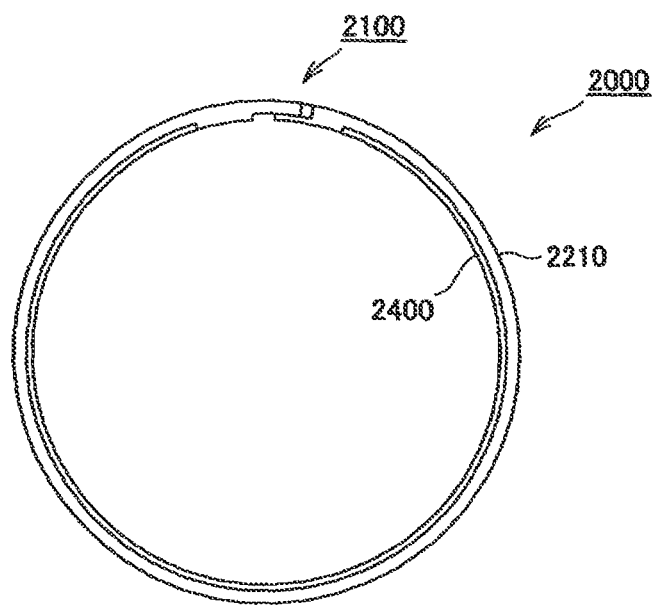
FIG. 68 is a side view of the outer peripheral ring (a side view seen from a low pressure side) according to the ninth reference example of the present disclosure.

The outer peripheral ring 2000 according to this ninth reference example of the present disclosure will be explained in further detail while referring in particular to FIG. 66 through FIG. 68. An abutment joint portion 2100 is formed on the outer peripheral ring 2000 at one place in a circumferential direction thereof. In addition, the outer peripheral ring 2000 is formed on its outer peripheral surface with a concave portion 2220 for introducing fluid. Furthermore, a protrusion portion 2400 is formed on a side surface in the outer peripheral ring 2000 at a side opposite to a side at which the concave portion 2220 is formed.

Here, note that the outer peripheral ring 2000 according to this reference example is constructed such that the abutment joint portion 2100, the concave portion 2220 and the protrusion portion 2400 as mentioned above are formed on an annular member of which the cross section is rectangular. However, this is only an explanation of the shape thereof, but does not necessarily mean that an annular member of a rectangular cross section is used as a material, and processing to form the abutment joint portion 2100, the concave portion 2220 and the protrusion portion 2400 is applied to this material. Of course, after an annular member of a rectangular cross section has been molded or formed, the abutment joint portion 2100, the concave portion 2220 and the protrusion portion 2400 can also be obtained by means of cutting work. However, for example, after molding or forming a member which has the abutment joint portion 2100 in advance, the concave portion 2220 and the protrusion portion 2400 may be obtained by means of cutting work. In this manner, the method of production thereof is not limited in particular.

A special step cut is employed for the abutment joint portion 2100, similar to the above-mentioned embodiment. However, for the abutment joint portion 2100, there can be adopted a straight cut, a bias cut, another step cut, and so on, including but not limited to this. In addition, in cases where a material (e.g., PTFE, etc.) of low elasticity is adopted as a material of the outer peripheral ring 2000, the outer peripheral ring 2000 may also be endless, without forming the abutment joint portion 2100.

In this reference example, too, the concave portion 2220 is formed over the entire periphery of the outer peripheral ring 2000 except for the vicinity of the abutment joint portion 2100. The concave portion 2220 is the same as explained in the above-mentioned embodiment, and so, the detailed explanation thereof is omitted.

In addition, in this reference example, the protrusion portion 2400 is formed over the entire periphery of the outer peripheral ring 2000 except for the vicinity of the abutment joint portion 2100. This protrusion portion 2400 is formed on an inner peripheral surface side of the side surface of the outer peripheral ring 2000 at the low pressure side (L). Then, this protrusion portion 2400 is constructed so as to come into the annular concave portion 4121 formed in the annular groove 4120.

<Mechanism at the Time of Using the Sealing Device>

A mechanism at the time of using the sealing device 1000 according to this reference example will be explained, while referring in particular to FIG. 69 and FIG. 70. FIG. 69 shows an unloaded state in which an engine is stopped, and there does not exist a differential pressure (or there exists substantially no differential pressure) between right-hand side region of the sealing device 1000 and left-hand side region of the sealing device 1000. FIG. 70 shows a state in which the engine is operated, and fluid pressure in the right-hand side region of the sealing device 1000 has become higher in comparison with that in the left-hand side region of the sealing device 1000.

In a state where the sealing device 1000 is fitted in the annular groove 4120, the inner peripheral ring 3100 made of a rubber-like elastic body is in intimate contact with the inner peripheral surface of the outer peripheral ring 2000 and a groove bottom surface of the annular groove 4120, respectively. Then, the inner peripheral ring 3100 exhibits a function of pushing the outer peripheral ring 2000 toward its outer peripheral surface side due to the elastic repulsion thereof.

Accordingly, even if the engine is in an unloaded state, those portions of the outer peripheral surface of the outer peripheral ring 2000 which exclude the concave portion 2220 (i.e., a low pressure side convex portion 2210 and a portion of the outer peripheral ring 2000 in the vicinity of the abutment joint portion 2100 in which the concave portion 2220 is not formed) maintain a state in which they are in contact with the inner peripheral surface of the shaft hole in the housing 5000.

Figure 70:
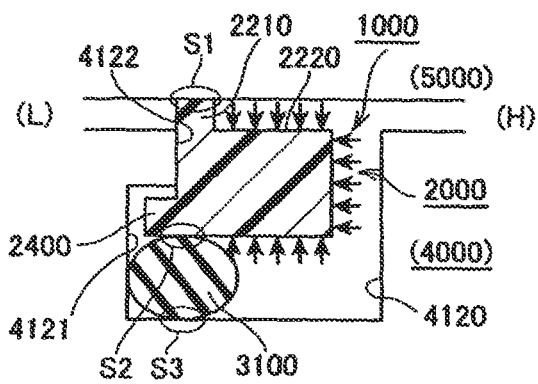
FIG. 70 is a schematic cross sectional view showing a high pressure state in the sealing structure according to the ninth reference example of the present disclosure.

Then, in a state in which the engine is started to generate a differential pressure, the outer peripheral ring 2000 is pushed by means of the fluid pressure from the high pressure side (H), so that it becomes a state of being in intimate contact with the annular convex portion 4122 in the side wall surface of the annular groove 4120 at the low pressure side (L), as shown in FIG. 70. Here, note that it is needless to say that the outer peripheral ring 2000 maintains the state of being in contact (sliding) with the inner peripheral surface of the shaft hole in the housing 5000. In addition, with respect to the inner peripheral ring 3100, it becomes a state of being in intimate contact with the annular concave portion 4121 in the side wall surface of the annular groove 4120 at the low pressure side (L).

In addition, in this reference example, there is adopted a construction in which the protrusion portion 2400 formed on the outer peripheral ring 2000 comes into the annular concave portion 4121 formed in the annular groove 4120. According to this, it is made possible to cause the position of intimate contact of the inner peripheral ring 3100 with respect to the outer peripheral ring 2000 to be biased to the low pressure side (L). Here, note that in this reference example, in a state where the inner peripheral ring 3100 is in intimate contact with the annular concave portion 4121, a region of a seal portion S1 between the outer peripheral ring 2000 and the shaft hole inner peripheral surface, a region of a seal portion S2 between the inner peripheral ring 3100 and the outer peripheral ring 2000 and a region of a seal portion S3 between the inner peripheral ring 3100 and the groove bottom of the annular groove 4120 are designed in such a manner that at least parts thereof overlap with each other, in the case of being viewed in a radial direction in any of a no-load condition and a high pressure condition (refer to FIG. 69 and FIG. 70).

<Advantages of the Sealing Device and the Sealing Structure According to this Reference Example>

According to the sealing device 1000 and the sealing structure provided with this sealing device according to this reference example, the following advantages are achieved in comparison with the sealing device explained in the above-mentioned embodiment. That is, the annular concave portion 4121 is formed on the side wall surface of the annular groove 4120 at the low pressure side (L), and the protrusion portion 2400, which comes into this annular concave portion 4121, is formed on the side surface of the outer peripheral ring 2000 at the low pressure side (L). In addition, the inner peripheral ring 3100 is arranged so as to be able to be in intimate contact with the side wall surface of the annular concave portion 4121 at the low pressure side (L). For that reason, it becomes possible to cause the position of intimate contact of the inner peripheral ring 3100 with respect to the outer peripheral ring 2000 to be biased to the low pressure side (L). As a result of this, it becomes possible to make the position (the seal portion S1) in which the outer peripheral ring 2000 slides with respect to the inner peripheral surface of the shaft hole, the position (the seal portion S2) in which the inner peripheral ring 3100 is in intimate contact with respect to the inner peripheral surface of the outer peripheral ring 2000, and the position (the seal portion S3) in which the inner peripheral ring 3100 is in intimate contact with respect to the groove bottom surface of the annular groove 4120 close to each other in the axial direction. In this reference example, as mentioned above, in a state where the inner peripheral ring 3100 is in intimate contact with the annular concave portion 4121, the region of the seal portion S1, the region of the seal portion S2 and the region of the seal portion S3 are designed in such a manner that at least parts thereof overlap with each other when viewed in the radial direction, in any of the no-load condition and the high pressure condition. Accordingly, it is possible to suppress the outer peripheral ring 2000 from being inclined in the annular groove 4120, thereby making it possible to stabilize the mounting state of the outer peripheral ring 2000.

(Others)

In this reference example, there is shown a construction in which the protrusion portion 2400 is formed over the entire periphery of the outer peripheral ring 2000 except for the vicinity of the abutment joint portion 2100. However, with respect to the protrusion portion 2400, there can be adopted another construction in which a plurality of protrusion portions are provided at a predetermined distance spaced apart from one another in a circumferential direction.

Tenth Reference Example

Summary

A sealing device according to a tenth reference example of the present disclosure, which is fitted into an annular groove formed in an outer periphery of a shaft so as to seal an annular gap between said shaft and a housing which rotate relative to each other, thereby to hold a fluid pressure in a region to be sealed which is constructed such that the fluid pressure therein changes, comprising: an outer peripheral ring made of resin that is in intimate contact with a side wall surface of said annular groove at a low pressure side thereof, and slides with respect to an inner peripheral surface of a shaft hole in said housing through which said shaft is inserted; and an inner peripheral ring made of a rubber-like elastic body that is in intimate contact with said outer peripheral ring and said annular groove, respectively; wherein said outer peripheral ring is formed on its outer peripheral surface with a concave portion which extends from an end of a high pressure side to a position which does not arrive at an end of a low pressure side, so as to introduce fluid thereinto from the high pressure side, and also with an inclined surface which connects a side wall surface at a high pressure side and its inner peripheral surface with each other; and wherein said inner peripheral ring is in intimate contact with said inclined surface in said outer peripheral ring, a groove bottom surface and the side wall surface at the high pressure side in said annular groove, respectively, thereby to push said outer peripheral ring toward its outer peripheral surface side and the low pressure side.

According to the sealing device according to this reference example, the following advantages are achieved in comparison with the sealing device explained in the above-mentioned embodiment. That is, in this reference example, the outer peripheral ring is pushed toward its outer peripheral surface side and the low pressure side by means of the inner peripheral ring which is constructed so as to be in intimate contact with the inclined surface. Accordingly, the outer peripheral ring is kept in a state of being in intimate contact with the inner peripheral surface of the shaft hole in the housing and the side wall surface of the annular groove at the low pressure side, so that a stable posture thereof is maintained without regard to a change in the fluid pressure. As a result of this, a sealing function is maintained in a stable manner. Further, invasion of fluid from the high pressure side to the inner peripheral surface side of the outer peripheral ring can be suppressed by means of the inner peripheral ring which is in intimate contact with the inclined surface in the outer peripheral ring, the groove bottom surface and the side wall surface at the high pressure side in the annular groove, respectively. According to this, it is possible to suppress an increase of a pushing force toward the outer peripheral surface side of the outer peripheral ring accompanying the increase in the fluid pressure, which is combined with the above-mentioned effect due to the concave portion, thereby making it possible to suppress an increase in sliding torque in a synergistic manner.

Specific Example

Hereinafter, a sealing device and a sealing structure according to the tenth reference example of the present disclosure will be explained more specifically while referring to FIG. 71 through FIG. 75. Here, note that the basic construction of this example is the same as that of the above-mentioned embodiment, individual reference examples and individual practical examples, and hence, the same component parts are denoted by the same reference numerals and characters, and the explanation thereof is omitted as the case may be.

A sealing device 1000 according to this reference example is composed of an outer peripheral ring 2000 made of resin, and an inner peripheral ring 3100 made of a rubber-like elastic body. The inner peripheral ring 3100 according to this reference example is a so-called O ring having a circular cross sectional shape.

It is constructed such that in a state where the outer peripheral ring 2000 and the inner peripheral ring 3100 are combined or assembled together, a peripheral length of an outer peripheral surface of the outer peripheral ring 2000 becomes longer than a peripheral length of an inner peripheral surface of a shaft hole in a housing 5000, as explained in the above-mentioned embodiment. Here, note that for the outer peripheral ring 2000 as a single or separate member, the peripheral length of the outer peripheral surface thereof is made shorter than the peripheral length of the inner peripheral surface of the shaft hole in the housing 5000, as explained in the above-mentioned embodiment.

<Outer Peripheral Ring>

Figure 71:
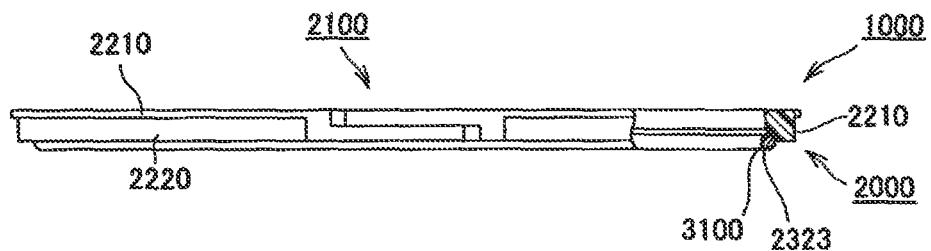
FIG. 71 is a partially broken cross sectional view of a sealing device according to a tenth reference example of the present disclosure.
Figure 72:
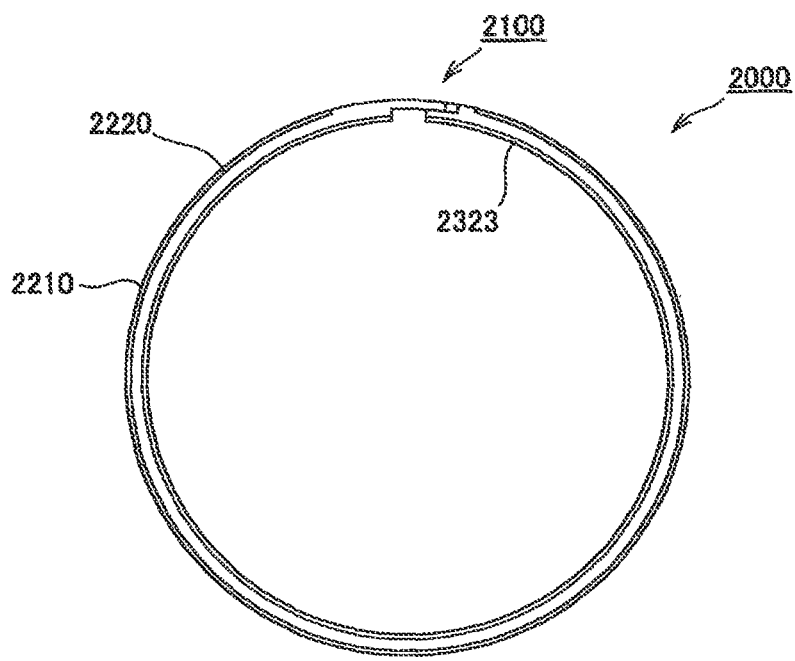
FIG. 72 is a side view of an outer peripheral ring according to the tenth reference example of the present disclosure.
Figure 73:
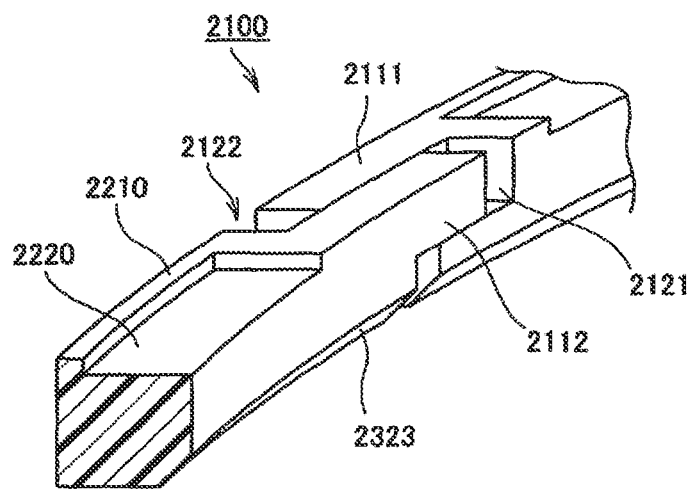
FIG. 73 is a partially broken perspective view of the outer peripheral ring according to the tenth reference example of the present disclosure.

The outer peripheral ring 2000 according to this tenth reference example of the present disclosure will be explained in further detail while referring in particular to FIG. 71 through FIG. 73. An abutment joint portion 2100 is formed on the outer peripheral ring 2000 at one place in a circumferential direction thereof. In addition, the outer peripheral ring 2000 is formed on its outer peripheral surface with a concave portion 2220 for introducing fluid. Further, the outer peripheral ring 2000 is formed with an inclined surface 2323 which connects its side wall surface at a high pressure side and its inner peripheral surface with each other. Although the inclined surface 2323 according to this reference example is a tapered surface, it may be composed of a curved surface which becomes a curved line when viewed in cross section.

Here, note that the outer peripheral ring 2000 according to this reference example is constructed such that the abutment joint portion 2100, the concave portion 2220 and the inclined surface 2323 as mentioned above are formed on an annular member of which the cross section is rectangular. However, this is only an explanation of the shape thereof, but does not necessarily mean that an annular member of a rectangular cross section is used as a material, and processing to form the abutment joint portion 2100, the concave portion 2220 and the inclined surface 2323 is applied to this material. Of course, after an annular member of a rectangular cross section has been molded or formed, the abutment joint portion 2100, the concave portion 2220 and the inclined surface 2323 can also be obtained by means of cutting work. However, for example, after molding or forming a member which has the abutment joint portion 2100 in advance, the concave portion 2220 and the inclined surface 2323 may be obtained by means of cutting work. In this manner, the method of production thereof is not limited in particular.

A special step cut is employed for the abutment joint portion 2100, similar to the above-mentioned embodiment. However, for the abutment joint portion 2100, there can be adopted a straight cut, a bias cut, another step cut, and so on, including but not limited to this. In addition, in cases where a material (e.g., PTFE, etc.) of low elasticity is adopted as a material of the outer peripheral ring 2000, the outer peripheral ring 2000 may also be endless, without forming the abutment joint portion 2100.

In this reference example, too, the concave portion 2220 is formed over the entire periphery of the outer peripheral ring 2000 except for the vicinity of the abutment joint portion 2100. The concave portion 2220 is the same as explained in the above-mentioned embodiment, and so, the detailed explanation thereof is omitted.

<Mechanism at the Time of Using the Sealing Device>

Figure 74:
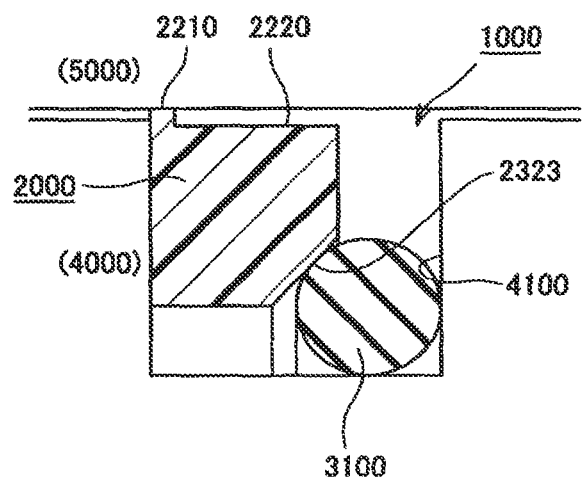
FIG. 74 is a schematic cross sectional view showing an unloaded state in the sealing device according to the tenth reference example of the present disclosure.
Figure 75:
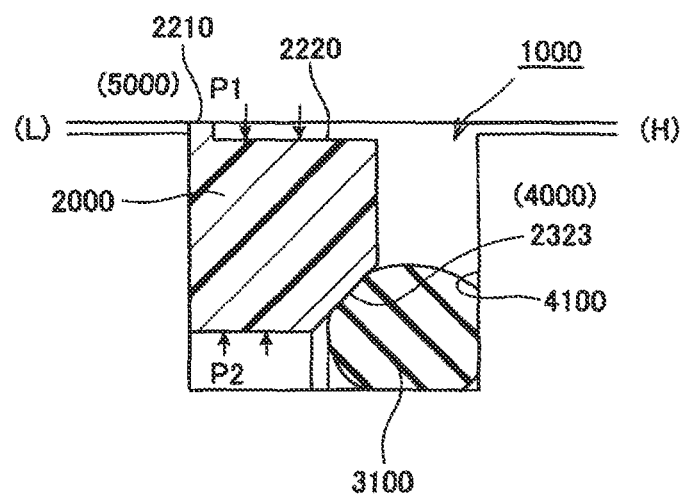
FIG. 75 is a schematic cross sectional view showing a high pressure state in the sealing device according to the tenth reference example of the present disclosure.
Figure 76:
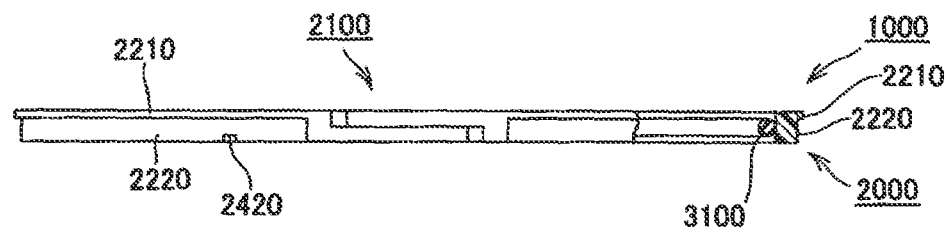
FIG. 76 is a partially broken cross sectional view of a sealing device according to an eleventh reference example of the present disclosure.
Figure 77:
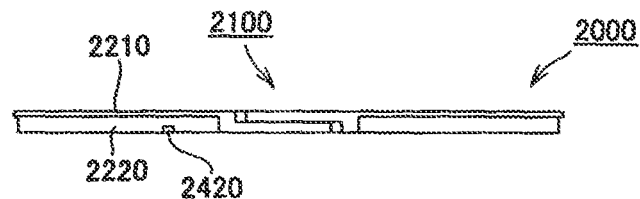
FIG. 77 is a view of an outer peripheral ring seen from an outer peripheral surface side thereof according to the eleventh reference example of the present disclosure.
Figure 78:
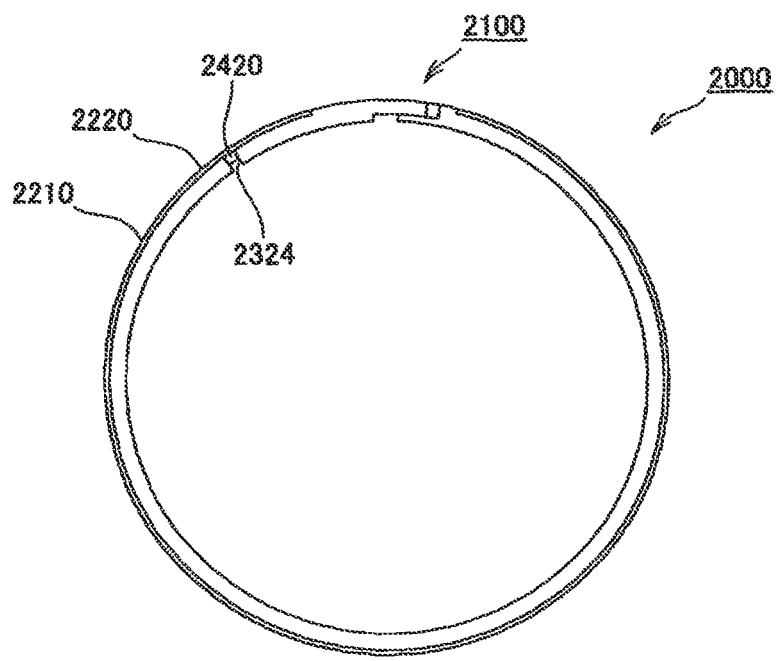
FIG. 78 is a side view of the outer peripheral ring according to the eleventh reference example of the present disclosure.
Figure 79:
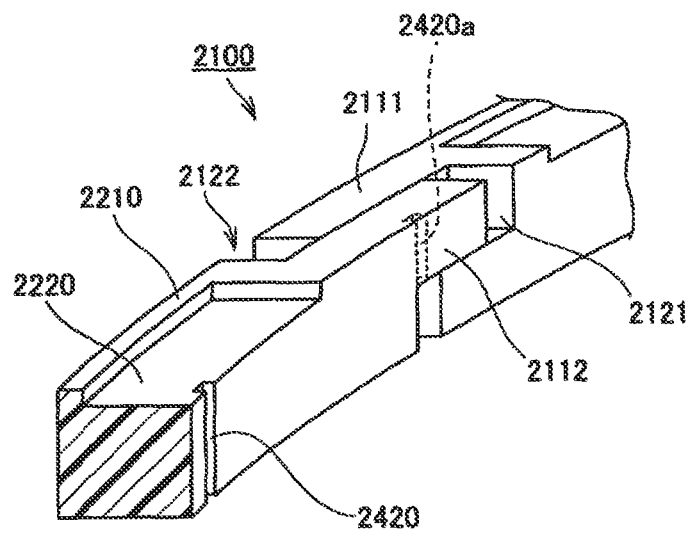
FIG. 79 is a partially broken perspective view of the outer peripheral ring according to the eleventh reference example of the present disclosure.

A mechanism at the time of using the sealing device 1000 according to this reference example will be explained, while referring in particular to FIG. 74 and FIG. 75. FIG. 74 shows an unloaded state in which an engine is stopped, and there does not exist a differential pressure (or there exists substantially no differential pressure) between right-hand side region of the sealing device 1000 and left-hand side region of the sealing device 1000. FIG. 75 shows a state in which the engine is operated, and fluid pressure in the right-hand side region of the sealing device 1000 has become higher in comparison with that in the left-hand side region of the sealing device 1000.

In a state where the sealing device 1000 is fitted in an annular groove 4100, the inner peripheral ring 3100 made of a rubber-like elastic body is in intimate contact with the inclined surface 2323 in the outer peripheral ring 2000 and a groove bottom surface and a side wall surface at a high pressure side (H) in the annular groove 4100, respectively. According to this, the inner peripheral ring 3100 exhibits a function of pushing the outer peripheral ring 2000 toward its outer peripheral surface side and a low pressure side (L) due to the elastic repulsion thereof.

Here, as shown in FIG. 74, in an unloaded condition, too, the outer peripheral ring 2000 is pushed toward its outer peripheral surface side and the low pressure side (L) by means of the inner peripheral ring 3100, as mentioned above. Accordingly, those portions of the outer peripheral surface of the outer peripheral ring 2000 which exclude the concave portion 2220 (i.e., a low pressure side convex portion 2210 and a portion of the outer peripheral ring 2000 in the vicinity of the abutment joint portion 2100 in which the concave portion 2220 is not formed) maintain a state in which they are in contact with the inner peripheral surface of the shaft hole in the housing 5000 and the side wall surface of the annular groove 4100 at the low pressure side (L).

Then, in a state in which the engine is started to generate a differential pressure, the outer peripheral ring 2000 becomes a state of being further pushed to the low pressure side (L) by means of the fluid pressure from the high pressure side (H), as shown in FIG. 75. Thus, in the state in which differential pressure has been generated, too, the outer peripheral ring 2000 maintains its state of being in intimate contact with respect to the side wall surface of the annular groove 4100 at the low pressure side (L), and at the same time maintains its state of being in contact (sliding contact) with respect to the inner peripheral surface of the shaft hole in the housing 5000. In addition, with respect to the inner peripheral ring 3100, too, it also maintains a state of being in intimate contact with the inclined surface 2323 in the outer peripheral ring 2000, the groove bottom surface and the side wall surface at the high pressure side (H) of the annular groove 4100, respectively.

<Advantages of the Sealing Device According to this Reference Example>

According to the sealing device 1000 and the sealing structure provided with this sealing device according to this reference example, the following advantages are achieved in comparison with the sealing device explained in the above-mentioned embodiment. That is, the outer peripheral ring 2000 is pushed toward its outer peripheral surface side and the low pressure side (L) by means of the inner peripheral ring 3100 which is constructed so as to be in intimate contact with the inclined surface 2323. Accordingly, the outer peripheral ring 2000 is kept in a state of being in intimate contact with the inner peripheral surface of the shaft hole in the housing 5000 and the side wall surface of the annular groove 4100 at the low pressure side (L), so that a stable posture thereof is maintained without regard to a change in the fluid pressure. In other words, the concave portion 2220 is formed over a wide range of the outer peripheral surface of the outer peripheral ring 2000, and hence, if the inner peripheral ring 3100 is not provided, there will be a fear that the outer peripheral ring 2000 may be inclined in a counter-clockwise direction in FIGS. 74 and 75. However, in this reference example, as mentioned above, the outer peripheral ring 2000 becomes a state of being pushed with respect to the inner peripheral surface of the shaft hole in the housing 5000, and the side wall surface of the annular groove 4100 at the low pressure side (L), so that its posture is stabilized. As a result, according to the sealing device 1000 according to this reference example, a sealing function can be maintained in a stable manner.

Here, note that in this reference example, too, the concave portion 2220 is formed on the outer peripheral surface of the outer peripheral ring 2000, so that fluid can be introduced into this concave portion 2220 from the high pressure side (H). For that reason, even if the fluid pressure becomes higher, the fluid pressure acts toward the inner peripheral surface side of the outer peripheral ring 2000 in a region in which the concave portion 2220 is formed. Here, note that an arrow P1 in FIG. 75 shows how the fluid pressure acts with respect to the outer peripheral ring 2000. According to this, in the sealing device 1000 according to this reference example, too, it is possible to suppress a rise in pressure toward the outer peripheral surface side by means of the outer peripheral ring 2000 accompanying a rise in the fluid pressure, thus making it possible to suppress sliding torque to a low level.

In addition, in this reference example, the inner peripheral ring 3100 is in intimate contact with the inclined surface 2323 in the outer peripheral ring 2000, the groove bottom surface and the side wall surface at the high pressure side (H) of the annular groove 4100, respectively, thereby exhibiting a sealing function in these intimate contact portions. For that reason, it is possible to suppress invasion of the fluid from the high pressure side (H) to the inner peripheral surface side of the outer peripheral ring 2000. According to this, it is possible to suppress a rise in the pushing force to the outer peripheral surface side of the outer peripheral ring 2000 accompanying a rise in the fluid pressure at the high pressure side (H). In other words, even if pressure P1 in FIG. 75 at the outer peripheral surface side goes up with the rise of the fluid pressure, pressure P2 at the inner peripheral surface side does not change so much. Accordingly, in combination with the above-mentioned effect due to the concave portion 2220, this serves to suppress a rise in sliding torque in a synergistic manner.

Here, note that with respect to the feature that the outer peripheral ring 2000 slides at the outer peripheral surface side thereof, it is the same as in the case of the above-mentioned embodiment.

Eleventh Reference Example

Summary

A sealing device according to an eleventh reference example of the present disclosure, which is fitted into an annular groove formed in an outer periphery of a shaft so as to seal an annular gap between said shaft and a housing which rotate relative to each other, thereby to hold a fluid pressure in a region to be sealed which is constructed such that the fluid pressure therein changes, comprising: an outer peripheral ring made of resin that is in intimate contact with a side wall surface of said annular groove at a low pressure side thereof, and slides with respect to an inner peripheral surface of a shaft hole in said housing through which said shaft is inserted; and an inner peripheral ring made of a rubber-like elastic body that is in intimate contact with an inner peripheral surface of said outer peripheral ring and a groove bottom surface of said annular groove, respectively, thereby to push said outer peripheral ring toward an outer peripheral surface side thereof; and wherein said outer peripheral ring is formed on its outer peripheral surface with a concave portion which extends from an end of a high pressure side to a position which does not arrive at an end of a low pressure side, so as to introduce fluid thereinto from the high pressure side, in a state where said outer peripheral ring is fitted in a normal direction; and wherein said outer peripheral ring is formed with a passage for detecting a fitting direction which forms a flow passage through which fluid to be sealed leaks from the high pressure side to the low pressure side, in a state where said outer peripheral ring is fitted in a reverse direction.

According to the sealing device according to this reference example, the following advantages are achieved in comparison with the sealing device explained in the above-mentioned embodiment. That is, in this reference example, the outer peripheral ring is formed with the fitting direction detection passage. Accordingly, in cases where the outer peripheral ring is fitted in a reverse direction, an amount of leakage of fluid to be sealed increases, and hence, by measuring the amount of leakage, a confirmation can be made as to whether the outer peripheral ring is fitted in a normal direction. In addition, in the case of the sealing device according to this reference example, too, the outer peripheral ring is pushed toward the outer peripheral surface side thereof by means of the inner peripheral ring. For that reason, even in a state where the fluid pressure does not act (differential pressure is not generated), or in a state where the fluid pressure does not substantially act (differential pressure is not substantially generated), the outer peripheral ring becomes the state of being in contact with the inner peripheral surface of the shaft hole in the housing, so that a sealing function is exhibited as long as the outer peripheral ring is in intimate contact with the side wall surface at the low pressure side in the annular groove. Accordingly, the fluid pressure can be made to be held from immediately after the fluid pressure in the region to be sealed begins to increase.

Here, it is preferable that said fitting direction detection passage be composed of a first groove that is formed on the inner peripheral surface side of said outer peripheral ring so as to extend in an axial direction, and a second groove that is formed on a side wall surface side of said outer peripheral ring at the low pressure side in a state where said outer peripheral ring is fitted in the reverse direction, and extends in a radial direction so as to be connected with the first groove.

Specific Example

Hereinafter, a sealing device and a sealing structure according to the eleventh reference example of the present disclosure will be explained more specifically while referring to FIG. 76 through FIG. 82. Here, note that the basic construction of this example is the same as that of the above-mentioned embodiment, individual reference examples and individual practical examples, and hence, the same component parts are denoted by the same reference numerals and characters, and the explanation thereof is omitted as the case may be.

A sealing device 1000 according to this reference example is composed of an outer peripheral ring 2000 made of resin, and an inner peripheral ring 3100 made of a rubber-like elastic body. The inner peripheral ring 3100 according to this reference example is a so-called O ring having a circular cross sectional shape. However, the inner peripheral ring 3100 is not limited to the O ring, but as such there can be adopted other seal ring such as a rectangular or polygonal ring, etc.

It is constructed such that in a state where the outer peripheral ring 2000 and the inner peripheral ring 3100 are combined or assembled together, a peripheral length of an outer peripheral surface of the outer peripheral ring 2000 becomes longer than a peripheral length of an inner peripheral surface of a shaft hole in a housing 5000, as explained in the above-mentioned embodiment. Here, note that for the outer peripheral ring 2000 as a single or separate member, the peripheral length of the outer peripheral surface thereof is made shorter than the peripheral length of the inner peripheral surface of the shaft hole in the housing 5000, as explained in the above-mentioned embodiment.

<Outer Peripheral Ring>

The outer peripheral ring 2000 according to this reference example of the present disclosure will be explained in further detail while referring in particular to FIG. 76 through FIG. 79. An abutment joint portion 2100 is formed on the outer peripheral ring 2000 at one place in a circumferential direction thereof. In addition, the outer peripheral ring 2000 is formed on its outer peripheral surface with a concave portion 2220 for introducing fluid. Further, the outer peripheral ring 2000 is formed on its inner peripheral surface and its side wall surface with a first groove 2324 and a second groove 2420, respectively, which together constitute a fitting direction detection passage.

Here, note that the outer peripheral ring 2000 according to this reference example is constructed such that the abutment joint portion 2100, the concave portion 2220, the first groove 2324 and the second groove 2420 as mentioned above are formed on an annular member of which the cross section is rectangular. However, this is only an explanation of the shape thereof, but does not necessarily mean that an annular member of a rectangular cross section is used as a material, and processing to form the abutment joint portion 2100, the concave portion 2220, the first groove 2324 and the second groove 2420 is applied to this material. Of course, after an annular member of a rectangular cross section has been molded or formed, the abutment joint portion 2100, the concave portion 2220, the first groove 2324 and the second groove 2420 can also be obtained by means of cutting work. However, for example, after molding or forming a member which has the abutment joint portion 2100 in advance, the concave portion 2220, the first groove 2324 and the second groove 2420 may be obtained by means of cutting work. In this manner, the method of production thereof is not limited in particular.

A special step cut is employed for the abutment joint portion 2100, similar to the above-mentioned embodiment. However, for the abutment joint portion 2100, there can be adopted a straight cut, a bias cut, another step cut, and so on, including but not limited to this. In addition, in cases where a material (e.g., PTFE, etc.) of low elasticity is adopted as a material of the outer peripheral ring 2000, the outer peripheral ring 2000 may also be endless, without forming the abutment joint portion 2100.

In this reference example, too, the concave portion 2220 is formed over the entire periphery of the outer peripheral ring 2000 except for the vicinity of the abutment joint portion 2100. The concave portion 2220 is the same as explained in the above-mentioned embodiment, and so, the detailed explanation thereof is omitted.

Then, the outer peripheral ring 2000 according to this reference example is formed with the fitting direction detection passage. This fitting direction detection passage is composed of the first groove 2324 formed on the inner peripheral surface of the outer peripheral ring 2000, and the second groove 2420 formed on the side wall surface. The first groove 2324 is constructed so as to extend in the axial direction. Also, the second groove 2420 is constructed so as to extend in the radial direction. This second groove 2420 is formed on the side wall surface at the low pressure side (L) in a state where the outer peripheral ring 2000 is incorrectly fitted in the reverse direction, as will be described later. Then, the first groove 2324 and the second groove 2420 are constructed so as to be connected with each other.

<Mechanism at the Time of Using the Sealing Device>

Figure 80:
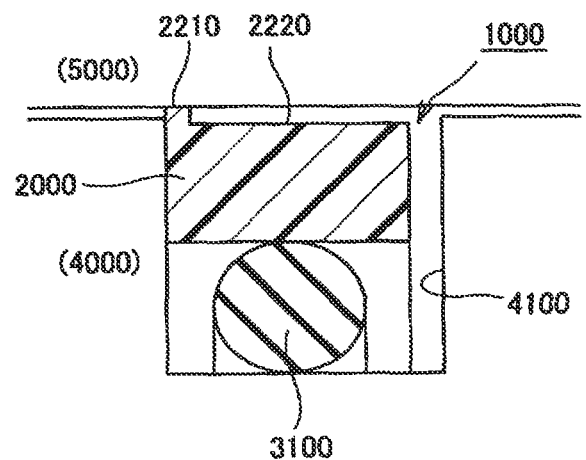
FIG. 80 is a schematic cross sectional view showing an unloaded state in the sealing device according to the eleventh reference example of the present disclosure.
Figure 81:
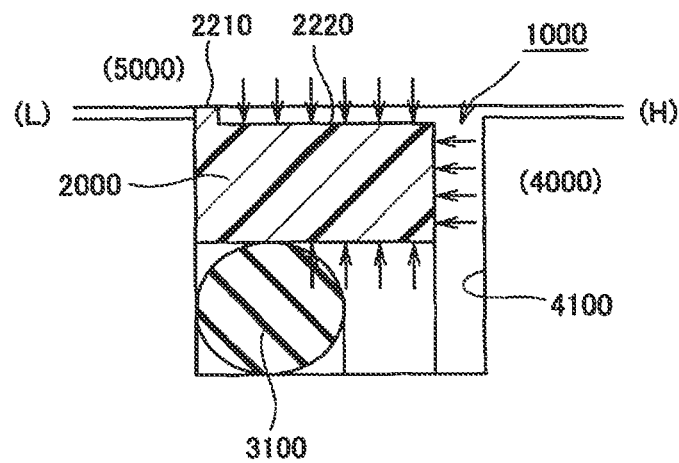
FIG. 81 is a schematic cross sectional view showing a high pressure state in the sealing device according to the eleventh reference example of the present disclosure.

A mechanism at the time of using the sealing device 1000 according to this reference example will be explained, while referring in particular to FIG. 80 and FIG. 81. FIG. 80 shows an unloaded (or low load) state in which the engine is stopped, and there does not exist a differential pressure (or there exists substantially no differential pressure) between right-hand side region of the sealing device 1000 and left-hand side region of the sealing device 1000. FIG. 81 shows a state in which the engine is operated, and fluid pressure in the right-hand side region of the sealing device 1000 has become higher in comparison with that in the left-hand side region of the sealing device 1000.

In a state where the sealing device 1000 is fitted in the annular groove 4100, the inner peripheral ring 3100 made of a rubber-like elastic body is in intimate contact with the inner peripheral surface of the outer peripheral ring 2000 and a groove bottom surface of the annular groove 4100, respectively. Then, the inner peripheral ring 3100 exhibits a function of pushing the outer peripheral ring 2000 toward its outer peripheral surface side due to the elastic repulsion thereof.

Accordingly, even if the engine is in an unloaded state, those portions of the outer peripheral surface of the outer peripheral ring 2000 which exclude the concave portion 2220 (i.e., a low pressure side convex portion 2210 and a portion of the outer peripheral ring 2000 in the vicinity of the abutment joint portion 2100 in which the concave portion 2220 is not formed) maintain a state in which they are in contact with the inner peripheral surface of the shaft hole in the housing 5000.

Then, in a state in which the engine is started to generate a differential pressure, the outer peripheral ring 2000 is pushed to the low pressure side (L) by means of the fluid pressure from the high pressure side (H), so that it becomes a state of being in intimate contact with the side wall surface of the annular groove 4100 at the low pressure side (L), as shown in FIG. 81. Here, note that it is needless to say that the outer peripheral ring 2000 maintains the state of being in contact (sliding) with the inner peripheral surface of the shaft hole in the housing 5000. In addition, with respect to the inner peripheral ring 3100, too, it also becomes a state of being in intimate contact with the side wall surface of the annular groove 4100 at the low pressure side (L).

<Advantages of the Sealing Device According to this Reference Example>

According to the sealing device 1000 and sealing structure provided therewith according to this reference example, the outer peripheral ring 2000 is pushed toward the outer peripheral surface side thereof by means of the inner peripheral ring 3100. For that reason, even in a state where the fluid pressure does not act (a differential pressure has not occurred), or in a state where the fluid pressure does not substantially act (a differential pressure has not substantially occurred), the outer peripheral ring 2000 becomes the state of being in contact with the inner peripheral surface of the shaft hole in the housing 5000. Here, note that an annular continuous sealing surface is formed by an outer peripheral surface of the low pressure side convex portion 2210 in the outer peripheral ring 2000 and an outer peripheral surface of that portion of the outer peripheral ring 2000 in which the concave portion 2220 is not formed in the vicinity of the abutment joint portion 2100. For that reason, a sealing function is exhibited as long as the outer peripheral ring 2000 is in intimate contact with the side wall surface at the low pressure side (L) in the annular groove 4100. Accordingly, the fluid pressure can be made to be held from immediately after the fluid pressure in the region to be sealed begins to increase, as in the case of the above-mentioned embodiment, individual reference examples and individual practical examples.

Here, note that in a state where a considerable period of time has elapsed after the engine has been stopped, the fluid pressure ceases to act completely (i.e., differential pressure becomes zero). In this case, the outer peripheral ring 2000 can move away from the side wall surface of the annular groove 4100 (the side wall surface at the low pressure side (L) at the time of the generation of differential pressure). For that reason, in the case of the sealing device 1000 according to this reference example, the first groove 2324 is formed on the inner peripheral surface of the outer peripheral ring 2000, and hence, leakage of fluid may occur. However, as mentioned above, in cases where the stopped state of the engine continues not so long, the state of generation of differential pressure can be maintained, so that the outer peripheral ring 2000 can be maintained in intimate contact with the side wall surface of the annular groove 4100 at the low pressure side (L). Accordingly, even under a low load condition, the function of suppressing the leakage of fluid is exhibited.

The operational effects due to the concave portion 2220 formed on the outer peripheral surface of the outer peripheral ring 2000 are as explained in the above-mentioned embodiment.

Here, in the sealing device 1000 according to this reference example, in cases where the outer peripheral ring 2000 is fitted in a proper direction (in a normal direction), the operational effects as mentioned above are exhibited. In other words, in cases where the outer peripheral ring 2000 is fitted in the annular groove 4100 in such a manner that the low pressure side convex portion 2210 becomes the low pressure side (L) at the time of the generation of differential pressure, fluid is introduced into the concave portion 2220, whereby the operational effects as mentioned above are exhibited. In cases where the outer peripheral ring 2000 is fitted in the reverse direction by mistake, fluid is not introduced into the concave portion 2220, so the operational effects as stated above can not be obtained. In addition, if the outer peripheral ring 2000 has been fitted in the reverse direction, a low torque effect will not be obtained, but there will also be a fear that sliding between the outer peripheral ring 2000 and the inner peripheral ring 3100 may be caused due to side surface sliding thereof, thereby giving rise to abnormal wear.

Figure 82:
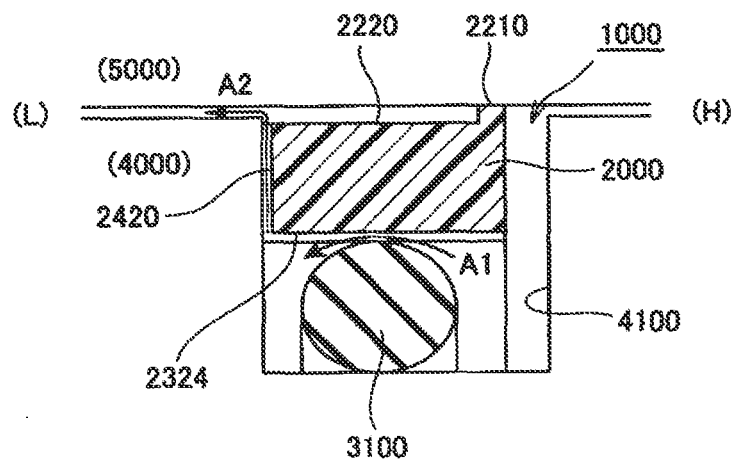
FIG. 82 is a schematic cross sectional view showing a high pressure state in the sealing device and a state where the outer peripheral ring is fitted or mounted in an opposite direction according to the eleventh reference example of the present disclosure.
Figure 83:
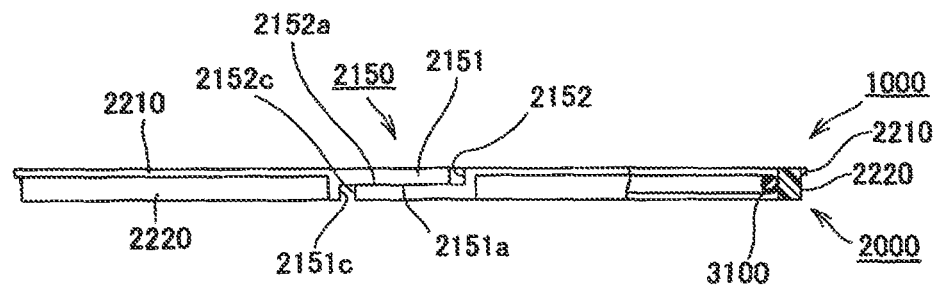
FIG. 83 is a partially broken cross sectional view of a sealing device according to a twelfth reference example of the present disclosure.
Figure 84:
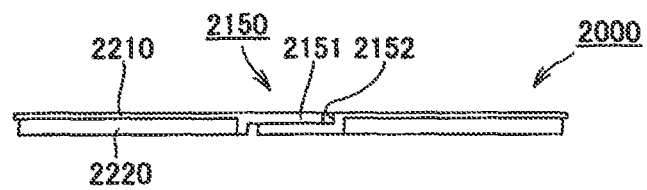
FIG. 84 is a view of an outer peripheral ring seen from an outer peripheral surface side thereof according to the twelfth reference example of the present disclosure.
Figure 85:
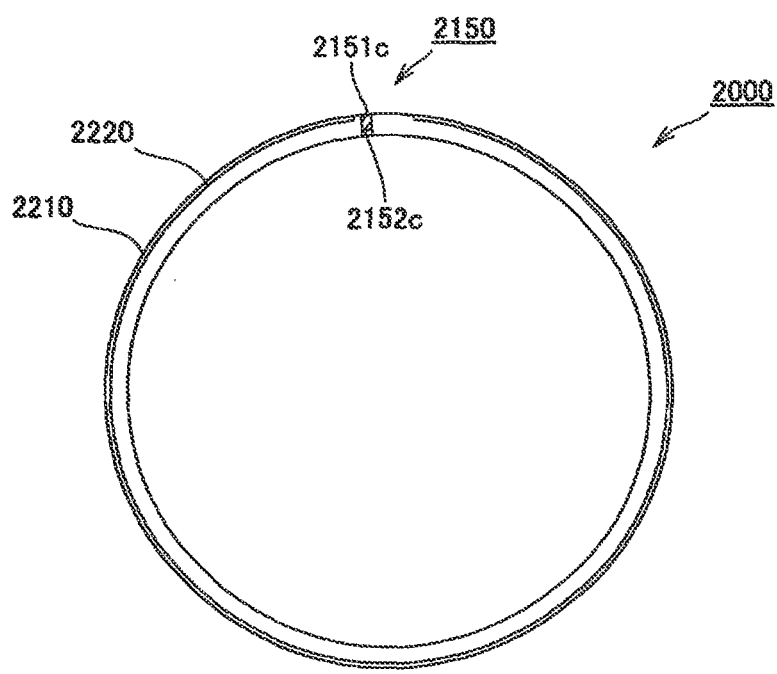
FIG. 85 is a side view of the outer peripheral ring according to the twelfth reference example of the present disclosure.
Figure 86:
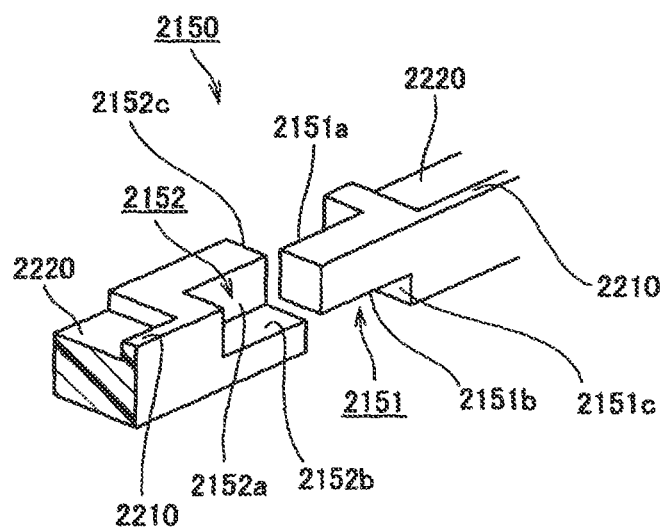
FIG. 86 is a partially broken perspective view of the outer peripheral ring according to the twelfth reference example of the present disclosure.

As a result, it is necessary to prevent the outer peripheral ring 2000 from being fitted in the reverse direction. Accordingly, in the sealing device 1000 according to this reference example, it is devised such that a confirmation can be simply made as to whether the outer peripheral ring 2000 has been fitted in the normal direction or in the reverse direction. This will be explained below with reference to FIG. 82. FIG. 82 shows a state in which the outer peripheral ring 2000 has been fitted in the reverse direction by mistake, and the fluid pressure in a right-hand side region of the sealing device 1000 has become higher in comparison with that in a left-hand side region of the sealing device 1000. In the sealing device 1000 according to this reference example, the fitting direction detection passage composed of the first groove 2324 and the second groove 2420 is formed on the outer peripheral ring 2000, as mentioned above. The outer peripheral ring 2000 in FIG. 82 shows a cross section of a portion in which this fitting direction detection passage is formed. In cases where the outer peripheral ring 2000 is fitted in the reverse direction, there is formed a flow passage through which the fluid to be sealed leaks from the high pressure side (H) to the low pressure side (L), so that it first passes through the first groove 2324 (arrow A1), and then passes through the second groove 2420 (arrow A2). Accordingly, by measuring an amount of leakage of fluid in a state where differential pressure has been generated, it becomes possible to simply make a confirmation as to whether the outer peripheral ring 2000 has been fitted in the normal direction or in the reverse direction.

Here, note that a leakage test was carried out under the condition that the cross-sectional area of the fitting direction detection passage (i.e., the cross-sectional areas of the first groove 2324 and the second groove 2420) was set to be about 30 mm$^{2'}$ and the pressure of fluid (e.g., a gas such as air) at the high pressure side was set to be 1 MPa under an environment of room temperature in a state where there was no relative rotation between the shaft 4000 and the housing 5000. As a result of this leakage test, it was found that in cases where the outer peripheral ring 2000 is fitted in the normal direction, the amount of leakage was 2 cc/min, but in contrast to this, in cases where the outer peripheral ring 2000 is fitted in the reverse direction, the amount of leakage was 420 cc/min. Thus, due to the fact that a large difference appears in the amount of leakage, it is possible to simply make a confirmation as to whether the outer peripheral ring 2000 has been fitted in the normal direction or in the reverse direction. Here, note that in this reference example, there has been shown the construction in the case where the fitting direction detection passage is formed only in one place, but a plurality of fitting direction detection passages may be formed at locations which are different from one another in the circumferential direction.

Twelfth Reference Example

Summary

A sealing device according to a twelfth reference example of the present disclosure, which is fitted into an annular groove formed in an outer periphery of a shaft so as to seal an annular gap between said shaft and a housing which rotate relative to each other, thereby to hold a fluid pressure in a region to be sealed which is constructed such that the fluid pressure therein changes, comprising: an outer peripheral ring made of resin that is in intimate contact with a side wall surface of said annular groove at a low pressure side thereof, and slides with respect to an inner peripheral surface of a shaft hole in said housing through which said shaft is inserted; and an inner peripheral ring made of a rubber-like elastic body that is in intimate contact with an inner peripheral surface of said outer peripheral ring and a groove bottom surface of said annular groove, respectively, thereby to push said outer peripheral ring toward an outer peripheral surface side thereof; wherein said outer peripheral ring is formed on its outer peripheral surface with a concave portion which extends from an end of a high pressure side to a position which does not arrive at an end of a low pressure side, so as to introduce fluid thereinto from the high pressure side; wherein an abutment joint portion is formed on said outer peripheral ring at one place in a circumferential direction thereof; wherein said abutment joint portion has an engagement convex portion which is formed at one outer peripheral surface side of a cut portion and at a low pressure side surface side, and an engagement concave portion which is formed at the other outer peripheral surface side and at the low pressure side surface side, and into which said engagement convex portion is engaged thereby to exhibit a sealing function in both an axial direction and a radial direction; and wherein between an end face of a portion of said outer peripheral ring at the one side of said cut portion except for said engagement convex portion, and an end face of a portion of said outer peripheral ring at the other side except for said engagement concave portion, there is formed a gap which constitutes a flow passage which is closed by the inner peripheral surface of said shaft hole and a low pressure side surface of said annular groove in a state where said outer peripheral ring is fitted in a normal direction, and which is opened to allow a fluid to be sealed to leak from the high pressure side to the low pressure side in a state where said outer peripheral ring is fitted in a reverse direction.

According to the sealing device according to this reference example, the following advantages are achieved in comparison with the sealing device explained in the above-mentioned embodiment. That is, in this reference example, in the outer peripheral ring, the abutment joint portion is constructed as mentioned above, and hence, in the state where the outer peripheral ring is fitted in the normal direction, a sealing function is exhibited, whereas in the state where the outer peripheral ring is fitted in the reverse direction, there is formed the flow passage through which the fluid to be sealed leaks from the high pressure side to the low pressure side.

Accordingly, in cases where the outer peripheral ring is fitted in the reverse direction, an amount of leakage of fluid to be sealed increases, and hence, by measuring the amount of leakage, a confirmation can be made as to whether the outer peripheral ring is fitted in the normal direction.

Specific Example

Hereinafter, a sealing device and a sealing structure according to the twelfth reference example of the present disclosure will be explained more specifically while referring to FIG. 83 through FIG. 90. Here, note that the basic construction of this example is the same as that of the above-mentioned embodiment, individual reference examples and individual practical examples, and hence, the same component parts are denoted by the same reference numerals and characters, and the explanation thereof is omitted as the case may be.

A sealing device 1000 according to this reference example is composed of an outer peripheral ring 2000 made of resin, and an inner peripheral ring 3100 made of a rubber-like elastic body. The inner peripheral ring 3100 according to this reference example is a so-called O ring having a circular cross sectional shape. However, the inner peripheral ring 3100 is not limited to the O rings, but as such there can be adopted other seal ring such as a rectangular or polygonal ring, etc.

It is constructed such that in a state where the outer peripheral ring 2000 and the inner peripheral ring 3100 are combined or assembled together, a peripheral length of an outer peripheral surface of the outer peripheral ring 2000 becomes longer than a peripheral length of an inner peripheral surface of a shaft hole in a housing 5000, as explained in the above-mentioned embodiment. Here, note that for the outer peripheral ring 2000 as a single or separate member, the peripheral length of the outer peripheral surface thereof is made shorter than the peripheral length of the inner peripheral surface of the shaft hole in the housing 5000, as explained in the above-mentioned embodiment.

<Outer Peripheral Ring>

The outer peripheral ring 2000 according to the twelfth reference example of the present disclosure will be explained in further detail while referring in particular to FIG. 83 through FIG. 86. An abutment joint portion 2150 is formed on the outer peripheral ring 2000 at one place in a circumferential direction thereof. In addition, the outer peripheral ring 2000 is formed on its outer peripheral surface with a concave portion 2220 for introducing fluid.

Here, note that the outer peripheral ring 2000 according to this reference example is constructed such that the abutment joint portion 2150 and the concave portion 2220 as mentioned above are formed on an annular member of which the cross section is rectangular. However, this is only an explanation of the shape thereof, but does not necessarily mean that an annular member of a rectangular cross section is used as a material, and processing to form the abutment joint portion 2150 and the concave portion 2220 is applied to this material. Of course, after an annular member of a rectangular cross section has been molded or formed, the abutment joint portion 2150 and the concave portion 2220 can also be obtained by means of cutting work. However, for example, after molding or forming a member which has the abutment joint portion 2150 in advance, the concave portion 2220 may be obtained by means of cutting work. In this manner, the method of production thereof is not limited in particular.

The abutment joint portion 2150 has an engagement convex portion 2151 which is formed at one outer peripheral surface side of a cut portion and at a low pressure side surface side, and an engagement concave portion 2152 which is formed at the other outer peripheral surface side and at the low pressure side surface side, and into which this engagement convex portion 2151 is engaged. In addition, in this reference example, the engagement convex portion 2151 and the engagement concave portion 2152 are each constructed into a rectangular parallelepiped shape. Strictly speaking, however, an outer peripheral surface and an inner peripheral surface thereof are curved surfaces when viewed in an axial direction (i.e., surfaces concentric with the outer peripheral surface and the inner peripheral surface of the outer peripheral ring 2000), and the other surfaces thereof are flat or plane surfaces. Here, note that the "high pressure side" referred to herein is a high pressure side (H) in the case where the outer peripheral ring 2000 is fitted in a proper direction (in a normal direction), as will be described later, and the "low pressure side" is a low pressure side (L) in the case where the outer peripheral ring 2000 is fitted in the proper direction (in the normal direction).

In this reference example, too, the concave portion 2220 is formed over the entire periphery of the outer peripheral ring 2000 except for the vicinity of the abutment joint portion 2150. The concave portion 2220 is the same as explained in the above-mentioned embodiment, and so, the detailed explanation thereof is omitted.

<Mechanism at the Time of Using the Sealing Device>

Figure 87:
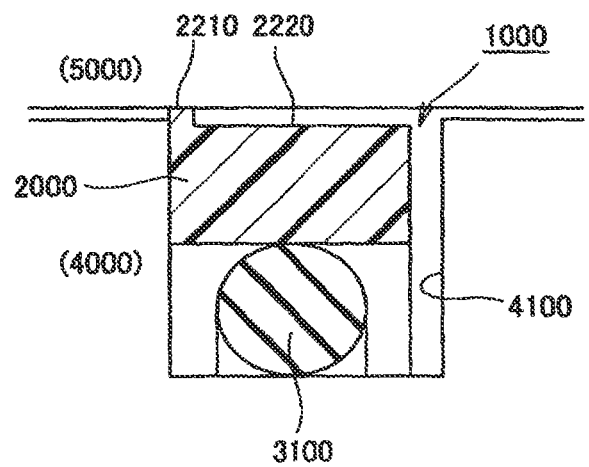
FIG. 87 is a schematic cross sectional view showing an unloaded state in the sealing device according to the twelfth reference example of the present disclosure.
Figure 88:
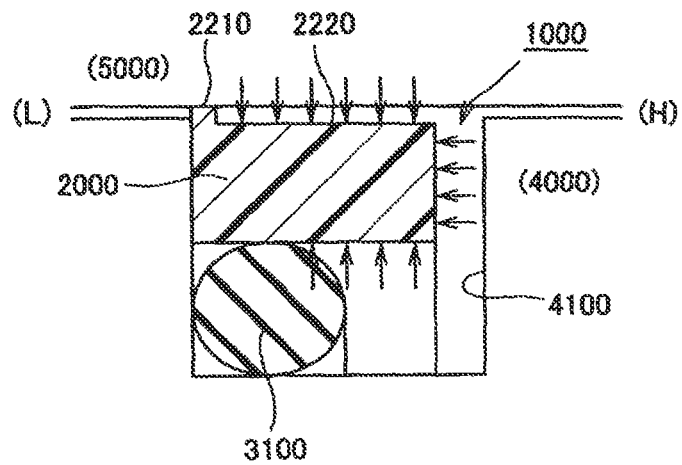
FIG. 88 is a schematic cross sectional view showing a high pressure state in the sealing device according to the twelfth reference example of the present disclosure.

A mechanism at the time of using the sealing device 1000 according to this reference example will be explained, while referring in particular to FIG. 87 and FIG. 88. FIG. 87 shows an unloaded (or low load) state in which the engine is stopped, and there does not exist a differential pressure (or there exists substantially no differential pressure) between right-hand side region of the sealing device 1000 and left-hand side region of the sealing device 1000. FIG. 88 shows a state in which the engine is operated, and fluid pressure in the right-hand side region of the sealing device 1000 has become higher in comparison with that in the left-hand side region of the sealing device 1000.

In a state where the sealing device 1000 is fitted in the annular groove 4100, the inner peripheral ring 3100 made of a rubber-like elastic body is in intimate contact with the inner peripheral surface of the outer peripheral ring 2000 and a groove bottom surface of the annular groove 4100, respectively. Then, the inner peripheral ring 3100 exhibits a function of pushing the outer peripheral ring 2000 toward its outer peripheral surface side due to the elastic repulsion thereof.

Accordingly, even if the engine is in an unloaded state, those portions of the outer peripheral surface of the outer peripheral ring 2000 which exclude the concave portion 2220 (i.e., a low pressure side convex portion 2210 and a portion of the outer peripheral ring 2000 in the vicinity of the abutment joint portion 2150 in which the concave portion 2220 is not formed) maintain a state in which they are in contact with the inner peripheral surface of the shaft hole in the housing 5000.

Then, in a state in which the engine is started to generate a differential pressure, the outer peripheral ring 2000 is pushed to the low pressure side (L) by means of the fluid pressure from the high pressure side (H), so that it becomes a state of being in intimate contact with the side wall surface of the annular groove 4100 at the low pressure side (L), as shown in FIG. 88. Here, note that it is needless to say that the outer peripheral ring 2000 maintains the state of being in contact (sliding) with the inner peripheral surface of the shaft hole in the housing 5000. In addition, with respect to the inner peripheral ring 3100, too, it also becomes a state of being in intimate contact with the side wall surface of the annular groove 4100 at the low pressure side (L).

<Advantages of the Sealing Device According to this Reference Example>

Figure 89:
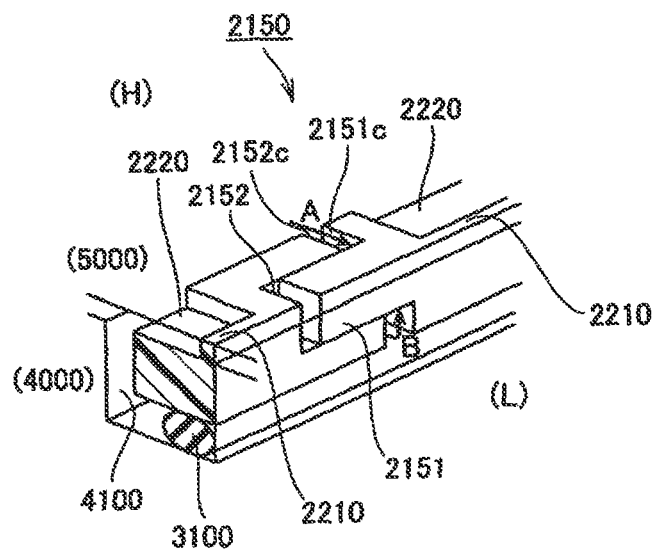
FIG. 89 is an explanatory view showing a high pressure state in the sealing device and a state where the outer peripheral ring is fitted or mounted in a normal direction according to the twelfth reference example of the present disclosure.
Figure 90:
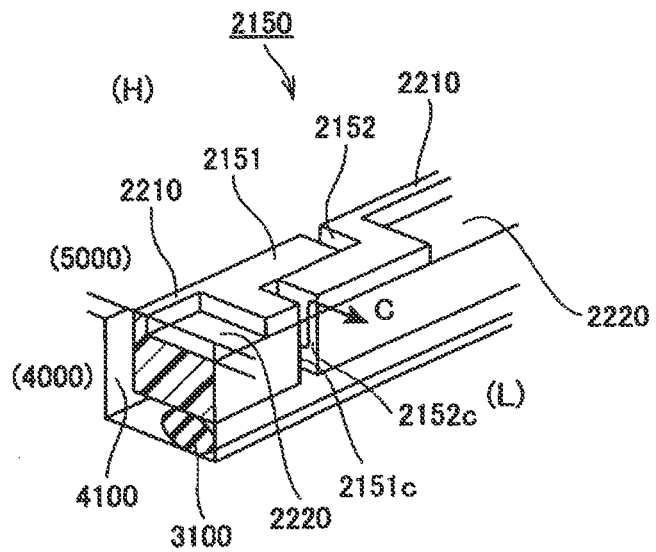
FIG. 90 is an explanatory view showing a high pressure state in the sealing device and a state where the outer peripheral ring is fitted or mounted in an opposite direction according to the twelfth reference example of the present disclosure.

According to the sealing device 1000 and the sealing structure provided with this sealing device according to this reference example, the following advantages are achieved in comparison with the sealing device explained in the above-mentioned embodiment. That is, in this reference example, too, by adopting the construction as mentioned above as the abutment joint portion 2150, similar to the case of the above-mentioned eleventh reference example, a confirmation as to whether the outer peripheral ring 2000 has been fitted in the normal direction or in the reverse direction can be made in a simple manner. This will be explained below with reference to FIG. 86, FIG. 89 and FIG. 90. FIG. 89 is a perspective view looking obliquely at the vicinity of the abutment joint portion 2150 in the case of the outer peripheral ring 2000 being fitted in the normal direction, and FIG. 90 is a perspective view looking obliquely at the vicinity of the abutment joint portion 2150 in the case of the outer peripheral ring 2000 being fitted in the reverse direction. Here, note that in FIG. 89 and FIG. 90, a far or back side is the high pressure side (H), and a near or front side is the low pressure side (L).

As described above, in the abutment joint portion 2150 according to this reference example, an engagement convex portion 2151 is formed at one outer peripheral surface side of a cut portion and at a low pressure side surface side, and an engagement concave portion 2152, into which this engagement convex portion 2151 is engaged, is formed at the other outer peripheral surface side and at the low pressure side surface side. Here, in a state where the engagement convex portion 2151 has been fitted into the engagement concave portion 2152, a side wall surface 2151a in the engagement convex portion 2151 directed toward the high pressure side (H) and a side wall surface 2152a in the engagement concave portion 2152 directed toward the low pressure side (L) are in intimate contact with each other for sliding movement relative to each other, and an inner peripheral surface 2151b in the engagement convex portion 2151 and an outer peripheral surface 2152b in the engagement concave portion 2152 are in intimate contact with each other for sliding movement relative to each other. By means of such two seal portions, a sealing function is exhibited even with respect to any of the axial direction and the radial direction.

In addition, in the abutment joint portion 2150, there is formed a gap between an end face 2151c of a portion of the outer peripheral ring at one side of the cut portion except for the engagement convex portion 2151, and an end face 2152c of a portion of the outer peripheral ring at the other side except for the engagement concave portion 2152. Here, note that the longer the peripheral length of the outer peripheral ring 2000 is made due to thermal expansion and contraction, the narrower becomes this gap, whereas the shorter the peripheral length of the outer peripheral ring 2000, the wider becomes this gap.

In cases where the outer peripheral ring 2000 is fitted in the normal direction, this gap does not form a flow passage through which the fluid to be sealed leaks from the high pressure side (H) to the low pressure side (L), but in contrast to this, in cases where the outer peripheral ring 2000 is fitted in the reverse direction, this gap forms a flow passage through which the fluid to be sealed leaks from the high pressure side (H) to the low pressure side (L). That is, as shown in FIG. 89, in cases where the outer peripheral ring 2000 is fitted in the normal direction, the flow passage formed by the gap is blocked or closed by the inner peripheral surface of the shaft hole in the housing 5000 (refer to an arrow A), and the flow passage formed by the gap is blocked or closed by the side wall surface of the annular groove 4100 at the low pressure side (refer to an arrow B). Accordingly, in cases where the outer peripheral ring 2000 is fitted in the normal direction, the fluid to be sealed does not leak to the low pressure side (L). In contrast to this, however, as shown in FIG. 90, in cases where the outer peripheral ring 2000 is fitted in the reverse direction, there is formed a flow passage (refer to an arrow C) through which the fluid to be sealed leaks from the high pressure side (H) to the low pressure side (L).

Accordingly, by measuring an amount of leakage of fluid in a state where differential pressure has been generated, it becomes possible to simply make a confirmation as to whether the outer peripheral ring 2000 has been fitted in the normal direction or in the reverse direction.

<Modification of the Twelfth Reference Example>

Figure 91:
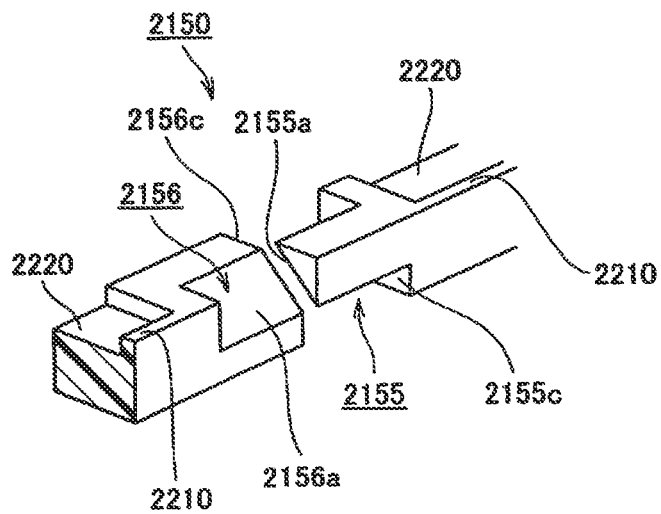
FIG. 91 is a partially broken perspective view of the outer peripheral ring according to a modification of the twelfth reference example of the present disclosure.
Figure 92:
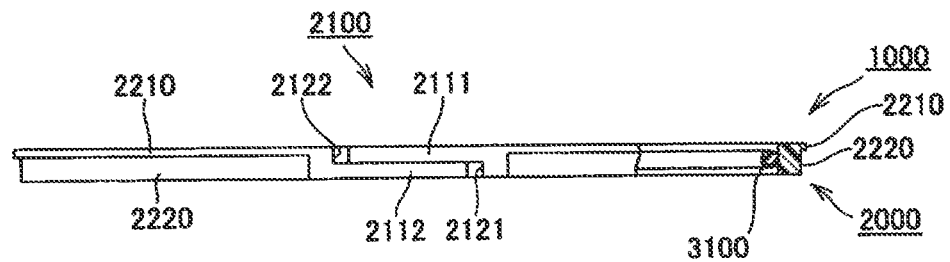
FIG. 92 is a partially broken cross sectional view of a sealing device according to a thirteenth reference example of the present disclosure.
Figure 93:
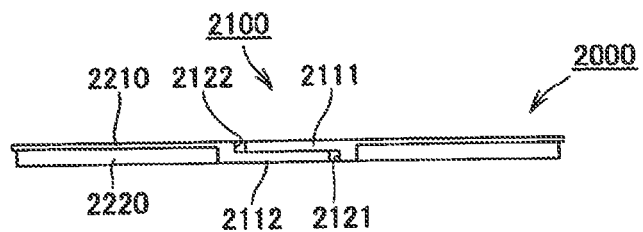
FIG. 93 is a view of an outer peripheral ring seen from an outer peripheral surface side thereof according to the thirteenth reference example of the present disclosure.
Figure 94:
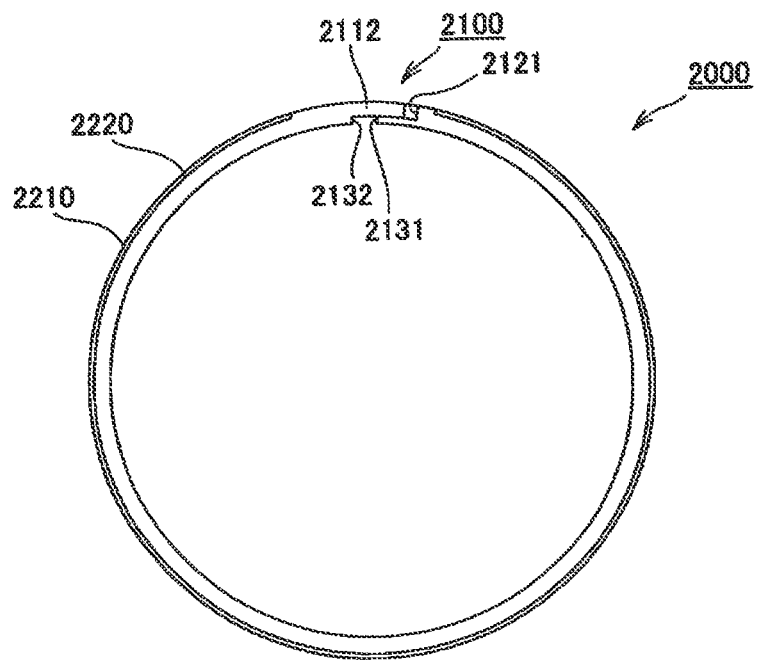
FIG. 94 is a side view of the outer peripheral ring according to the thirteenth reference example of the present disclosure.

A modification of the twelfth reference example of the present disclosure is shown in FIG. 91. In this modification, a modified form of the abutment joint portion of the outer peripheral ring is shown in the construction shown in the above-mentioned twelfth reference example. The other construction and operation of this modification are the same as those in the above-mentioned twelfth reference example, and hence, the same component parts as those of the above-mentioned sixteenth practical example are denoted by the same reference numerals and characters, and the explanation thereof is omitted.

In an outer peripheral ring 2000 according to this modification, too, an abutment joint portion 2150 is formed on the outer peripheral ring 2000 at one place in a circumferential direction thereof. In addition, the outer peripheral ring 2000 is formed on its outer peripheral surface with a concave portion 2220 for introducing fluid.

Then, in the abutment joint portion 2150 according to this modification, too, similar to the case of the above-mentioned twelfth reference example, an engagement convex portion 2155 is formed at one outer peripheral surface side of a cut portion and at a low pressure side surface side, and an engagement concave portion 2156, into which this engagement convex portion 2155 is fitted, is formed at the other outer peripheral surface side and at a low pressure side surface side. Here, in the above-mentioned twelfth reference example, the engagement convex portion 2151 and the engagement concave portion 2152 are each constructed into a rectangular parallelepiped shape, but in contrast to this, the engagement convex portion 2155 and the engagement concave portion 2156 according to this modification are each constructed into a triangular prism shape. The other construction with respect to the concave portion 2220 and the feature that the outer peripheral ring 2000 together with the inner peripheral ring 3100 is fitted into the annular groove 4100 are the same as those in the above-mentioned twelfth reference example.

In this modification, in a state where the engagement convex portion 2151 has been fitted into the engagement concave portion 2156, an inner peripheral side inclined surface 2155a in the engagement convex portion 2151 and an outer peripheral side inclined surface 2156a in the engagement concave portion 2156 are in intimate contact with each other for sliding movement relative to each other. These inclined surface 2155a and inclined surface 2156a are each inclined with respect to the axial direction, and also inclined with respect to the radial direction. Accordingly, due to the intimate contact between the inclined surface 2155a and the inclined surface 2156a for sliding movement relative to each other, a sealing function is exhibited even with respect to any of the axial direction and the radial direction.

In addition, in the abutment joint portion 2150 according to this modification, too, similar to the case of the above-mentioned twelfth reference example, there is formed a gap between an end face 2155c of a portion of the outer peripheral ring at one side of the cut portion except for the engagement convex portion 2155, and an end face 2156c of a portion of the outer peripheral ring at the other side except for the engagement concave portion 2156. Similar to the case of the above-mentioned twelfth reference example, in cases where the outer peripheral ring 2000 is fitted in the normal direction, this gap does not form a flow passage through which the fluid to be sealed leaks from the high pressure side (H) to the low pressure side (L). In contrast to this, in cases where the outer peripheral ring 2000 is fitted in the reverse direction, this gap forms a flow passage through which the fluid to be sealed leaks from the high pressure side (H) to the low pressure side (L). This mechanism is the same as in the case of the above-mentioned twelfth reference example, so the explanation thereof is omitted.

According to the construction as mentioned above, in this modification, too, the same operational effects as in the case of the above-mentioned twelfth reference example can be obtained.

(Others)

The gap between the end face 2151c and the end face 2152c shown in the above-mentioned twelfth reference example and the gap between the end face 2155c and the end face 2156c shown in the modification of the twelfth reference example become narrower or wider according to the peripheral length of the outer peripheral ring 2000. In cases where these gaps are lost, even if the outer peripheral ring 2000 is fitted in the reverse direction, there will be formed no flow passage through which the fluid to be sealed leaks from the high pressure side (H) to the low pressure side (L). In addition, when the gaps become small in a state where a part of the outer peripheral side of the inner peripheral ring 3100 has entered these gaps, there will be a fear that the part may be pinched and damaged. From these reasons, it is desirable for the above-mentioned gaps to be always formed. Accordingly, in the case of the above-mentioned twelfth reference example, it is preferable that the length in the circumferential direction of the engagement convex portion 2151 be set longer than the length in the circumferential direction of the engagement concave portion 2152. If the setting is made in this manner, even in cases where a tip end of the engagement convex portion 2151 abuts against an end face in the circumferential direction of the engagement concave portion 2152, a gap can be formed without fail between the end face 2151c and the end face 2152c. In addition, similarly, in the modification of the twelfth reference example, too, if the length in the circumferential direction of the engagement convex portion 2155 is set longer than the length in the circumferential direction of the engagement concave portion 2156, the same effect will be able to be obtained.

Thirteenth Reference Example

Summary

A sealing device according to a thirteenth reference example of the present disclosure, which is fitted into an annular groove formed in an outer periphery of a shaft so as to seal an annular gap between said shaft and a housing which rotate relative to each other, thereby to hold a fluid pressure in a region to be sealed which is constructed such that the fluid pressure therein changes, comprising: an outer peripheral ring made of resin that is in intimate contact with a side wall surface of said annular groove at a low pressure side thereof, and slides with respect to an inner peripheral surface of a shaft hole in said housing through which said shaft is inserted; and an inner peripheral ring made of a rubber-like elastic body that is in intimate contact with an inner peripheral surface of said outer peripheral ring and a groove bottom surface of said annular groove, respectively, thereby to push said outer peripheral ring toward an outer peripheral surface side thereof; wherein said outer peripheral ring is formed on its outer peripheral surface with a concave portion which extends from an end of a high pressure side to a position which does not arrive at an end of a low pressure side, so as to introduce fluid thereinto from the high pressure side; wherein an abutment joint portion is formed on said outer peripheral ring at one place in a circumferential direction thereof; wherein said abutment joint portion has: a first engagement convex portion formed at the low pressure side and a first engagement concave portion formed at the high pressure side, on an outer peripheral side at one side thereof of a cut portion; and a second engagement concave portion formed at the low pressure side into which said first engagement convex portion is engaged, and a second engagement convex portion formed at the high pressure side which is engaged into said first engagement concave portion, on the outer peripheral side at the other side thereof of the cut portion; and wherein between an inner peripheral surface and a side wall surface at the low pressure side in said second engagement convex portion, there is formed a fitting direction detection concave portion which forms a part of a flow passage through which fluid to be sealed leaks from the high pressure side to the low pressure side, in cases where said outer peripheral ring is fitted in a reverse direction.

According to the sealing device according to this reference example, the following advantages are achieved in comparison with the sealing device explained in the above-mentioned embodiment. That is, in this reference example, between an inner peripheral surface and a side wall surface at the low pressure side in said second engagement convex portion, there is formed a fitting direction detection concave portion which forms a part of a flow passage through which fluid to be sealed leaks from the high pressure side to the low pressure side, in cases where said outer peripheral ring is fitted in a reverse direction. Accordingly, in cases where the outer peripheral ring is fitted in the reverse direction, an amount of leakage of fluid to be sealed increases, and hence, by measuring the amount of leakage, a confirmation can be made as to whether the outer peripheral ring is fitted in a normal direction.

Specific Example

Hereinafter, a sealing device and a sealing structure according to the thirteenth reference example of the present disclosure will be explained more specifically while referring to FIG. 92 through FIG. 101. Here, note that the basic construction of this example is the same as that of the above-mentioned embodiment, individual reference examples and individual practical examples, and hence, the same component parts are denoted by the same reference numerals and characters, and the explanation thereof is omitted as the case may be.

A sealing device 1000 according to this reference example is composed of an outer peripheral ring 2000 made of resin, and an inner peripheral ring 3100 made of a rubber-like elastic body. The inner peripheral ring 3100 according to this reference example is a so-called O ring having a circular cross sectional shape. However, the inner peripheral ring 3100 is not limited to the O ring, but as such there can be adopted other seal rings such as a rectangular or polygonal ring, etc.

It is constructed such that in a state where the outer peripheral ring 2000 and the inner peripheral ring 3100 are combined or assembled together, a peripheral length of an outer peripheral surface of the outer peripheral ring 2000 becomes longer than a peripheral length of an inner peripheral surface of a shaft hole in a housing 5000, as explained in the above-mentioned embodiment. Here, note that for the outer peripheral ring 2000 as a single or separate member, the peripheral length of the outer peripheral surface thereof is made shorter than the peripheral length of the inner peripheral surface of the shaft hole in the housing 5000, as explained in the above-mentioned embodiment.

<Outer Peripheral Ring>

The outer peripheral ring 2000 according to this thirteenth reference example of the present disclosure will be explained in further detail while referring in particular to FIG. 92 through FIG. 97. An abutment joint portion 2100 is formed on the outer peripheral ring 2000 at one place in a circumferential direction thereof. In addition, the outer peripheral ring 2000 is formed on its outer peripheral surface with a concave portion 2220 for introducing fluid.

Here, note that the outer peripheral ring 2000 according to this reference example is constructed such that the abutment joint portion 2100 and the concave portion 2220 as mentioned above are formed on an annular member of which the cross section is rectangular. However, this is only an explanation of the shape thereof, but does not necessarily mean that an annular member of a rectangular cross section is used as a material, and processing to form the abutment joint portion 2100 and the concave portion 2220 is applied to this material. Of course, after an annular member of a rectangular cross section has been molded or formed, the abutment joint portion 2100 and the concave portion 2220 can also be obtained by means of cutting work. However, for example, after molding or forming a member which has the abutment joint portion 2100 in advance, the concave portion 2220 may be obtained by means of cutting work. In this manner, the method of production thereof is not limited in particular.

Figure 95:
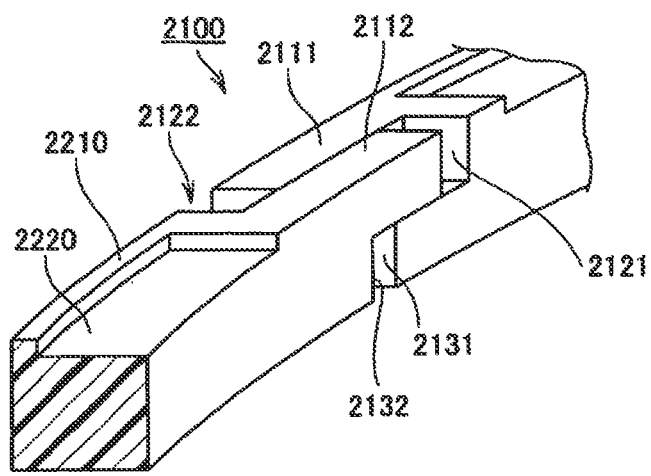
FIG. 95 is a partially broken perspective view of the outer peripheral ring according to the thirteenth reference example of the present disclosure.
Figure 96:
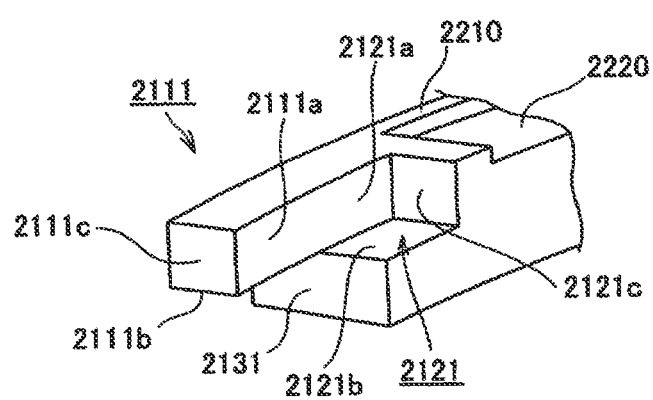
FIG. 96 is a perspective view of the vicinity of an abutment joint portion on the outer peripheral ring according to the thirteenth reference example of the present disclosure.
Figure 97:
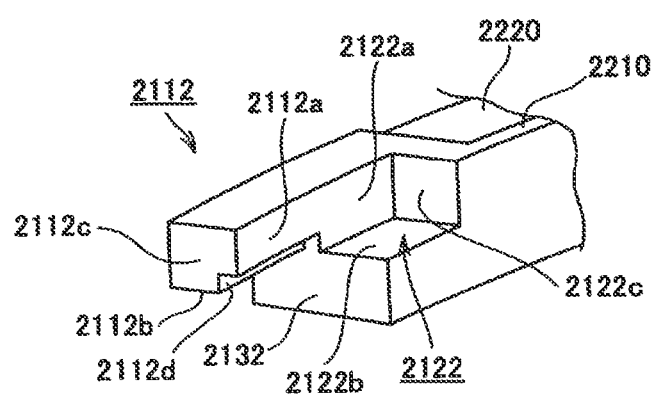
FIG. 97 is a perspective view of the vicinity of the abutment joint portion on the outer peripheral ring according to the thirteenth reference example of the present disclosure.

Hereinafter, the abutment joint portion 2100 will be described in more detail with particular reference to FIG. 95 through FIG. 97. FIG. 95 is a perspective view showing the vicinity of the abutment joint portion 2100, and FIG. 96 is a perspective view showing one side of a cut portion in the abutment joint portion 2100, and FIG. 97 is a perspective view showing the other side of the cut portion in the abutment joint portion 2100.

The abutment joint portion 2100 adopts a so-called special step cut which is formed by being cut in a stepwise shape even when seen from any of an outer peripheral surface side and opposite side wall surface sides thereof. Here, note that in the case of a special step cut, there is a characteristic of maintaining stable sealing performance even if the peripheral length of the outer peripheral ring 2000 is changed due to thermal expansion and contraction.

The abutment joint portion 2100 has a first engagement convex portion 2111 formed at the low pressure side and a first engagement concave portion 2121 formed at the high pressure side, on an outer peripheral side at one side thereof of the cut portion. In addition, the abutment joint portion 2100 also has a second engagement concave portion 2122 formed at the low pressure side into which the first engagement convex portion 2111 is engaged, and a second engagement convex portion 2112 formed at the high pressure side which is engaged into the first engagement concave portion 2121, on the outer peripheral side at the other side thereof of the cut portion.

Here, note that the "high pressure side" referred to herein is a high pressure side (H) in the case where the outer peripheral ring 2000 is fitted in a proper direction (in a normal direction), as will be described later, and the "low pressure side" is a low pressure side (L) in the case where the outer peripheral ring 2000 is fitted in the proper direction (in the normal direction).

Here, in a state where the first engagement convex portion 2111 and the second engagement concave portion 2122 as well as the second engagement convex portion 2112 and the first engagement concave portion 2121 are in engagement with each other, respectively, a side wall surface 2111a directed to the high pressure side of the first engagement convex portion 2111 and a side wall surface 2122a directed to the low pressure side of the second engagement concave portion 2122, an inner peripheral surface 2111b of the first engagement convex portion 2111 and an outer peripheral surface 2122b of the second engagement concave portion 2122, a side wall surface 2112a directed to the low pressure side of the second engagement convex portion 2112 and a side wall surface 2121a directed to the high pressure side of the first engagement concave portion 2121, as well as an inner peripheral surface 2112b of the second engagement convex portion 2112 and an outer peripheral surface 2121b of the first engagement concave portion 2121, are in contact with each other for sliding movement relative to each other, respectively. According to such a construction, a sealing function is exhibited even with respect to any of the axial direction and the radial direction, without regard to the peripheral length of the outer peripheral ring 2000.

Then, in the outer peripheral ring 2000 according to this reference example, in cases where the outer peripheral ring 2000 is fitted in the reverse direction, a fitting direction detection concave portion 2112d, which forms a part of the flow passage through which the fluid to be sealed leaks from the high pressure side to the low pressure side, is formed between the inner peripheral surface 2112b and the side wall surface 2112a at the low pressure side in the second engagement convex portion 2112.

In this reference example, too, the concave portion 2220 is formed over the entire periphery of the outer peripheral ring 2000 except for the vicinity of the abutment joint portion 2100. The concave portion 2220 is the same as explained in the above-mentioned embodiment, and so, the detailed explanation thereof is omitted.

<Mechanism at the Time of Using the Sealing Device>

Figure 98:
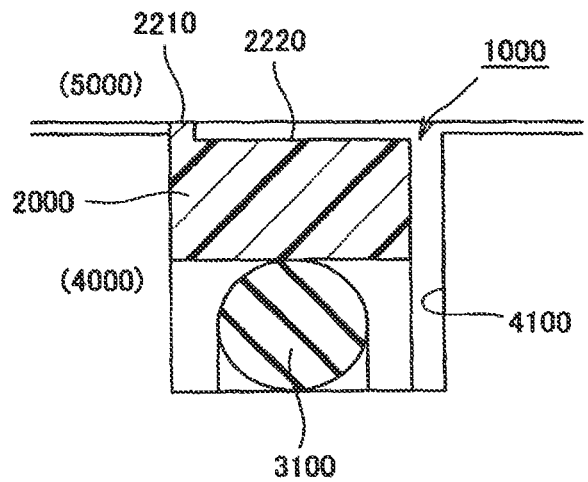
FIG. 98 is a schematic cross sectional view showing an unloaded state in the sealing device according to the thirteenth reference example of the present disclosure.
Figure 99:
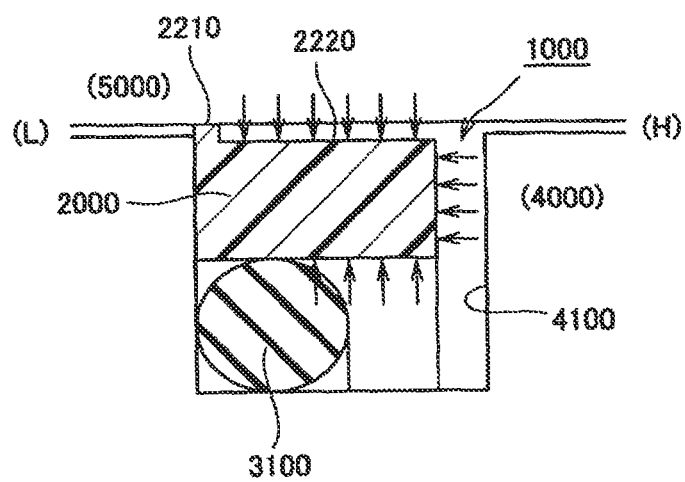
FIG. 99 is a schematic cross sectional view showing a high pressure state in the sealing device according to the thirteenth reference example of the present disclosure.

A mechanism at the time of using the sealing device 1000 according to this reference example will be explained, while referring in particular to FIG. 98 and FIG. 99. FIG. 98 shows an unloaded (or low load) state in which the engine is stopped, and there does not exist a differential pressure (or there exists substantially no differential pressure) between right-hand side region of the sealing device 1000 and left-hand side region of the sealing device 1000. FIG. 99 shows a state in which the engine is operated, and fluid pressure in the right-hand side region of the sealing device 1000 has become higher in comparison with that in the left-hand side region of the sealing device 1000.

In a state where the sealing device 1000 is fitted in the annular groove 4100, the inner peripheral ring 3100 made of a rubber-like elastic body is in intimate contact with the inner peripheral surface of the outer peripheral ring 2000 and a groove bottom surface of the annular groove 4100, respectively. Then, the inner peripheral ring 3100 exhibits a function of pushing the outer peripheral ring 2000 toward its outer peripheral surface side due to the elastic repulsion thereof.

Accordingly, even if the engine is in an unloaded state, those portions of the outer peripheral surface of the outer peripheral ring 2000 which exclude the concave portion 2220 (i.e., a low pressure side convex portion 2210 and a portion of the outer peripheral ring 2000 in the vicinity of the abutment joint portion 2100 in which the concave portion 2220 is not formed) maintain a state in which they are in contact with the inner peripheral surface of the shaft hole in the housing 5000.

Then, in a state in which the engine is started to generate a differential pressure, the outer peripheral ring 2000 is pushed to the low pressure side (L) by means of the fluid pressure from the high pressure side (H), so that it becomes a state of being in intimate contact with the side wall surface of the annular groove 4100 at the low pressure side (L), as shown in FIG. 99. Here, note that it is needless to say that the outer peripheral ring 2000 maintains the state of being in contact (sliding) with the inner peripheral surface of the shaft hole in the housing 5000. In addition, with respect to the inner peripheral ring 3100, too, it also becomes a state of being in intimate contact with the side wall surface of the annular groove 4100 at the low pressure side (L).

<Advantages of the Sealing Device According to this Reference Example>

Figure 100:
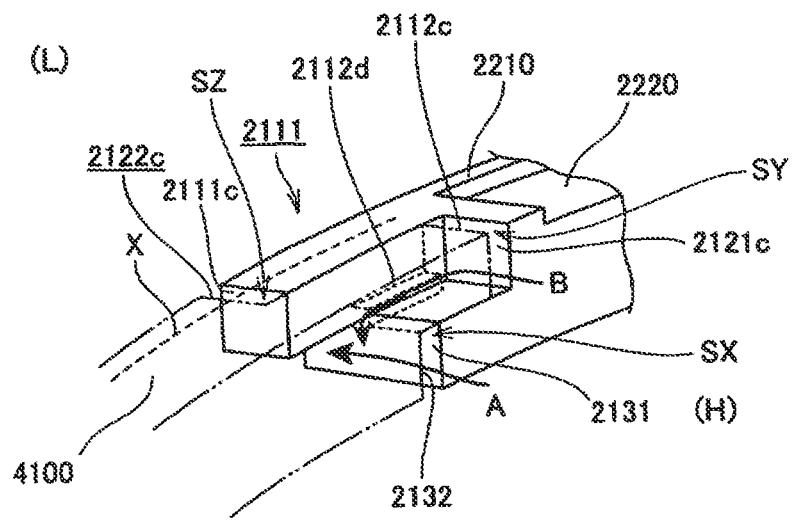
FIG. 100 is an explanatory view showing a high pressure state in the sealing device and a state where the outer peripheral ring is fitted or mounted in a normal direction according to the thirteenth reference example of the present disclosure.
Figure 101:
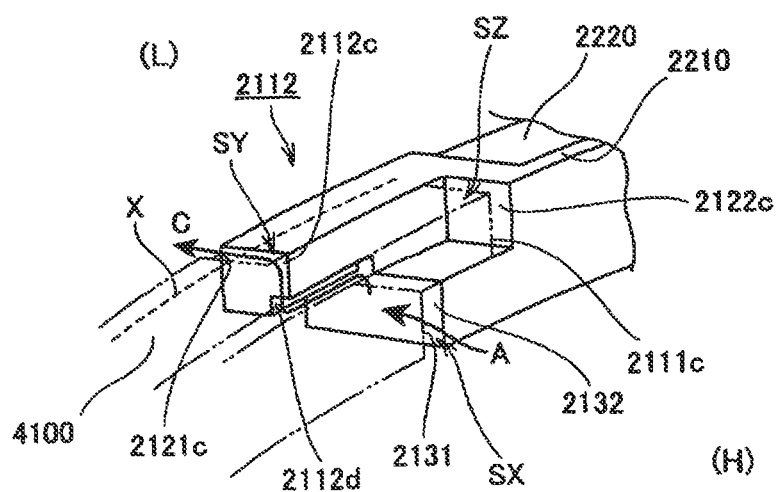
FIG. 101 is an explanatory view showing a high pressure state in the sealing device and a state where the outer peripheral ring is fitted or mounted in an opposite direction according to the thirteenth reference example of the present disclosure.

According to the sealing device 1000 and the sealing structure provided with this sealing device according to this reference example, the following advantages are achieved in comparison with the sealing device explained in the above-mentioned embodiment. That is, in the case of this reference example, too, by adopting the construction as mentioned above as the abutment joint portion 2100, similar to the case of the above-mentioned eleventh and twelfth reference examples, a confirmation as to whether the outer peripheral ring 2000 has been fitted in the normal direction or in the reverse direction can be made in a simple manner. This will be explained below with reference to FIG. 100 and FIG. 101. FIG. 100 is a perspective view looking obliquely at the vicinity of the abutment joint portion 2100 in the case of the outer peripheral ring 2000 being fitted in the normal direction, and FIG. 101 is a perspective view looking obliquely at the vicinity of the abutment joint portion 2100 in the case of the outer peripheral ring 2000 being fitted in the reverse direction. Here, note that for the sake of convenience of explanation, in FIG. 100, one side of the cut portion in the abutment joint portion 2100 is indicated by a solid line, and the other side is indicated by a broken line. In FIG. 101, the other side of the cut portion in the abutment joint portion 2100 is indicated by a solid line, and the one side is indicated by a broken line. In addition, in FIG. 100 and FIG. 101, a near or front side is the high pressure side (H), and a far or back side is the low pressure side (L). Further, in FIG. 100 and FIG. 101, a broken line X indicates the position of a boundary line between the side wall surface at the low pressure side (L) in the annular groove 4100 and an outer peripheral surface of a shaft 4000.

In a state where the first engagement convex portion 2111 and the second engagement concave portion 2122 as well as the second engagement convex portion 2112 and the first engagement concave portion 2121 are in engagement with each other, respectively, a gap SX is formed in the abutment joint portion 2100 between an end face 2131 of the outer peripheral ring at one side inner peripheral side of the cut portion, and an end face 2132 of the outer peripheral ring at the other side inner peripheral side. In addition, in a state where the first engagement convex portion 2111 and the second engagement concave portion 2122 as well as the second engagement convex portion 2112 and the first engagement concave portion 2121 are in engagement with each other, respectively, a gap SY is also formed in the abutment joint portion 2100 between a tip end face 2112c of the second engagement convex portion 2112, and an end face 2121c in the circumferential direction of the first engagement concave portion 2121. Moreover, in a state where the first engagement convex portion 2111 and the second engagement concave portion 2122 as well as the second engagement convex portion 2112 and the first engagement concave portion 2121 are in engagement with each other, respectively, a gap SZ is also formed in the abutment joint portion 2100 between a tip end face 2111c of the first engagement convex portion 2111, and an end face 2122c in the circumferential direction of the second engagement concave portion 2122.

As shown in FIG. 100, in cases where the outer peripheral ring 2000 is fitted in the normal direction, a flow passage is formed in a direction from the high pressure side (H) toward the low pressure side (L) by means of the above-mentioned gap SX (refer to an arrow A in this figure). However, similar to the case of a general special step cut, this gap SX is closed by the side wall surface at the low pressure side (L) of the annular groove 4100. Accordingly, there is formed no flow passage through which the fluid to be sealed leaks from the high pressure side (H) to the low pressure side (L). Here, note that in this reference example, the fitting direction detection concave portion 2112d is formed on the second engagement convex portion 2112, so that a flow passage is formed which passes through the fitting direction detection concave portion 2112d from the above-mentioned gap SY (refer to an arrow B in this figure). However, this flow passage, being only connected with the above-mentioned gap SX, does not form a leak passage.

In contrast to this, in cases where the outer peripheral ring 2000 is fitted in the reverse direction, as shown in FIG. 101, the above-mentioned gap SX, the fitting direction detection concave portion 2112d, and the gap SY will become a state of being connected with one another. For that reason, the fluid to be sealed flowing in the direction of an arrow A passes through the fitting direction detection concave portion 2112d, and flows into the gap SY (refer to an arrow C in this figure). In this manner, in cases where the outer peripheral ring 2000 is fitted in the reverse direction, there is formed a flow passage through which the fluid to be sealed leaks from the high pressure side (H) to the low pressure side (L).

Accordingly, by measuring an amount of leakage of fluid in a state where differential pressure has been generated, it becomes possible to simply make a confirmation as to whether the outer peripheral ring 200 has been fitted in the normal direction or in the reverse direction.

<Modification of the Thirteenth Reference Example>

Figure 102:
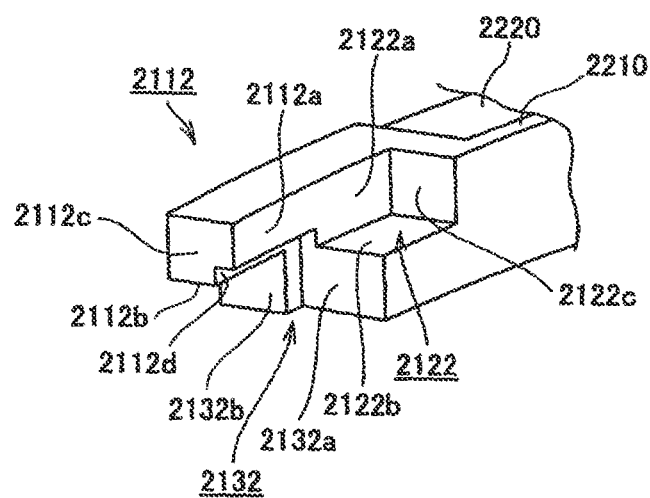
FIG. 102 is a perspective view of the vicinity of an abutment joint portion on an outer peripheral ring according to a modification of the thirteenth reference example of the present disclosure.

A modification of the thirteenth reference example of the present disclosure is shown in FIG. 102. In this modification, a modified form of the abutment joint portion of the outer peripheral ring is shown in the construction shown in the above-mentioned thirteenth reference example. The other construction and operation of this modification are the same as those in the above-mentioned thirteenth reference example, and hence, the same component parts are denoted by the same reference numerals and characters, and the explanation thereof is omitted.

In an outer peripheral ring 2000 according to this modification, too, an abutment joint portion 2100 is formed on the outer peripheral ring 2000 at one place in a circumferential direction thereof. Then, the basic construction of the abutment joint portion 2100 in the outer peripheral ring 2000 according to this modification is the same as that of the above-mentioned thirteenth reference example. However, in the case of this modification, in the abutment joint portion 2100, the end face 2132 at the other side inner peripheral side of the cut portion is formed into a stepped surface. That is, the end face 2132 is composed of the stepped surface which has a low pressure side end face 2132a and a high pressure side end face 2132b protruded in the circumferential direction more than the low pressure side end face 2132a. The other construction in the abutment joint portion 2100, the construction with respect to the concave portion 2220, and the feature that the outer peripheral ring 2000 together with the inner peripheral ring 3100 is fitted into the annular groove 4100 are the same as those in the above-mentioned thirteenth reference example.

In this modification, the high pressure side end face 2132b protrudes in the circumferential direction, so the distance from this high pressure side end face 2132b to the tip end face 2112c of the second engagement convex portion 2112 becomes short. For this reason, even if the end face 2131 at one side inner peripheral side of the cut portion and the high pressure side end face 2132b at the other side inner peripheral side are in intimate contact with each other, there will be formed the gap SY as explained in the above-mentioned thirteenth reference example. In addition, because the end face 2132 is composed of the stepped surface, even if the end face 2131 at one side inner peripheral side of the cut portion and the high pressure side end face 2132b at the other side inner peripheral side are in intimate contact with each other, a gap is formed, within the gap SX explained in the above-mentioned thirteenth reference example, between the end face 2131 of the outer peripheral ring at one side inner peripheral side of the cut portion, and the low pressure side end face 2132a of the outer peripheral ring at the other side inner peripheral side. Accordingly, in cases where the outer peripheral ring 2000 is fitted in the reverse direction, even if the end face 2131 at one side inner peripheral side of the cut portion and the high pressure side end face 2132b at the other side inner peripheral side are in intimate contact with each other, a flow passage is formed through which the fluid to be sealed leaks from the high pressure side (H) to the low pressure side (L).

Accordingly, by measuring an amount of leakage of fluid in a state where differential pressure has been generated, it becomes possible to make a confirmation as to whether the outer peripheral ring 2000 has been fitted in the normal direction or in the reverse direction, in a more reliable manner.

Fourteenth Reference Example

Summary

A sealing device according to a fourteenth reference example of the present disclosure, which is fitted into an annular groove formed in an outer periphery of a shaft so as to seal an annular gap between said shaft and a housing which rotate relative to each other, thereby to hold a fluid pressure in a region to be sealed which is constructed such that the fluid pressure therein changes, comprising: an outer peripheral ring made of resin that is in intimate contact with a side wall surface of said annular groove at a low pressure side thereof, and slides with respect to an inner peripheral surface of a shaft hole in said housing through which said shaft is inserted; and an inner peripheral ring made of a rubber-like elastic body that is in intimate contact with an inner peripheral surface of said outer peripheral ring and a groove bottom surface of said annular groove, respectively, thereby to push said outer peripheral ring toward an outer peripheral surface side thereof; wherein said outer peripheral ring is formed on its outer peripheral surface with a concave portion which extends from an end of a high pressure side to a position which does not arrive at an end of a low pressure side, so as to introduce fluid thereinto from the high pressure side; and wherein a fitting engagement portion is formed on said outer peripheral ring and is constructed in such a manner that in cases where said outer peripheral ring is fitted in a normal direction, said fitting engagement portion is in fitting engagement with a fitted engagement portion formed in said annular groove so that said outer peripheral ring is fitted in a correct posture, whereas in cases where said outer peripheral ring is fitted in a reverse direction, said fitting engagement portion is not in fitting engagement with said fitted engagement portion so that said outer peripheral ring is not fitted in the correct posture.

In addition, a sealing structure according to the fourteenth reference example of the present disclosure, which is provided with: a shaft and a housing that rotate relative to each other; and a sealing device that is fitted into an annular groove formed in an outer periphery of said shaft so as to seal an annular gap between said shaft and said housing, thereby to hold a fluid pressure in a region to be sealed which is constructed such that the fluid pressure therein changes; wherein said sealing device comprises: an outer peripheral ring made of resin that is in intimate contact with a side wall surface of said annular groove at a low pressure side thereof, and slides with respect to an inner peripheral surface of a shaft hole in said housing through which said shaft is inserted; and an inner peripheral ring made of a rubber-like elastic body that is in intimate contact with an inner peripheral surface of said outer peripheral ring and a groove bottom surface of said annular groove, respectively, thereby to push said outer peripheral ring toward an outer peripheral surface side thereof; said outer peripheral ring is formed on its outer peripheral surface with a concave portion which extends from an end of a high pressure side to a position which does not arrive at an end of a low pressure side, so as to introduce fluid thereinto from the high pressure side; said annular groove is formed with a fitted engagement portion, and said outer peripheral ring is formed with a fitting engagement portion which is in fitting engagement with said fitted engagement portion; in cases where said outer peripheral ring is fitted in a normal direction, said fitting engagement portion is in fitting engagement with said fitted engagement portion so that said outer peripheral ring is fitted in a correct posture; and in cases where said outer peripheral ring is fitted in a reverse direction, said fitting engagement portion is not in fitting engagement with said fitted engagement portion so that said outer peripheral ring is not fitted in the correct posture.

According to the sealing device and the sealing structure according to this reference example, the following advantages are achieved in comparison with the sealing device and the sealing structure explained in the above-mentioned embodiment. That is, in this reference example, in cases where the outer peripheral ring is fitted in the normal direction, the fitting engagement portion is in fitting engagement with the fitted engagement portion so that the outer peripheral ring is fitted in the correct posture. However, in cases where the outer peripheral ring is fitted in the reverse direction, the fitting engagement portion is not in fitting engagement with the fitted engagement portion so that the outer peripheral ring is not fitted in the correct posture. As a result, it is possible to suppress the outer peripheral ring from being fitted in the reverse direction.

Specific Example

Figure 103:
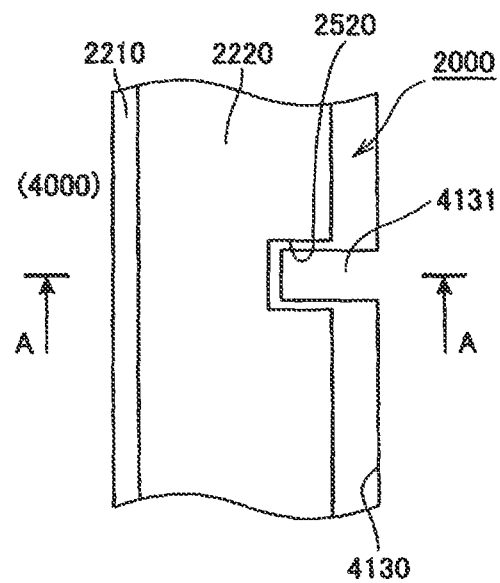
FIG. 103 is a part of a view seen from an outer peripheral surface side, showing a state where a sealing device according to a fourteenth reference example of the present disclosure is mounted or fitted in an annular groove.
Figure 104:
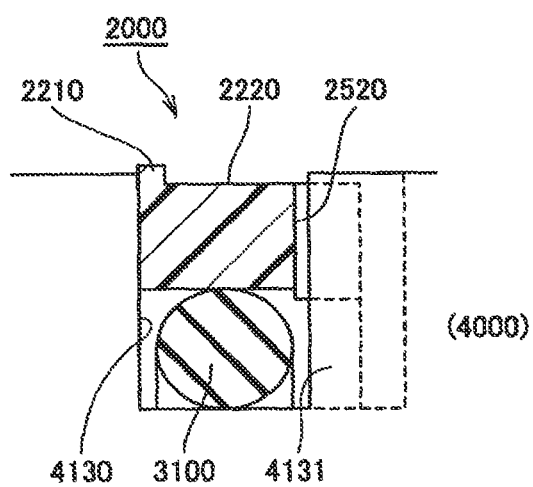
FIG. 104 is a schematic cross sectional view showing a state where the sealing device according to the fourteenth reference example of the present disclosure is mounted or fitted in the annular groove.

Hereinafter, a sealing device and a sealing structure according to the fourteenth reference example of the present disclosure will be explained more specifically while referring to FIG. 103 and FIG. 104. FIG. 103 is a part of a view seen from an outer peripheral surface side, showing a state where the sealing device according to the fourteenth reference example of the present disclosure is mounted or fitted in an annular groove, and FIG. 104 is a cross sectional view along a line AA in FIG. 103.

Here, note that the characteristic construction of the sealing device and the sealing structure according to this reference example can be applied to the above-mentioned embodiment, the first through fourth practical examples and the first through fourth and ninth reference examples. Here, an explanation will be made by taking an example of a case where it is applied to the first reference example. Here, note that the basic construction thereof is the same as that of the above-mentioned embodiment, individual reference examples and individual practical examples, and hence, the same component parts as those of the above-mentioned embodiment and examples are denoted by the same reference numerals and characters, and the explanation thereof is omitted as the case may be.

As explained in the above-mentioned eleventh reference example, in the sealing devices 1000 according to the above-mentioned embodiment, individual reference examples and individual practical examples, it is necessary to prevent the outer peripheral ring 2000 from being fitted in the reverse direction. In the above-mentioned eleventh through thirteenth reference examples, there have been shown cases where the construction of the outer peripheral ring 2000 is devised so as to confirm whether the outer peripheral ring 2000 has been fitted in the normal direction or in the reverse direction by measuring an amount of leakage of fluid in a state where differential pressure has been generated.

In contrast to this, in this reference example, there is shown a case where the construction of an outer peripheral ring 2000, etc., is devised in such a manner that the outer peripheral ring 2000 can not be mounted or fitted in the reverse direction due to its structure. Here, note that the basic construction, the operational effect and so on of this example are the same as explained in the above-mentioned first reference example, and so, the detailed explanation thereof is omitted.

In the outer peripheral ring 2000 according to this reference example, a concave portion 2520 as a fitting engagement portion is formed on a side wall surface thereof at a side opposite to a side at which a low pressure side convex portion 2210 is formed. In other words, the concave portion 2520 is formed on the side wall surface which becomes a high pressure side (H) at the time of the generation of differential pressure. Then, in an annular groove 4130, a convex portion 4131 as a fitted engagement portion is formed on a side wall surface thereof which becomes the high pressure side (H) at the time of the generation of differential pressure.

With the construction as mentioned above, at the time of fitting the outer peripheral ring 2000 into the annular groove 4130, it is possible to mount or fit the outer peripheral ring 2000 in a proper or correct posture by mounting the concave portion 2520 so as to bring it into fitting engagement with the convex portion 4131. Here, even if the outer peripheral ring 2000 is tried to be mounted in the reverse direction, the convex portion 4131 becomes obstructive, so that the outer peripheral ring 2000 can not be mounted in its correct posture. Accordingly, it is possible to prevent the outer peripheral ring 2000 from being mounted in the reverse direction by mistake. In addition, in this reference example, a locking (rotation stop) effect is also exhibited by means of the fitting engagement of the concave portion 2520 and the convex portion 4131, so that it is possible to suppress the outer peripheral ring 2000 from rotating with respect to a shaft 4000 in a more reliable manner.

Here, note that the number required for the concave portion 2520 and the convex portion 4131 is not limited in particular, and one (single) or more may be good.

Fifteenth Reference Example

A summary of description of this fifteenth reference example is the same as that of the above-mentioned fourteenth reference example, so the explanation thereof is omitted.

Specific Example

Figure 105:
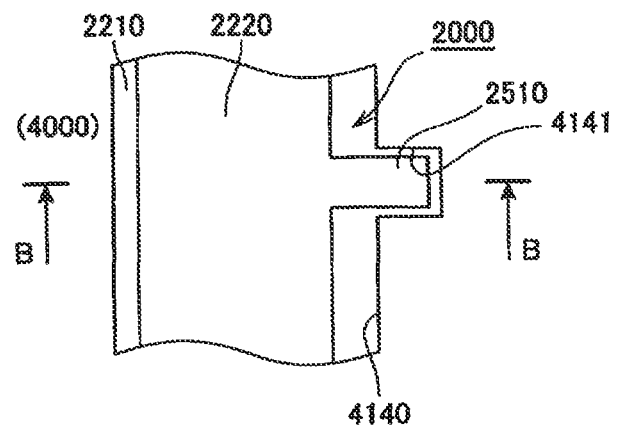
FIG. 105 is a part of a view seen from an outer peripheral surface side, showing a state where a sealing device according to a fifteenth reference example of the present disclosure is mounted or fitted in an annular groove.
Figure 106:
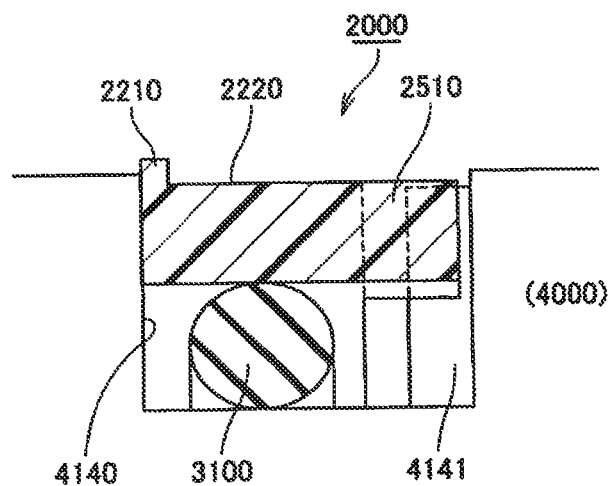
FIG. 106 is a schematic cross sectional view showing a state where the sealing device according to the fifteenth reference example of the present disclosure is mounted or fitted in the annular groove.

Hereinafter, a sealing device and a sealing structure according to the fifteenth reference example of the present disclosure will be explained more specifically while referring to FIG. 105 through FIG. 108. FIG. 105 is a part of a view seen from an outer peripheral surface side, showing a state where the sealing device according to the fifteenth reference example of the present disclosure is mounted or fitted in an annular groove, and FIG. 106 is a cross sectional view along a line BB in FIG. 105.

Here, note that the characteristic construction of the sealing device and the sealing structure according to this reference example can be applied to the above-mentioned embodiment, the first through fourth practical examples and the first through ninth reference examples. Here, an explanation will be made by taking an example of a case where it is applied to the first reference example. Here, note that the basic construction of this example is the same as that of the above-mentioned embodiment, individual reference examples and individual practical examples, and hence, the same component parts as those of the above-mentioned embodiment and examples are denoted by the same reference numerals and characters, and the explanation thereof is omitted as the case may be.

In this reference example, too, similar to the case of the above-mentioned fourteenth reference example, there is shown a case where the construction of an outer peripheral ring 2000, etc., is devised in such a manner that the outer peripheral ring 2000 can not be mounted or fitted in the reverse direction due to its structure. Here, note that the basic construction, the operational effect and so on of this example are the same as explained in the above-mentioned first reference example, and so, the detailed explanation thereof is omitted.

In the above-mentioned fourteenth reference example, there has been shown a construction in the case where the concave portion is formed in the side wall surface of the outer peripheral ring, and the convex portion is formed on the side wall surface of the annular groove, but in this reference example, there is shown a construction in the case where a convex portion is formed on a side wall surface of an outer peripheral ring, and a concave portion is formed in a side wall surface of an annular groove.

In an outer peripheral ring 2000 according to this reference example, a convex portion 2510 as a fitting engagement portion is formed on a side wall surface thereof at a side opposite to a side at which a low pressure side convex portion 2210 is formed. In other words, the convex portion 2510 is formed on the side wall surface which becomes a high pressure side (H) at the time of the generation of differential pressure. Then, in an annular groove 4140, a concave portion 4141 as a fitted engagement portion is formed in a side wall surface thereof which becomes the high pressure side (H) at the time of the generation of differential pressure. Here, note that in the illustrated example, it is constructed such that the thickness of the convex portion 2510 becomes the same as the thickness of a main body portion of the outer peripheral ring 2000. In addition, it is also constructed such that the depth of the concave portion 4141 becomes the same as the depth of the annular groove 4140.

With the construction as mentioned above, at the time of fitting the outer peripheral ring 2000 into the annular groove 4140, it is possible to mount or fit the outer peripheral ring 2000 in a proper or correct posture by mounting the convex portion 2510 so as to bring it into fitting engagement with the concave portion 4141. Here, even if the outer peripheral ring 2000 is tried to be mounted in the reverse direction, the convex portion 2510 becomes obstructive, so that the outer peripheral ring 2000 can not be mounted in its correct posture. Accordingly, it is possible to prevent the outer peripheral ring 2000 from being mounted in the reverse direction by mistake. In addition, in this reference example, too, a locking (rotation stop) effect is also exhibited by means of the fitting engagement of the convex portion 2510 and the concave portion 4141.

Here, note that the number required for the convex portion 2510 and the concave portion 4141 is not limited in particular, and one (single) or more may be good.

Figure 107:
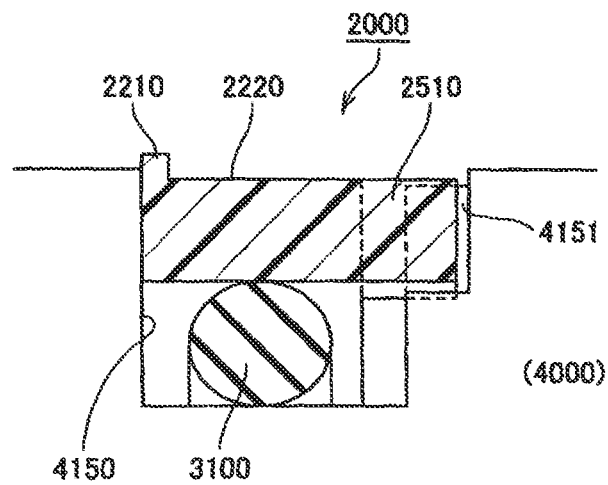
FIG. 107 is a schematic cross sectional view showing a state where the sealing device according to the fifteenth reference example of the present disclosure is mounted or fitted in the annular groove.

FIG. 107 shows a modification of the example shown in FIG. 106. Here, note that FIG. 107 corresponds to a cross section along a line BB in FIG. 105. An outer peripheral ring 2000 in this illustrated example is the same construction as the outer peripheral ring 2000 shown in FIG. 106.

Then, in the example shown in FIG. 107, too, in an annular groove 4150, a concave portion 4151 as a fitted engagement portion is formed in a side wall surface thereof which becomes the high pressure side (H) at the time of the generation of differential pressure. Unlike the case of the example shown in FIG. 106, it is constructed such that the depth of this concave portion 4151 becomes shallower than the depth of the annular groove 4150, and is set to a depth equal to about the thickness of the outer peripheral ring 2000. In this illustrated example, too, the same effects as in the case of the example shown in FIG. 106 can be obtained. In addition, in the case of this example shown in FIG. 107, there is an effect of suppressing the outer peripheral ring 2000 from inclining or tilting in a clockwise direction in this figure.

Figure 108:
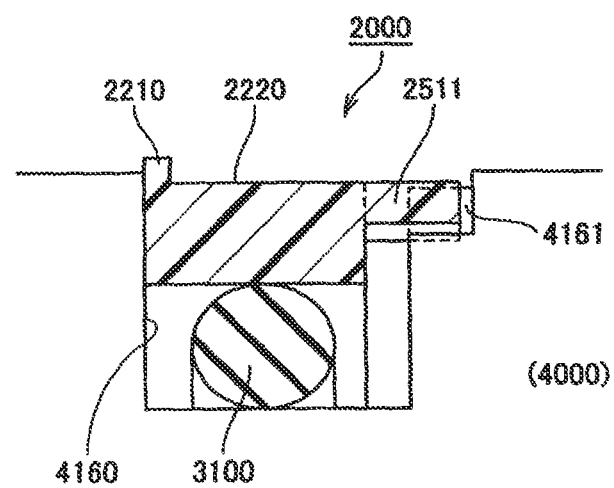
FIG. 108 is a schematic cross sectional view showing a state where the sealing device according to the fifteenth reference example of the present disclosure is mounted or fitted in the annular groove.

FIG. 108 also shows a modification of the example shown in FIG. 106. Here, note that FIG. 108 corresponds to a cross section along the line BB in FIG. 105.

In the case of an outer peripheral ring 2000 in this illustrated example, a convex portion 2511 is constructed so as to protrude only in the vicinity of an outer peripheral surface side, and the thickness of the convex portion 2511 is constructed to be thinner than the thickness of a main body portion of the outer peripheral ring 2000. In addition, the depth of a concave portion 4161 in this illustrated example is also constructed to be shallower than the depth of an annular groove 4160, and is set to a depth equal to about the thickness of the convex portion 2511. In this illustrated example, too, the same effects as in the case of the example shown in FIG. 107 can be obtained. Here, note that in the case of the example shown in FIG. 108, there may be adopted a construction in which the convex portion 2511 and the concave portion 4161 are formed so as to extend over the entire peripheries of the outer peripheral ring and the annular groove, respectively. In other words, it may be constructed such that the convex portion 2511 becomes an annular convex portion and the concave portion 4161 becomes an annular concave portion, instead of being partially formed in singularity or in plurality in a circumferential direction. In this case, although a locking (rotation stop) effect is not exhibited, there is an advantage that processing, in particular for forming the concave portion 4161, becomes easy.

Sixteenth Reference Example

A summary of description of this sixteenth reference example is the same as that of the above-mentioned fourteenth reference example, so the explanation thereof is omitted.

Specific Example

Figure 109:
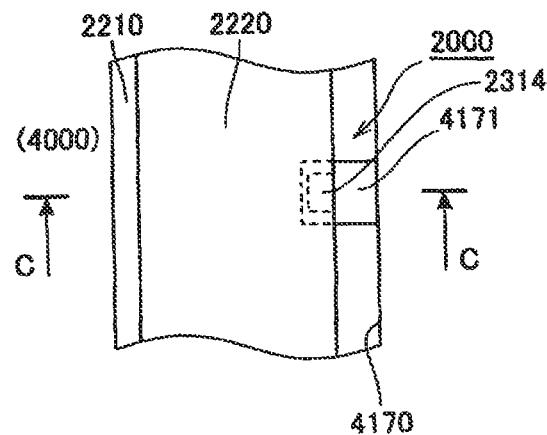
FIG. 109 is a part of a view seen from an outer peripheral surface side, showing a state where a sealing device according to a sixteenth reference example of the present disclosure is mounted or fitted in an annular groove.
Figure 110:
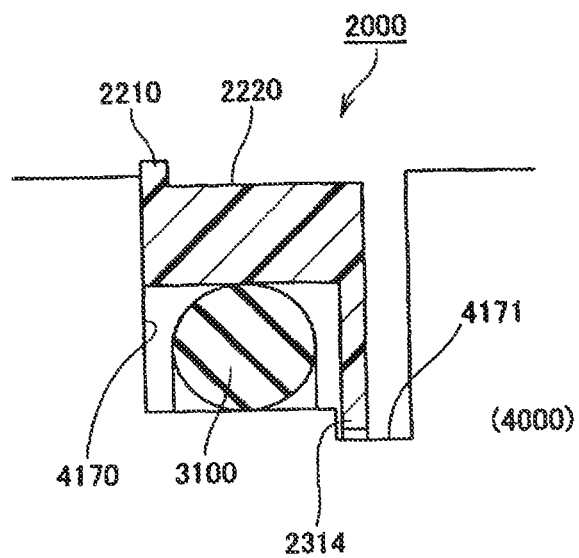
FIG. 110 is a schematic cross sectional view showing a state where the sealing device according to the sixteenth reference example of the present disclosure is mounted or fitted in the annular groove.

Hereinafter, a sealing device and a sealing structure according to the sixteenth reference example of the present disclosure will be explained while referring to FIG. 109 and FIG. 110. FIG. 109 is a part of a view seen from an outer peripheral surface side, showing a state where the sealing device according to the sixteenth reference example of the present disclosure is mounted or fitted in an annular groove, and FIG. 110 is a cross sectional view along a line CC in FIG. 109.

Here, note that the characteristic construction of the sealing device and the sealing structure according to this reference example can be applied to the above-mentioned embodiment, the first through fourth practical examples and the first through four and ninth reference examples. Here, an explanation will be made by taking an example of a case where it is applied to the first reference example. Here, note that the basic construction thereof is the same as that of the above-mentioned embodiment, individual reference examples and individual practical examples, and hence, the same component parts as those of the above-mentioned embodiment and examples are denoted by the same reference numerals and characters, and the explanation thereof is omitted as the case may be.

In this reference example, too, similar to the case of the above-mentioned fourteenth reference example, there is shown a case where the construction of an outer peripheral ring 2000, etc., is devised in such a manner that the outer peripheral ring 2000 can not be mounted or fitted in the reverse direction due to its structure. Here, note that the basic construction, the operational effect and so on of this example are the same as explained in the above-mentioned first reference example, and so, the detailed explanation thereof is omitted.

In the above-mentioned fourteenth reference example, there has been shown the construction in the case where the concave portion is formed in the side wall surface of the outer peripheral ring, and the convex portion is formed on the side wall surface of the annular groove, but in this reference example, there is shown a construction in the case where a convex portion is formed on an inner peripheral surface of an outer peripheral ring at a high pressure side, and a concave portion is formed in a groove bottom surface of an annular groove at a high pressure side.

In an outer peripheral ring 2000 according to this reference example, a convex portion 2314 as a fitting engagement portion is formed on an inner peripheral surface thereof near a side opposite to a side at which a low pressure side convex portion 2210 is formed. In other words, the convex portion 2314 is formed on the inner peripheral surface at a side which becomes a high pressure side (H) at the time of the generation of differential pressure. Then, in a groove bottom surface of an annular groove 4170, a concave portion 4171 as a fitted engagement portion is formed at a side which becomes the high pressure side (H) at the time of the generation of differential pressure.

With the construction as mentioned above, at the time of fitting the outer peripheral ring 2000 into the annular groove 4170, it is possible to mount or fit the outer peripheral ring 2000 in a proper or correct posture by mounting the convex portion 2314 so as to bring it into fitting engagement with the concave portion 4171. Here, even if the outer peripheral ring 2000 is tried to be mounted in the reverse direction, the convex portion 2314 becomes obstructive, so that the outer peripheral ring 2000 can not be mounted in its correct posture. Accordingly, it is possible to prevent the outer peripheral ring 2000 from being mounted in the reverse direction by mistake. In addition, in this reference example, too, a locking (rotation stop) effect is also exhibited by means of the fitting engagement of the convex portion 2314 and the concave portion 4171.

Here, note that the number required for the convex portion 2314 and the concave portion 4171 is not limited in particular, and one (single) or more may be good.

In addition, in the case of this reference example, there may be adopted a construction in which the convex portion 2314 and the concave portion 4171 are formed over the entire peripheries of the outer peripheral ring and the annular groove, respectively. In other words, it may be constructed such that the convex portion 2314 becomes an annular convex portion and the concave portion 4171 becomes an annular concave portion, instead of being partially formed in singularity or in plurality in a circumferential direction. In this case, although a locking (rotation stop) effect is not exhibited, there is an advantage that processing, in particular for forming the concave portion 4171, becomes easy.

Seventeenth Reference Example

A summary of description of this seventeenth reference example is the same as that of the above-mentioned fourteenth reference example, so the explanation thereof is omitted.

Specific Example

Figure 111:
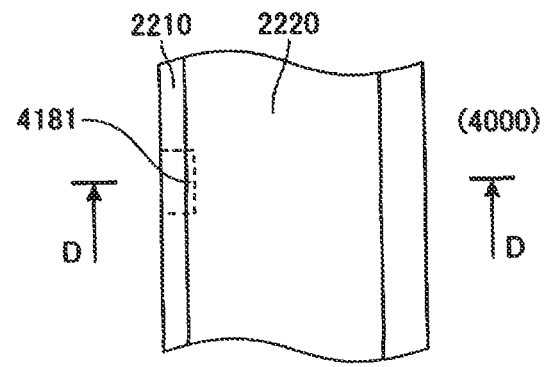
FIG. 111 is a part of a view seen from an outer peripheral surface side, showing a state where a sealing device according to a seventeenth reference example of the present disclosure is mounted or fitted in an annular groove.
Figure 112:
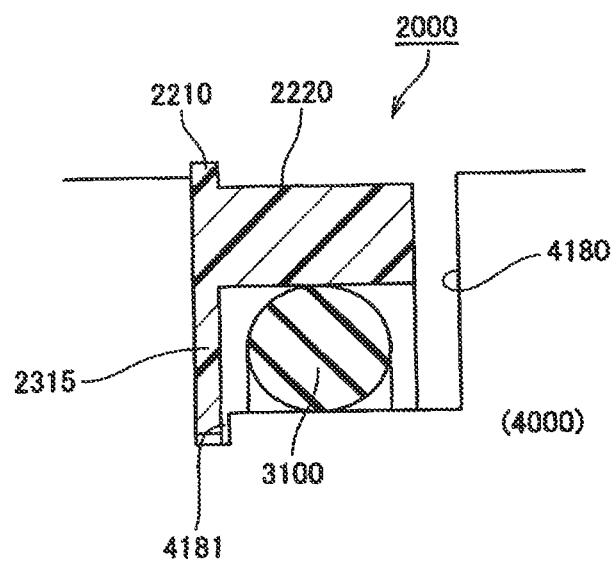
FIG. 112 is a schematic cross sectional view showing a state where the sealing device according to the seventeenth reference example of the present disclosure is mounted or fitted in the annular groove.

Hereinafter, a sealing device and a sealing structure according to the seventeenth reference example of the present disclosure will be explained while referring to FIG. 111 and FIG. 112. FIG. 111 is a part of a view seen from an outer peripheral surface side, showing a state where the sealing device according to the seventeenth reference example of the present disclosure is mounted or fitted in an annular groove, and FIG. 112 is a cross sectional view along a line DD in FIG. 111.

Here, note that the characteristic construction of the sealing device and the sealing structure according to this reference example can be applied to the above-mentioned embodiment, the first through fourth practical examples and the first through eighth and tenth reference examples. Here, an explanation will be made by taking an example of a case where it is applied to the first reference example. Here, note that the basic construction of this example is the same as that of the above-mentioned embodiment, individual reference examples and individual practical examples, and hence, the same component parts as those of the above-mentioned embodiment and examples are denoted by the same reference numerals and characters, and the explanation thereof is omitted as the case may be.

In this reference example, too, similar to the case of the above-mentioned fourteenth reference example, there is shown a case where the construction of an outer peripheral ring 2000, etc., is devised in such a manner that the outer peripheral ring 2000 can not be mounted or fitted in the reverse direction due to its structure. Here, note that the basic construction, the operational effect and so on of this example are the same as explained in the above-mentioned first reference example, and so, the detailed explanation thereof is omitted.

In the above-mentioned sixteenth reference example, there has been shown a construction in the case where the convex portion is formed on the inner peripheral surface of the outer peripheral ring at the high pressure side, and the concave portion is formed in the groove bottom surface of the annular groove at the high pressure side. In this reference example, however, there is shown a construction in the case where a convex portion is formed on an inner peripheral surface of an outer peripheral ring at a low pressure side, and a concave portion is formed in a groove bottom surface of an annular groove at a low pressure side.

In an outer peripheral ring 2000 according to this reference example, a convex portion 2315 as a fitting engagement portion is formed on an inner peripheral surface thereof near a side at which a low pressure side convex portion 2210 is formed. In other words, the convex portion 2315 is formed on the inner peripheral surface at a side which becomes a low pressure side (L) at the time of the generation of differential pressure. Then, in a groove bottom surface of an annular groove 4180, a concave portion 4181 as a fitted engagement portion is formed at a side which becomes the low pressure side (L) at the time of the generation of differential pressure.

With the construction as mentioned above, at the time of fitting the outer peripheral ring 2000 into the annular groove 4180, it is possible to mount or fit the outer peripheral ring 2000 in a proper or correct posture by mounting the convex portion 2315 so as to bring it into fitting engagement with the concave portion 4181. Here, even if the outer peripheral ring 2000 is tried to be mounted in the reverse direction, the convex portion 2315 becomes obstructive, so that the outer peripheral ring 2000 can not be mounted in its correct posture. Accordingly, it is possible to prevent the outer peripheral ring 2000 from being mounted in the reverse direction by mistake. In addition, in this reference example, too, a locking (rotation stop) effect is also exhibited by means of the fitting engagement of the convex portion 2315 and the concave portion 4181.

Here, note that the number required for the convex portion 2315 and the concave portion 4181 is not limited in particular, and one (single) or more may be good.

In addition, in the case of this reference example, there may be adopted a construction in which the convex portion 2315 and the concave portion 4181 are formed over the entire peripheries of the outer peripheral ring and the annular groove, respectively. In other words, it may be constructed such that the convex portion 2315 becomes an annular convex portion and the concave portion 4181 becomes an annular concave portion, instead of being partially formed in singularity or in plurality in a circumferential direction. In this case, although a locking (rotation stop) effect is not exhibited, there is an advantage that processing, in particular for forming the concave portion 4181, becomes easy.

Eighteenth Reference Example

Summary

A sealing device according to an eighteenth reference example of the present disclosure, which is fitted into an annular groove formed in an outer periphery of a shaft so as to seal an annular gap between said shaft and a housing which rotate relative to each other, thereby to hold a fluid pressure in a region to be sealed which is constructed such that the fluid pressure therein changes, comprising: an outer peripheral ring made of resin that is in intimate contact with a side wall surface of said annular groove at a low pressure side thereof, and slides with respect to an inner peripheral surface of a shaft hole in said housing through which said shaft is inserted; and an inner peripheral ring made of a rubber-like elastic body that is in intimate contact with an inner peripheral surface of said outer peripheral ring and a groove bottom surface of said annular groove, respectively, thereby to push said outer peripheral ring toward an outer peripheral surface side thereof; wherein said outer peripheral ring is formed on its outer peripheral surface and over an entire periphery thereof with a concave portion which extends from an end of a high pressure side to a position which does not arrive at an end of a low pressure side, so as to introduce fluid thereinto from the high pressure side.

In addition, a sealing structure according to the eighteenth reference example of the present disclosure, which is provided with: a shaft and a housing that rotate relative to each other; and a sealing device that is fitted into an annular groove formed in an outer periphery of said shaft so as to seal an annular gap between said shaft and said housing, thereby to hold a fluid pressure in a region to be sealed which is constructed such that the fluid pressure therein changes; wherein said sealing device comprises: an outer peripheral ring made of resin that is in intimate contact with a side wall surface of said annular groove at a low pressure side thereof, and slides with respect to an inner peripheral surface of a shaft hole in said housing through which said shaft is inserted; and an inner peripheral ring made of a rubber-like elastic body that is in intimate contact with an inner peripheral surface of said outer peripheral ring and a groove bottom surface of said annular groove, respectively, thereby to push said outer peripheral ring toward an outer peripheral surface side thereof; said outer peripheral ring is formed on its outer peripheral surface and over an entire periphery thereof with a concave portion which extends from an end of a high pressure side to a position which does not arrive at an end of a low pressure side, so as to introduce fluid thereinto from the high pressure side; and a protrusion portion is formed on the inner peripheral surface of said shaft hole in a position opposing to said concave portion in the case where said outer peripheral ring is fitted in a normal direction, and is constructed to protrude toward an inner peripheral surface side up to a position which does not reach a bottom surface of said concave portion, so that when said shaft is fitted into the shaft hole with said outer peripheral ring being fitted in said annular groove in a reverse direction, an outer peripheral convex portion remaining on the outer peripheral surface side of said outer peripheral ring without the formation of said concave portion is caught in so that said shaft can not be fitted in a regular position.

According to the sealing device according to this reference example, there can be obtained the same operational effects as in the sealing device explained in the above-mentioned embodiment. In addition, according to the sealing structure according to this reference example, the following advantages are achieved in comparison with the sealing structure explained in the above-mentioned embodiment. That is, in this reference example, the protrusion portion is formed on the inner peripheral surface of the shaft hole in the housing, and hence, in cases where the outer peripheral ring has been fitted in the reverse direction by mistake, the shaft can not be mounted in the regular position. As a result, it is possible to suppress the outer peripheral ring from being fitted in the reverse direction.

Specific Example

Hereinafter, a sealing device and a sealing structure according to the eighteenth reference example of the present disclosure will be explained more specifically while referring to FIG. 113 through FIG. 118. Here, note that the basic construction of this example is the same as that of the above-mentioned embodiment, individual reference examples and individual practical examples, and hence, the same component parts as those of the above-mentioned embodiment and examples are denoted by the same reference numerals and characters, and the explanation thereof is omitted as the case may be.

A sealing device 1000 according to this reference example is composed of an outer peripheral ring 2000 made of resin, and an inner peripheral ring 3100 made of a rubber-like elastic body. The inner peripheral ring 3100 according to this reference example is a so-called O ring having a circular cross sectional shape. However, the inner peripheral ring 3100 is not limited to the O ring, but as such there can be adopted other seal rings such as a rectangular or polygonal ring, etc.

It is constructed such that in a state where the outer peripheral ring 2000 and the inner peripheral ring 3100 are combined or assembled together, a peripheral length of an outer peripheral surface of the outer peripheral ring 2000 becomes longer than a peripheral length of an inner peripheral surface of a shaft hole in a housing 5000, as explained in the above-mentioned embodiment. Here, note that for the outer peripheral ring 2000 as a single or separate member, the peripheral length of the outer peripheral surface thereof is made shorter than the peripheral length of the inner peripheral surface of the shaft hole in the housing 5000, as explained in the above-mentioned embodiment.

<Outer Peripheral Ring>

Figure 113:
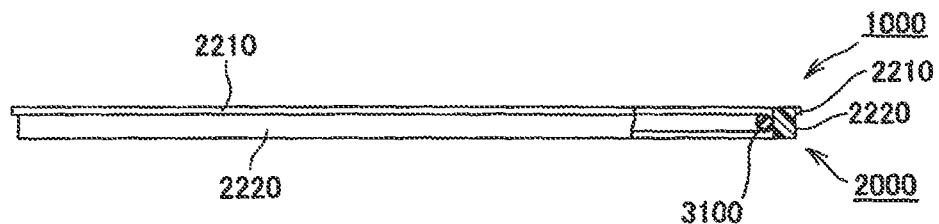
FIG. 113 is a partially broken cross sectional view of a sealing device according to an eighteenth reference example of the present disclosure.
Figure 114:
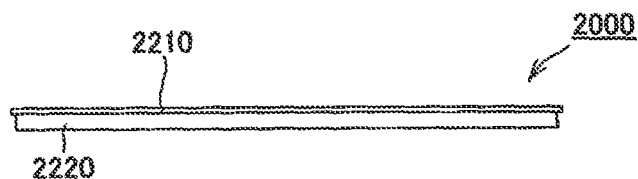
FIG. 114 is a view of an outer peripheral ring seen from an outer peripheral surface side thereof according to the eighteenth reference example of the present disclosure.
Figure 115:
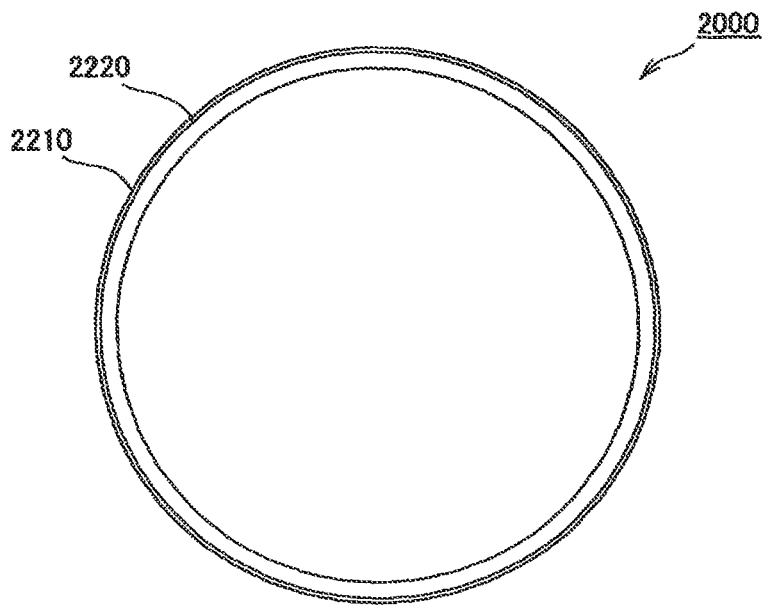
FIG. 115 is a side view of the outer peripheral ring according to the eighteenth reference example of the present disclosure.

The outer peripheral ring 2000 according to this reference example of the present disclosure will be explained in further detail while referring in particular to FIG. 113 through FIG. 115. The outer peripheral ring 2000 is formed on its outer peripheral surface and an entire periphery thereof with a concave portion 2220 for introducing fluid. In other words, the outer peripheral ring 2000 is formed at a high pressure side in its outer peripheral surface with an annular concave portion 2220.

Here, note that the outer peripheral ring 2000 according to this reference example is constructed such that the concave portion 2220 as mentioned above is formed on an annular member of which the cross section is rectangular. However, this is only an explanation of the shape thereof, but does not necessarily mean that an annular member of a rectangular cross section is used as a material, and processing to form the concave portion 2220 is applied to this material. Of course, after an annular member of a rectangular cross section has been molded or formed, the concave portion 2220 can also be obtained by means of cutting work. However, the outer peripheral ring 2000 having the concave portion 2220 may be molded or formed. In this manner, the method of production thereof is not limited in particular.

Moreover, the concave portion 2220 is formed to extend from an end of the high pressure side to a position which does not reach an end of the low pressure side. In addition, more specifically, this concave portion 2220 is formed so as to extend to the vicinity of the low pressure side end. Here, note that a bottom surface of the concave portion 2220 is composed of a surface which is concentric with an inner peripheral surface of the outer peripheral ring 2000.

Here, note that the shallower the depth of the concave portion 2220, the higher becomes the rigidity of that portion of the outer peripheral ring 2000 in which a low pressure side convex portion 2210 is formed. On the other hand, the low pressure side convex portion 2210 is worn out due to the relative sliding movement thereof, so the depth of the concave portion 2220 becomes shallower as the time elapses. For that reason, when the depth of the concave portion 2220 becomes too much shallow, it will become impossible to introduce fluid therein. Accordingly, it is desirable to set an initial depth of the concave portion 2220 by taking into consideration both the above-mentioned rigidity and the maintenance of introduction of fluid even if the wear progresses with the lapse of time. For example, in cases where the thickness of the outer peripheral ring 2000 is 1.7 mm, it is preferable to set the depth of the concave portions 2220 to be equal to or more than about 0.1 mm and equal to or less than about 0.3 mm. In addition, the narrower the width of the low pressure side convex portion 2210, the more the torque can be reduced, but if the width is made too much narrow, sealing efficiency and durability will become low. Accordingly, it is desirable to narrow the width concerned as much as possible according to service conditions, etc., to such an extent that sealing efficiency and durability can be maintained. Here, note that for example, in cases where the entire length of the width (width in the axial direction) of the outer peripheral ring 2000 is 1.9 mm, it is preferable to set the width of the low pressure side convex portion 2210 to be equal to or more than about 0.3 mm and equal to or less than about 0.7 mm.

<Mechanism at the Time of Using the Sealing Device>

Figure 116:
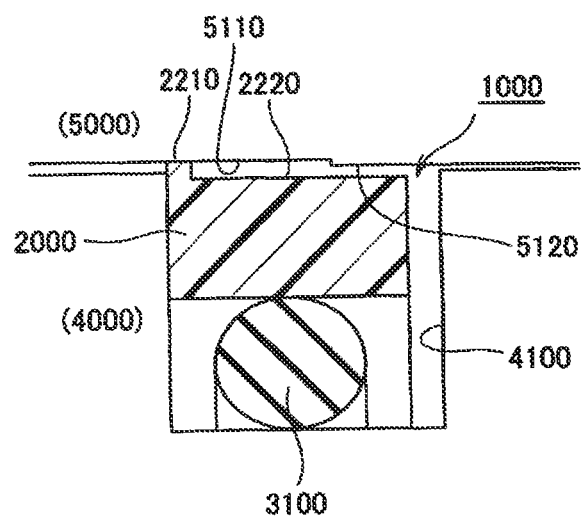
FIG. 116 is a schematic cross sectional view showing an unloaded state in the sealing device according to the eighteenth reference example of the present disclosure.
Figure 117:
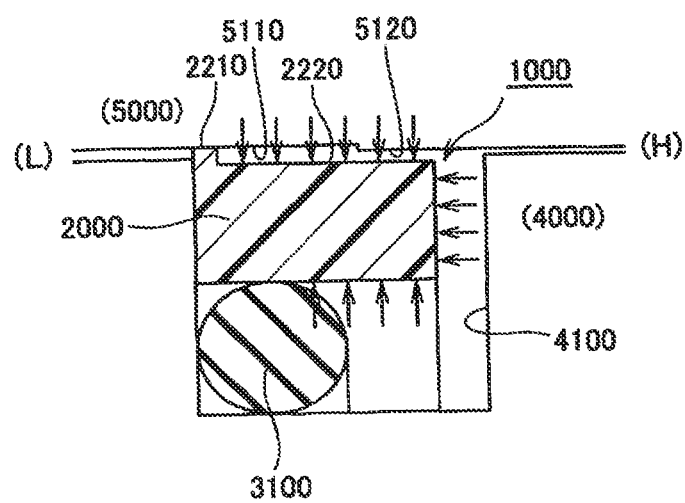
FIG. 117 is a schematic cross sectional view showing a high pressure state in the sealing device according to the eighteenth reference example of the present disclosure.
Figure 118:
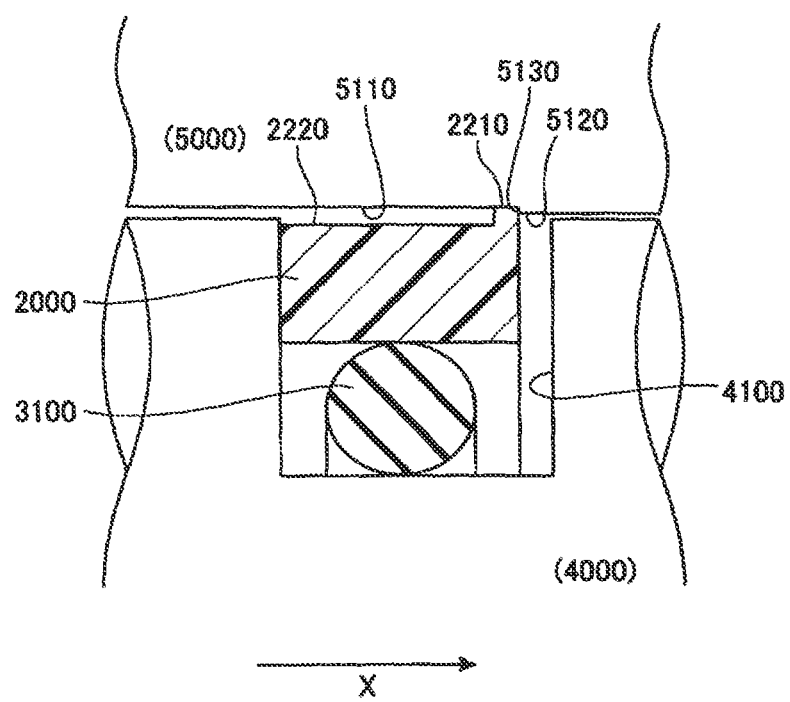
FIG. 118 is a schematic cross sectional view showing a situation when a shaft is fitted into a shaft hole in a housing in a state where the sealing device according to the eighteenth reference example of the present disclosure is fitted or mounted in an opposite direction.

A mechanism at the time of using the sealing device 1000 according to this reference example will be explained, while referring in particular to FIG. 116 and FIG. 117. FIG. 116 shows an unloaded (or low load) state in which the engine is stopped, and there does not exist a differential pressure (or there exists substantially no differential pressure) between right-hand side region of the sealing device 1000 and left-hand side region of the sealing device 1000. FIG. 117 shows a state in which the engine is operated, and fluid pressure in the right-hand side region of the sealing device 1000 has become higher in comparison with that in the left-hand side region of the sealing device 1000.

In a state where the sealing device 1000 is fitted in the annular groove 4100, the inner peripheral ring 3100 made of a rubber-like elastic body is in intimate contact with the inner peripheral surface of the outer peripheral ring 2000 and a groove bottom surface of the annular groove 4100, respectively. Then, the inner peripheral ring 3100 exhibits a function of pushing the outer peripheral ring 2000 toward its outer peripheral surface side due to the elastic repulsion thereof.

Accordingly, even if the engine is in an unloaded state, that portion of the outer peripheral surface of the outer peripheral ring 2000 which excludes the concave portion 2220 (i.e., the low pressure side convex portion 2210) maintains a state in which they are in contact with the inner peripheral surface of the shaft hole in the housing 5000.

Then, in a state in which the engine is started to generate a differential pressure, the outer peripheral ring 2000 is pushed to the low pressure side (L) by means of the fluid pressure from the high pressure side (H), so that it becomes a state of being in intimate contact with the side wall surface of the annular groove 4100 at the low pressure side (L), as shown in FIG. 117. Here, note that it is needless to say that the outer peripheral ring 2000 maintains the state of being in contact (sliding) with the inner peripheral surface of the shaft hole in the housing 5000. In addition, with respect to the inner peripheral ring 3100, too, it also becomes a state of being in intimate contact with the side wall surface of the annular groove 4100 at the low pressure side (L).

<Advantages of the Sealing Device and the Sealing Structure According to this Reference Example>

According to the sealing device 1000 according to this reference example, too, there can be obtained the same operational effects as in the sealing device explained in the above-mentioned embodiment.

Here, as explained in the above-mentioned eleventh reference example, in the sealing device 1000, it is necessary to prevent the outer peripheral ring 2000 from being mounted or fitted in the reverse direction. Accordingly, in this reference example, the outer peripheral ring 2000 is prevented from being mounted or fitted in the reverse direction, by devising the structure of the inner peripheral surface of the shaft hole in the housing 5000. In the following, this feature will be described.

In this reference example, as shown in FIG. 116 and FIG. 117, there is adopted a construction in which a protrusion portion is formed on the inner peripheral surface of the shaft hole in the housing 5000 in a position opposing to the concave portion 2220 in the case where the outer peripheral ring 2000 is mounted or fitted in the normal direction. More specifically, the inner peripheral surface of the shaft hole is constructed of a surface with a step which is composed of a large diameter portion 5110 and a small diameter portion 5120 of which the inside diameter is smaller than that of the large diameter portion 5110. The large diameter portion 5110 corresponds to a part in which the low pressure side convex portion 2210 in the outer peripheral ring 2000 slides. In addition, the small diameter portion 5120 is formed in a position which is in opposition to the concave portion 2220 in the case where the outer peripheral ring 2000 is mounted in the normal direction, and the small diameter portion 5120 corresponds to the above-mentioned protrusion portion. This small diameter portion 5120 is constructed so as to protrude toward an inner peripheral surface side up to a position which does not reach the bottom surface of the concave portion 2220. With the construction as mentioned above, if a shaft 4000 is fitted into the shaft hole in a direction of an arrow X in FIG. 118, with the outer peripheral ring 2000 being fitted in the annular groove 4100 in the reverse direction, the low pressure side convex portion 2210 will be caught in or obstructed by the small diameter portion 5120 (more specifically, the stepped surface 5130 of the large diameter portion 5110 and the small diameter portion 5120). For this reason, it is impossible to mount the shaft 4000 in a regular or proper position. As a result, it is possible to know the outer peripheral ring 2000 from having been fitted into the annular groove 4100 in the reverse direction by mistake. From the above, it is possible to prevent the outer peripheral ring 2000 from being fitted in the reverse direction.

Here, note that in this reference example, there has been shown a case where the inner peripheral surface of the shaft hole is constructed of the stepped surface, as the protrusion portion formed on the inner peripheral surface of the shaft hole in the housing 5000. However, the construction of the protrusion portion is not limited to such a structure. In brief, it should be such that in cases where the shaft 4000 is fitted into the shaft hole with the outer peripheral ring 2000 being fitted in the annular groove 4100 in the reverse direction, the low pressure side convex portion 2210 is caught in the protrusion portion so that the shaft 4000 can not be fitted in the regular position. Accordingly, this protrusion portion can also be constructed of a single protrusion or a plurality of protrusions, partially formed in a circumferential direction. In addition, the protrusion portion may be constructed of a protrusion partially formed with respect to the axial direction. In this case, the protrusion may be formed in singularity or in plurality partially in the circumferential direction, or may be an annular protrusion.

In addition, in order to improve the mountability (fitting ability or easiness) of the outer peripheral ring 2000, an abutment joint portion such as a straight cut, a bias cut, etc., may be formed at one place in the outer peripheral ring 2000 in the circumferential direction.

Nineteenth Reference Example

Summary

A sealing device according to a nineteenth reference example of the present disclosure, which is fitted into an annular groove formed in an outer periphery of a shaft so as to seal an annular gap between said shaft and a housing which rotate relative to each other, thereby to hold a fluid pressure in a region to be sealed which is constructed such that the fluid pressure therein changes, comprising: an outer peripheral ring made of resin that is in intimate contact with a side wall surface of said annular groove at a low pressure side thereof, and slides with respect to an inner peripheral surface of a shaft hole in said housing through which said shaft is inserted; and an inner peripheral ring made of a rubber-like elastic body that is in intimate contact with an inner peripheral surface of said outer peripheral ring and a groove bottom surface of said annular groove, respectively, thereby to push said outer peripheral ring toward an outer peripheral surface side thereof; wherein said outer peripheral ring is formed on its outer peripheral surface with a concave portion which extends from an end of a high pressure side to a position which does not arrive at an end of a low pressure side, so as to introduce fluid thereinto from the high pressure side.

Then, said inner peripheral ring is an annular member of which the cross section cut by a plane including an axis thereof is a V shape, and which forms an annular seal portion at one place with respect to the groove bottom surface of said annular groove, and annular seal portions at two places with respect to the inner peripheral surface of said outer peripheral ring.

According to the sealing device according to this reference example, the following advantages are achieved in comparison with the sealing device explained in the above-mentioned embodiment. That is, in this reference example, the inner peripheral ring and the outer peripheral ring are in contact with each other in a plurality of locations. For that reason, even in a state where the fluid pressure does not act, or in a state where the fluid pressure does not substantially act, the outer peripheral ring is made to be held in a stable manner. In addition, in a state where the fluid pressure is high and differential pressure is high, the inner peripheral ring will be in a state of being deformed under compression in the axial direction, as well as being moved to the low pressure side. As a result of this, the inner peripheral ring pushes the outer peripheral ring toward its outer peripheral surface side, by acting on a low pressure side portion of the inner peripheral surface in the outer peripheral ring. Accordingly, it is possible to stabilize the intimate contact of the outer peripheral ring with respect to the inner peripheral surface of the shaft hole to a further extent.

Specific Example

Hereinafter, an inner peripheral ring according to the nineteenth reference example of the present disclosure will be explained while referring to FIG. 119 and FIG. 120. Here, note that the construction and operation of this example other than the inner peripheral ring are the same as those in the above-mentioned embodiment, and hence, the same component parts as those of the above-mentioned embodiment are denoted by the same reference numerals and characters, and the explanation thereof is omitted.

An inner peripheral ring 3110 according to this reference example is composed of a rubber-like elastic body such as acrylic rubber (ACM), fluororubber (FKM), hydrogenated nitrile rubber (HNBR), etc. In addition, the inner peripheral ring 3110 according to this reference example is an annular member of which the cross section cut by a plane including an axis thereof is a V shape. Here, note that the "axis" is a central axis of the inner peripheral ring 3110, and coincides with a central axis of a shaft 4000 in a state where the inner peripheral ring 3110 has been fitted into an annular groove 4100. Moreover, the inner peripheral ring 3110 is a symmetrical shape with respect to a center plane in an axial direction thereof.

The inner peripheral ring 3110 as constructed in this manner, at the time of the use thereof, is in intimate contact with an inner peripheral surface in an outer peripheral ring 2000 and a groove bottom surface of the annular groove 4100, respectively. Then, the inner peripheral ring 3110 exhibits a function of pushing the outer peripheral ring 2000 toward its outer peripheral surface side due to the elastic repulsion thereof. In addition, the inner peripheral ring 3110 serves to form an annular seal portion 3113 at one place with respect to the groove bottom surface of the annular groove 4100, and annular seal portions 3111, 3112 at two places with respect to the inner peripheral surface of the outer peripheral ring 2000.

Figure 119:
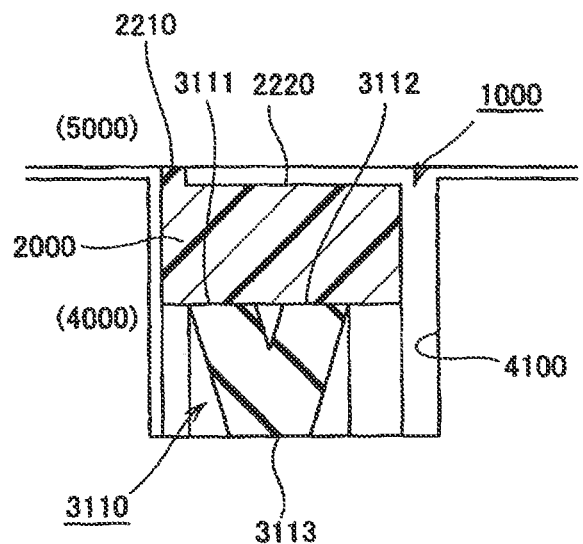
FIG. 119 is a schematic cross sectional view showing an unloaded state in a sealing device according to a nineteenth reference example of the present disclosure.
Figure 120:
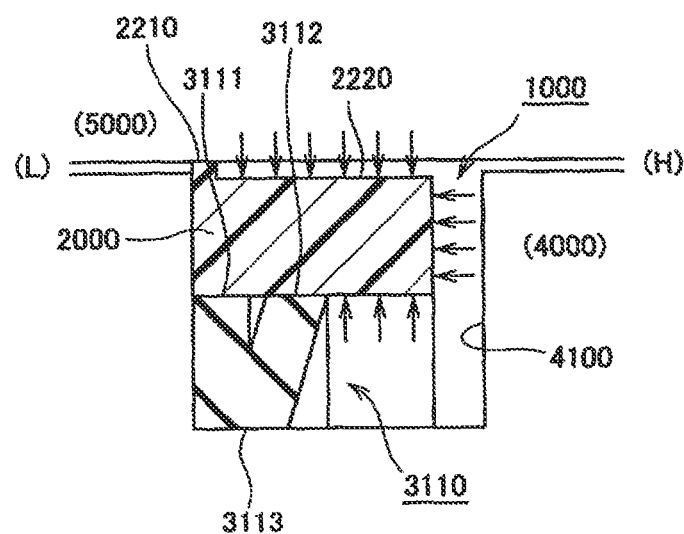
FIG. 120 is a schematic cross sectional view showing a high pressure state in the sealing device according to the nineteenth reference example of the present disclosure.

Here, in an unloaded condition, there is no differential pressure between left-hand side and right-hand side regions, as shown in FIG. 119, so that the inner peripheral ring 3110 can be in a state of being away from a side wall surface at the left side in this figure in the annular groove 4100. Then, in a state in which the engine is started to generate a differential pressure, the inner peripheral ring 3110 is pushed by means of the fluid pressure from the high pressure side (H), so that it becomes a state of being in intimate contact with the side wall surface of the annular groove 4100 at the low pressure side (L), as shown in FIG. 120. At this time, the inner peripheral ring 3110 will be in a state of being inserted or clamped between the fluid pressure at the high pressure side (H) and the side wall surface at the low pressure side (L) in the annular groove 4100, so that it is deformed in such a manner as to narrow the space or distance between the annular seal portions 3111, 3112 at two places on its outer peripheral side.

As described above, in the sealing device according to this reference example, the inner peripheral ring 3110 takes a symmetrical shape with respect to the center plane in the axial direction, so it is not necessary to take into consideration the direction of mounting or fitting at the time when the inner peripheral ring 3110 is mounted or fitted into the annular groove 4100. In addition, the inner peripheral ring 3110 and the outer peripheral ring 2000 are in contact with each other in a plurality of locations, as a result of which even in a state where the fluid pressure does not act, or in a state where the fluid pressure does not substantially act, the outer peripheral ring 2000 is made to be held in a stable manner. Moreover, in a state where the fluid pressure is high and so the differential pressure is high, the inner peripheral ring 3110 will be in a state of being deformed under compression in the axial direction, as well as being moved to the low pressure side (L). As a result of this, the inner peripheral ring 3110 pushes the outer peripheral ring 2000 toward its outer peripheral surface side, by acting on the portion at the low pressure side (L) of the inner peripheral surface in the outer peripheral ring 2000. Accordingly, it is possible to stabilize the intimate contact of the outer peripheral ring 2000 with respect to the inner peripheral surface of the shaft hole to a further extent.

Here, note that the inner peripheral ring 3110 explained in this reference example can also be applied, among the above-mentioned individual reference examples and individual practical examples, to various kinds of reference examples and practical examples in which the statement "the inner peripheral ring 3100 is not limited to the O ring, but as such there can be adopted other seal rings such as a rectangular or polygonal ring, etc." is described.

Twentieth Reference Example

Summary

A sealing device according to a twentieth reference example of the present disclosure, which is fitted into an annular groove formed in an outer periphery of a shaft so as to seal an annular gap between said shaft and a housing which rotate relative to each other, thereby to hold a fluid pressure in a region to be sealed which is constructed such that the fluid pressure therein changes, comprising: an outer peripheral ring made of resin that is in intimate contact with a side wall surface of said annular groove at a low pressure side thereof, and slides with respect to an inner peripheral surface of a shaft hole in said housing through which said shaft is inserted; and an inner peripheral ring made of a rubber-like elastic body that is in intimate contact with an inner peripheral surface of said outer peripheral ring and a groove bottom surface of said annular groove, respectively, thereby to push said outer peripheral ring toward an outer peripheral surface side thereof; wherein said outer peripheral ring is formed on its outer peripheral surface with a concave portion which extends from an end of a high pressure side to a position which does not arrive at an end of a low pressure side, so as to introduce fluid thereinto from the high pressure side.

Then, said inner peripheral ring is an annular member of which the cross section cut by a plane including an axis thereof is an X shape, and which forms annular seal portions at two places with respect to the groove bottom surface of said annular groove, and annular seal portions at two places with respect to the inner peripheral surface of said outer peripheral ring.

According to the sealing device according to this reference example, the following advantages are achieved in comparison with the sealing device explained in the above-mentioned embodiment. That is, in this reference example, by forming the inner peripheral ring in such a manner that the cross section thereof cut by a plane including an axis thereof takes an X shape, it is possible to make it difficult for a twist to occur at the time when the inner peripheral ring is fitted into the annular groove. In addition, the inner peripheral ring is in contact, at two places, with each of the outer peripheral ring and the groove bottom surface, so that it is possible to reduce a deviation in the distribution of the pushing pressure or force by the inner peripheral ring with respect to the inner peripheral surface of the outer peripheral ring. Accordingly, even in a state where the fluid pressure does not act, or in a state where the fluid pressure does not substantially act, or even in a state where the fluid pressure is high and differential pressure is high, the outer peripheral ring is held in a stable manner.

Specific Example

Hereinafter, an inner peripheral ring according to the twentieth reference example of the present disclosure will be explained while referring to FIG. 121 and FIG. 122. Here, note that the construction and operation of this example other than the inner peripheral ring are the same as those in the above-mentioned embodiment, and hence, the same component parts as those of the above-mentioned embodiment are denoted by the same reference numerals and characters, and the explanation thereof is omitted.

An inner peripheral ring 3120 according to this reference example is composed of a rubber-like elastic body such as acrylic rubber (ACM), fluororubber (FKM), hydrogenated nitrile rubber (HNBR), etc. In addition, the inner peripheral ring 3120 according to this reference example is an annular member of which the cross section cut by a plane including an axis thereof is an X shape. Here, note that the "axis" is a central axis of the inner peripheral ring 3120, and coincides with a central axis of a shaft 4000 in a state where the inner peripheral ring 3120 has been fitted into an annular groove 4100. Moreover, the inner peripheral ring 3120 is a symmetrical shape with respect to a center plane in an axial direction thereof.

The inner peripheral ring 3120 as constructed in this manner, at the time of the use thereof, is in intimate contact with an inner peripheral surface in an outer peripheral ring 2000 and a groove bottom surface of the annular groove 4100, respectively. Then, the inner peripheral ring 3120 exhibits a function of pushing the outer peripheral ring 2000 toward its outer peripheral surface side due to the elastic repulsion thereof. In addition, the inner peripheral ring 3120 serves to form annular seal portions 3123, 3124 at two places with respect to the groove bottom surface of the annular groove 4100, and annular seal portions 3121, 3122 at two places with respect to the inner peripheral surface of the outer peripheral ring 2000.

Figure 121:
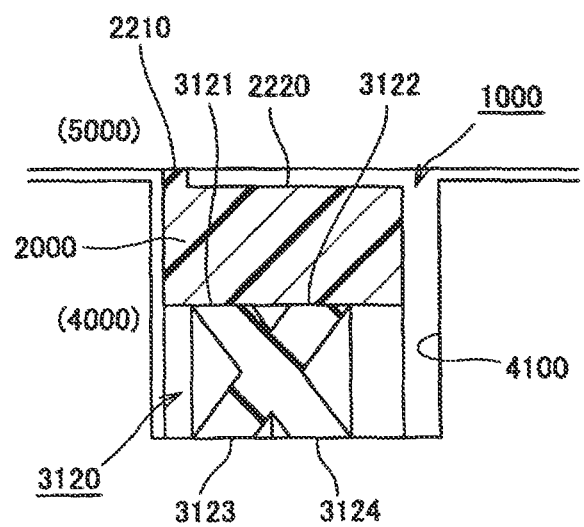
FIG. 121 is a schematic cross sectional view showing an unloaded state in a sealing device according to a twentieth reference example of the present disclosure.
Figure 122:
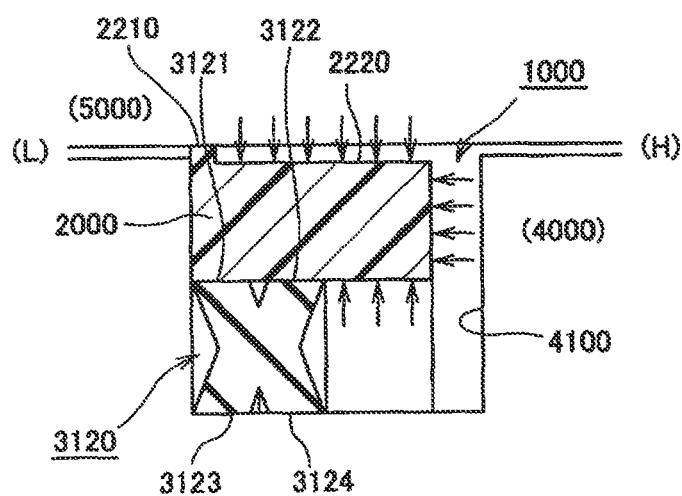
FIG. 122 is a schematic cross sectional view showing a high pressure state in the sealing device according to the twentieth reference example of the present disclosure.

Here, in an unloaded condition, there is no differential pressure between left-hand side and right-hand side regions, as shown in FIG. 121, so that the inner peripheral ring 3120 can be in a state of being away from a side wall surface at the left side in this figure in the annular groove 4100. Then, in a state in which the engine is started to generate a differential pressure, the inner peripheral ring 3120 is pushed by means of the fluid pressure from the high pressure side (H), so that it becomes a state of being in intimate contact with the side wall surface of the annular groove 4100 at the low pressure side (L), as shown in FIG. 122. At this time, the inner peripheral ring 3120 will be in a state of being inserted or clamped between the fluid pressure at the high pressure side (H) and the side wall surface at the low pressure side (L) in the annular groove 4100, so that it is deformed in such a manner as to narrow the spaces or distances between the annular seal portions 3121, 3122 at two places on its outer peripheral side, and between the annular seal portions 3123, 3124 at two places on its inner peripheral side, respectively.

As described above, in the sealing device according to this reference example, by forming the inner peripheral ring 3120 in such a manner that the cross section thereof cut by the plane including the axis thereof takes the X shape, it is possible to make it difficult for a twist to occur at the time when the inner peripheral ring 3120 is fitted into the annular groove 4100. In addition, the inner peripheral ring 3120 takes a symmetrical shape with respect to the center plane in the axial direction, so it is not necessary to take into consideration the direction of mounting or fitting at the time when the inner peripheral ring 3120 is mounted or fitted into the annular groove 4100. Moreover, the inner peripheral ring 3120 is in contact, at two places, with each of the inner peripheral surface of the outer peripheral ring 2000 and the groove bottom surface of the annular groove 4100, so that it is possible to reduce a deviation in the distribution of the pushing pressure or force by the inner peripheral ring 3120 with respect to the inner peripheral surface of the outer peripheral ring 2000. Accordingly, even in a state where the fluid pressure does not act, or in a state where the fluid pressure does not substantially act, or even in a state where the fluid pressure is high and differential pressure is high, the outer peripheral ring 2000 is held in a stable manner.

Here, note that the inner peripheral ring 3120 explained in this reference example can also be applied, among the above-mentioned individual reference examples and individual practical examples, to various kinds of reference examples and practical examples in which the statement "the inner peripheral ring 3100 is not limited to the O ring, but as such there can be adopted other seal rings such as a rectangular or polygonal ring, etc." is described.

Twenty-First Reference Example

Summary

A sealing device according to a twenty-first reference example of the present disclosure, which is fitted into an annular groove formed in an outer periphery of a shaft so as to seal an annular gap between said shaft and a housing which rotate relative to each other, thereby to hold a fluid pressure in a region to be sealed which is constructed such that the fluid pressure therein changes, comprising: an outer peripheral ring made of resin that is in intimate contact with a side wall surface of said annular groove at a low pressure side thereof, and slides with respect to an inner peripheral surface of a shaft hole in said housing through which said shaft is inserted; and an inner peripheral ring made of a rubber-like elastic body that is in intimate contact with an inner peripheral surface of said outer peripheral ring and a groove bottom surface of said annular groove, respectively, thereby to push said outer peripheral ring toward an outer peripheral surface side thereof; wherein said outer peripheral ring is formed on its outer peripheral surface with a concave portion which extends from an end of a high pressure side to a position which does not arrive at an end of a low pressure side, so as to introduce fluid thereinto from the high pressure side.

Then, said inner peripheral ring is an annular member of which the cross section cut by a plane including an axis thereof is a y shape, and which forms annular seal portions at two places with respect to the groove bottom surface of said annular groove, and an annular seal portion at one place with respect to the inner peripheral surface of said outer peripheral ring; and said inner peripheral ring is disposed in such a manner that a surface thereof facing the high pressure side becomes only a tapered surface which increases in diameter from the high pressure side toward the low pressure side.

According to the sealing device according to this reference example, the following advantages are achieved in comparison with the sealing device explained in the above-mentioned embodiment. That is, in this reference example, by constructing the inner peripheral ring in the manner as mentioned above, in a state where the fluid pressure is high and differential pressure is high, a force directing to an inner peripheral surface side acts on the inner peripheral ring. For that reason, it is possible to suppress the pushing force of the inner peripheral ring with respect to the outer peripheral ring to push it toward its outer peripheral surface side. Accordingly, an increase in pressure toward the outer peripheral surface side by means of the outer peripheral ring accompanying the increase in the fluid pressure can be suppressed, thus making it possible to suppress sliding torque to a low level.

Specific Example

Hereinafter, an inner peripheral ring according to the twenty-first reference example of the present disclosure will be explained while referring to FIG. 123 and FIG. 124. Here, note that the construction and operation of this example other than the inner peripheral ring are the same as those in the above-mentioned embodiment, and hence, the same component parts as those of the above-mentioned embodiment are denoted by the same reference numerals and characters, and the explanation thereof is omitted.

An inner peripheral ring 3130 according to this reference example is composed of a rubber-like elastic body such as acrylic rubber (ACM), fluororubber (FKM), hydrogenated nitrile rubber (HNBR), etc. In addition, the inner peripheral ring 3130 according to this reference example is an annular member of which the cross section cut by a plane including an axis thereof is a y shape. Here, note that the "axis" is a central axis of the inner peripheral ring 3130, and coincides with a central axis of a shaft 4000 in a state where the inner peripheral ring 3130 has been fitted into an annular groove 4100. Also, note that it is needless to say that with respect to the cross section obtained by cutting the inner peripheral ring 3130 by the above-mentioned plane, a cross sectional shape at one side of a cut portion becomes a y-character shape, whereas a cross sectional shape at the other side becomes a shape of a mirror image with respect to the y character.

The inner peripheral ring 3130 as constructed in this manner, at the time of the use thereof, is in intimate contact with an inner peripheral surface in an outer peripheral ring 2000 and a groove bottom surface of the annular groove 4100, respectively. Then, the inner peripheral ring 3130 exhibits a function of pushing the outer peripheral ring 2000 toward its outer peripheral surface side due to the elastic repulsion thereof. In addition, the inner peripheral ring 3130 serves to form annular seal portions 3132, 3133 at two places with respect to the groove bottom surface of the annular groove 4100, and an annular seal portion 3131 at one place with respect to the inner peripheral surface of the outer peripheral ring 2000. Moreover, in this reference example, the inner peripheral ring 3130 is disposed in such a manner that a long rectilinear portion in the y character is directed to a high pressure side (H). As a result of this, a surface facing the high pressure side (H) in the inner peripheral ring 3130 becomes only a tapered surface which increases in diameter from the high pressure side (H) toward a low pressure side (L).

Figure 123:
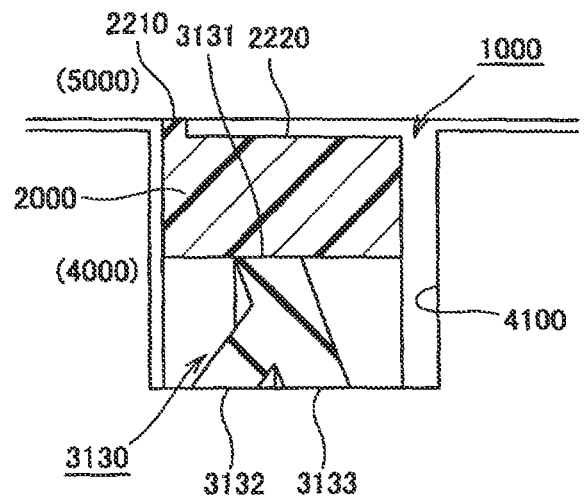
FIG. 123 is a schematic cross sectional view showing an unloaded state in a sealing device according to a twenty-first reference example of the present disclosure.
Figure 124:
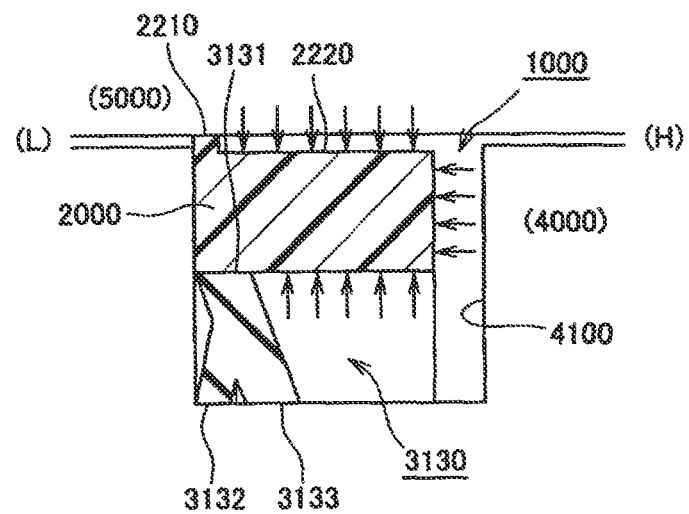
FIG. 124 is a schematic cross sectional view showing a high pressure state in the sealing device according to the twenty-first reference example of the present disclosure.

Here, in an unloaded condition, there is no differential pressure between left-hand side and right-hand side regions, as shown in FIG. 123, so that the inner peripheral ring 3130 can be in a state of being away from a side wall surface at the left side in this figure in the annular groove 4100. Then, in a state in which the engine is started to generate a differential pressure, the inner peripheral ring 3130 is pushed by means of the fluid pressure from the high pressure side (H), so that it becomes a state of being in intimate contact with the side wall surface of the annular groove 4100 at the low pressure side (L), as shown in FIG. 124. At this time, the inner peripheral ring 3130 will be in a state of being inserted or clamped between the fluid pressure at the high pressure side (H) and the side wall surface at the low pressure side (L) in the annular groove 4100, so that it is deformed in such a manner as to narrow the space or distance between the annular seal portions 3132, 3133 at two places on its inner peripheral side.

As described above, in the sealing device according to this reference example, the surface facing the high pressure side (H) in the inner peripheral ring 3130 becomes only the tapered surface which increases in diameter from the high pressure side (H) toward the low pressure side (L). As a result of this, in a state where the fluid pressure is high and differential pressure is high, a force directing to an inner peripheral surface side acts on the inner peripheral ring 3130. For that reason, it is possible to suppress the pushing force of the inner peripheral ring 3130 with respect to the outer peripheral ring 2000 to push it toward its outer peripheral surface side. Accordingly, an increase in pressure toward the outer peripheral surface side by means of the outer peripheral ring 2000 accompanying the increase in the fluid pressure can be suppressed, thus making it possible to suppress sliding torque to a low level.

Here, note that the inner peripheral ring 3130 explained in this reference example can also be applied, among the above-mentioned individual reference examples and individual practical examples, to various kinds of reference examples and practical examples in which the statement "the inner peripheral ring 3100 is not limited to the O ring, but as such there can be adopted other seal rings such as a rectangular or polygonal ring, etc." is described.

Twenty-Second Reference Example

Summary

A sealing device according to a twenty-second reference example of the present disclosure, which is fitted into an annular groove formed in an outer periphery of a shaft so as to seal an annular gap between said shaft and a housing which rotate relative to each other, thereby to hold a fluid pressure in a region to be sealed which is constructed such that the fluid pressure therein changes, comprising: an outer peripheral ring made of resin that is in intimate contact with a side wall surface of said annular groove at a low pressure side thereof, and slides with respect to an inner peripheral surface of a shaft hole in said housing through which said shaft is inserted; and an inner peripheral ring made of a rubber-like elastic body that is in intimate contact with an inner peripheral surface of said outer peripheral ring and a groove bottom surface of said annular groove, respectively, thereby to push said outer peripheral ring toward an outer peripheral surface side thereof; wherein said outer peripheral ring is formed on its outer peripheral surface with a concave portion which extends from an end of a high pressure side to a position which does not arrive at an end of a low pressure side, so as to introduce fluid thereinto from the high pressure side.

Then, said inner peripheral ring is an annular member of which the cross section cut by a plane including an axis thereof is a C-character shape, and which forms an annular seal portion at one place with respect to the groove bottom surface of said annular groove, and an annular seal portion at one place with respect to the inner peripheral surface of said outer peripheral ring; and said inner peripheral ring is disposed in such a manner that an opening side in said C character is directed to the low pressure side.

According to the sealing device according to this reference example, the following advantages are achieved in comparison with the sealing device explained in the above-mentioned embodiment. That is, in this reference example, by constructing the inner peripheral ring in the manner as mentioned above, the size of an outside diameter thereof can be set larger and the size of an inside diameter thereof can be set smaller, as compared with the case where an O ring is adopted as the inner peripheral ring, so that the areas of contact of the inner peripheral ring with respect to the outer peripheral ring and the groove bottom surface of the annular groove can be made wider. Accordingly, even in a state where the fluid pressure does not act, or in a state where the fluid pressure does not substantially act, the outer peripheral ring can be made to be held in a stable manner. In addition, the inner peripheral ring is hollow in its interior, and so, is easy to deform into an interior side. For that reason, even in a state where the fluid pressure is high and differential pressure is high, the inner peripheral ring itself is deformed, thereby making it possible to suppress the pushing force of the inner peripheral ring with respect to the outer peripheral ring to push it toward its outer peripheral surface side. Accordingly, an increase in pressure toward the outer peripheral surface side by means of the outer peripheral ring accompanying the increase in the fluid pressure can be suppressed, thus making it possible to suppress sliding torque to a low level.

Specific Example

Hereinafter, an inner peripheral ring according to the twenty-second reference example of the present disclosure will be explained while referring to FIG. 125 and FIG. 126. Here, note that the construction and operation of this example other than the inner peripheral ring are the same as those in the above-mentioned embodiment, and hence, the same component parts as those of the above-mentioned embodiment are denoted by the same reference numerals and characters, and the explanation thereof is omitted.

An inner peripheral ring 3140 according to this reference example is composed of a rubber-like elastic body such as acrylic rubber (ACM), fluororubber (FKM), hydrogenated nitrile rubber (HNBR), etc. In addition, the inner peripheral ring 3140 according to this reference example is an annular member of which the cross section cut by a plane including an axis thereof is a C shape. Here, note that the "axis" is a central axis of the inner peripheral ring 3140, and coincides with a central axis of a shaft 4000 in a state where the inner peripheral ring 3140 has been fitted into an annular groove 4100. Also, note that it is needless to say that with respect to the cross section obtained by cutting the inner peripheral ring 3140 by the above-mentioned plane, a cross sectional shape at one side of a cut portion becomes a C-character shape, whereas a cross sectional shape at the other side becomes a shape of a mirror image with respect to the C character.

The inner peripheral ring 3140 as constructed in this manner, at the time of the use thereof, is in intimate contact with an inner peripheral surface in an outer peripheral ring 2000 and a groove bottom surface of the annular groove 4100, respectively. Then, the inner peripheral ring 3140 exhibits a function of pushing the outer peripheral ring 2000 toward its outer peripheral surface side due to the elastic repulsion thereof. In addition, the inner peripheral ring 3140 serves to form an annular seal portion 3142 at one place with respect to the groove bottom surface of the annular groove 4100, and an annular seal portion 3141 at one place with respect to the inner peripheral surface of the outer peripheral ring 2000. Moreover, in this reference example, the inner peripheral ring 3140 is disposed in such a manner that an opening side in the C character is directed to a low pressure side (L).

Figure 125:
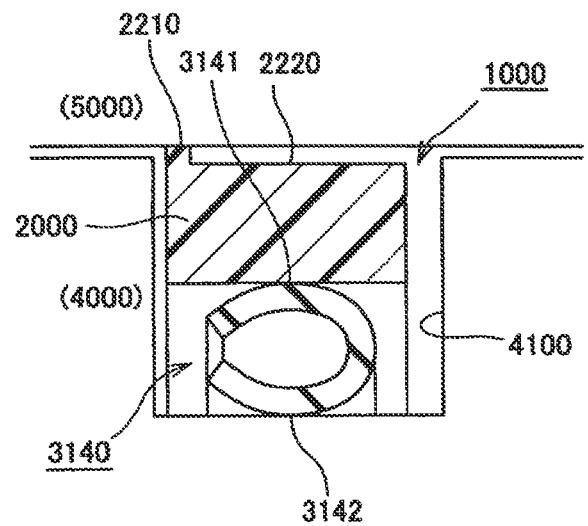
FIG. 125 is a schematic cross sectional view showing an unloaded state in a sealing device according to a twenty-second reference example of the present disclosure.
Figure 126:
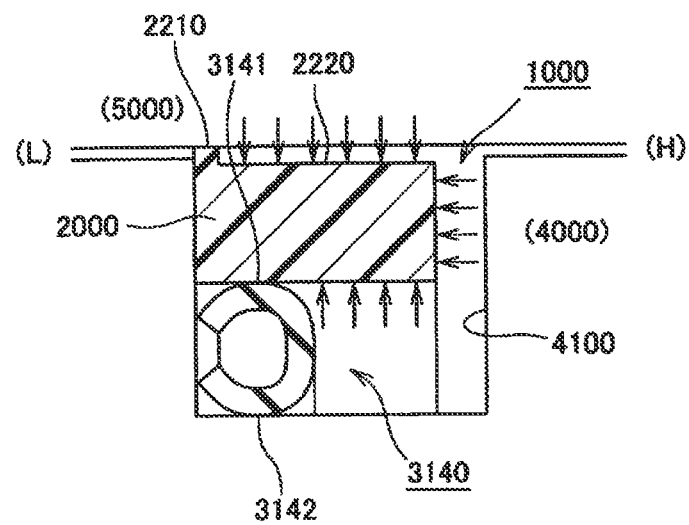
FIG. 126 is a schematic cross sectional view showing a high pressure state in the sealing device according to the twenty-second reference example of the present disclosure.

Here, in an unloaded condition, there is no differential pressure between left-hand side and right-hand side regions, as shown in FIG. 125, so that the inner peripheral ring 3140 can be in a state of being away from a side wall surface at the left side in this figure in the annular groove 4100. Then, in a state in which the engine is started to generate a differential pressure, the inner peripheral ring 3140 is pushed by means of the fluid pressure from the high pressure side (H), so that it becomes a state of being in intimate contact with the side wall surface of the annular groove 4100 at the low pressure side (L), as shown in FIG. 126. At this time, the inner peripheral ring 3140 will be in a state of being inserted or clamped between the fluid pressure at the high pressure side (H) and the side wall surface at the low pressure side (L) in the annular groove 4100, so that it is deformed to be compressed in an axial direction.

As described above, in the sealing device according to this reference example, as the inner peripheral ring 3140, there is adopted an annular member of which the cross section cut by a plane including an axis thereof is a C shape. With this, the size of an outside diameter of the inner peripheral ring 3140 can be set larger, and the size of an inside diameter thereof can be set smaller, as compared with the case where an O ring is adopted as the inner peripheral ring. As a result of this, the areas of contact of the inner peripheral ring 3140 with respect to the outer peripheral ring 2000 and the groove bottom surface of the annular groove 4100 can be made wider. Accordingly, even in a state where the fluid pressure does not act, or in a state where the fluid pressure does not substantially act, the outer peripheral ring 2000 can be made to be held in a stable manner.

In addition, the inner peripheral ring 3140 is hollow in its interior, and so, is easy to deform into an interior side. For that reason, even in a state where the fluid pressure is high and differential pressure is high, the inner peripheral ring 3140 itself is deformed, thereby making it possible to suppress the pushing force of the inner peripheral ring 3140 with respect to the outer peripheral ring 2000 to push it toward its outer peripheral surface side. Accordingly, an increase in pressure toward the outer peripheral surface side by means of the outer peripheral ring 2000 accompanying the increase in the fluid pressure can be suppressed, thus making it possible to suppress sliding torque to a low level.

Here, note that the inner peripheral ring 3140 explained in this reference example can also be applied, among the above-mentioned individual reference examples and individual practical examples, to various kinds of reference examples and practical examples in which the statement "the inner peripheral ring 3100 is not limited to the O ring, but as such there can be adopted other seal rings such as a rectangular or polygonal ring, etc." is described.

Twenty-Third Reference Example

Summary

A sealing device according to a twenty-third reference example of the present disclosure, which is fitted into an annular groove formed in an outer periphery of a shaft so as to seal an annular gap between said shaft and a housing which rotate relative to each other, thereby to hold a fluid pressure in a region to be sealed which is constructed such that the fluid pressure therein changes, comprising: an outer peripheral ring made of resin that is in intimate contact with a side wall surface of said annular groove at a low pressure side thereof, and slides with respect to an inner peripheral surface of a shaft hole in said housing through which said shaft is inserted; and an inner peripheral ring made of a rubber-like elastic body that is in intimate contact with an inner peripheral surface of said outer peripheral ring and a groove bottom surface of said annular groove, respectively, thereby to push said outer peripheral ring toward an outer peripheral surface side thereof; wherein said outer peripheral ring is formed on its outer peripheral surface with a concave portion which extends from an end of a high pressure side to a position which does not arrive at an end of a low pressure side, so as to introduce fluid thereinto from the high pressure side; and wherein said inner peripheral ring is in intimate contact with the entire inner peripheral surface of said outer peripheral ring.

According to the sealing device according to this reference example, the following advantages are achieved in comparison with the sealing device explained in the above-mentioned embodiment. That is, in this reference example, a construction is adopted in which the inner peripheral ring is in intimate contact with the entire inner peripheral surface of the outer peripheral ring. With such a construction, it is possible to suppress the fluid pressure from acting on the inner peripheral surface of the outer peripheral ring, so that sliding torque can be further suppressed to a low level. In addition, the entire inner peripheral surface of the outer peripheral ring is supported by the inner peripheral ring, so that the posture of the outer peripheral ring is stabilized.

Specific Example

Figure 127:
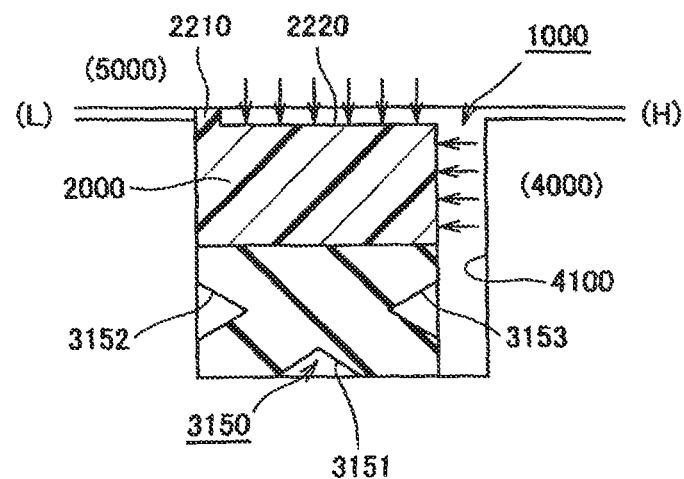
FIG. 127 is a schematic cross sectional view showing a high pressure state in a sealing device according to a twenty-third reference example of the present disclosure.

A sealing device according to the twenty-third reference example of the present disclosure will be explained, while referring to FIG. 127. FIG. 127 is a schematic cross sectional view showing a high pressure state in the sealing device according to the twenty-third reference example of the present disclosure. Here, note that an arrow in FIG. 127 shows how the fluid pressure acts with respect to the outer peripheral ring 2000.

With respect to the outer peripheral ring 2000 in this reference example, its construction is the same as that explained in the above-mentioned embodiment, and so, the detailed explanation thereof is omitted.

An inner peripheral ring 3150 according to this reference example is composed of a rubber-like elastic body such as acrylic rubber (ACM), fluororubber (FKM), hydrogenated nitrile rubber (HNBR), etc. In addition, the inner peripheral ring 3150 according to this reference example is composed of an annular member, and is formed on its inner peripheral surface side and its opposite side surface sides with annular grooves 3151, 3152, 3153, respectively. More specifically, the construction is such that the annular grooves 3151, 3152, 3153 are formed at the inner peripheral surface side and the opposite side surface sides, respectively, of a so-called rectangular ring of which the cross section is rectangular. Then, the width (the length in an axial direction) of the inner peripheral ring 3150 is designed to be the same size as the width of the outer peripheral ring 2000.

The inner peripheral ring 3150 as constructed in this manner, at the time of the use thereof, is in intimate contact with an inner peripheral surface in the outer peripheral ring 2000 and a groove bottom surface of an annular groove 4100, respectively. Then, the inner peripheral ring 3150 exhibits a function of pushing the outer peripheral ring 2000 toward its outer peripheral surface side due to the elastic repulsion thereof. In addition, the inner peripheral ring 3150 is in intimate contact with the entire inner peripheral surface of the outer peripheral ring 2000.

According to the sealing device 1000 constructed as described above, because there is adopted the construction in which the inner peripheral ring 3150 is in intimate contact with the entire inner peripheral surface of the outer peripheral ring 2000, there will be obtained the following effects in addition to the operational effects explained in the above-mentioned embodiment. That is, it is possible to suppress the fluid pressure from acting on the inner peripheral surface of the outer peripheral ring 2000. Accordingly, it is possible to suppress sliding torque to a low level to a further extent. In addition, the entire inner peripheral surface of the outer peripheral ring 2000 is supported by the inner peripheral ring 3150, so that the posture of the outer peripheral ring 2000 is stabilized.

In addition, in this reference example, because the annular grooves 3151, 3152 and 3153 are formed at the inner peripheral surface side and the opposite side surface sides, respectively, of the inner peripheral ring 3150, the repulsive force of the inner peripheral ring 3150 is reduced in an appropriate manner. As a result of this, a pressing load to the outer peripheral ring 2000 is stabilized, so that a pressure pattern (i.e., surface pressure distribution) on a sealing surface can be made uniform.

Here, note that the inner peripheral ring 3150 explained in this reference example can also be applied, among the above-mentioned individual reference examples and individual practical examples, to various kinds of reference examples and practical examples in which the statement "the inner peripheral ring 3100 is not limited to the O ring, but as such there can be adopted other seal rings such as a rectangular or polygonal ring, etc." is described.

Twenty-Fourth Reference Example

Summary

A sealing device according to a twenty-fourth reference example of the present disclosure, which is fitted into an annular groove formed in an outer periphery of a shaft so as to seal an annular gap between said shaft and a housing which rotate relative to each other, thereby to hold a fluid pressure in a region to be sealed which is constructed such that the fluid pressure therein changes, comprising: an outer peripheral ring made of resin that is in intimate contact with a side wall surface of said annular groove at a low pressure side thereof, and slides with respect to an inner peripheral surface of a shaft hole in said housing through which said shaft is inserted; and an inner peripheral ring made of a rubber-like elastic body that is in intimate contact with an inner peripheral surface of said outer peripheral ring and a groove bottom surface of said annular groove, respectively, thereby to push said outer peripheral ring toward an outer peripheral surface side thereof; wherein said outer peripheral ring is formed on its outer peripheral surface with a concave portion which extends from an end of a high pressure side to a position which does not arrive at an end of a low pressure side, so as to introduce fluid thereinto from the high pressure side; and wherein said inner peripheral ring is in intimate contact with the entire inner peripheral surface of said outer peripheral ring.

In addition, in a central position in a width direction at the outer peripheral surface side of said outer peripheral ring, there is formed an outer peripheral convex portion which extends in a circumferential direction with its outer peripheral surface being slidable with respect to the inner peripheral surface of said shaft hole; and a portion in the outer peripheral surface side of said outer peripheral ring at a higher pressure side than said outer peripheral convex portion is said concave portion.

According to the sealing device according to this reference example, the following advantages are achieved in comparison with the sealing device explained in the above-mentioned embodiment. That is, in this reference example, a construction is adopted in which the inner peripheral ring is in intimate contact with the entire inner peripheral surface of the outer peripheral ring. With such a construction, it is possible to suppress the fluid pressure from acting on the inner peripheral surface of the outer peripheral ring, so that sliding torque can be further suppressed to a low level. In addition, the entire inner peripheral surface of the outer peripheral ring is supported by the inner peripheral ring, so that the posture of the outer peripheral ring is stabilized. Further, the outer peripheral ring slides with respect to the inner peripheral surface of the shaft hole in the central position in the width direction, so that the posture of the outer peripheral ring can be stabilized to a further extent.

Specific Example

Figure 128:
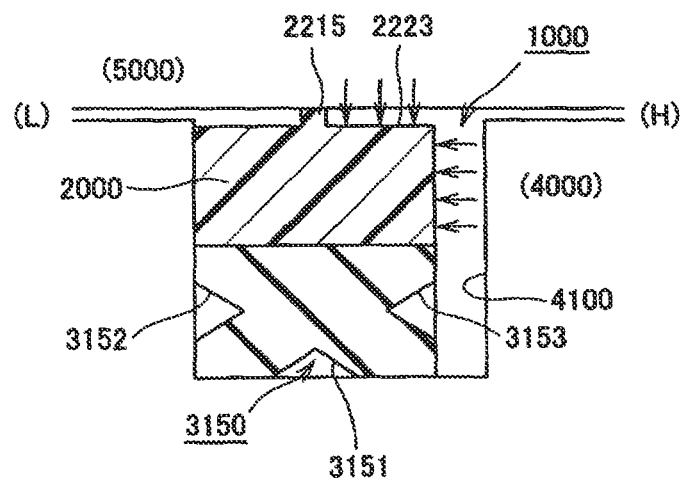
FIG. 128 is a schematic cross sectional view showing a high pressure state in a sealing device according to a twenty-fourth reference example of the present disclosure.
Figure 129:
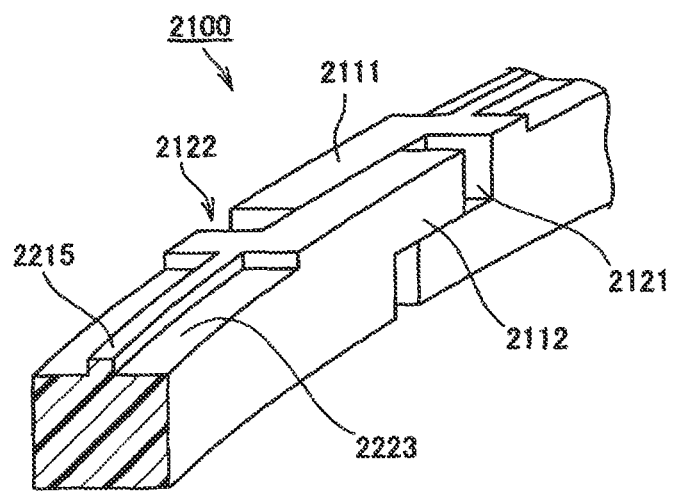
FIG. 129 is a partially broken perspective view of an outer peripheral ring according to the twenty-fourth reference example of the present disclosure.

A sealing device according to the twenty-fourth reference example of the present disclosure will be explained, while referring to FIG. 128 and FIG. 129. FIG. 128 is a schematic cross sectional view showing a high pressure state in the sealing device according to the twenty-fourth reference example of the present disclosure. FIG. 129 is a partially broken perspective view of an outer peripheral ring according to the twenty-fourth reference example of the present disclosure. Here, note that an arrow in FIG. 128 shows how the fluid pressure acts with respect to the outer peripheral ring 2000.

With respect to an inner peripheral ring 3150 according to this reference example, its construction is the same as that explained in the above-mentioned twenty-third reference example, and so, the detailed explanation thereof is omitted.

The outer peripheral ring 2000 according to this reference example is different from the outer peripheral ring explained in the above-mentioned embodiment, in that in a central position in a width direction at an outer peripheral surface side thereof, there is formed an outer peripheral convex portion 2215 which extends in a circumferential direction with its outer peripheral surface being slidable with respect to an inner peripheral surface of a shaft hole in a housing 5000. Here, note that a portion in the outer peripheral surface side of the outer peripheral ring 2000 at a higher pressure side (H) than the outer peripheral convex portion 2215 is a concave portion 2223 for introducing fluid.

In addition, in this reference example, too, similar to the above-mentioned twenty-third reference example, the width (the length in an axial direction) of the inner peripheral ring 3150 is designed to be the same size as the width of the outer peripheral ring 2000.

In the sealing device 1000 as constructed in the above manner, too, the same operational effects as in the case of the above-mentioned twenty-third reference example can be obtained.

Here, note that in the case of this reference example, a region in the outer peripheral surface side of the outer peripheral ring 2000 in which the concave portion 2223 is formed is in a position deviated toward a high pressure side (H) from the center in the width direction. Accordingly, a force by which the outer peripheral ring 2000 is pushed toward its inner peripheral surface side by means of the fluid pressure is reduced in comparison with the case of the outer peripheral ring 2000 shown in the above-mentioned embodiment. However, in the case of this reference example, the outer peripheral ring 2000 slides with respect to the inner peripheral surface of the shaft hole in the housing 5000, in the central position in the width direction, so that the posture of the outer peripheral ring 2000 can be stabilized to a further extent. In addition, in the case of the outer peripheral ring 2000 shown in the above-mentioned embodiment, it is necessary to mount or fit the outer peripheral ring 2000 in such a manner that the low pressure side convex portion 2210 is disposed at the low pressure side (L). In contrast to this, in the case of the outer peripheral ring 2000 according to this reference example, even if it is mounted or fitted in either direction, the concave portion 2223 will exist at the high pressure side (H), and hence, this outer peripheral ring 2000 is excellent in respect of mounting or fitting workability. Here, note that with respect to the setting of the width size of the outer peripheral convex portion 2215, it is the same as that in the case of the low pressure side convex portion 2210 shown in the above-mentioned embodiment. Accordingly, the feature that a sliding area between the outer peripheral ring 2000 and the inner peripheral surface of the shaft hole in the housing 5000 is sufficiently narrower than an area of intimate contact between the outer peripheral ring 2000 and the side wall surface of the annular groove 4100 at the low pressure side (L) is similar to the case of the above-mentioned embodiment.

Twenty-Fifth Reference Example

A summary of description of this twenty-fifth reference example is the same as that of the above-mentioned twenty-fourth reference example, so the explanation thereof is omitted.

Specific Example

Figure 130:
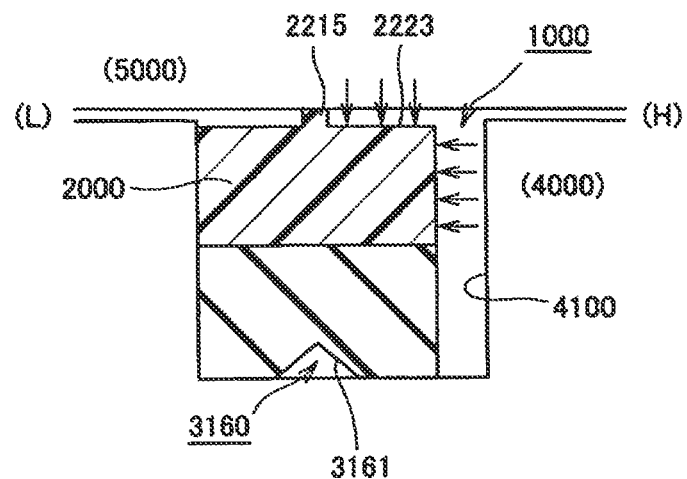
FIG. 130 is a schematic cross sectional view showing a high pressure state in a sealing device according to a twenty-fifth reference example of the present disclosure.

A sealing device according to the twenty-fifth reference example of the present disclosure will be explained, while referring to FIG. 130. FIG. 130 is a schematic cross sectional view showing a high pressure state in the sealing device according to the twenty-fifth reference example of the present disclosure. Here, note that an arrow in FIG. 130 shows how the fluid pressure acts with respect to the outer peripheral ring 2000.

With respect to an outer peripheral ring 2000 in this reference example, its construction is the same as that explained in the above-mentioned twenty-fourth reference example, and so, the detailed explanation thereof is omitted.

An inner peripheral ring 3160 according to this reference example is composed of a rubber-like elastic body such as acrylic rubber (ACM), fluororubber (FKM), hydrogenated nitrile rubber (HNBR), etc. In addition, the inner peripheral ring 3160 according to this reference example is composed of an annular member, and is formed on its inner peripheral surface side with an annular groove 3161. More specifically, the construction is such that the annular groove 3161 is formed at the inner peripheral surface side of a so-called rectangular ring of which the cross section is rectangular. Then, the width (the length in an axial direction) of the inner peripheral ring 3160 is designed to be the same size as the width of the outer peripheral ring 2000.

The inner peripheral ring 3160 as constructed in this manner, at the time of the use thereof, is in intimate contact with an inner peripheral surface in the outer peripheral ring 2000 and a groove bottom surface of an annular groove 4100, respectively. Then, the inner peripheral ring 3160 exhibits a function of pushing the outer peripheral ring 2000 toward its outer peripheral surface side due to the elastic repulsion thereof. In addition, the inner peripheral ring 3160 is in intimate contact with the entire inner peripheral surface of the outer peripheral ring 2000.

According to the sealing device 1000 as constructed in the above manner, the same operational effects as in the case of the above-mentioned twenty-fourth reference example can be obtained. Here, note that with respect to the outer peripheral ring 2000, there can also be adopted the outer peripheral ring shown in the above-mentioned embodiment.

Here, note that the inner peripheral ring 3160 explained in this reference example can also be applied, among the above-mentioned individual reference examples and individual practical examples, to various kinds of reference examples and practical examples in which the statement "the inner peripheral ring 3100 is not limited to the O ring, but as such there can be adopted other seal rings such as a rectangular or polygonal ring, etc." is described.

Twenty-Sixth Reference Example

A summary of description of this twenty-sixth reference example is the same as that of the above-mentioned twenty-fourth reference example, so the explanation thereof is omitted.

Specific Example

Figure 131:
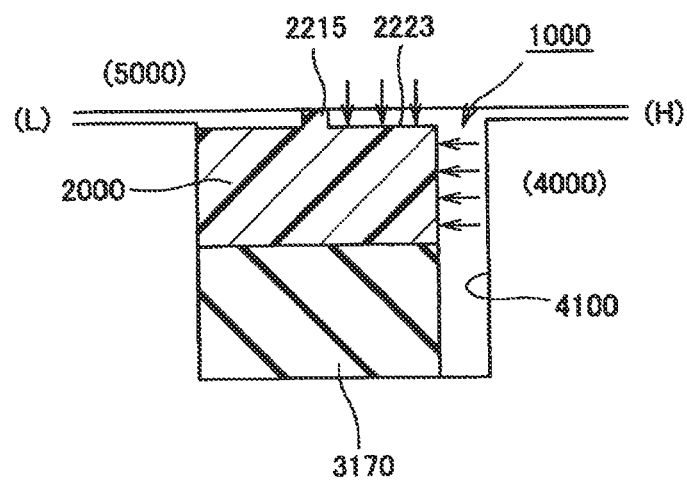
FIG. 131 is a schematic cross sectional view showing a high pressure state in a sealing device according to a twenty-sixth reference example of the present disclosure.

A sealing device according to the twenty-sixth reference example of the present disclosure will be explained, while referring to FIG. 131. FIG. 131 is a schematic cross sectional view showing a high pressure state in the sealing device according to the twenty-sixth reference example of the present disclosure. Here, note that an arrow in FIG. 131 shows how the fluid pressure acts with respect to an outer peripheral ring 2000.

With respect to the outer peripheral ring 2000 in this reference example, its construction is the same as that explained in the above-mentioned twenty-fourth reference example, and so, the detailed explanation thereof is omitted.

An inner peripheral ring 3170 according to this reference example is composed of a rubber-like elastic body such as acrylic rubber (ACM), fluororubber (FKM), hydrogenated nitrile rubber (HNBR), etc. In addition, the inner peripheral ring 3170 according to this reference example is a so-called rectangular ring of which the cross section is rectangular. Then, the width (the length in an axial direction) of the inner peripheral ring 3170 is designed to be the same size as the width of the outer peripheral ring 2000.

The inner peripheral ring 3170 as constructed in this manner, at the time of the use thereof, is in intimate contact with an inner peripheral surface in the outer peripheral ring 2000 and a groove bottom surface of an annular groove 4100, respectively. Then, the inner peripheral ring 3170 exhibits a function of pushing the outer peripheral ring 2000 toward its outer peripheral surface side due to the elastic repulsion thereof. In addition, the inner peripheral ring 3170 is in intimate contact with the entire inner peripheral surface of the outer peripheral ring 2000.

According to the sealing device 1000 as constructed in the above manner, the same operational effects as in the case of the above-mentioned twenty-fourth reference example can be obtained. Here, note that with respect to the outer peripheral ring 2000, there can also be adopted the outer peripheral ring shown in the above-mentioned embodiment.

Here, note that the inner peripheral ring 3160 explained in this reference example can also be applied, among the above-mentioned individual reference examples and individual practical examples, to various kinds of reference examples and practical examples in which the statement "the inner peripheral ring 3100 is not limited to the O ring, but as such there can be adopted other seal rings such as a rectangular or polygonal ring, etc." is described.

Twenty-Seventh Reference Example

Summary

A sealing device according to a twenty-seventh reference example of the present disclosure, which is fitted into an annular groove formed in an outer periphery of a shaft so as to seal an annular gap between said shaft and a housing which rotate relative to each other, thereby to hold a fluid pressure in a region to be sealed which is constructed such that the fluid pressure therein changes, comprising: an outer peripheral ring made of resin that is in intimate contact with a side wall surface of said annular groove at a low pressure side thereof, and slides with respect to an inner peripheral surface of a shaft hole in said housing through which said shaft is inserted; and an inner peripheral ring made of a rubber-like elastic body that is in intimate contact with an inner peripheral surface of said outer peripheral ring and a groove bottom surface of said annular groove, respectively, thereby to push said outer peripheral ring toward an outer peripheral surface side thereof; wherein said outer peripheral ring is formed on its outer peripheral surface with a concave portion which extends from an end of a high pressure side to a position which does not arrive at an end of a low pressure side, so as to introduce fluid thereinto from the high pressure side; wherein said outer peripheral ring is formed on its inner peripheral surface side with an inner peripheral convex portion which extends in a circumferential direction; and wherein said inner peripheral ring is formed on its outer peripheral surface side with a groove which is in engagement with said inner peripheral convex portion.

According to the sealing device according to this reference example, the following advantages are achieved in comparison with the sealing device explained in the above-mentioned embodiment. That is, in this reference example, there is adopted a construction in which the outer peripheral ring is formed on its inner peripheral surface side with the inner peripheral convex portion which extends in the circumferential direction, and the inner peripheral ring is formed on its outer peripheral surface side with the groove which is in engagement with this inner peripheral convex portion. Accordingly, the position of the inner peripheral ring with respect to the outer peripheral ring is settled or fixed, so that the posture of the outer peripheral ring is stabilized.

It is preferable that said inner peripheral ring be set to a size in which a gap is formed between the inner peripheral ring and the side wall surface of said annular groove at the low pressure side thereof in a state where the groove formed in the inner peripheral ring is in engagement with said inner peripheral convex portion.

With this, the inner peripheral convex portion formed on the outer peripheral ring is pushed to the low pressure side by the groove formed in the inner peripheral ring, so that a state of the outer peripheral ring being in intimate contact with the side wall surface of the annular groove at the low pressure side is maintained in a stable manner.

Specific Example

Figure 132:
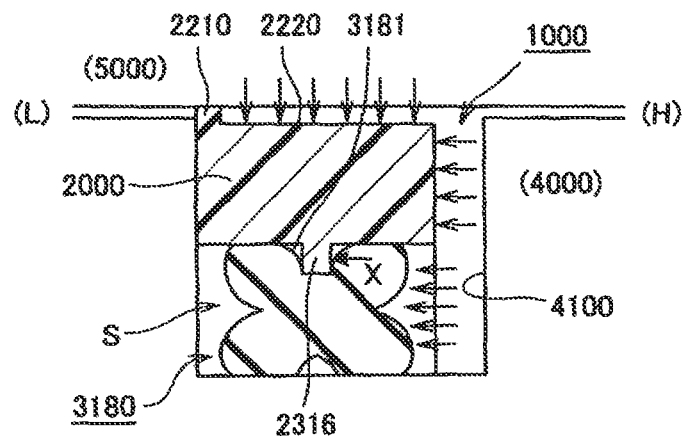
FIG. 132 is a schematic cross sectional view showing a high pressure state in a sealing device according to a twenty-seventh reference example of the present disclosure.

A sealing device according to the twenty-seventh reference example of the present disclosure will be explained, while referring to FIG. 132. FIG. 132 is a schematic cross sectional view showing a high pressure state in the sealing device according to the twenty-seventh reference example of the present disclosure. Here, note that an arrow in FIG. 132 shows how the fluid pressure acts with respect to a sealing device 1000.

In an outer peripheral ring 2000 according to this reference example, an inner peripheral convex portion 2316 extending in a circumferential direction is formed on an inner peripheral surface side thereof. The other construction of this example is the same as the construction of the outer peripheral ring 2000 explained in the above-mentioned embodiment, and hence, the same component parts as those of the above-mentioned embodiment are denoted by the same reference numerals and characters, and the explanation thereof is omitted. Here, note that the inner peripheral convex portion 2316 may be formed over an entire periphery in a circumferential direction (but excluding the vicinity of an abutment joint portion in cases where such an abutment joint portion is formed), or may be formed in plurality at intervals in the circumferential direction.

In addition, an inner peripheral ring 3180 according to this reference example is composed of a rubber-like elastic body such as acrylic rubber (ACM), fluororubber (FKM), hydrogenated nitrile rubber (HNBR), etc. Moreover, the inner peripheral ring 3180 according to this reference example is a so-called X ring of which the cross section is an X-character shape. Accordingly, it is constructed such that an annular groove 3181 is formed on an outer peripheral surface side of the inner peripheral ring 3180, so that this groove 3181 is in engagement with the inner peripheral convex portion 2316 formed on the outer peripheral ring 2000. Further, the inner peripheral ring 3180 is designed such that its width (i.e., length in the axial direction) is shorter than the width of the outer peripheral ring 2000, so that a gap S is formed between the inner peripheral ring 3180 and a side wall surface of the annular groove 4100 at a low pressure side (L) thereof in a state where the groove 3181 formed in the inner peripheral ring 3180 is in engagement with the inner peripheral convex portion 2316.

The inner peripheral ring 3180 as constructed in this manner, at the time of the use thereof, is in intimate contact with an inner peripheral surface in the outer peripheral ring 2000 and a groove bottom surface of the annular groove 4100, respectively. Then, the inner peripheral ring 3180 exhibits a function of pushing the outer peripheral ring 2000 toward its outer peripheral surface side due to the elastic repulsion thereof. In addition, in a state where differential pressure has been generated, due to a combination of the formation of the gap S and the engagement of the groove 3181 with the inner peripheral convex portion 2316, as mentioned above, the inner peripheral convex portion 2316 in the outer peripheral ring 2000 is pushed toward the low pressure side (L) (refer to an arrow X).

According to the sealing device 1000 constructed as described above, the following effects will be obtained in addition to the operational effects explained in the above-mentioned embodiment. That is, due to the engagement between the inner peripheral convex portion 2316 of the outer peripheral ring and the groove 3181 in the inner peripheral ring 3180, the position of the inner peripheral ring 3180 with respect to the outer peripheral ring 2000 is settled or fixed. Accordingly, the posture of the outer peripheral ring 2000 is made stable. In addition, as mentioned above, in a state where differential pressure has been generated, the inner peripheral convex portion 2316 is pushed to the low pressure side (L), so that the state of the outer peripheral ring 2000 being in intimate contact with the side wall surface of the annular groove 4100 at the low pressure side (L) is maintained in a stable manner.

Twenty-Eighth Reference Example

A summary of description of this twenty-eighth reference example is the same as that of the above-mentioned twenty-seventh reference example, so the explanation thereof is omitted.

Specific Example

Figure 133:
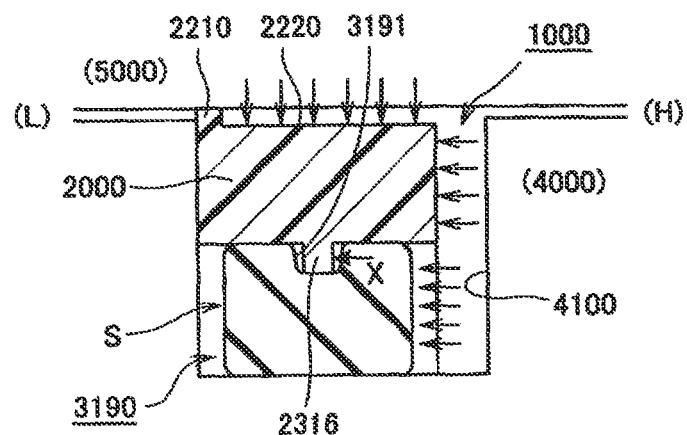
FIG. 133 is a schematic cross sectional view showing a high pressure state in a sealing device according to a twenty-eighth reference example of the present disclosure.

A sealing device according to the twenty-eighth reference example of the present disclosure will be explained, while referring to FIG. 133. FIG. 133 is a schematic cross sectional view showing a high pressure state in the sealing device according to the twenty-eighth reference example of the present disclosure. Here, note that an arrow in FIG. 133 shows how the fluid pressure acts with respect to a sealing device 1000.

With respect to an outer peripheral ring 2000 according to this reference example, its construction is the same as that explained in the above-mentioned twenty-seventh reference example, and so, the detailed explanation thereof is omitted.

In addition, an inner peripheral ring 3190 according to this reference example is composed of a rubber-like elastic body such as acrylic rubber (ACM), fluororubber (FKM), hydrogenated nitrile rubber (HNBR), etc. Moreover, the inner peripheral ring 3190 according to this reference example has a construction in which a so-called rectangular ring having a rectangular cross section is formed on its outer peripheral surface side with an annular groove 3191. Then, this groove 3191 is constructed so as to be in engagement with an inner peripheral convex portion 2316 formed on the outer peripheral ring 2000. Further, the inner peripheral ring 3190 is designed such that its width (i.e., length in the axial direction) is shorter than the width of the outer peripheral ring 2000, so that a gap S is formed between the inner peripheral ring 3190 and a side wall surface of an annular groove 4100 at a low pressure side (L) thereof in a state where the groove 3191 formed in the inner peripheral ring 3190 is in engagement with the inner peripheral convex portion 2316.

The inner peripheral ring 3190 as constructed in this manner, at the time of the use thereof, is in intimate contact with an inner peripheral surface in the outer peripheral ring 2000 and a groove bottom surface of the annular groove 4100, respectively. Then, the inner peripheral ring 3190 exhibits a function of pushing the outer peripheral ring 2000 toward its outer peripheral surface side due to the elastic repulsion thereof. In addition, in a state where differential pressure has been generated, due to a combination of the formation of the gap S and the engagement of the groove 3181 with the inner peripheral convex portion 2316, as mentioned above, the inner peripheral convex portion 2316 in the outer peripheral ring 2000 is pushed toward the low pressure side (L) (refer to an arrow X).

According to the sealing device 1000 as constructed in the above manner, the same operational effects as in the case of the above-mentioned twenty-seventh reference example can be obtained.

Twenty-Ninth Reference Example

A summary of description of this twenty-ninth reference example is the same as that of the above-mentioned twenty-seventh reference example, so the explanation thereof is omitted.

Specific Example

Figure 134:
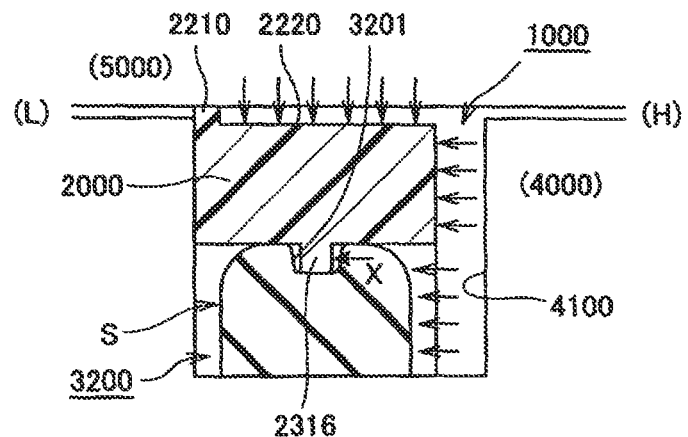
FIG. 134 is a schematic cross sectional view showing a high pressure state in a sealing device according to a twenty-ninth reference example of the present disclosure.

A sealing device according to the twenty-ninth reference example of the present disclosure will be explained, while referring to FIG. 134. FIG. 134 is a schematic cross sectional view showing a high pressure state in the sealing device according to the twenty-ninth reference example of the present disclosure. Here, note that an arrow in FIG. 134 shows how the fluid pressure acts with respect to a sealing device 1000.

With respect to an outer peripheral ring 2000 according to this reference example, its construction is the same as that explained in the above-mentioned twenty-seventh reference example, and so, the detailed explanation thereof is omitted.

In addition, an inner peripheral ring 3200 according to this reference example is composed of a rubber-like elastic body such as acrylic rubber (ACM), fluororubber (FKM), hydrogenated nitrile rubber (HNBR), etc. Moreover, the inner peripheral ring 3200 according to this reference example has a construction in which a so-called D ring having a D-character shaped cross section is formed on its outer peripheral surface side with an annular groove 3201. Then, this groove 3201 is constructed so as to be in engagement with an inner peripheral convex portion 2316 formed on the outer peripheral ring 2000. Further, the inner peripheral ring 3200 is designed such that its width (i.e., length in the axial direction) is shorter than the width of the outer peripheral ring 2000, so that a gap S is formed between the inner peripheral ring 3200 and a side wall surface of an annular groove 4100 at a low pressure side (L) thereof in a state where the groove 3201 formed in the inner peripheral ring 3200 is in engagement with the inner peripheral convex portion 2316.

The inner peripheral ring 3200 as constructed in this manner, at the time of the use thereof, is in intimate contact with an inner peripheral surface in the outer peripheral ring 2000 and a groove bottom surface of the annular groove 4100, respectively. Then, the inner peripheral ring 3200 exhibits a function of pushing the outer peripheral ring 2000 toward its outer peripheral surface side due to the elastic repulsion thereof. In addition, in a state where differential pressure has been generated, due to a combination of the formation of the gap S and the engagement of the groove 3201 with the inner peripheral convex portion 2316, as mentioned above, the inner peripheral convex portion 2316 in the outer peripheral ring 2000 is pushed toward the low pressure side (L) (refer to an arrow X).

According to the sealing device 1000 as constructed in the above manner, the same operational effects as in the case of the above-mentioned twenty-seventh reference example can be obtained.

Thirtieth Reference Example

A summary of description of this thirtieth reference example is the same as that of the above-mentioned twenty-seventh reference example, so the explanation thereof is omitted.

Specific Example

Figure 135:
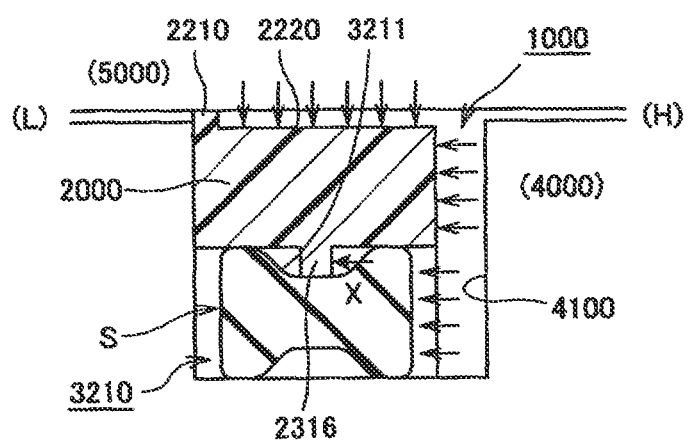
FIG. 135 is a schematic cross sectional view showing a high pressure state in a sealing device according to a thirtieth reference example of the present disclosure.

A sealing device according to the thirtieth reference example of the present disclosure will be explained, while referring to FIG. 135. FIG. 135 is a schematic cross sectional view showing a high pressure state in the sealing device according to the thirtieth reference example of the present disclosure. Here, note that an arrow in FIG. 135 shows how the fluid pressure acts with respect to a sealing device 1000.

With respect to an outer peripheral ring 2000 according to this reference example, its construction is the same as that explained in the above-mentioned twenty-seventh reference example, and so, the detailed explanation thereof is omitted.

In addition, an inner peripheral ring 3210 according to this reference example is composed of a rubber-like elastic body such as acrylic rubber (ACM), fluororubber (FKM), hydrogenated nitrile rubber (HNBR), etc. Moreover, the inner peripheral ring 3210 according to this reference example has a construction in which a so-called rectangular ring having a rectangular cross section is formed on its inner and outer peripheral surface sides with grooves, respectively. Then, a groove 3211 on the outer peripheral surface side is constructed so as to be in engagement with an inner peripheral convex portion 2316 formed on the outer peripheral ring 2000. Further, the inner peripheral ring 3210 is designed such that its width (i.e., length in the axial direction) is shorter than the width of the outer peripheral ring 2000, so that a gap S is formed between the inner peripheral ring 3210 and a side wall surface of an annular groove 4100 at a low pressure side (L) thereof in a state where the groove 3211 formed in the inner peripheral ring 3210 is in engagement with the inner peripheral convex portion 2316.

The inner peripheral ring 3210 as constructed in this manner, at the time of the use thereof, is in intimate contact with an inner peripheral surface in the outer peripheral ring 2000 and a groove bottom surface of the annular groove 4100, respectively. Then, the inner peripheral ring 3210 exhibits a function of pushing the outer peripheral ring 2000 toward its outer peripheral surface side due to the elastic repulsion thereof. In addition, in a state where differential pressure has been generated, due to a combination of the formation of the gap S and the engagement of the groove 3211 with the inner peripheral convex portion 2316, as mentioned above, the inner peripheral convex portion 2316 in the outer peripheral ring 2000 is pushed toward the low pressure side (L) (refer to an arrow X).

According to the sealing device 1000 as constructed in the above manner, the same operational effects as in the case of the above-mentioned twenty-seventh reference example can be obtained.

Thirty-First Reference Example

Summary

In this reference example, reference will be made to a construction which can be used in a suitable manner in cases where in the above-mentioned embodiment, individual reference examples and individual practical examples, a special step cut is adopted as an abutment joint portion in an outer peripheral ring.

That is, a sealing device according to the thirty-first reference example of the present disclosure, wherein an abutment joint portion is formed in an outer peripheral ring at one place in a circumferential direction thereof; said abutment joint portion, by being cut in a stepwise shape even when seen from any of an outer peripheral surface side and opposite side wall surface sides thereof, is formed, on an outer peripheral side at one side thereof of a cut portion, with a first engagement convex portion and a first engagement concave portion, and is also formed, on the outer peripheral side at the other side thereof of the cut portion, with a second engagement concave portion into which said first engagement convex portion is engaged, and a second engagement convex portion which is engaged into said first engagement concave portion; and a length from one end face of an inner peripheral side in the cut portion to a tip end of the first engagement convex portion is longer than a length from the one end face of the inner peripheral side in the cut portion to a rear end of the first engagement concave portion, and a length from the other end face of the inner peripheral side in the cut portion to a tip end of the second engagement convex portion is longer than a length from the other end face of the inner peripheral side in the cut portion to a rear end of the second engagement concave portion.

For this reason, even if the peripheral length of the outer peripheral ring becomes longer due to its thermal expansion so that the outer peripheral ring is put into a state where the tip end of the first engagement convex portion is in abutment against the rear end of the second engagement concave portion, and the tip end of the second engagement convex portion is in abutment against the rear end of the first engagement concave portion, a state will be maintained in which a gap is formed between the end faces of the inner peripheral side in the cut portion. Accordingly, it is possible to suppress the inner peripheral ring from being damaged by the end faces of the inner peripheral side in the cut portion being clamped or pinched with each other.

Specific Example

Figure 136:
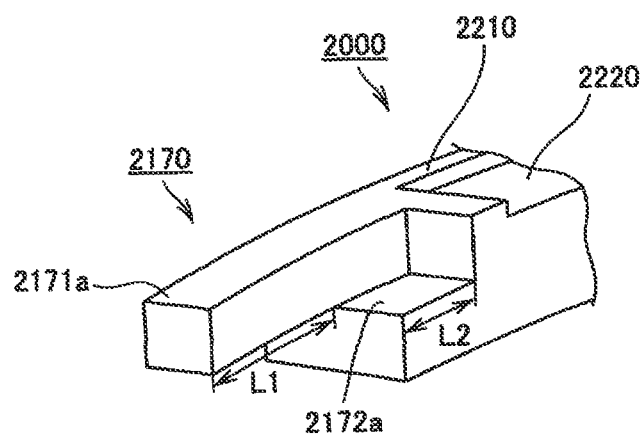
FIG. 136 is a perspective view showing a part of an outer peripheral ring according to a thirty-first reference example of the present disclosure.
Figure 137:
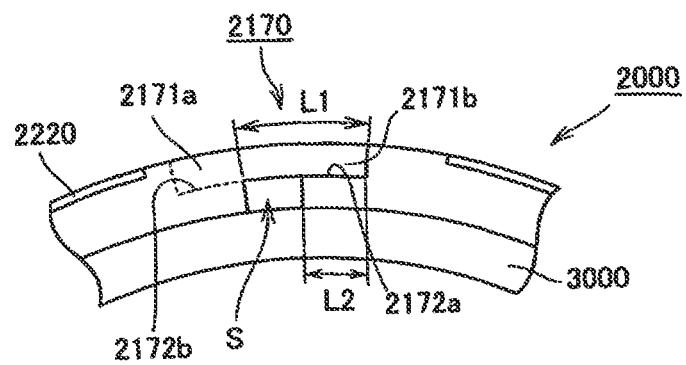
FIG. 137 is a part of a side view of the outer peripheral ring according to the thirty-first reference example of the present disclosure.
Figure 138:
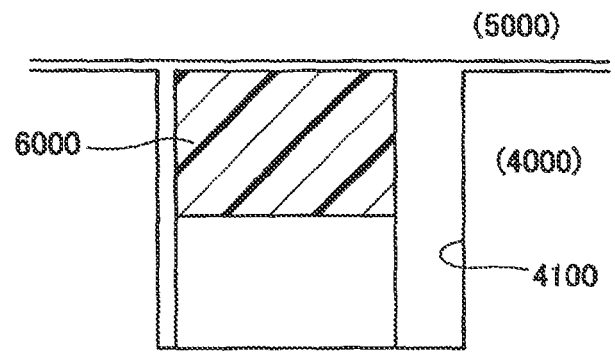
FIG. 138 is a schematic cross sectional view showing a state where oil pressure is not held in a seal ring according to a conventional example.
Figure 139:
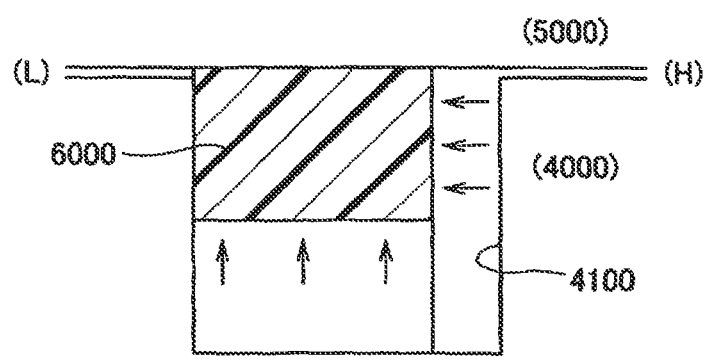
FIG. 139 is a schematic cross sectional view showing a state where oil pressure is held in the seal ring according to the conventional example.

The thirty-first reference example of the present disclosure is shown in FIG. 136 and FIG. 137. In this reference example, a modified form of the abutment joint portion of the outer peripheral ring is shown in the construction shown in each of the above-mentioned embodiment, individual reference examples and individual practical examples. The other construction and operation of this modification are the same as those in the above-mentioned embodiment, and hence, the same component parts as those of the above-mentioned embodiment are denoted by the same reference numerals and characters, and the explanation thereof is omitted.

An abutment joint portion 2170 in an outer peripheral ring 2000 according to this reference example also adopts a so-called special step cut which is formed by being cut in a stepwise shape even when seen from any of an outer peripheral surface side and opposite side wall surface sides thereof, as in the case of the above-mentioned embodiment. As a result of this, in the outer peripheral ring 2000, a first engagement convex portion 2171$a$ and a first engagement concave portion 2172$a$ are formed at one outer peripheral side of a cut portion, and a second engagement concave portion 2172$b$ into which the first engagement convex portion 2571$a$ is engaged, and a second engagement convex portion 2171$b$ which is engaged into the first engagement concave portion 2172$a$ are formed at the other outer peripheral side.

Here, note that in FIG. 136, an end portion at one side of the cut portion in the abutment joint portion 2170 is shown in a perspective view. In addition, in FIG. 137, there is shown a view in which the vicinity of the abutment joint portion 2170 is seen from a side surface thereof.

In general, in the case of the special step cut, a length from one end face of an inner peripheral side (i.e., an end face of one end) in the cut portion to a tip end of a first engagement convex portion (corresponding to L1 in the figure), a length from the one end face to a rear end of a first engagement concave portion (corresponding to L2 in the figure), a length from the other end face of the inner peripheral side (i.e., an end face of the other end) in the cut portion to a tip end of a second engagement convex portion (corresponding to L1 in the figure), and a length from the other end face to a rear end of a second engagement concave portion (corresponding to L2 in the figure) are set to be equal to one another. Accordingly, as the peripheral length of the outer peripheral ring becomes longer due to its thermal expansion, at a certain point of time, the tip end of the first engagement convex portion comes into abutment against the rear end of the second engagement concave portion, and the tip end of the second engagement convex portion comes into abutment against the rear end of the first engagement concave portion, and the inner peripheral side end faces of the outer peripheral ring comes into abutment against each other, at the same time. In other words, it becomes a state where a gap has disappeared between the end faces of the outer peripheral ring at opposite sides of the cut portion.

Accordingly, in the abutment joint portion, the gap between the end faces at opposite sides of the cut portion varies (i.e., becomes larger or smaller) in accordance with the thermal expansion and contraction of the outer peripheral ring. For that reason, in a construction in which an inner peripheral ring made of a rubber-like elastic body is provided inside the outer peripheral ring, when the gap becomes small in a state where a part of an outer peripheral side of the inner peripheral ring has entered the gap, there will be a fear that the part may be pinched and damaged.

Accordingly, in the abutment joint portion 2170 of the outer peripheral ring 2000 according to this reference example, the length L1 from the one end face of the inner peripheral side (the end face of one end) in the cut portion to the tip end of the first engagement convex portion 2171$a$ is set to be longer than the length L2 from the one end face of the inner peripheral side (the end face of the one end) in the cut portion to the rear end of the first engagement concave portion 2172$a$, and the length L1 from the other end face of the inner peripheral side (the end face of the other end) in the cut portion to the tip end of the second engagement convex portion 2171$b$ is set to be longer than the length L2 from the other end face of the inner peripheral side (the end face of the other end) in the cut portion to the rear end of the second engagement concave portion 2172$b$. Here, note that the length from the one end face of the inner peripheral side (the end face of the one end) in the cut portion to the tip end of the first engagement convex portion 2171$a$ and the length from the other end face of the inner peripheral side (the end face of the other end) in the cut portion to the tip end of the second engagement convex portion 2171$b$ are each the same length L1. In addition, the length from the one end face of the inner peripheral side (the end face of the one end) in the cut portion to the rear end of the first engagement concave portion 2172$a$ and the length from the other end face of the inner peripheral side (the end face of the other end) in the cut portion to the rear end of the second engagement concave portion 2172b are each the same length L2.

Here, note that an inner peripheral ring 3000 and a concave portion 2220 formed on the outer peripheral surface of the outer peripheral ring 2000 are the same as explained in the above-mentioned embodiment, and so, the explanation thereof is omitted.

As described above, in the sealing device according to this reference example, too, the same operational effects as in the case of the above-mentioned embodiment can be obtained. In addition, in the case of the sealing device according to this reference example, even if the peripheral length of the outer peripheral ring 2000 becomes longer due to its thermal expansion so that the outer peripheral ring 2000 is put into a state where the tip end of the first engagement convex portion 2171a is in abutment against the rear end of the second engagement concave portion 2172b, and the tip end of the second engagement convex portion 2171b is in abutment against the rear end of the first engagement concave portion 2172a, a state will be maintained in which a gap S is formed between the end faces of the inner peripheral side in the cut portion (refer to FIG. 137). Accordingly, it is possible to suppress the inner peripheral ring 3000 from being damaged by the end faces of the inner peripheral side in the cut portion being clamped or pinched with each other. Here, note that it is preferable to appropriately set the gap S with which damage to the inner peripheral ring 3000 will not be caused, according to the service or use environment, the rigidity of the inner peripheral ring 3000, etc., and to set a difference between L1 and L2 according to the gap S.

Here, note that as explained in the beginning of this reference example, the construction of the special step cut according to this reference example can be applied not only to the above-mentioned embodiment, but also to a case where in each of the above-mentioned individual reference examples and individual practical examples, the special step cut is adopted for an abutment joint portion of an outer peripheral ring.

<Modification of the Thirty-First Reference Example>

Summary

Reference will be made to a case where the construction of the special step cut according to the above-mentioned thirty-first reference example is applied to the construction of the sealing device according to the eleventh reference example.

That is, a sealing device according to the eleventh reference example of the present disclosure, which is fitted into an annular groove formed in an outer periphery of a shaft so as to seal an annular gap between said shaft and a housing which rotate relative to each other, thereby to hold a fluid pressure in a region to be sealed which is constructed such that the fluid pressure therein changes, comprising: an outer peripheral ring made of resin that is in intimate contact with a side wall surface of said annular groove at a low pressure side thereof, and slides with respect to an inner peripheral surface of a shaft hole in said housing through which said shaft is inserted; and an inner peripheral ring made of a rubber-like elastic body that is in intimate contact with an inner peripheral surface of said outer peripheral ring and a groove bottom surface of said annular groove, respectively, thereby to push said outer peripheral ring toward an outer peripheral surface side thereof; wherein said outer peripheral ring is formed on its outer peripheral surface with a concave portion which extends from an end of a high pressure side to a position which does not arrive at an end of a low pressure side, so as to introduce fluid thereinto from the high pressure side, in a state where said outer peripheral ring is fitted in a normal direction; and wherein said outer peripheral ring is formed with a fitting direction detection passage that forms a flow passage through which fluid to be sealed leaks from the high pressure side to the low pressure side, in a state where said outer peripheral ring is fitted in a reverse direction.

And, it is further characterized in the following features: an abutment joint portion is formed on said outer peripheral ring at one place in a circumferential direction thereof; said abutment joint portion, by being cut in a stepwise shape even when seen from any of an outer peripheral surface side and opposite side wall surface sides thereof, is formed, on an outer peripheral side at one side thereof of a cut portion, with a first engagement convex portion and a first engagement concave portion, and is also formed, on the outer peripheral side at the other side thereof of the cut portion, with a second engagement concave portion into which said first engagement convex portion is engaged, and a second engagement convex portion which is engaged into said first engagement concave portion; it is constructed such that a length from one end face of an inner peripheral side in the cut portion to a tip end of the first engagement convex portion is longer than a length from the one end face of the inner peripheral side in the cut portion to a rear end of the first engagement concave portion, and a length from the other end face of the inner peripheral side in the cut portion to a tip end of the second engagement convex portion is longer than a length from the other end face of the inner peripheral side in the cut portion to a rear end of the second engagement concave portion; and said fitting direction detection passage is composed of a gap that is formed at an inner peripheral surface side in the abutment joint portion of said outer peripheral ring so as to extend in an axial direction, and a groove that is formed at a side wall surface side of said outer peripheral ring at the low pressure side in a state where said outer peripheral ring is fitted in the reverse direction, and extends in a radial direction so as to be connected with said gap.

With the above construction, the operational effects of the sealing device according to the eleventh reference example are obtained, and at the same time, the operational effects of the sealing device according to the thirty-first reference example are obtained.

Specific Example

As described above, in the thirty-first reference example, the gap S extending in the axial direction will always be formed at the inner peripheral surface side in the abutment joint portion 2170 of the outer peripheral ring 2000, as mentioned above. Accordingly, this gap S can be utilized as the fitting direction detection passage explained in the eleventh reference example. That is, it becomes possible to form the fitting direction detection passage by forming on the side wall surface of the outer peripheral ring 2000 at the low pressure side (L) a groove extending in a radial direction so as to be connected with the above-mentioned gap S. In other words, by forming a groove 2420a extending in a radial direction, as shown by a broken line in FIG. 79, the fitting direction detection passage can be formed by the gap S and the groove 2420a referred to above.

Here, note that in the above-mentioned eleventh reference example, the outer peripheral ring 2000 may be formed with only a fitting direction detection passage which is composed of such a gap S and such a groove 2420a, or a construction may instead be adopted in which the outer peripheral ring 2000 is formed with both a fitting direction detection passage which is composed of the first groove 2324 and the second groove 2420 referred to above, and a fitting direction detection passage which is composed of the gap S and the groove 2420a.

(Others)

The characteristic constructions in the above-mentioned individual reference examples and individual practical examples are not limited to the cases in which a particular explanation has been made in the reference examples and practical examples, but may be combined with one another in a suitable manner as much as possible.

For example, a characteristic construction in the second reference example can be applied to the above-mentioned individual reference examples and individual practical examples except for the fourth through tenth and nineteenth through thirtieth reference examples.

In addition, a characteristic construction in the third reference example can be applied to the above-mentioned individual reference examples and individual practical examples except for the fourth through tenth and twenty-third through thirtieth practical examples.

Further, individual characteristic constructions in the first through fourth practical examples can be applied to the above-mentioned individual reference examples, respectively, except for the eighteenth, twenty-fourth, twenty-fifth and twenty-sixth reference examples. In the following, particularly preferable combinations will be explained.

(Combination of the First Practical Example and the Thirty-First Reference Example)

It is preferable to apply the construction of the abutment joint portion 2170 shown in the thirty-first reference example as illustrated in FIG. 136 and FIG. 137 to the abutment joint portion 2100 of the outer peripheral ring 2000 which is formed with a plurality of concave portions 2220, 2220a, 2220b, 2220c shown in the first practical example and in the various modifications thereof explained with reference to the above-mentioned FIG. 19 through FIG. 28.

(Combination of the Tenth Reference Example and the Thirty-First Reference Example)

It is preferable to apply the construction of the abutment joint portion 2170 shown in the thirty-first reference example as illustrated in FIG. 136 and FIG. 137 to the abutment joint portion 2100 of the outer peripheral ring 2000 which is formed with the inclined surface 2323 shown in the tenth reference example explained with reference to the above-mentioned FIG. 71 through FIG. 75. However, it is necessary to form the inclined surface 2323 as shown in FIG. 73, for example, on the abutment joint portion 2170, too.

(Combination of the First Practical Example, the Thirteenth Reference Example and the Thirty-First Reference Example)

It is preferable to further apply the construction of the abutment joint portion having the fitting direction detection concave portion 2112d explained in the thirtieth reference example and in the modification thereof described with reference to FIG. 92 through FIG. 102 to the above-mentioned construction which is the combination of the first practical example and the thirty-first reference example.

EXPLANATION OF REFERENCE NUMERALS AND CHARACTERS 1000 sealing device
2000 outer peripheral ring
2100 abutment joint portion
2111 first engagement convex portion
2111a side wall surface
2111b inner peripheral surface
2111c tip end face
2112 second engagement convex portion
2112a side wall surface
2112b inner peripheral surface
2112c tip end face
2112d fitting direction detection concave portion
2121 first engagement concave portion
2121a side wall surface
2121b outer peripheral surface
2121c end face
2122 second engagement concave portion
2122a side wall surface
2122b outer peripheral surface
2122c end face
2131 end face
2132 end face
2132a low pressure side end face
2132b high pressure side end face
2150 abutment joint portion
2151 engagement convex portion
2151a side wall surface
2151b inner peripheral surface
2151c end face
2152 engagement concave portion
2152a side wall surface
2152b outer peripheral surface
2152c end face
2155 engagement convex portion
2155a inclined surface
2155c end face
2156 engagement concave portion
2156a inclined surface
2156c end face
2170 abutment joint portion
2171a first engagement convex portion
2171b second engagement convex portion
2172a first engagement concave portion
2172b second engagement concave portion
2210 low pressure side convex portion
2211, 2211a, 2211b, 2211c rib
2211c1 inclined surface
2212, 2212a, 2212b, 2213 and 2214 convex portion
2215 outer peripheral convex portion
2220, 2220a, 2220b, 2220c, 2223 concave portion
2221, 2221a, 2221b third concave portion
2222, 2222a, 2222b fourth concave portion
2311 convex portion
2312, 2313 inner peripheral convex portion
2314 convex portion
2315 convex portion
2316 inner peripheral convex portion
2321 mounting groove
2322 second concave portion
2323 inclined surface
2324 first groove
2400 protrusion portion
2420 second groove
2420a groove
2510, 2511 convex portion
2520 concave portion
2571a engagement convex portion
3000, 3100, 3110, 3120, 3130, 3140, 3150, 3160, 3170, 3180, 3190, 3200, 3210 inner peripheral ring
3111, 3112, 3113, 3121, 3122, 3123, 3124, 3131, 3132, 3133, 3141, 3142 seal portion
3151, 3152, 3153, 3161 annular groove 3181, 3191, 3201, 3211 groove
3500, 3510 position limiting ring
4000 shaft
4100, 4110, 4120, 4130, 4140, 4150, 4160, 4170, 4180 annular groove
4121 annular concave portion
4122 annular convex portion
4131 convex portion
4141, 4151, 4161, 4171, 4180, 4181 concave portion
5000 housing
5110 large diameter portion
5120 small diameter portion
5130 stepped surface

The invention claimed is:

1. A sealing device which is fitted into an annular groove formed in an outer periphery of a shaft so as to seal an annular gap between said shaft and a housing which rotate relative to each other, thereby to hold a fluid pressure in a region to be sealed which is constructed such that the fluid pressure therein changes, comprising:
an outer peripheral ring made of resin that is in intimate contact with a side wall surface of said annular groove at a low pressure side thereof, and slides with respect to an inner peripheral surface of a shaft hole in said housing through which said shaft is inserted; and
an inner peripheral ring made of a rubber-like elastic body that is in intimate contact with an inner peripheral surface of said outer peripheral ring and a groove bottom surface of said annular groove, respectively, thereby to push said outer peripheral ring toward an outer peripheral surface side thereof;
wherein a portion in said outer peripheral ring which slides with respect to the inner peripheral surface of said shaft hole is constructed by a raised portion which is formed so as to extend along a majority of a circumferential direction while changing its position to a high pressure side and a low pressure side in an alternate manner.

2. A sealing device which is fitted into an annular groove formed in an outer periphery of a shaft so as to seal an annular gap between said shaft and a housing which rotate relative to each other, thereby to hold a fluid pressure in a region to be sealed which is constructed such that the fluid pressure therein changes, comprising:
an outer peripheral ring made of resin that is in intimate contact with a side wall surface of said annular groove at a low pressure side thereof, and slides with respect to an inner peripheral surface of a shaft hole in said housing through which said shaft is inserted; and
an inner peripheral ring made of a rubber-like elastic body that is in intimate contact with an inner peripheral surface of said outer peripheral ring and a groove bottom surface of said annular groove, respectively, thereby to push said outer peripheral ring toward an outer peripheral surface side thereof;
wherein said outer peripheral ring is formed on its outer peripheral surface with a plurality of recessed portions which are spaced from one another along a majority of a circumferential direction and which each extend from an end of a high pressure side to a position which does not arrive at an end of a low pressure side, so as to introduce fluid thereinto from the high pressure side; and
wherein raised portions each formed between adjacent recessed portions are formed so as to extend from the low pressure side toward the high pressure side as they go in the sliding direction of said outer peripheral ring with respect to said housing.

3. A sealing structure which is provided with:
a shaft and a housing that rotate relative to each other; and
a sealing device that is fitted into an annular groove formed in an outer periphery of said shaft so as to seal an annular gap between said shaft and said housing, thereby to hold a fluid pressure in a region to be sealed which is constructed such that the fluid pressure therein changes;
wherein said sealing device comprises:
an outer peripheral ring made of resin that is in intimate contact with a side wall surface of said annular groove at a low pressure side thereof, and slides with respect to an inner peripheral surface of a shaft hole in said housing through which said shaft is inserted; and
an inner peripheral ring made of a rubber-like elastic body that is in intimate contact with an inner peripheral surface of said outer peripheral ring and a groove bottom surface of said annular groove, respectively, thereby to push said outer peripheral ring toward an outer peripheral surface side thereof;
said outer peripheral ring is formed on its outer peripheral surface with a plurality of recessed portions which are spaced from one another along a majority of a circumferential direction and which extend from an end of a high pressure side to a position which does not arrive at an end of a low pressure side, so as to introduce fluid thereinto from the high pressure side; and
raised portions each formed between adjacent recessed portions are formed so as to extend from the low pressure side toward the high pressure side as they go in the sliding direction of said outer peripheral ring with respect to said housing.

4. A sealing device which is fitted into an annular groove formed in an outer periphery of a shaft so as to seal an annular gap between said shaft and a housing which rotate relative to each other, thereby to hold a fluid pressure in a region to be sealed which is constructed such that the fluid pressure therein changes, comprising:
an outer peripheral ring made of resin that is in intimate contact with a side wall surface of said annular groove at a low pressure side thereof, and slides with respect to an inner peripheral surface of a shaft hole in said housing through which said shaft is inserted; and
an inner peripheral ring made of a rubber-like elastic body that is in intimate contact with an inner peripheral surface of said outer peripheral ring and a groove bottom surface of said annular groove, respectively, thereby to push said outer peripheral ring toward an outer peripheral surface side thereof;
wherein said outer peripheral ring is formed on its outer peripheral surface with a plurality of recessed portions which are spaced from one another along a majority of a circumferential direction and which each extend from an end of a high pressure side to a position which does not arrive at an end of a low pressure side, so as to introduce fluid thereinto from the high pressure side; and
wherein raised portions each formed between adjacent recessed portions are formed so as to extend from the high pressure side toward the low pressure side as they go in the sliding direction of said outer peripheral ring with respect to said housing.

5. A sealing structure which is provided with:
a shaft and a housing that rotate relative to each other; and
a sealing device that is fitted into an annular groove formed in an outer periphery of said shaft so as to seal an annular gap between said shaft and said housing, thereby to hold a fluid pressure in a region to be sealed which is constructed such that the fluid pressure therein changes;

wherein said sealing device comprises:
an outer peripheral ring made of resin that is in intimate contact with a side wall surface of said annular groove at a low pressure side thereof, and slides with respect to an inner peripheral surface of a shaft hole in said housing through which said shaft is inserted; and
an inner peripheral ring made of a rubber-like elastic body that is in intimate contact with an inner peripheral surface of said outer peripheral ring and a groove bottom surface of said annular groove, respectively, thereby to push said outer peripheral ring toward an outer peripheral surface side thereof;
said outer peripheral ring is formed on its outer peripheral surface with a plurality of recessed portions which are spaced from one another along a majority of a circumferential direction and which extend from an end of a high pressure side to a position which does not arrive at an end of a low pressure side, so as to introduce fluid thereinto from the high pressure side; and
raised portions each formed between adjacent recessed portions are formed so as to extend from the high pressure side toward the low pressure side as they go in the sliding direction of said outer peripheral ring with respect to said housing.

* * * * *